(12) United States Patent
Van Os et al.

(10) Patent No.: US 9,842,330 B1
(45) Date of Patent: Dec. 12, 2017

(54) USER INTERFACES FOR STORED-VALUE ACCOUNTS

(71) Applicant: APPLE INC., Cupertino, CA (US)

(72) Inventors: Marcel Van Os, San Francisco, CA (US); Charles Ahn, Portola Valley, CA (US); Oluwatomiwa B. Alabi, San Francisco, CA (US); Peter D. Anton, San Francisco, CA (US); George R. Dicker, Sunnyvale, CA (US); Donald W. Pitschel, San Francisco, CA (US); Glen W. Steele, San Jose, CA (US); Simon Tickner, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/274,086

(22) Filed: Sep. 23, 2016

Related U.S. Application Data

(60) Provisional application No. 62/384,043, filed on Sep. 6, 2016.

(51) Int. Cl.
| | |
|---|---|
| *G06Q 40/00* | (2012.01) |
| *G06Q 20/32* | (2012.01) |
| *G06Q 20/40* | (2012.01) |
| *G06Q 20/36* | (2012.01) |

(52) U.S. Cl.
CPC ....... *G06Q 20/327* (2013.01); *G06Q 20/3674* (2013.01); *G06Q 20/40* (2013.01)

(58) Field of Classification Search
CPC ................................................. G06Q 20/3674
USPC .......................................................... 705/40
See application file for complete search history.

(56) References Cited

U.S. PATENT DOCUMENTS

| | | | |
|---|---|---|---|
| 5,917,913 | A | 6/1999 | Wang |
| 6,212,548 | B1 | 4/2001 | DeSimone et al. |
| 6,282,656 | B1 | 8/2001 | Wang |
| 6,398,646 | B1 | 6/2002 | Wei et al. |
| 7,155,411 | B1 | 12/2006 | Blinn et al. |

(Continued)

FOREIGN PATENT DOCUMENTS

| | | |
|---|---|---|
| AU | 2015100708 A4 | 7/2015 |
| AU | 2015100709 A4 | 7/2015 |

(Continued)

OTHER PUBLICATIONS

Advisory Action received for U.S. Appl. No. 14/503,296, dated Oct. 2, 2015, 3 pages.

(Continued)

*Primary Examiner* — Edward Chang
(74) *Attorney, Agent, or Firm* — Dentons US LLP

(57) ABSTRACT

In some examples, an account is provisioned onto an electronic device. In some examples, the device receives a value to fund the account provisioned on the electronic device. In some examples, the electronic device transacts with a contactless transaction terminal using the provisioned account and displays an indication of the transaction. In some examples, the electronic device transmits information corresponding to the provisioned account without checking for authentication. In some examples, the device receives user input initiating a process for moving the account from a first device to a second device. In some examples, the device receives account payment credentials from a second device when a set of payment criteria are met.

75 Claims, 121 Drawing Sheets

(56) References Cited

U.S. PATENT DOCUMENTS

| | | |
|---|---|---|
| 7,305,350 B1 | 12/2007 | Bruecken |
| 7,454,192 B1 | 11/2008 | Zhu |
| 7,644,019 B2 | 1/2010 | Woda et al. |
| RE42,574 E | 7/2011 | Cockayne |
| 8,050,997 B1 | 11/2011 | Nosek et al. |
| 8,060,571 B2 | 11/2011 | Rao |
| 8,195,507 B2 | 6/2012 | Postrel |
| 8,195,576 B1 | 6/2012 | Grigg et al. |
| 8,392,259 B2 | 3/2013 | MacGillivray et al. |
| 8,453,940 B2 | 6/2013 | Diamond |
| 8,571,937 B2 | 10/2013 | Rose et al. |
| 8,763,896 B2 | 7/2014 | Kushevsky et al. |
| 8,880,055 B1 | 11/2014 | Clement et al. |
| 8,892,474 B1 | 11/2014 | Inskeep et al. |
| 8,931,703 B1 | 1/2015 | Mullen et al. |
| 8,942,420 B2 | 1/2015 | Kim et al. |
| 9,269,083 B1 | 2/2016 | Jarajapu et al. |
| 9,324,067 B2 | 4/2016 | Van Os et al. |
| 9,355,393 B2 | 5/2016 | Purves et al. |
| 9,483,763 B2 | 11/2016 | Van Os et al. |
| 2001/0039497 A1 | 11/2001 | Hubbard |
| 2002/0023215 A1 | 2/2002 | Wang et al. |
| 2002/0029169 A1 | 3/2002 | Oki et al. |
| 2003/0061157 A1 | 3/2003 | Hirka et al. |
| 2003/0142227 A1 | 7/2003 | van Zee |
| 2003/0181201 A1 | 9/2003 | Bomze et al. |
| 2003/0200184 A1 | 10/2003 | Dominguez et al. |
| 2004/0169722 A1 | 9/2004 | Pena |
| 2004/0254891 A1 | 12/2004 | Blinn et al. |
| 2005/0187873 A1 | 8/2005 | Labrou et al. |
| 2005/0210394 A1 | 9/2005 | Crandall et al. |
| 2005/0253814 A1 | 11/2005 | Ghassabian |
| 2006/0000900 A1 | 1/2006 | Fernandes et al. |
| 2006/0064313 A1 | 3/2006 | Steinbarth et al. |
| 2006/0064372 A1 | 3/2006 | Gupta |
| 2006/0165060 A1 | 7/2006 | Dua |
| 2006/0179404 A1 | 8/2006 | Yolleck et al. |
| 2006/0206709 A1 | 9/2006 | Labrou et al. |
| 2006/0294025 A1 | 12/2006 | Mengerink |
| 2007/0096765 A1 | 5/2007 | Kagan |
| 2007/0131759 A1 | 6/2007 | Cox et al. |
| 2007/0194113 A1 | 8/2007 | Esplin et al. |
| 2007/0254712 A1 | 11/2007 | Chitti |
| 2007/0260558 A1 | 11/2007 | Look |
| 2008/0040265 A1 | 2/2008 | Rackley, III et al. |
| 2008/0041936 A1 | 2/2008 | Vawter |
| 2008/0052181 A1 | 2/2008 | Devitt-Carolan et al. |
| 2008/0120707 A1 | 5/2008 | Ramia |
| 2008/0208762 A1 | 8/2008 | Arthur et al. |
| 2009/0030793 A1 | 1/2009 | Fordyce, III |
| 2009/0036165 A1 | 2/2009 | Brede |
| 2009/0037326 A1 | 2/2009 | Chitti et al. |
| 2009/0057396 A1 | 3/2009 | Barbour et al. |
| 2009/0083850 A1 | 3/2009 | Fadell et al. |
| 2009/0135678 A1 | 5/2009 | Godat |
| 2009/0173784 A1 | 7/2009 | Yang |
| 2009/0182674 A1 | 7/2009 | Patel et al. |
| 2009/0195469 A1 | 8/2009 | Lim et al. |
| 2009/0210308 A1 | 8/2009 | Toomer et al. |
| 2009/0307139 A1 | 12/2009 | Mardikar et al. |
| 2010/0023449 A1 | 1/2010 | Skowronek et al. |
| 2010/0026453 A1 | 2/2010 | Yamamoto et al. |
| 2010/0042517 A1 | 2/2010 | Paintin et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0114731 A1 | 5/2010 | Kingston et al. |
| 2010/0153265 A1 | 6/2010 | Hershfield et al. |
| 2010/0161434 A1 | 6/2010 | Herwig et al. |
| 2010/0164864 A1 | 7/2010 | Chou |
| 2010/0223145 A1 | 9/2010 | Dragt |
| 2010/0267362 A1 | 10/2010 | Smith et al. |
| 2010/0306107 A1 | 12/2010 | Nahari |
| 2011/0078025 A1 | 3/2011 | Shrivastav |
| 2011/0099079 A1 | 4/2011 | White |
| 2011/0106671 A1 | 5/2011 | Minnis et al. |
| 2011/0159959 A1 | 6/2011 | Mallinson et al. |
| 2011/0184820 A1 | 7/2011 | Mon et al. |
| 2011/0214158 A1 | 9/2011 | Pasquero et al. |
| 2011/0218849 A1 | 9/2011 | Rutigliano et al. |
| 2011/0225057 A1 | 9/2011 | Webb et al. |
| 2011/0251892 A1 | 10/2011 | Laracey |
| 2012/0024947 A1 | 2/2012 | Naelon |
| 2012/0028609 A1 | 2/2012 | Hruska |
| 2012/0036029 A1 | 2/2012 | Esplin et al. |
| 2012/0078751 A1 | 3/2012 | MacPhail et al. |
| 2012/0089507 A1 | 4/2012 | Zhang et al. |
| 2012/0101881 A1 | 4/2012 | Taylor et al. |
| 2012/0101887 A1 | 4/2012 | Harvey et al. |
| 2012/0123937 A1 | 5/2012 | Spodak |
| 2012/0185397 A1 | 7/2012 | Levovitz |
| 2012/0191603 A1 | 7/2012 | Nuzzi |
| 2012/0197740 A1 | 8/2012 | Grigg et al. |
| 2012/0215647 A1 | 8/2012 | Powell et al. |
| 2012/0221464 A1 | 8/2012 | Pasquero et al. |
| 2012/0238363 A1 | 9/2012 | Watanabe et al. |
| 2012/0245985 A1 | 9/2012 | Cho et al. |
| 2012/0284185 A1 | 11/2012 | Mettler et al. |
| 2012/0290449 A1 | 11/2012 | Mullen et al. |
| 2012/0290472 A1 | 11/2012 | Mullen et al. |
| 2012/0310760 A1 | 12/2012 | Phillips et al. |
| 2012/0317023 A1 | 12/2012 | Moon et al. |
| 2012/0322370 A1 | 12/2012 | Lee |
| 2012/0322371 A1 | 12/2012 | Lee |
| 2013/0006746 A1 | 1/2013 | Moore |
| 2013/0031217 A1 | 1/2013 | Rajapakse |
| 2013/0047034 A1 | 2/2013 | Salomon et al. |
| 2013/0080272 A1 | 3/2013 | Renta et al. |
| 2013/0080275 A1 | 3/2013 | Ronca et al. |
| 2013/0082819 A1 | 4/2013 | Cotterill |
| 2013/0085931 A1 | 4/2013 | Runyan |
| 2013/0103519 A1 | 4/2013 | Kountotsis et al. |
| 2013/0110719 A1 | 5/2013 | Carter et al. |
| 2013/0124319 A1 | 5/2013 | Hodge et al. |
| 2013/0179304 A1 | 7/2013 | Swist |
| 2013/0189953 A1 | 7/2013 | Mathews |
| 2013/0198112 A1 | 8/2013 | Bhat |
| 2013/0200146 A1 | 8/2013 | Moghadam |
| 2013/0212655 A1 | 8/2013 | Hoyos et al. |
| 2013/0218721 A1 | 8/2013 | Borhan et al. |
| 2013/0232073 A1 | 9/2013 | Sheets et al. |
| 2013/0238455 A1 | 9/2013 | Laracey |
| 2013/0239202 A1 | 9/2013 | Adams et al. |
| 2013/0246202 A1 | 9/2013 | Tobin |
| 2013/0282533 A1 | 10/2013 | Foran-Owens et al. |
| 2013/0297414 A1 | 11/2013 | Goldfarb et al. |
| 2013/0304651 A1 | 11/2013 | Smith |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0346273 A1 | 12/2013 | Stockton et al. |
| 2014/0006285 A1 | 1/2014 | Chi et al. |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0052553 A1 | 2/2014 | Uzo |
| 2014/0058860 A1 | 2/2014 | Roh et al. |
| 2014/0058935 A1 | 2/2014 | Mijares |
| 2014/0058941 A1 | 2/2014 | Moon et al. |
| 2014/0074569 A1 | 3/2014 | Francis et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0094124 A1 | 4/2014 | Dave et al. |
| 2014/0095225 A1 | 4/2014 | Williams et al. |
| 2014/0099886 A1 | 4/2014 | Monroe |
| 2014/0101056 A1 | 4/2014 | Wendling |
| 2014/0122331 A1 | 5/2014 | Vaish et al. |
| 2014/0129435 A1 | 5/2014 | Pardo et al. |
| 2014/0129441 A1 | 5/2014 | Blanco et al. |
| 2014/0134947 A1 | 5/2014 | Stouder-Studenmund |
| 2014/0138435 A1 | 5/2014 | Khalid |
| 2014/0140587 A1 | 5/2014 | Ballard et al. |

(56) References Cited

U.S. PATENT DOCUMENTS

| | | |
|---|---|---|
| 2014/0143145 A1 | 5/2014 | Kortina et al. |
| 2014/0149198 A1 | 5/2014 | Kim et al. |
| 2014/0156531 A1 | 6/2014 | Poon et al. |
| 2014/0164241 A1 | 6/2014 | Neuwirth |
| 2014/0181747 A1 | 6/2014 | Son |
| 2014/0187856 A1 | 7/2014 | Holoien et al. |
| 2014/0188673 A1 | 7/2014 | Graham et al. |
| 2014/0197234 A1 | 7/2014 | Hammad |
| 2014/0215361 A1 | 7/2014 | Hwang et al. |
| 2014/0244495 A1 | 8/2014 | Davis et al. |
| 2014/0258292 A1 | 9/2014 | Thramann et al. |
| 2014/0279442 A1 | 9/2014 | Luoma et al. |
| 2014/0279474 A1 | 9/2014 | Evans et al. |
| 2014/0279556 A1 | 9/2014 | Priebatsch et al. |
| 2014/0282987 A1 | 9/2014 | Narendra et al. |
| 2014/0292396 A1 | 10/2014 | Bruwer et al. |
| 2014/0337207 A1 | 11/2014 | Zhang et al. |
| 2014/0344082 A1 | 11/2014 | Soundararajan |
| 2014/0359140 A1 | 12/2014 | Shankarraman |
| 2014/0372309 A1 | 12/2014 | Shirey et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0012435 A1 | 1/2015 | Ramavarjula et al. |
| 2015/0014141 A1 | 1/2015 | Rao et al. |
| 2015/0039494 A1 | 2/2015 | Sinton et al. |
| 2015/0051846 A1 | 2/2015 | Masuya |
| 2015/0056957 A1 | 2/2015 | Mardikar et al. |
| 2015/0058146 A1 | 2/2015 | Gaddarn et al. |
| 2015/0066758 A1 | 3/2015 | DeNardis et al. |
| 2015/0077362 A1 | 3/2015 | Seo |
| 2015/0095174 A1 | 4/2015 | Dua |
| 2015/0095175 A1 | 4/2015 | Dua |
| 2015/0120545 A1 | 4/2015 | Fiore et al. |
| 2015/0121405 A1 | 4/2015 | Ekselius et al. |
| 2015/0127539 A1 | 5/2015 | Ye et al. |
| 2015/0178878 A1 | 6/2015 | Huang |
| 2015/0186871 A1 | 7/2015 | Laracey |
| 2015/0195133 A1 | 7/2015 | Sheets et al. |
| 2015/0215128 A1 | 7/2015 | Pal |
| 2015/0229750 A1 | 8/2015 | Zhou et al. |
| 2015/0242837 A1 | 8/2015 | Yarbrough et al. |
| 2015/0254661 A1 | 9/2015 | Lanc |
| 2015/0257004 A1 | 9/2015 | Shanmugam et al. |
| 2015/0295921 A1 | 10/2015 | Cao |
| 2015/0302510 A1 | 10/2015 | Godsey et al. |
| 2015/0348001 A1 | 12/2015 | Van Os et al. |
| 2015/0348002 A1 | 12/2015 | Van Os et al. |
| 2015/0348009 A1 | 12/2015 | Brown et al. |
| 2015/0348014 A1 | 12/2015 | Van Os et al. |
| 2015/0348029 A1 | 12/2015 | Van Os et al. |
| 2016/0005024 A1 | 1/2016 | Harrell |
| 2016/0012417 A1 | 1/2016 | Mizon |
| 2016/0012465 A1 | 1/2016 | Sharp |
| 2016/0021003 A1 | 1/2016 | Pan |
| 2016/0034887 A1 | 2/2016 | Lee |
| 2016/0086176 A1 | 3/2016 | Silva Pinto et al. |
| 2016/0092665 A1 | 3/2016 | Cowan et al. |
| 2016/0104228 A1 | 4/2016 | Sundaresan |
| 2016/0132864 A1 | 5/2016 | Barrese et al. |
| 2016/0134488 A1 | 5/2016 | Straub et al. |
| 2016/0180305 A1 | 6/2016 | Dresser et al. |
| 2016/0224966 A1 | 8/2016 | Van Os et al. |
| 2016/0224973 A1 | 8/2016 | Van Os et al. |
| 2016/0232516 A1* | 8/2016 | Dayan ............... G06Q 20/3227 |
| 2016/0253665 A1 | 9/2016 | Van Os et al. |
| 2016/0267779 A1 | 9/2016 | Kuang |
| 2016/0358133 A1 | 12/2016 | Van Os et al. |
| 2016/0358134 A1 | 12/2016 | Van Os et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2017/0032375 A1 | 2/2017 | Van Os et al. |

FOREIGN PATENT DOCUMENTS

| | | |
|---|---|---|
| AU | 2016100796 A4 | 6/2016 |
| CN | 104038256 A | 9/2014 |
| EP | 2654275 A1 | 10/2013 |
| EP | 2701107 A1 | 2/2014 |
| EP | 2725537 A1 | 4/2014 |
| GB | 2466038 A | 6/2010 |
| JP | 2003-346059 A | 12/2003 |
| JP | 2004-252736 A | 9/2004 |
| JP | 2005-521961 A | 7/2005 |
| JP | 2005-523505 A | 8/2005 |
| JP | 2012-508930 A | 4/2012 |
| JP | 2014-44719 A | 3/2014 |
| KR | 10-2004-0049502 A | 6/2004 |
| KR | 10-2008-0064395 A | 7/2008 |
| KR | 10-2011-0056561 A | 5/2011 |
| WO | 1999/44114 A1 | 9/1999 |
| WO | 2003/083793 A2 | 10/2003 |
| WO | 2007/000012 A1 | 1/2007 |
| WO | 2010/039337 A2 | 4/2010 |
| WO | 2010/056484 A2 | 5/2010 |
| WO | 2010/128442 A2 | 11/2010 |
| WO | 2012/083113 A2 | 6/2012 |
| WO | 2013/000150 A1 | 1/2013 |
| WO | 2013/023224 A2 | 2/2013 |
| WO | 2013/177548 A1 | 11/2013 |
| WO | 2014/074407 A1 | 5/2014 |
| WO | 2014/147297 A1 | 9/2014 |
| WO | 2015/009581 A1 | 1/2015 |
| WO | 2015/030912 A1 | 3/2015 |
| WO | 2015/051361 A1 | 4/2015 |
| WO | 2017/072589 A2 | 5/2017 |

OTHER PUBLICATIONS

Advisory Action received for U.S. Appl. No. 14/869,715, dated Feb. 8, 2017, 3 pages.

Advisory Action received for U.S. Appl. No. 141869,715, dated May 18, 2017, 6 pages.

Advisory Action received for U.S. Appl. No. 14/869,877, dated Jan. 5, 2017, 3 pages.

Advisory Action received for U.S. Appl. No. 14/870,793, dated Apr. 13, 2017, 3 pages.

Advisory Action received for U.S. Appl. No. 15/137,944, dated May 11, 2017, 6 pages.

Extended European Search Report received for European Patent Application No. 16201159.7, dated Mar. 27, 2017, 12 pages.

Extended European Search Report received for European Patent Application No. 16201195,1, dated Feb. 7, 2017, 13 pages.

Extended European Search Report received for European Patent Application No. 16201205.8, dated Jan. 5, 2017, 12 pages.

Final Office Action received for U.S. Appl. No. 14/503,072, dated Mar. 2, 2017, 9 pages.

Final Office Action received for U.S. Appl. No. 14/503,072, dated Sep. 1, 2015, 16 pages.

Final Office Action received for U.S. Appl. No. 14/503,296, dated Jul. 2, 2015, 7 pages.

Final Office Action received for U.S. Appl. No. 14/869,715, dated Jun. 17, 2016, 35 pages.

Final Office Action received for U.S. Appl. No. 14/869,715, dated Mar. 7, 2017, 41 pages.

Final Office Action received for U.S. Appl. No. 14/869,715, dated Oct. 6, 2016, 37 pages.

Final Office Action received for U.S. Appl. No. 14/869,831, dated Aug. 2, 2016, 14 pages.

Final Office Action received for U.S. Appl. No. 14/869,831, dated May 19, 2017, 20 pages.

Final Office Action received for U.S. Appl. No. 14/869,877, dated Aug. 3, 2016, 13 pages.

Final Office Action received for U.S. Appl. No. 14/870,726, dated Apr. 19, 2017, 17 pages.

Final Office Action received for U.S. Appl. No. 14/870,793, dated Jan. 19, 2017, 16 pages.

(56) References Cited

OTHER PUBLICATIONS

Final Office Action received for U.S. Appl. No. 15/137,944, dated Feb. 27, 2017, 10 pages.
Final Office Action received for U.S. Appl. No. 14/870,694, dated Apr. 7, 2017, 16 pages.
International Preliminary Report on Patentability received for PCT Patent Application No. PCT/U32015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/U32016/015316, dated Aug. 10, 2017, 10 pages.
International Search Report and Written Opinion received for PCT Application No. PCT/US2015/033326, dated Aug. 10, 2015, 13 pages.
International Search Report and Written Opinion received for PCT Patent Application No. PCT/US2016/341751, dated Oct. 7, 2016, 17 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US2017/031748, dated Jun. 21, 2017, 2 pages.
Invitation to Pay Additional Fees received for PCT Patent Application No. PCT/US2016/341751, dated Aug. 11, 2016, 3 pages.
Invitation to Pay Additional Fees received for PCT Patent Application No. PCT/US2016/033751, dated Jul. 22, 2016, 2 pages.
IOS Security, "White Paper", Available online at <https://web.archive.org/web/20150526223200/http://www.apple.com/business/docs/iOS_Security_Guide.pdf>, 55 pages.
Naver Blog, "How to Use Smart Wallet and Registered Card", Online Available at <http://feena74.blog.me/140185758401>, 20 pages of Official Copy only (See Communication under 37 CFR § 1.98(a) (3)).
Non Final Office Action received for U.S. Appl. No. 14/869,715, dated Jan. 29, 2016, 62 pages.
Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.
Non Final Office Action received for U.S. Appl. No. 14/869,877, dated Jan. 29, 2016, 18 pages.
Non Final Office Action received for U.S. Appl. No. 14/869,877, dated Jun. 16, 2017, 17 pages.
Non Final Office Action received for U.S. Appl. No. 141870,793, dated Apr. 19, 2016, 17 pages.
Non Final Office Action received for U.S. Appl. No. 14/503,364, dated Feb. 3, 2016, 16 pages.
Non Final Office Action received for U.S. Appl. No. 14/869,831, dated Jan. 29, 2016, 18 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,381, dated May 13, 2015, 13 pages.
Non-Final Office Action received for U.S. Appl. No. 14/869,715, dated Oct. 11, 2016, 37 pages.
Non-final Office Action received for U.S. Appl. No. 14/870,726, dated Sep. 16, 2016, 12 pages.
Non-Final Office Action received for U.S. Appl. No. 14/871,635, dated May 5, 2017, 23 pages.
Non-Final Office Action received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 14/870,694, dated Sep. 23, 2016, 13 pages.
Notice of Allowance received for Chinese Patent Application No. 201520357381.9, dated Jul. 29, 2015, 4 pages (2 pages of English Translation and 2 pages of Official Copy).
Notice of Allowance received for Chinese Patent Application No. 201520358683,8, dated Mar. 10, 2016, 5 pages (3 pages of English Translation and 2 pages of Official Copy).
Notice of Allowance received for Chinese Patent Application No. 201620480708.6, dated Apr. 20, 2017, 3 pages (2 pages of English translation and 1 page of Official Copy).
Notice of Allowance received for Chinese Patent Application No. 201620480846.4, dated Apr. 20, 2017, 3 pages (2 pages of English Translation and 1 page of Official Copy).
Notice of Allowance received for Japanese Patent Application No. 2016-224508, dated Jun. 20, 2017, 3 pages of Official Copy only (See Communication under.37 Cfr § 1.98(a) (3)).
Notice of Allowance received for the U.S. Appl. No. 14/503,381, dated Dec. 16, 2015, 8 pages.
Notice of Allowance received for U.S. Appl. No. 14/503,364, dated Jun. 16, 2016, 11 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100328, dated May 16, 2017, 3 pages.
Office Action received for Australian Patent Application No. 2017201064, dated Mar. 9, 2017, 2 pages.
Office Action received for Australian Patent Application No. 2017201068, dated Mar. 10, 2017, 2 pages.

(56) References Cited

OTHER PUBLICATIONS

Office Action received for Chinese Patent Application No. 201520358683.8, dated Sep. 2, 2015, 4 pages (2 pages of English Translation and 2 pages of Official Copy).
Office Action received for Chinese Patent Application No. 201620101636.X, dated May 25, 2016, 3 pages (1 page of English Translation and 2 pages of Official Copy).
Office Action received for Chinese Patent Application No. 201620101636.X, dated Oct. 13, 2016, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).
Office Action received for Chinese Patent Application No. 201620480708.6, dated Sep. 14, 2016, 3 pages (1 page of English Translation and 2 pages of Official Copy).
Office Action received for Chinese Patent Application No. 201620480846.4, dated Jan. 9, 2017, 3 pages (1 page of English Translation and 2 pages of Official Copy).
Office Action received for Chinese Patent Application No. 201620480846.4, dated Sep. 14, 2016, 3 pages (1 page of English Translation and 2 pages of Official Copy).
Office Action received for Chinese Patent Application No. 201620509362.8, dated Feb. 10, 2017, 2 pages (Official Copy only) (See Communication under 37 CFR §.1.98(a) (3)).
Office Action received for Chinese Patent Application No. 201620509362.8, dated Oct. 21, 2016, 3 pages (1 page of English Translation and 2 pages of Official Copy).
Office Action received for Chinese Patent Application No. 201620509515.9, dated Nov. 9, 2016, 2 pages (1 page of English Translation and 1 page of Official Copy).
Office Action received for Danish Patent Application No. PA 201670709, dated Jul. 21, 2017, 4 pages.
Office Action received for Danish Patent Application No. PA 201670709, dated Nov. 30, 2016, 10 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670749, dated Jan. 30, 2017, 11 pages.
Office Action received for Danish Patent Application No. PA201670751, dated Jan. 13, 2017, 9 pages.
Office Action received for Danish Patent Application No. PA201770292, dated Jun. 6, 2017, 7 pages.
Office Action received for German Patent Application No. 2020150042678, dated Nov. 4, 2015, 4 pages (3 pages of English Translation and 1 page of Official Copy).
Office Action received for Japanese Patent Application No. 2016-224507, dated Jun. 16, 2017, 16 pages (8 pages of English Translation and 8 pages of Official Copy).
Office Action received for Korea Patent Application No. 10-2017-0022365, dated Jun. 26, 2017, 10 pages (4 pages of English Translation and 6 pages of Official Copy).
Office Action received for Korean Patent Application No. 10-2017-0022546, dated Jun. 21, 2017, 12 pages (5 pages of English Translation and 7 pages of Official copy).
Office Action received for Taiwanese Patent Application No. 104117508, dated Jul. 14, 2017, 9 pages (4 pages of English Translation and 5 pages of Official Copy).
Office Action received for Taiwanese Patent Application No. 104117508, dated Jul. 20, 2016, 19 pages (8 pages of English Translation and 11 pages of Official Copy).
Office Action received for Taiwanese Patent Application No. 104117508, dated Mar. 20, 2017, 22 pages (9 pages of English Translation and 13 pages of Official Copy).
International Search Report and Written Opinion received for PCT Patent Application No. PCT/US16/34175, dated Oct. 7, 2016, 17 pages.
Office Action received for Danish Patent Application No. PA201770292, dated Sep. 6, 2017, 4 pages.
Office Action received for Danish Patent Application No. PA201670710, dated Sep. 25, 2017, 6 pages.
Office Action received for Danish Patent Application No. PA201670749, dated Oct. 3, 2017, 3 pages.

* cited by examiner

USER INTERFACES FOR STORED-VALUE ACCOUNTS

CROSS-REFERENCE TO RELATED APPLICATIONS

This application claims priority to U.S. Patent Application Ser. No. 62/384,043, entitled "USER INTERFACES FOR STORED-VALUE ACCOUNTS," filed Sep. 6, 2016, the contents of which are hereby incorporated by reference in their entirety.

This application relates to U.S. Patent Application Ser. No. 61/912,727, entitled "PROVISIONING AND AUTHENTICATING CREDENTIALS ON AN ELECTRONIC DEVICE," filed Dec. 6, 2013 and U.S. Patent Application Ser. No. 62/004,837, entitled "METHODS FOR MANAGING PAYMENT APPLETS ON A SECURE ELEMENT TO CONDUCT MOBILE PAYMENT TRANSACTIONS," filed May 29, 2014, the contents of which are hereby incorporated by reference in their entirety.

FIELD

The present disclosure relates generally to computer user interfaces, and more specifically to techniques for managing transaction and accounts.

BACKGROUND

The use of electronic devices for managing transactions and accounts has increased significantly in recent years. Exemplary techniques for managing transactions include participating in a transaction of information. Exemplary techniques for managing accounts include adding and removing accounts of a smartphone device.

BRIEF SUMMARY

Some techniques for managing transactions and accounts using electronic devices, however, are generally cumbersome and inefficient. For example, some existing techniques use a complex and time-consuming user interface, which may include multiple key presses or keystrokes. In other examples, some existing techniques for participating in a transaction require users to provide inputs to specify an account, unlock devices, or provide authentication during the transaction. Existing techniques require more time than necessary, wasting user time and device energy. This latter consideration is particularly important in battery-operated devices.

Accordingly, the present techniques provide electronic devices with faster, more efficient methods and interfaces for managing accounts and transactions. Such methods and interfaces optionally complement or replace other methods for managing accounts and transactions. Such methods and interfaces reduce the cognitive burden on a user and produce a more efficient human-machine interface. For battery-operated computing devices, such methods and interfaces conserve power and increase the time between battery charges. Further, such methods and interfaces reduce the amount of input required at electronic devices, such as smartphones and smartwatches.

In accordance with some embodiments, a method performed at an electronic device with one or more input devices and one or more short-range communication radios is described. The method comprises: receiving, by the one or more short-range communication radios, a card account number of a card, wherein the card has a stored value; requesting verification information to verify ownership of the card; receiving, via the one or more input devices, input from a user of the electronic device that includes verification information for verifying ownership of the card; verifying ownership of the card by comparing the verification information with separate information about the card that is received separately from the verification information; and in accordance with a determination that verification of ownership is successful: generating a prompt to perform a value transfer operation for a value transfer; and in conjunction with the value transfer operation, transferring at least some of the stored value from the card to a virtual card stored on the electronic device.

In accordance with some embodiments, a non-transitory computer readable storage medium is described. The non-transitory computer-readable storage medium stores one or more programs configured to be executed by one or more processors of an electronic device with one or more input devices and one or more short-range communication radios, the one or more programs including instructions for: receiving, by the one or more short-range communication radios, a card account number of a card, wherein the card has a stored value; requesting verification information to verify ownership of the card; receiving, via the one or more input devices, input from a user of the electronic device that includes verification information for verifying ownership of the card; verifying ownership of the card by comparing the verification information with separate information about the card that is received separately from the verification information; and in accordance with a determination that verification of ownership is successful: generating a prompt to perform a value transfer operation for a value transfer; and in conjunction with the value transfer operation, transferring at least some of the stored value from the card to a virtual card stored on the electronic device.

In accordance with some embodiments, a transitory computer readable storage medium is described. The transitory computer-readable storage medium stores one or more programs configured to be executed by one or more processors of an electronic device with one or more input devices and one or more short-range communication radios, the one or more programs including instructions for: receiving, by the one or more short-range communication radios, a card account number of a card, wherein the card has a stored value; requesting verification information to verify ownership of the card; receiving, via the one or more input devices, input from a user of the electronic device that includes verification information for verifying ownership of the card; verifying ownership of the card by comparing the verification information with separate information about the card that is received separately from the verification information; and in accordance with a determination that verification of ownership is successful: generating a prompt to perform a value transfer operation for a value transfer; and in conjunction with the value transfer operation, transferring at least some of the stored value from the card to a virtual card stored on the electronic device.

In accordance with some embodiments, an electronic device is described. The electronic device comprises: one or more input devices; one or more short-range communication radios; one or more processors; and a memory storing one or more programs configured to be executed by the one or more processors, the one or more programs including instructions for: receiving, by the one or more short-range communication radios, a card account number of a card, wherein the card has a stored value; requesting verification information to verify ownership of the card; receiving, via the one or more input devices, input from a user of the electronic device that includes verification information for verifying ownership of the card; verifying ownership of the card by comparing the verification information with separate information about the card that is received separately from the verification information; and in accordance with a determination that verification of ownership is successful: generating a prompt to perform a value transfer operation for a value transfer; and in conjunction with the value transfer operation, transferring at least some of the stored value from the card to a virtual card stored on the electronic device.

In accordance with some embodiments, an electronic device is described. The electronic device comprises: one or more input devices; one or more short-range communication radios; means for receiving, by the one or more short-range communication radios, a card account number of a card, wherein the card has a stored value; means for requesting verification information to verify ownership of the card; means for receiving, via the one or more input devices, input from a user of the electronic device that includes verification information for verifying ownership of the card; means for verifying ownership of the card by comparing the verification information with separate information about the card that is received separately from the verification information; and means, in accordance with a determination that verification of ownership is successful, for: generating a prompt to perform a value transfer operation for a value transfer; and in conjunction with the value transfer operation, transferring at least some of the stored value from the card to a virtual card stored on the electronic device.

In accordance with some embodiments, a method performed at an electronic device with a display, one or more input devices, and one or more short-range communication radios is described. The method comprises: requesting verification information to verify ownership of a stored-value card, wherein the stored-value card has a stored value; receiving, via the one or more input devices, input from a user of the electronic device that includes verification information for verifying ownership of the card, wherein the verification information includes information that is not shown on the card; displaying, on the display of the electronic device, a prompt to place the electronic device within communication range of the stored-value card; receiving, by the one or more short-range communication radios, identifying information from the stored-value card; verifying ownership of the stored-value card by comparing the verification information with the identifying information; and in accordance with a determination that verification of ownership is successful: transferring at least some of the stored value from the stored-value card to a virtual card stored on the electronic device.

In accordance with some embodiments, a non-transitory computer-readable storage medium is described. The non-transitory computer-readable storage medium stores one or more programs configured to be executed by one or more processors of an electronic device with a display, one or more short-range communication radios, and one or more input devices, the one or more programs including instructions for: requesting verification information to verify ownership of a stored-value card, wherein the stored-value card has a stored value; receiving, via the one or more input devices, input from a user of the electronic device that includes verification information for verifying ownership of the card, wherein the verification information includes information that is not shown on the card; displaying, on the display of the electronic device within communication range of the stored-value card; receiving, by the one or more short-range communication radios, identifying information from the stored-value card; verifying ownership of the stored-value card by comparing the verification information with the identifying information; and in accordance with a determination that verification of ownership is successful: transferring at least some of the stored value from the stored-value card to a virtual card stored on the electronic device.

In accordance with some embodiments, a transitory computer-readable storage medium is described. The transitory computer-readable storage medium stores one or more programs configured to be executed by one or more processors of an electronic device with a display, one or more short-range communication radios, and one or more input devices, the one or more programs including instructions for: requesting verification information to verify ownership of a stored-value card, wherein the stored-value card has a stored value; receiving, via the one or more input devices, input from a user of the electronic device that includes verification information for verifying ownership of the card, wherein the verification information includes information that is not shown on the card; displaying, on the display of the electronic device, a prompt to place the electronic device within communication range of the stored-value card; receiving, by the one or more short-range communication radios, identifying information from the stored-value card; verifying ownership of the stored-value card by comparing the verification information with the identifying information; and in accordance with a determination that verification of ownership is successful: transferring at least some of the stored value from the stored-value card to a virtual card stored on the electronic device.

In accordance with some embodiments, an electronic device is described. The electronic device comprises: a display; one or more short-range communication radios; one or more input devices; one or more processors; and a memory storing one or more programs configured to be executed by the one or more processors, the one or more programs including instructions for: requesting verification information to verify ownership of a stored-value card, wherein the stored-value card has a stored value; receiving, via the one or more input devices, input from a user of the electronic device that includes verification information for verifying ownership of the card, wherein the verification information includes information that is not shown on the card; displaying, on the display of the electronic device, a prompt to place the electronic device within communication range of the stored-value card; receiving, by the one or more short-range communication radios, identifying information from the stored-value card; verifying ownership of the stored-value card by comparing the verification information with the identifying information; and in accordance with a determination that verification of ownership is successful: transferring at least some of the stored value from the stored-value card to a virtual card stored on the electronic device.

In accordance with some embodiments, an electronic device is described. The electronic device comprises: a display; one or more short-range communication radios; one or more input devices; means for requesting verification information to verify ownership of a stored-value card, wherein the stored-value card has a stored value; means for receiving, via the one or more input devices, input from a user of the electronic device that includes verification information for verifying ownership of the card, wherein the verification information includes information that is not shown on the card; means for displaying, on the display of the electronic device, a prompt to place the electronic device within communication range of the stored-value card; means for receiving, by the one or more short-range communication radios, identifying information from the stored-value card; means for verifying ownership of the stored-value card by comparing the verification information with the identifying information; and means, in accordance with a determination that verification of ownership is successful, for: transferring at least some of the stored value from the stored-value card to a virtual card stored on the electronic device.

In accordance with some embodiments, a method performed at an electronic device with a display and one or more input devices is described. The method comprises: displaying, on the display, a representation of a stored-value account that includes an activatable add-value option, wherein the electronic device has an electronic wallet application that includes the stored-value account and a payment account; while displaying the representation of the stored-value account, detecting, via the one or more input devices, activation of the add-value option; detecting, via there one or more input devices, activation of a fund-account option to add value to the stored-value account using the payment account of the electronic wallet application; while displaying a proposed transaction to add funds to the stored-value account from the payment account, receiving authentication information at the electronic device; and in response to receiving the authentication information and in accordance with a determination that the authentication information is consistent with enrolled authentication information for performing payment transactions using the payment account, adding value to the stored-value account using the payment account.

In accordance with some embodiments, a non-transitory computer-readable storage medium is described. The non-transitory computer-readable storage medium stores one or more programs configured to be executed by one or more processors of an electronic device with a display and one or more input devices, the one or more programs including instructions for: displaying, on the display, a representation of a stored-value account that includes an activatable add-value option, wherein the electronic device has an electronic wallet application that includes the stored-value account and a payment account; while displaying the representation of the stored-value account, detecting, via the one or more input devices, activation of the add-value option; detecting, via the one or more input devices, activation of a fund-account option to add value to the stored-value account using the payment account of the electronic wallet application; while displaying a proposed transaction to add funds to the stored-value account from the payment account, receiving authentication information at the electronic device; and in response to receiving the authentication information and in accordance with a determination that the authentication information is consistent with enrolled authentication information for performing payment transactions using the payment account, adding value to the stored-value account using the payment account.

In accordance with some embodiments, a transitory computer-readable storage medium is described. The transitory computer-readable storage medium stores one or more programs configured to be executed by one or more processors of an electronic device with a display and one or more input devices, the one or more programs including instructions for: displaying, on the display, a representation of a stored-value account that includes an activatable add-value option, wherein the electronic device has an electronic wallet application that includes the stored-value account and a payment account; while displaying the representation of the stored-value account, detecting, via the one or more input devices, activation of the add-value option; detecting, via the one or more input devices, activation of a fund-account option to add value to the stored-value account using the payment account of the electronic wallet application; while displaying a proposed transaction to add funds to the stored-value account from the payment account, receiving authentication information at the electronic device; and in response to receiving the authentication information and in accordance with a determination that the authentication information is consistent with enrolled authentication information for performing payment transactions using the payment account, adding value to the stored-value account using the payment account.

In accordance with some embodiments, an electronic device is described. The electronic device comprises: a display; one or more input devices; one or more processors; and a memory storing one or more programs configured to be executed by the one or more processors; the one or more programs including transactions for: displaying, on the display, a representation of a stored-value account that includes an activatable add-value option, wherein the electronic device has an electronic wallet application that includes the stored-value account and a payment account; while displaying the representation of the stored-value account, detecting, via the one or more input devices, activation of the add-value option; detecting, via the one or more input devices, activation of a fund-account option to add value to the stored-value account using the payment account of the electronic wallet application; while displaying a proposed transaction to add funds to the stored-value account from the payment account, receiving authentication information at the electronic device; and in response to receiving the authentication information and in accordance with a determination that the authentication information is consistent with enrolled authentication information for performing payment transactions using the payment account, adding value to the stored-value account using the payment account.

In accordance with some embodiments, an electronic device is described. The electronic device comprising: a display; one or more input devices; means for displaying, on the display, a representation of a stored-value account that includes an activatable add-value option, wherein the electronic device has an electronic wallet application that includes the stored-value account and a payment account; means, while displaying the representation of the stored-value account, for detecting, via the one or more input devices, activation of the add-value option; means for detecting, via the one or more input devices, activation of a fund-account option to add value to the stored-value account using the payment account of the electronic wallet application; means, while displaying a proposed transaction to add funds to the stored-value account from the payment account, for receiving authentication information at the electronic device; and means, in response to receiving the authentication information and in accordance with a determination that the authentication information is consistent with enrolled authentication information for performing payment transactions using the payment account, for adding value to the stored-value account using the payment account.

In accordance with some embodiments, a method performed at an electronic device with a display, one or more short-range communication radios, and an electronic wallet application that includes a stored-value account is described. The method comprises: displaying, on the display, an indication of an available credit of the stored-value account; transferring, using the one or more short-range communication radios, credentials of the stored-value account to a contactless transaction terminal that is separate from the electronic device; and replacing, based on a transaction performed with the contactless transaction terminal using the credentials of the stored-value account that were transferred to the contactless transaction terminal using the one or more short-range communication radios, display of the indication of the available credit with display of an indication of the transaction corresponding to the transfer of credentials to the contactless transaction terminal.

In accordance with some embodiments, a non-transitory computer-readable storage medium is described. The non-transitory computer-readable storage medium stores one or more programs configured to be executed by one or more processors of an electronic device with a display, one or more short-range communication radios, and an electronic wallet application that includes a stored-value account, the one or more programs including instructions for: displaying, on the display, an indication of an available credit of the stored-value account; transferring, using the one or more short-range communication radios, credentials of the stored-value account to a contactless transaction terminal that is separate from the electronic device; and replacing, based on a transaction performed with the contactless transaction terminal using the credentials of the stored-value account that were transferred to the contactless transaction terminal using the one or more short-range communication radios, display of the indication of the available credit with display of an indication of the transaction corresponding to the transfer of credentials to the contactless transaction terminal.

In accordance with some embodiments, a transitory computer-readable storage medium is described. The transitory computer-readable storage medium stores one or more programs configured to be executed by one or more processors of an electronic device with a display, one or more short-range communication radios, and an electronic wallet application that includes a stored-value account, the one or more programs including instructions for: displaying, on the display, an indication of an available credit of the stored-value account; transferring, using the one or more short-range communication radios, credentials of the stored-value account to a contactless transaction terminal that is separate from the electronic device; and replacing, based on a transaction performed with the contactless transaction terminal using the credentials of the stored-value account that were transferred to the contactless transaction terminal using the one or more short-range communication radios, display of the indication of the available credit with display of an indication of the transaction corresponding to the transfer of credentials to the contactless transaction terminal.

In accordance with some embodiments, an electronic device is described. The electronic device comprises: a display; one or more short-range communication radios; an electronic wallet application that includes a stored-value account; one or more processors; and a memory storing one or more programs configured to be executed by the one or more processors, the one or more programs including instructions for: displaying, on the display, an indication of an available credit of the stored-value account; transferring, using the one or more short-range communication radios, credentials of the stored-value account to a contactless transaction terminal that is separate from the electronic device; and replacing, based on a transaction performed with the contactless transaction terminal using the credentials of the stored-value account that were transferred to the contactless transaction terminal using the one or more short-range communication radios, display of the indication of the available credit with display of an indication of the transaction corresponding to the transfer of credentials to the contactless transaction terminal.

In accordance with some embodiments, an electronic device is described. The electronic device comprises: a display; one or more short-range communication radios; an electronic wallet application that includes a stored-value account; means for displaying, on the display, an indication of an available credit of the stored-value account; means for transferring, using the one or more short-range communication radios, credentials of the stored-value account to a contactless transaction terminal that is separate from the electronic device; and means for replacing, based on a transaction performed with the contactless transaction terminal using the credentials of the stored-value account that were transferred to the contactless transaction terminal using the one or more short-range communication radios, display of the indication of the available credit with display of an indication of the transaction corresponding to the transfer of credentials to the contactless transaction terminal.

In accordance with some embodiments, a method performed at an electronic device with one or more short-range communication radios and an account information application that includes a first account is described. The method comprises: detecting, by the one or more short-range communication radios, a wireless signal; in accordance with a determination that the wireless signal corresponds to a first type of request, transmitting information corresponding to the first account without checking for authentication; and in accordance with a determination that the wireless signal corresponds to a second type of request, checking for authentication before proceeding with a transaction corresponding to the wireless signal.

In accordance with some embodiments, a non-transitory computer-readable storage medium is described. The non-transitory computer-readable storage medium stores one or more programs configured to be executed by one or more processors of an electronic device with one or more short-range communication radios and an account information application that includes a first account, the one or more programs including instructions for: detecting, by the one or more short-range communication radios, a wireless signal; in accordance with a determination that the wireless signal corresponds to a first type of request, transmitting information corresponding to the first account without checking for authentication; and in accordance with a determination that the wireless signal corresponds to a second type of request, checking for authentication before proceeding with a transaction corresponding to the wireless signal.

In accordance with some embodiments, a transitory computer-readable storage medium is described. The transitory computer-readable storage medium stores one or more programs configured to be executed by one or more processors of an electronic device with one or more short-range communication radios and an account information application that includes a first account, the one or more programs including instructions for: detecting, by the one or more short-range communication radios, a wireless signal; in accordance with a determination that the wireless signal corresponds to a first type of request, transmitting information corresponding to the first account without checking for authentication; and in accordance with a determination that the wireless signal corresponds to a second type of request, checking for authentication before proceeding with a transaction corresponding to the wireless signal.

In accordance with some embodiments, an electronic device is described. The electronic device comprises: one or more short-range communication radios; an account information application that includes a first account; one or more processors; and a memory storing one or more programs configured to be executed by the one or more processors, the one or more programs including instructions for: detecting, by the one or more short-range communication radios, a wireless signal; in accordance with a determination that the wireless signal corresponds to a first type of request, transmitting information corresponding to the first account without checking for authentication; and in accordance with a determination that the wireless signal corresponds to a second type of request, checking for authentication before proceeding with a transaction corresponding to the wireless signal.

In accordance with some embodiments, an electronic device is described. The electronic comprising: one or more short-range communication radios; an account information application that includes a first account; means for detecting, by the one or more short-range communication radios, a wireless signal; means, in accordance with a determination that the wireless signal corresponds to a first type of request, for transmitting information corresponding to the first account without checking for authentication; and means, in accordance with a determination that the wireless signal corresponds to a second type of request, for checking for authentication before proceeding with a transaction corresponding to the wireless signal.

In accordance with some embodiments, a method performed at an electronic device with a display and one or more input devices is described. The method comprises: displaying, on the display, representations of a plurality of devices associated with a user account, wherein the representations of the plurality of devices include a first representation of a first device and a second representation of a second device, wherein the first device is associated with a transaction account and the second device is not associated with the transaction account; receiving, via the one or more input devices, a selection corresponding to the displayed representation of the second device; and in accordance with receiving the selection corresponding to the displayed representation of the second device: causing the transaction account to become associated with the second device; and causing the transaction account to become disassociated from the first device.

In accordance with some embodiments, a non-transitory computer-readable storage medium is described. The non-transitory computer-readable storage medium stores one or more programs configured to be executed by one or more processors of an electronic device with a display and one or more input devices, the one or more programs including instructions for: displaying, on the display, representations of a plurality of devices associated with a user account, wherein the representations of the plurality of devices include a first representation of a first device and a second representation of a second device, wherein the first device is associated with a transaction account and the second device is not associated with the transaction account; receiving, via the one or more input devices, a selection corresponding to the displayed representation of the second device; and in accordance with receiving the selection corresponding to the displayed representation of the second device: causing the transaction account to become associated with the second device; and causing the transaction account to become disassociated from the first device.

In accordance with some embodiments, a transitory computer-readable storage medium is described. The transitory computer-readable storage medium stores one or more programs configured to be executed by one or more processors of an electronic device with a display and one or more input devices, the one or more programs including instructions for: displaying, on the display, representations of a plurality of devices associated with a user account, wherein the representations of the plurality of devices include a first representation of a first device and a second representation of a second device, wherein the first device is associated with a transaction account and the second device is not associated with the transaction account; receiving, via the one or more input devices, a selection corresponding to the displayed representation of the second device; and in accordance with receiving the selection corresponding to the displayed representation of the second device: causing the transaction account to become associated with the second device; and causing the transaction account to become disassociated from the first device.

In accordance with some embodiments, an electronic device is described. The electronic device comprises: a display; one or more input devices; one or more processors; and a memory storing one or more programs configured to be executed by the one or more processors, the one or more programs including instructions for: displaying, on the display, representations of a plurality of devices associated with a user account, wherein the representations of the plurality of devices include a first representation of a first device and a second representation of a second device, wherein the first device is associated with a transaction account and the second device is not associated with the transaction account; receiving, via the one or more input devices, a selection corresponding to the displayed representation of the second device; and in accordance with receiving the selection corresponding to the displayed representation of the second device: causing the transaction account to become associated with the second device; and causing the transaction account to become disassociated from the first device.

In accordance with some embodiments, an electronic device is described. The electronic device comprises: a display; one or more input devices; means for displaying, on the display, representations of a plurality of devices associated with a user account, wherein the representations of the plurality of devices include a first representation of a first device and a second representation of a second device, wherein the first device is associated with a transaction account and the second device is not associated with the transaction account; means for receiving, via the one or more input devices, a selection corresponding to the displayed representation of the second device; and means, in accordance with receiving the selection corresponding to the displayed representation of the second device, for: causing the transaction account to become associated with the second device; and causing the transaction account to become disassociated from the first device.

In accordance with some embodiments, a method performed at an electronic device with an electronic wallet application is described. The method comprises: detecting that a set of one or more payment criteria for making a payment using a stored-value account has been met; in response to detecting that the set of one or more payment criteria for making the payment using the stored-value account has been met and in accordance with a determination that payment credentials of the stored-value account are not available in the electronic wallet application of the electronic device, requesting payment credentials of the stored-value account from a second device that is different from the electronic device; subsequent to requesting the payment credentials of the stored-value account from the second device when the payment credentials of the stored-value account are available at the second device, receiving payment credentials of the stored-value account at the electronic device from the second device.

In accordance with some embodiments, a non-transitory computer-readable storage medium is described. The non-transitory computer-readable storage medium stores one or more programs configured to be executed by one or more processors of an electronic device with an electronic wallet application, the one or more programs including instructions for: detecting that a set of one or more payment criteria for making a payment using a stored-value account has been met; in response to detecting that the set of one or more payment criteria for making the payment using the stored-value account has been met and in accordance with a determination that payment credentials of the stored-value account are not available in the electronic wallet application of the electronic device, requesting payment credentials of the stored-value account from a second device that is different from the electronic device; and subsequent to requesting the payment credentials of the stored-value account from the second device when the payment credentials of the stored-value account are available at the second device, receiving payment credentials of the stored-value account at the electronic device from the second device.

In accordance with some embodiments, a transitory computer-readable storage medium is described. The transitory computer-readable storage medium stores one or more programs configured to be executed by one or more processors of an electronic device with an electronic wallet application, the one or more programs including instructions for: detecting that a set of one or more payment criteria for making a payment using a stored-value account has been met; in response to detecting that the set of one or more payment criteria for making the payment using the stored-value account has been met and in accordance with a determination that payment credentials of the stored-value account are not available in the electronic wallet application of the electronic device, requesting payment credentials of the stored-value account from a second device that is different from the electronic device; and subsequent to requesting the payment credentials of the stored-value account from the second device when the payment credentials of the stored-value account are available at the second device, receiving payment credentials of the stored-value account at the electronic device from the second device.

In accordance with some embodiments, an electronic device is described. The electronic device comprises: an electronic wallet application; one or more processors; and a memory storing one or more programs configured to be executed by the one or more processors, the one or more programs including instructions for: detecting that a set of one or more payment criteria for making a payment using a stored-value account has been met; in response to detecting that the set of one or more payment criteria for making the payment using the stored-value account has been met and in accordance with a determination that payment credentials of the stored-value account are not available in the electronic wallet application of the electronic device, requesting payment credentials of the stored-value account from a second device that is different from the electronic device; and subsequent to requesting the payment credentials of the stored-value account from the second device when the payment credentials of the stored-value account are available at the second device, receiving payment credentials of the stored-value account at the electronic device from the second device.

In accordance with some embodiments, an electronic device is described. The electronic device comprises: an electronic wallet application; means for detecting that a set of one or more payment criteria for making a payment using a stored-value account has been met; means, in response to detecting that the set of one or more payment criteria for making the payment using the stored-value account has been met and in accordance with a determination that payment credentials of the stored-value account are not available in the electronic wallet application of the electronic device, for requesting payment credentials of the stored-value account from a second device that is different from the electronic device; and means, subsequent to requesting the payment credentials of the stored-value account from the second device when the payment credentials of the stored-value account are available at the second device, for receiving payment credentials of the stored-value account at the electronic device from the second device.

In accordance with some embodiments, an electronic device is described. The electronic device comprises: one or more input device units; one or more short-range communication radio units; and a processing unit coupled to the one or more input device units and the one or more short-range communication radio units, the processing unit configured to: receive, by the one or more short-range communication radio units, a card account number of a card, wherein the card has a stored value; request verification information to verify ownership of the card; receive, via the one or more input device units, input from a user of the electronic device that includes verification information for verifying ownership of the card; verify ownership of the card by comparing the verification information with separate information about the card that is received separately from the verification information; and in accordance with a determination that verification of ownership is successful: generate a prompt to perform a value transfer operation for a value transfer; and in conjunction with the value transfer operation, transfer at least some of the stored value from the card to a virtual card stored on the electronic device.

In accordance with some embodiments, an electronic device is described. The electronic device comprises: a display unit; one or more input device units; one or more short-range communication radio units; and a processing unit coupled to the display unit, the one or more short-range communication radio units, and the one or more input device units, the processing unit configured to: request verification information to verify ownership of a stored-value card, wherein the stored-value card has a stored value; receive, via the one or more input device units, input from a user of the electronic device that includes verification information for verifying ownership of the card, wherein the verification information includes information that is not shown on the card; enable display, on the display unit of the electronic device, of a prompt to place the electronic device within communication range of the stored-value card; receive, by the one or more short-range communication radio units, identifying information from the stored-value card; verify ownership of the stored-value card by comparing the verification information with the identifying information; and in accordance with a determination that verification of ownership is successful: transfer at least some of the stored value from the stored-value card to a virtual card stored on the electronic device.

In accordance with some embodiments, an electronic device is described. The electronic device comprises: a display unit; one or more input device units; and a processing unit coupled to the display unit and the one or more input device units, the processing unit configured to: enable display, on the display unit, of a representation of a stored-value account that includes an activatable add-value option, wherein the electronic device has an electronic wallet application that includes the stored-value account and a payment account; while enabling display of the representation of the stored-value account, detect, via the one or more input device units, activation of the add-value option; detect, via the one or more input device units, activation of a fund-account option to add value to the stored-value account using the payment account of the electronic wallet application; while enabling display of a proposed transaction to add funds to the stored-value account from the payment account, receive authentication information at the electronic device; and in response to receiving the authentication information and in accordance with a determination that the authentication information is consistent with enrolled authentication information for performing payment transactions using the payment account, add value to the stored-value account using the payment account.

In accordance with some embodiments, an electronic device is described. The electronic device comprises: a display unit; one or more short-range communication radio units; an electronic wallet application unit that includes a stored-value account; and a processing unit coupled to the display unit, the one or more short-range communication radio units, and the electronic wallet application unit that includes a stored-value account, the processing unit configured to: enable display, on the display unit, of an indication of an available credit of the stored-value account; transfer, using the one or more short-range communication radio units, credentials of the stored-value account to a contactless transaction terminal that is separate from the electronic device; and replace, based on a transaction performed with the contactless transaction terminal using the credentials of the stored-value account that were transferred to the contactless transaction terminal using the one or more short-range communication radio units, display of the indication of the available credit with display of an indication of the transaction corresponding to the transfer of credentials to the contactless transaction terminal.

In accordance with some embodiments, an electronic device is described. The electronic device comprises: one or more short-range communication radio units; an account information application unit that includes a first account; and a processing unit coupled to the one or more short-range communication units and the account information application unit that includes a first account, the processing unit configured to: detect, by the one or more short-range communication radio units, a wireless signal; in accordance with a determination that the wireless signal corresponds to a first type of request, transmit information corresponding to the first account without checking for authentication; and in accordance with a determination that the wireless signal corresponds to a second type of request, check for authentication before proceeding with a transaction corresponding to the wireless signal.

In accordance with some embodiments, an electronic device is described. The electronic device comprises: a display unit; one or more input device units; and a processing unit coupled to the display unit and the one or more input device units, the processing unit configured to: enable display, on the display unit, of representations of a plurality of devices associated with a user account, wherein the representations of the plurality of devices include a first representation of a first device and a second representation of a second device, wherein the first device is associated with a transaction account and the second device is not associated with the transaction account; receive, via the one or more input device units, a selection corresponding to the displayed representation of the second device; and in accordance with receiving the selection corresponding to the displayed representation of the second device: cause the transaction account to become associated with the second device; and cause the transaction account to become disassociated from the first device.

In accordance with some embodiments, an electronic device is described. The electronic device comprises: an electronic wallet application unit; and a processing unit, the processing unit configured to: detect that a set of one or more payment criteria for making a payment using a stored-value account has been met; in response to detecting that the set of one or more payment criteria for making the payment using the stored-value account has been met and in accordance with a determination that payment credentials of the stored-value account are not available in the electronic wallet application of the electronic device, request payment credentials of the stored-value account from a second device that is different from the electronic device; subsequent to requesting the payment credentials of the stored-value account from the second device when the payment credentials of the stored-value account are available at the second device, receive payment credentials of the stored-value account at the electronic device from the second device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing transactions, thereby increasing the effectiveness, efficiency, and user satisfaction with such devices. Such methods and interfaces may complement or replace other methods for managing transactions.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing accounts and transactions. Such techniques can reduce the cognitive burden on a user who accesses transactions, thereby enhancing productivity. Further, such techniques can reduce processor and battery power otherwise wasted on redundant user inputs.

Figure 6:
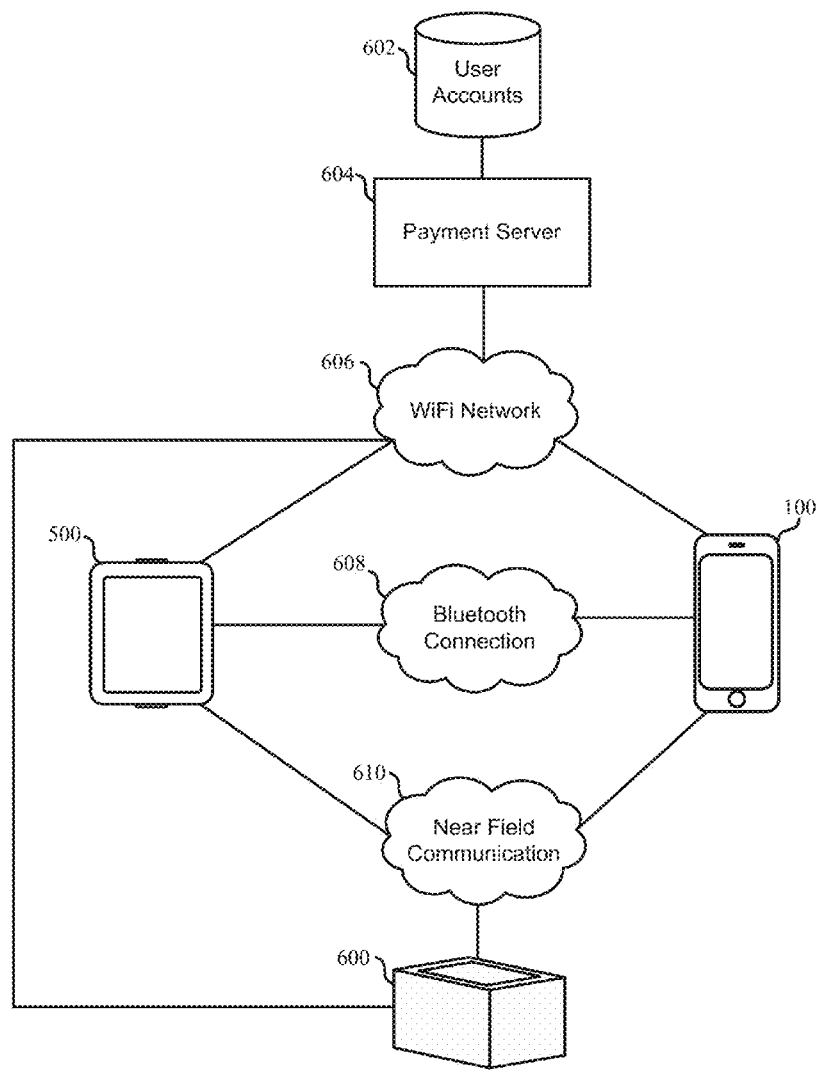
FIG. 6 illustrates exemplary devices connected via one or more communication channels, in accordance with some embodiments.
Figure 7A:
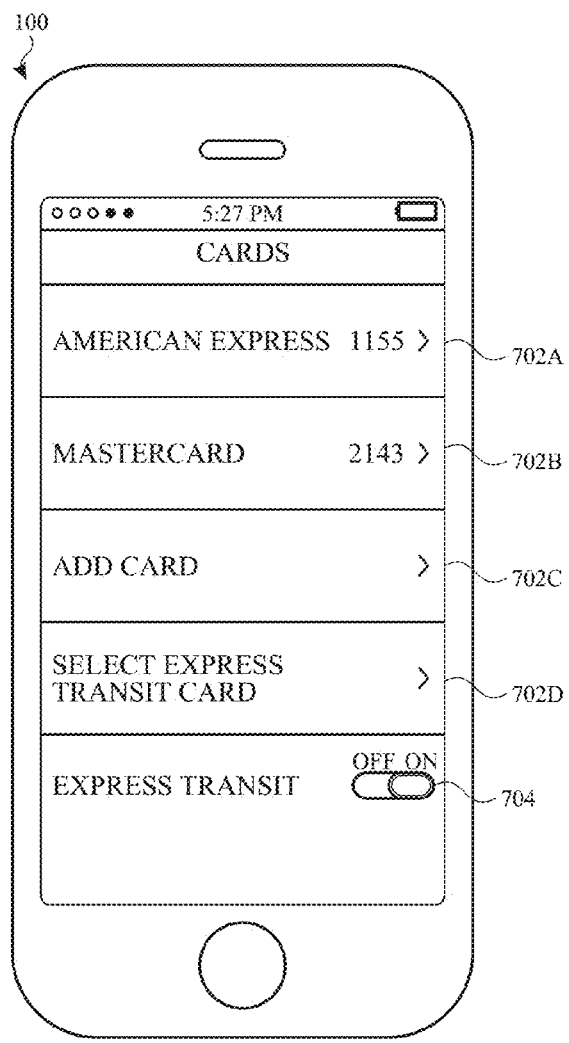
FIGS. 7A-7P illustrate exemplary user interfaces for provisioning cards onto an electronic device, in accordance with some embodiments.
Figure 7B:
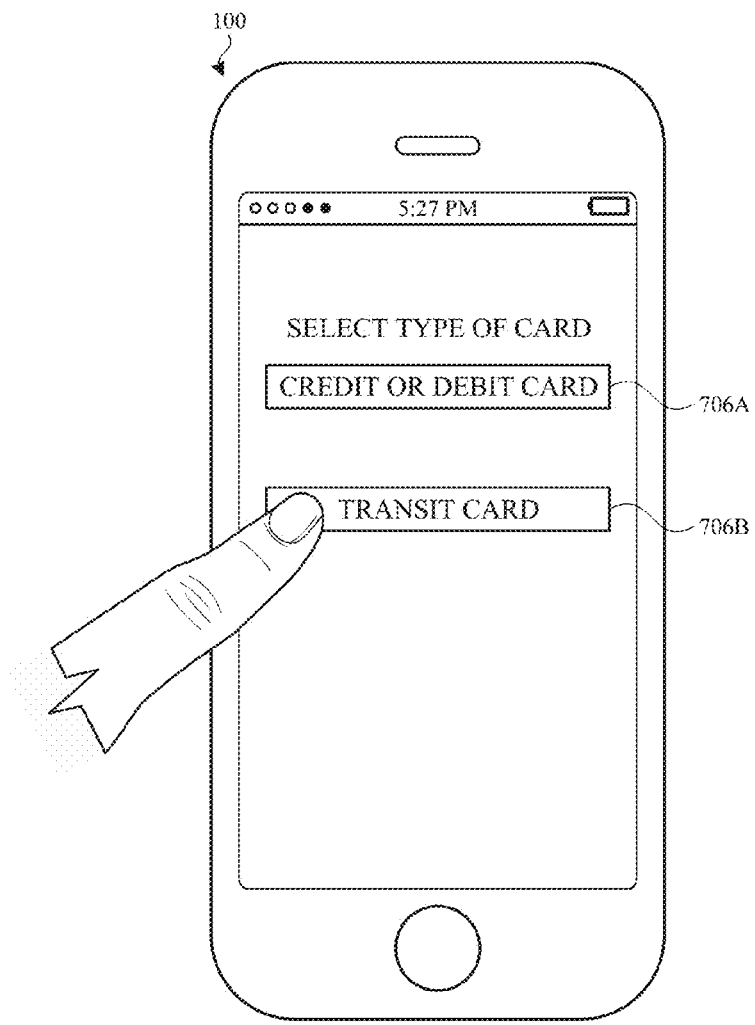
Figure 7P:
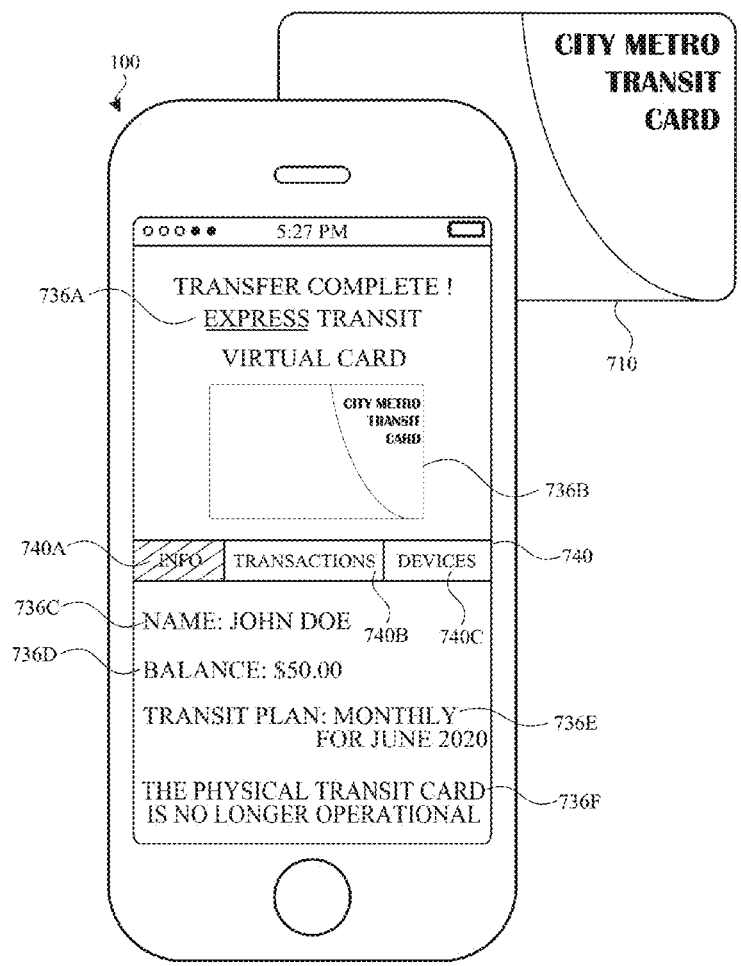
Figure 8A:
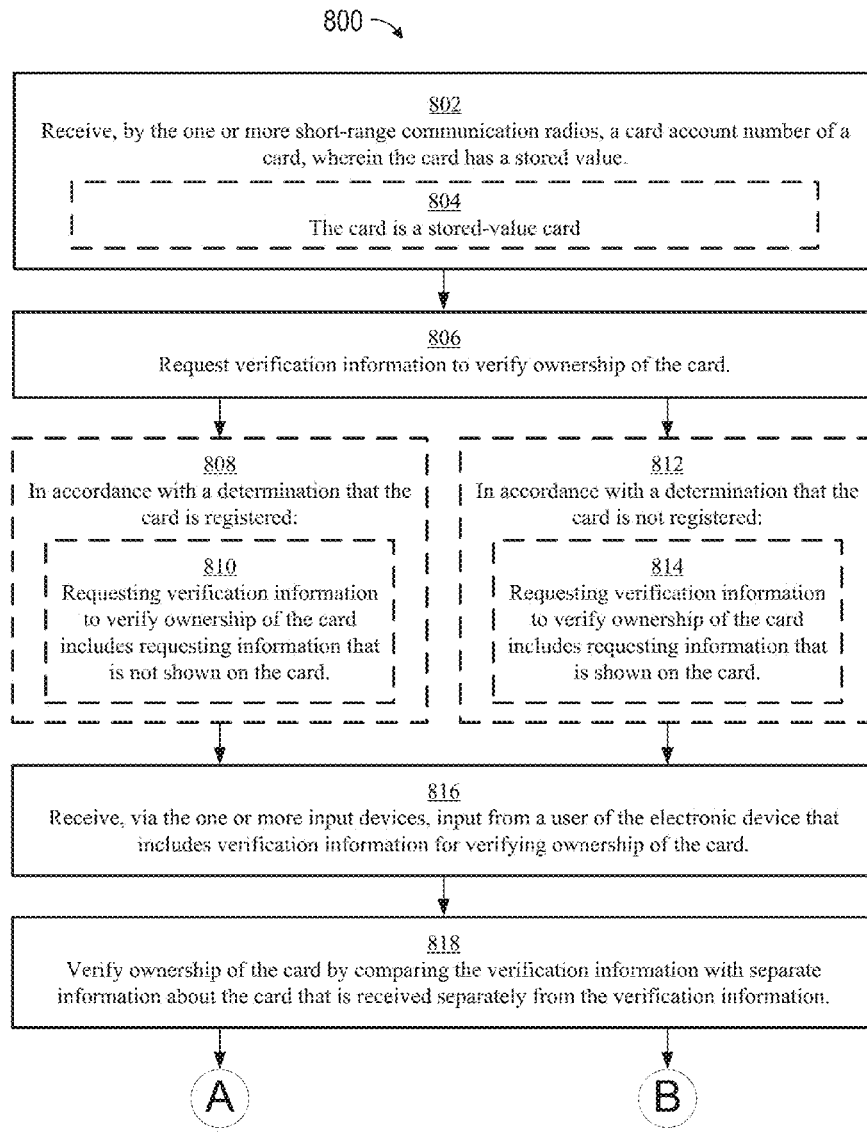
FIGS. 8A-8B are a flow diagram illustrating methods of provisioning cards onto an electronic device, in accordance with some embodiments.
Figure 8B:
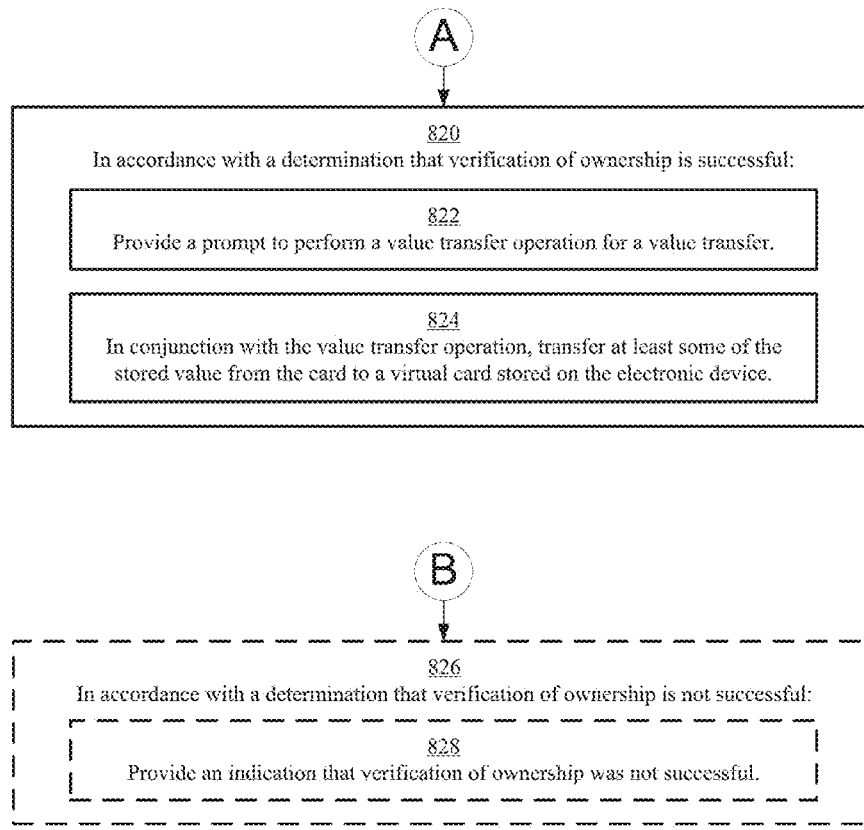
Figure 9A:
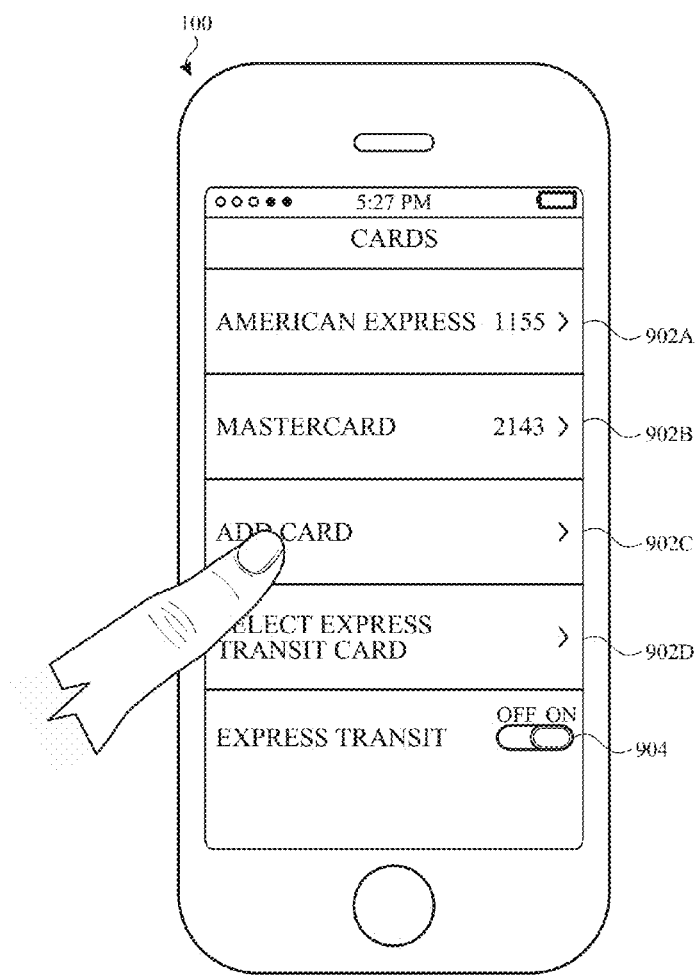
FIGS. 9A-9N illustrate exemplary user interfaces for provisioning cards onto an electronic device, in accordance with some embodiments.
Figure 9B:
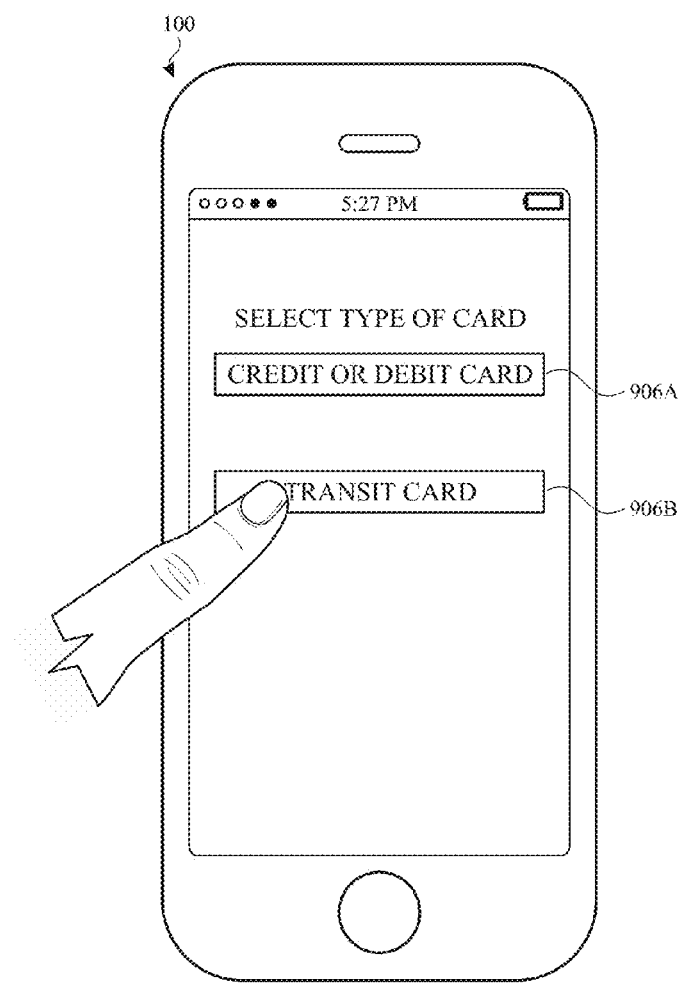
Figure 9N:
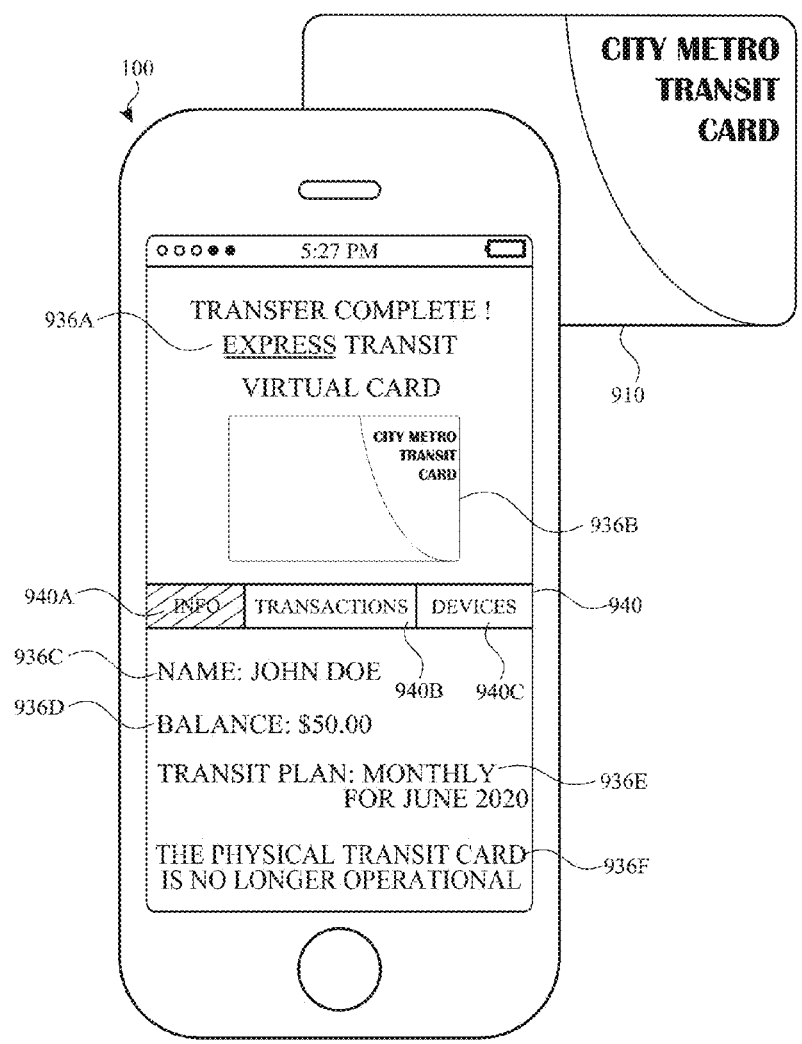
Figure 10:
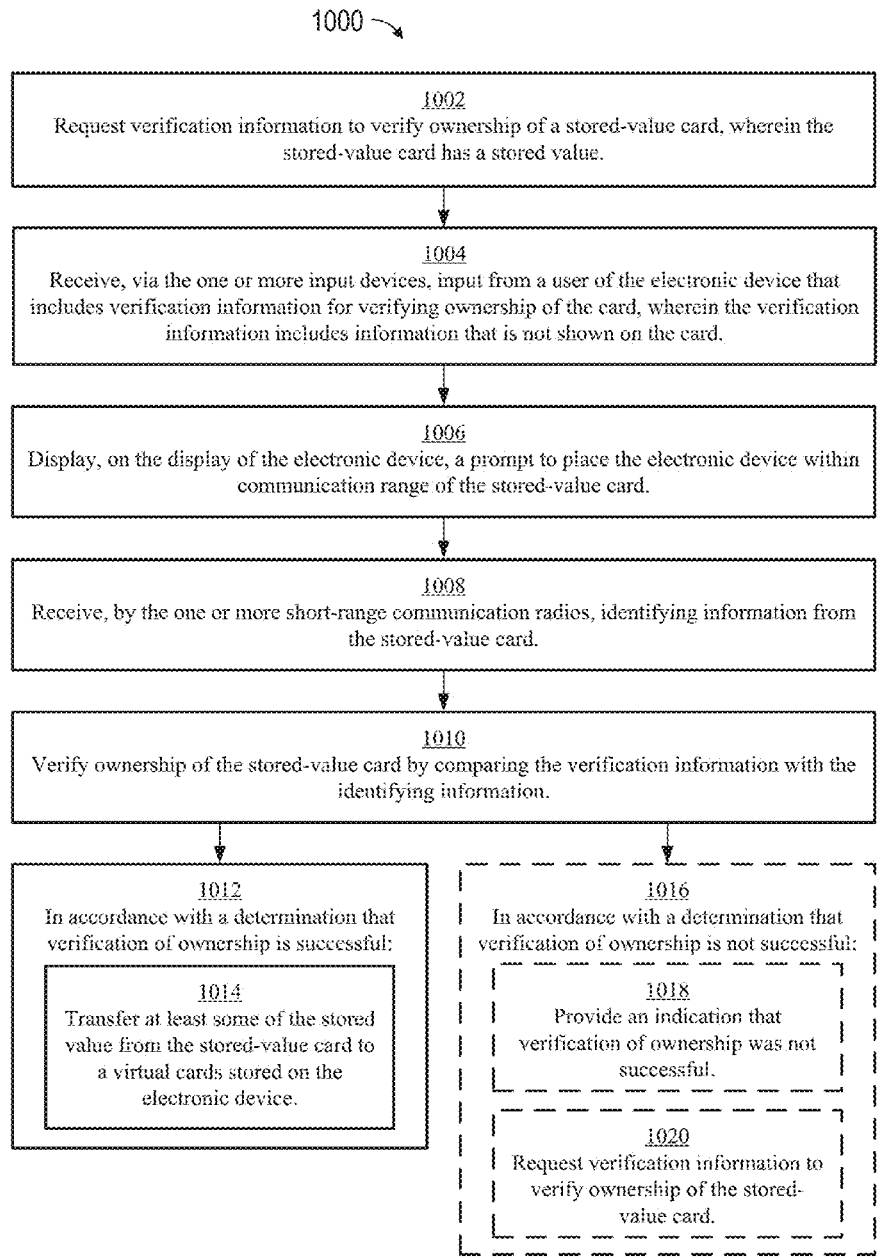
FIG. 10 is a flow diagram illustrating methods of provisioning cards onto an electronic device, in accordance with some embodiments.
Figure 11A:
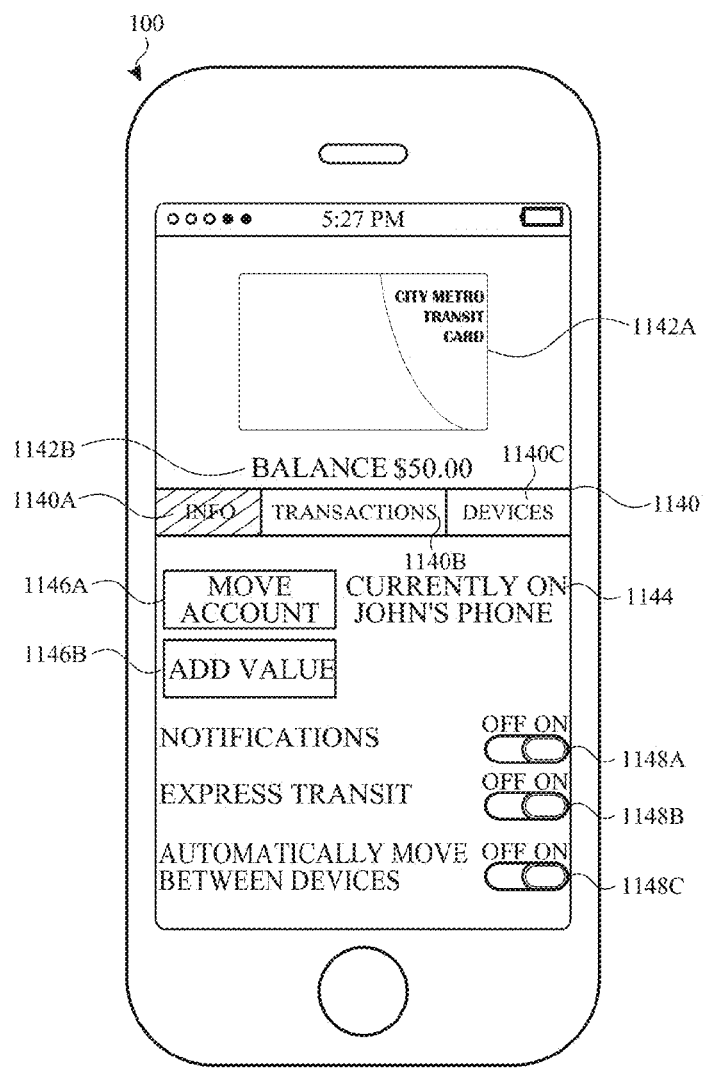
FIGS. 11A-11N illustrate exemplary user interfaces for adding value to a stored-value account provisioned on an electronic device, in accordance with some embodiments.
Figure 11B:
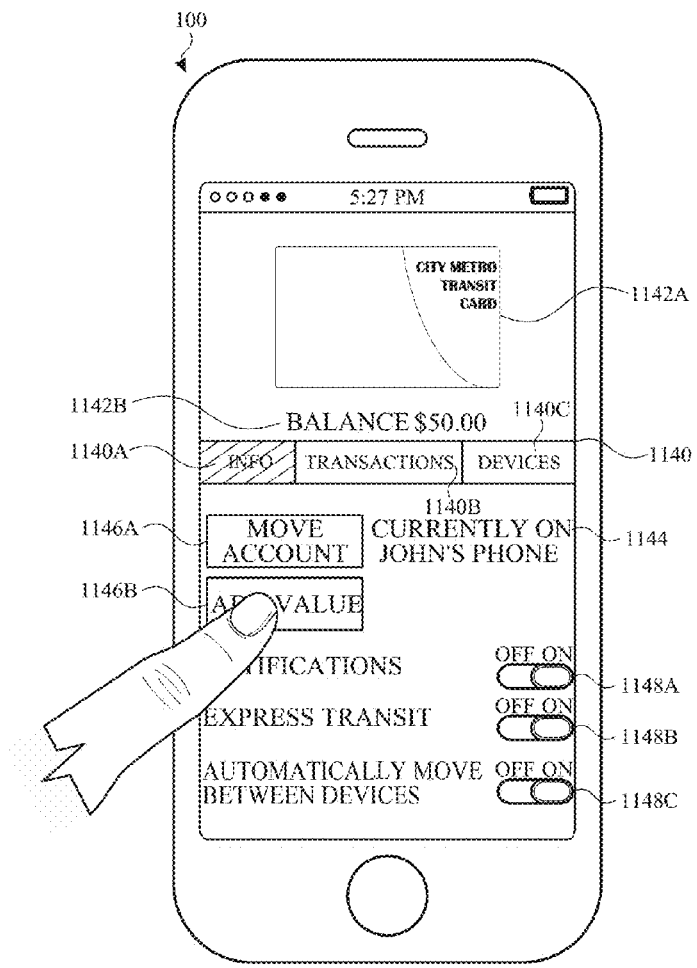
Figure 11C:
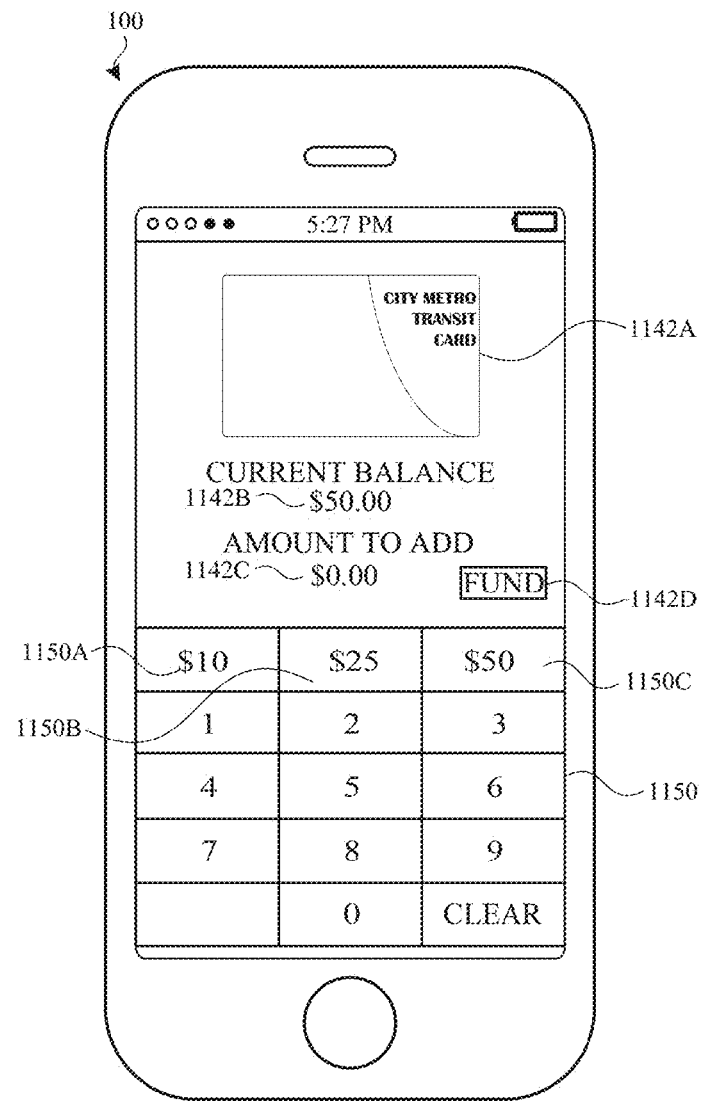
Figure 11N:
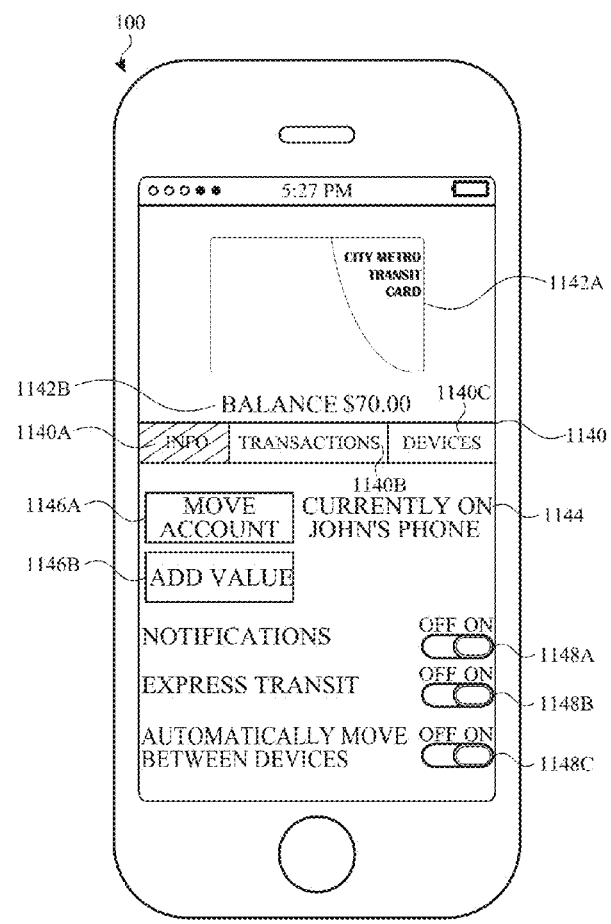
Figure 12A:
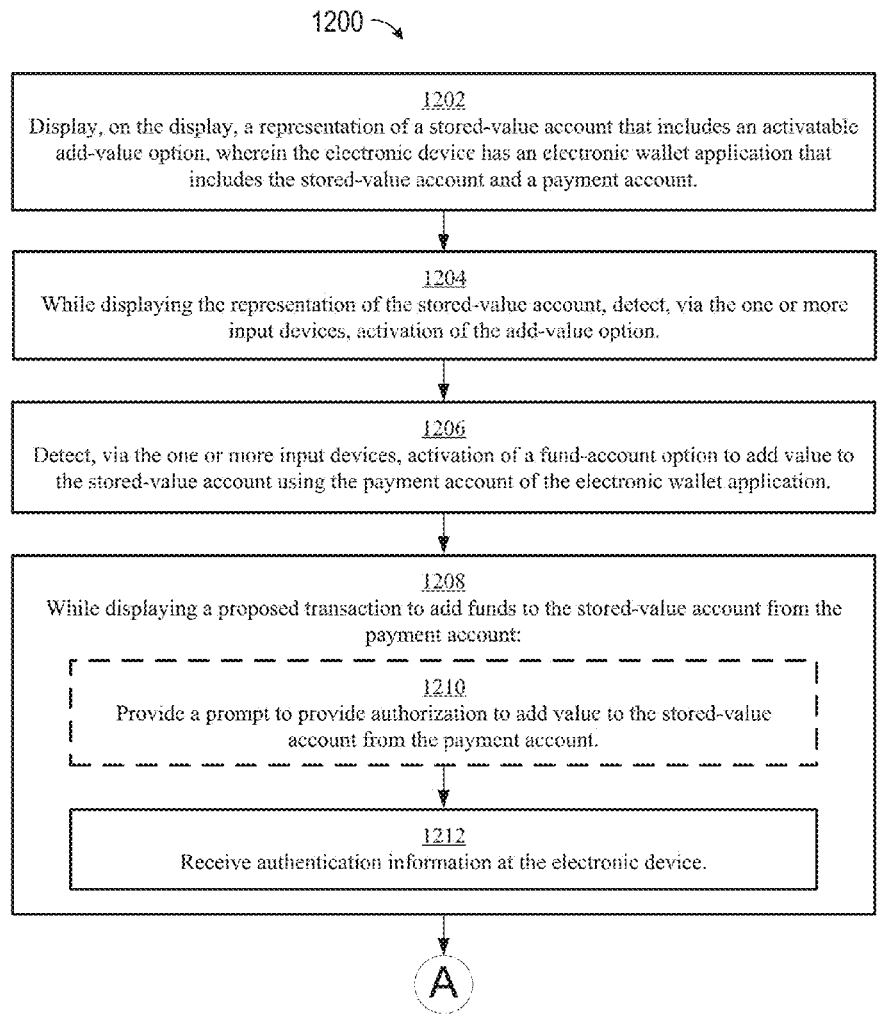
FIGS. 12A-12B are a flow diagram illustrating methods of adding value to a stored-value account provisioned on an electronic device, in accordance with some embodiments.
Figure 12B:
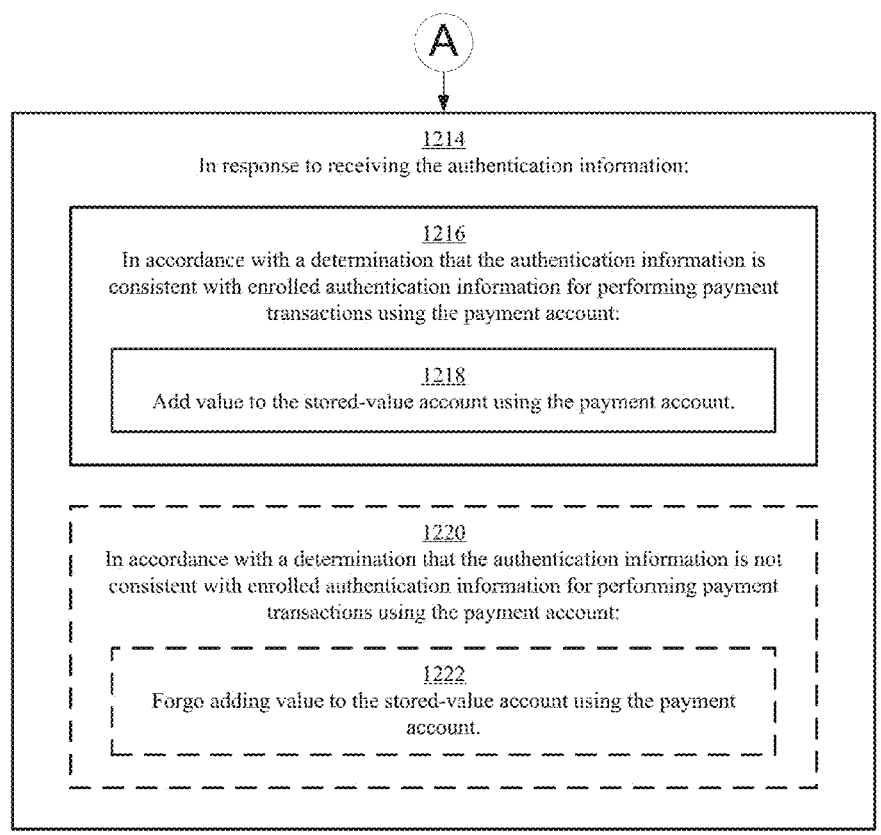
Figure 13A:
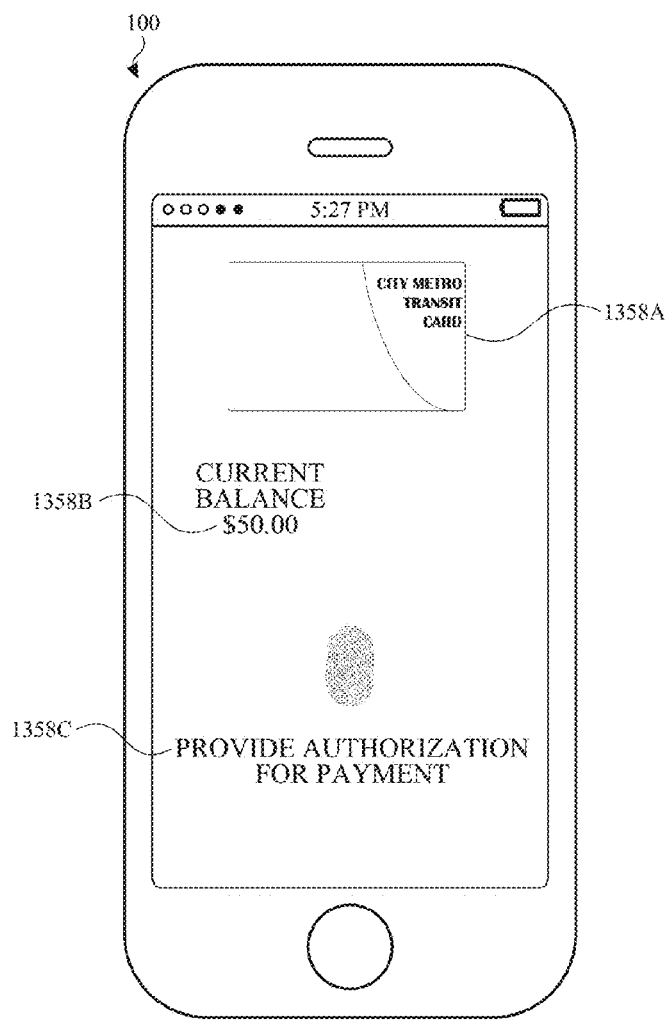
FIGS. 13A-13N illustrate exemplary user interfaces for transferring credentials of a stored-value account to a terminal.
Figure 13N:
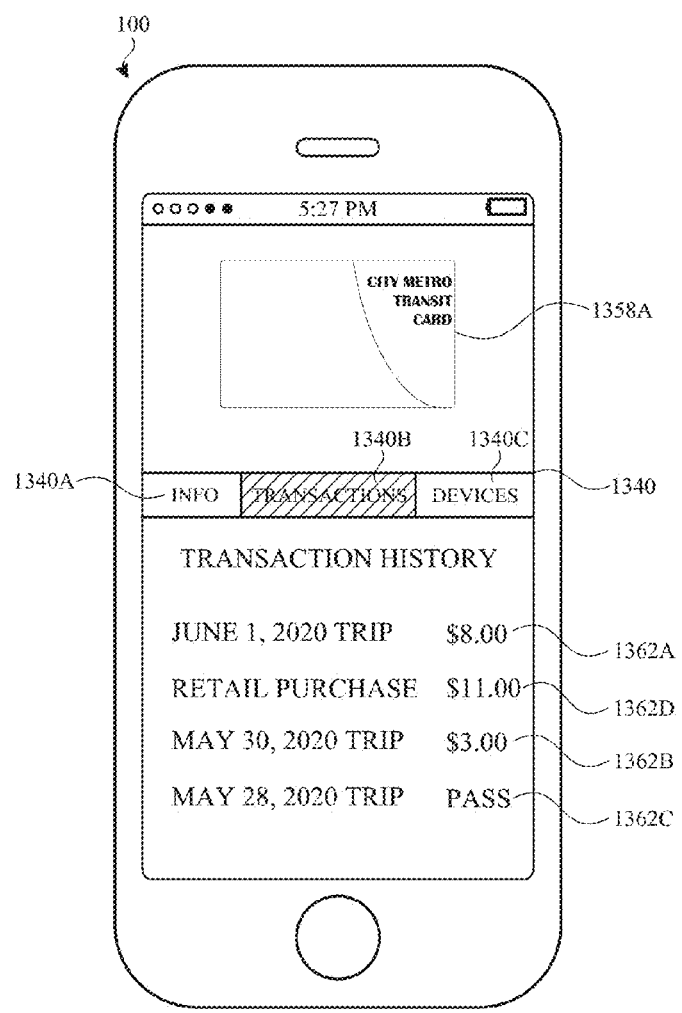
Figure 14A:
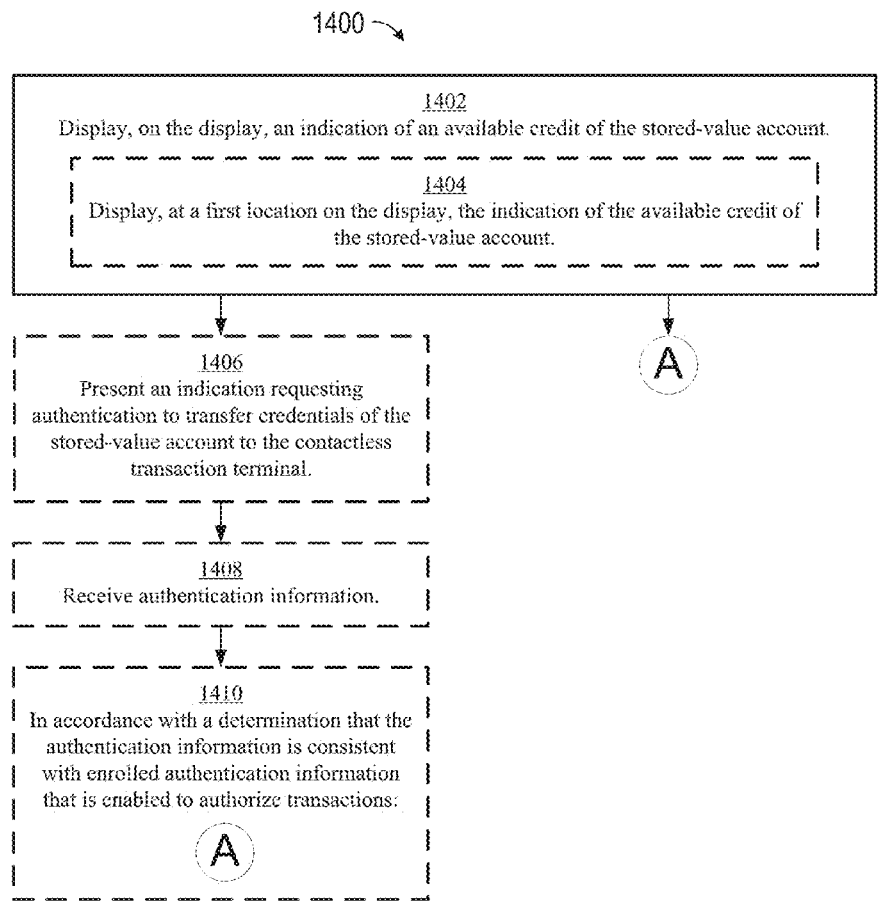
FIGS. 14A-14B are a flow diagram illustrating methods of transferring credentials of a stored-value account to a terminal, in accordance with some embodiments.
Figure 14B:
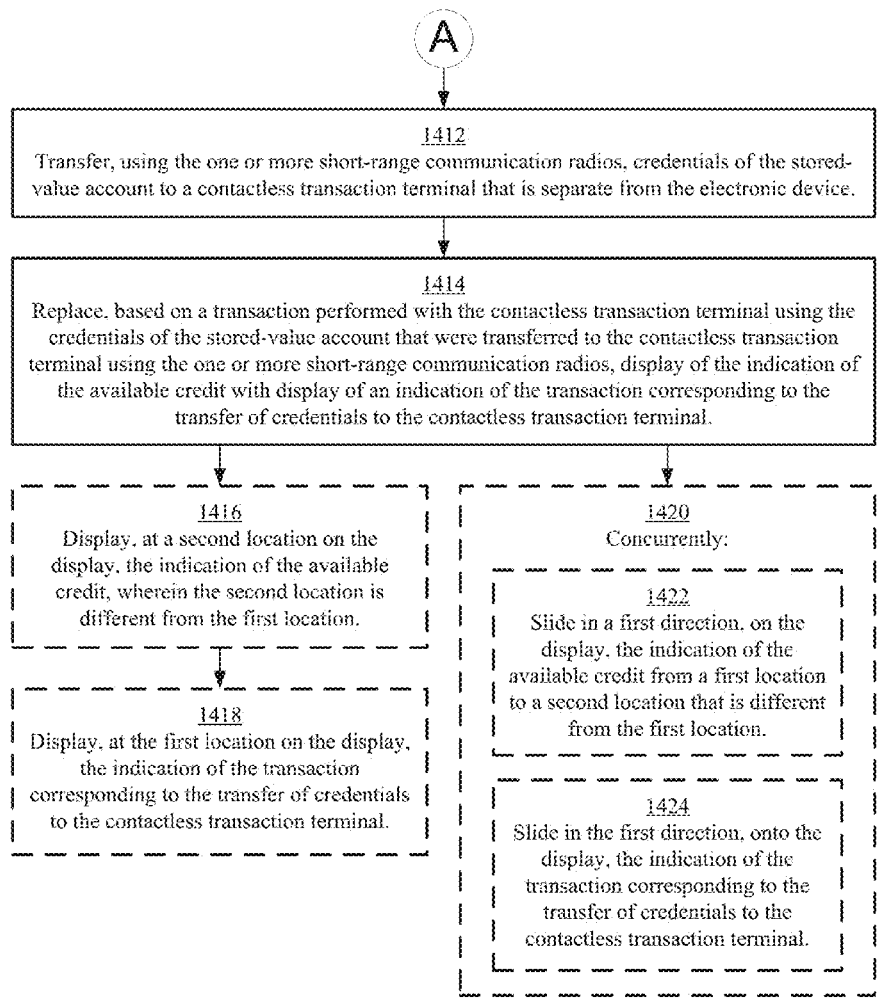
Figure 15A:
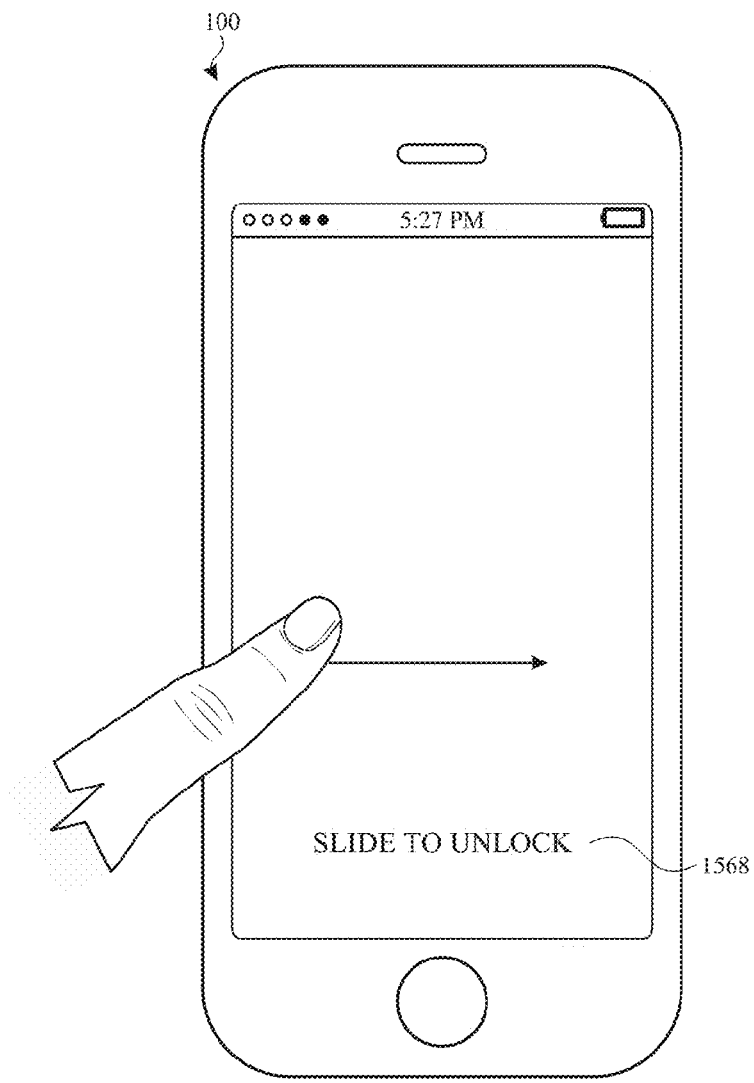
FIGS. 15A-15M illustrate exemplary user interfaces for making an account available for use without checking authentication, in accordance with some embodiments.
Figure 15B:
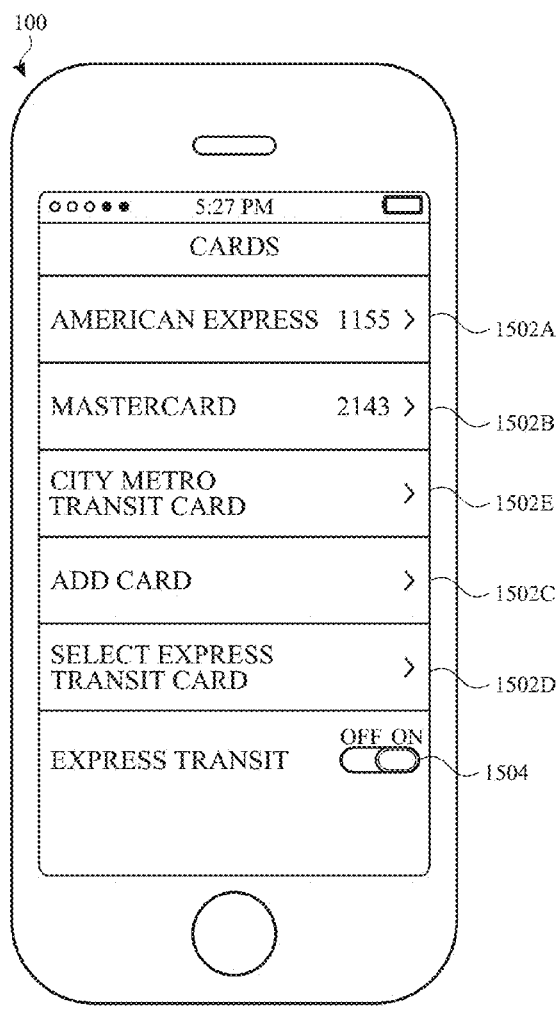
Figure 15C:
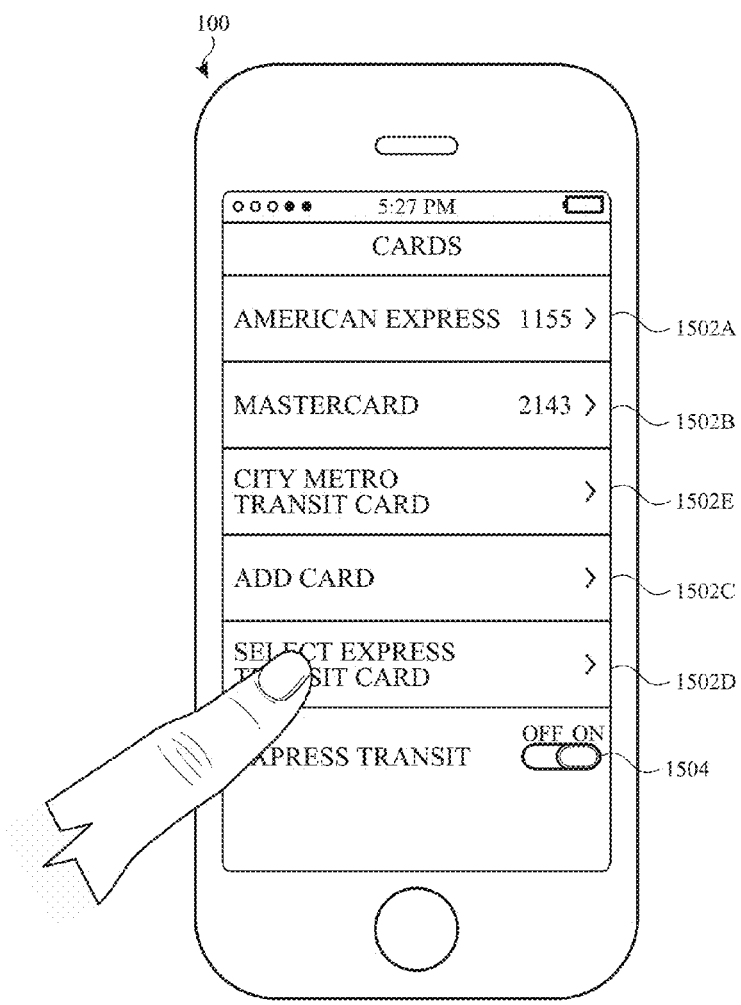

Below, FIGS. 1A-1B, 2, 3, 4A-4B, and 5A-5H provide a description of exemplary devices for performing the techniques for managing accounts and transactions. FIG. 6 illustrates exemplary devices connected via one or more communication channels, in accordance with some embodiments. FIGS. 7A-7P illustrate exemplary user interfaces for provisioning cards onto an electronic device, in accordance with some embodiments. FIGS. 8A-8B are a flow diagram illustrating methods of provisioning cards onto an electronic device, in accordance with some embodiments. The user interfaces in FIGS. 7A-7P are used to illustrate the processes described below, including the processes in FIGS. 8A-8B. FIGS. 9A-9N illustrate exemplary user interfaces for provisioning cards onto an electronic device, in accordance with some embodiments. FIG. 10 is a flow diagram illustrating methods of provisioning cards onto an electronic device, in accordance with some embodiments. The user interfaces in FIGS. 9A-9N are used to illustrate the processes described below, including the processes in FIG. 10. FIGS. 11A-11N illustrate exemplary user interfaces for adding value to a stored-value account provisioned on an electronic device, in accordance with some embodiments. FIGS. 12A-12B are a flow diagram illustrating methods of adding value to a stored-value account provisioned on an electronic device, in accordance with some embodiments. The user interfaces in FIGS. 11A-11N are used to illustrate the processes described below, including the processes in FIGS. 12A-12B. FIGS. 13A-13N illustrate exemplary user interfaces for transferring credentials of a stored-value account to a terminal. FIGS. 14A-14B are a flow diagram illustrating methods of transferring credentials of a stored-value account to a terminal, in accordance with some embodiments. The user interfaces in FIGS. 13A-13N are used to illustrate the processes described below, including the processes in FIGS. 14A-14B. FIGS. 15A-15M illustrate exemplary user interfaces for making an account available for use without checking authentication, in accordance with some embodiments. FIGS. 16A-16B are a flow diagram illustrating methods of making an account available for use without checking authentication, in accordance with some embodiments. The user interfaces in FIGS. 15A-15M are used to illustrate the processes described below, including the processes in FIGS. 16A-16B. FIGS. 17A-17H illustrate exemplary user interfaces for moving a transaction account from one device to another device, in accordance with some embodiments. FIG. 18 is a flow diagram illustrating methods of moving a transaction account from one device to another device, in accordance with some embodiments. The user interfaces in FIGS. 17A-17H are used to illustrate the processes described below, including the processes in FIG. 18. FIGS. 19A-19H illustrate exemplary user interfaces for accounts that are available for use at one or more devices of a plurality of devices, in accordance with some embodiments. FIGS. 20A-20B is a flow diagram illustrating methods of managing accounts that are available for use at one or more devices of a plurality of devices, in accordance with some embodiments. The user interfaces in FIGS. 19A-19H are used to illustrate the processes described below, including the processes in FIGS. 20A-20B. FIGS. 21-27 illustrate functional block diagrams in accordance with some embodiments.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
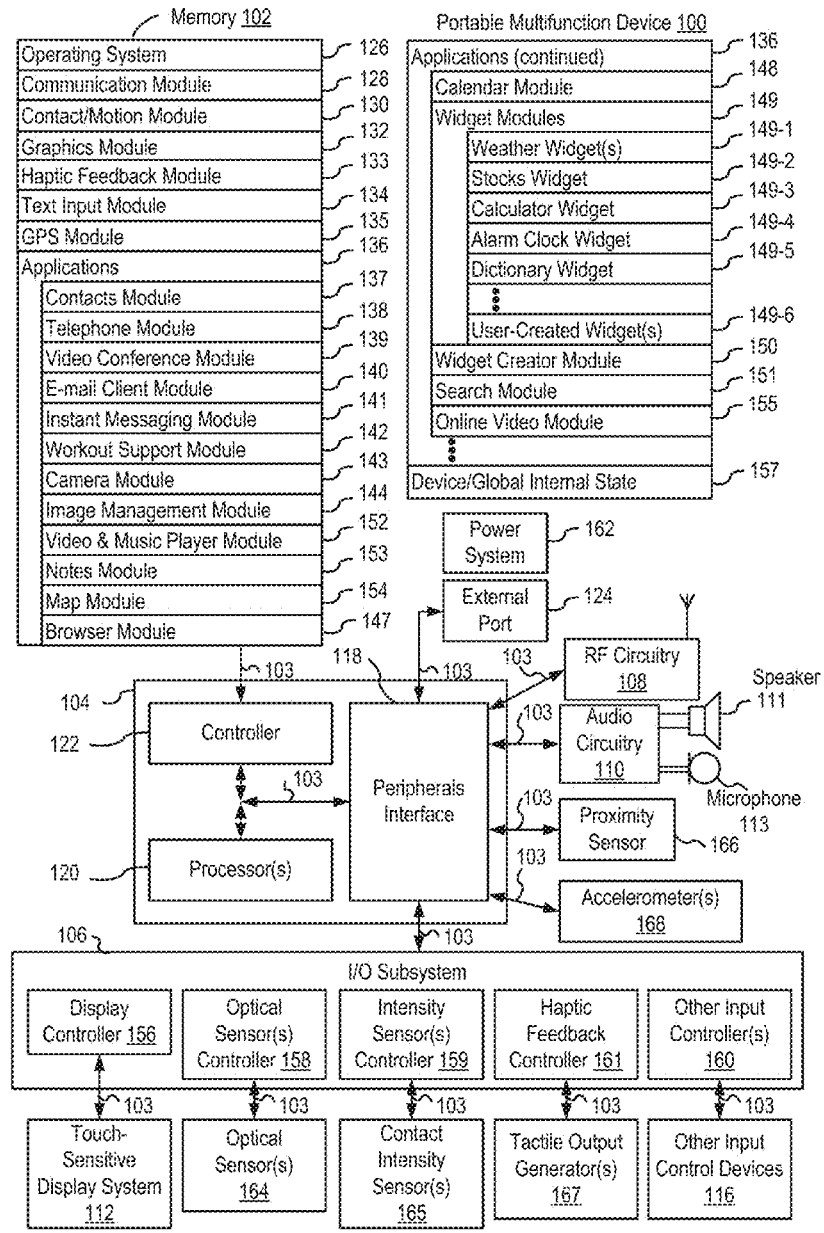
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
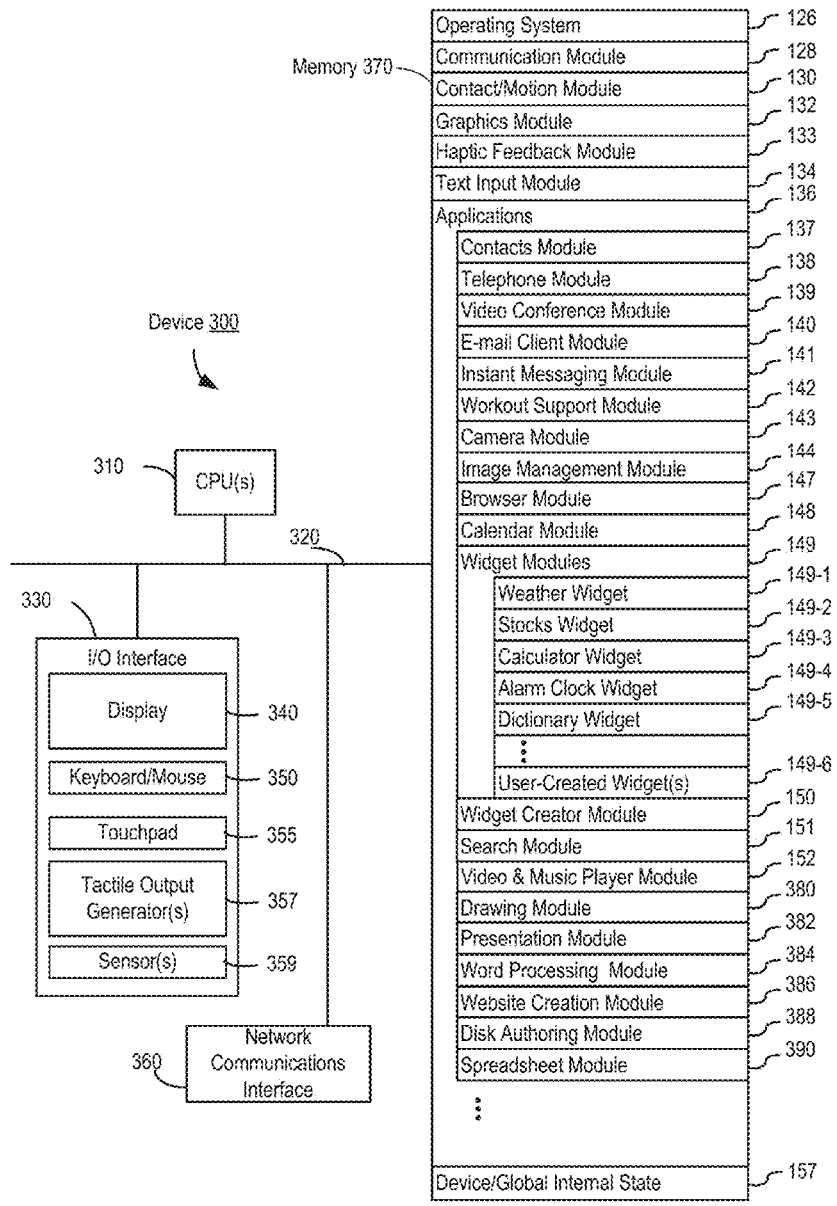
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
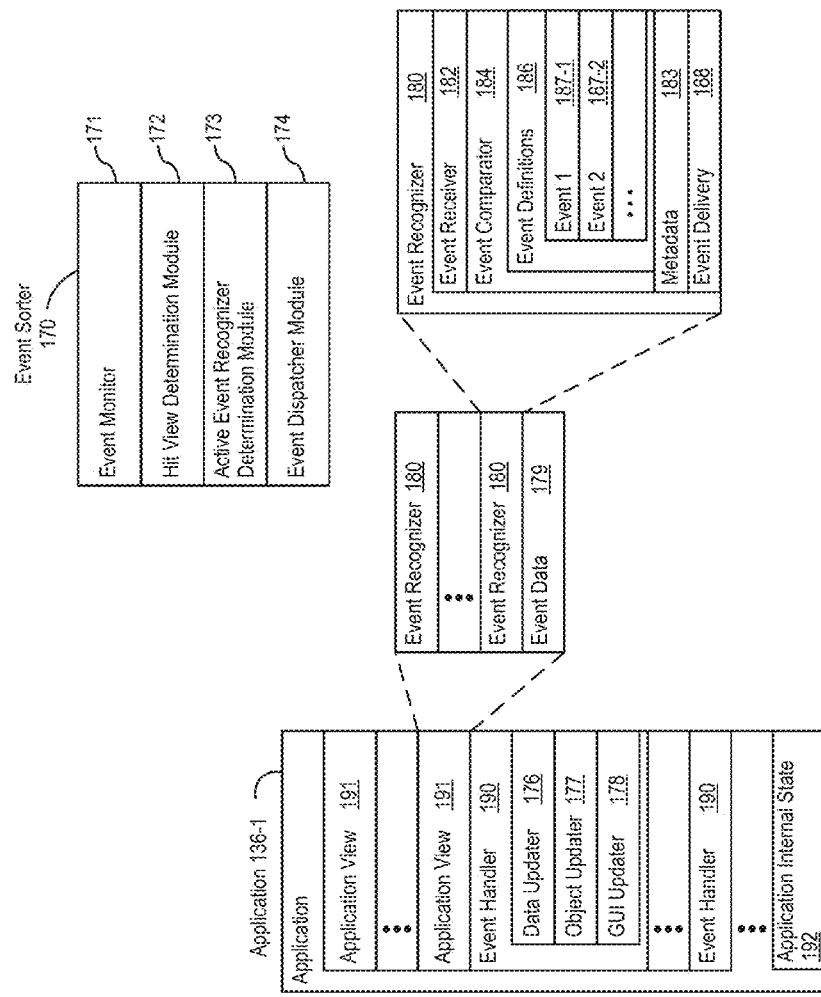
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
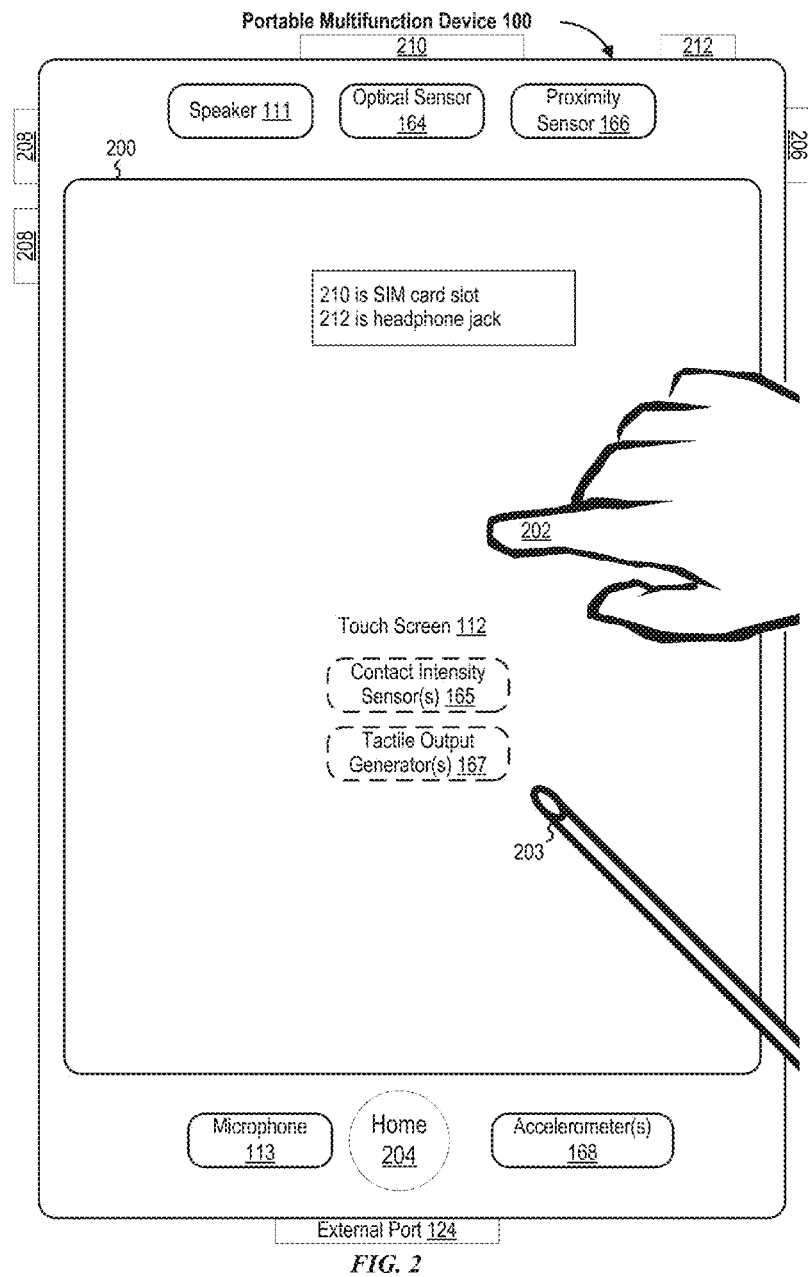
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
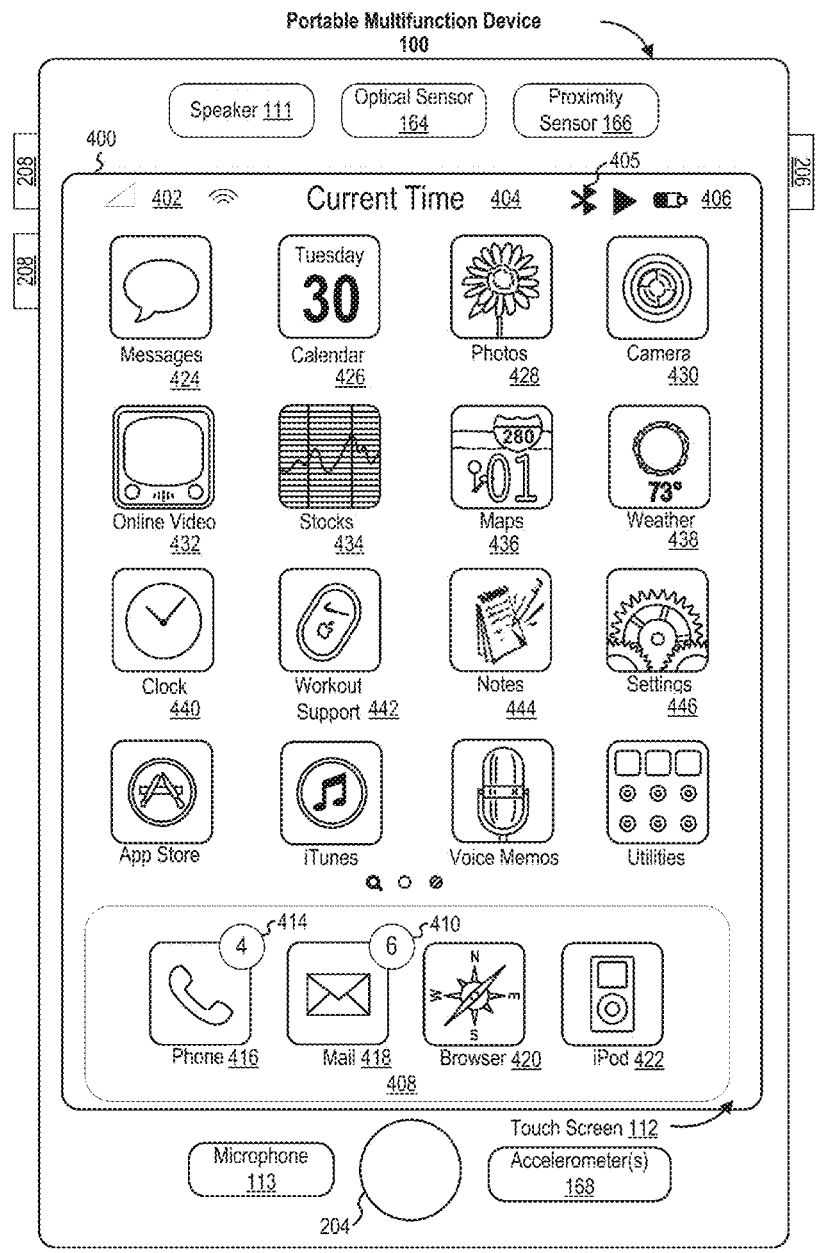
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
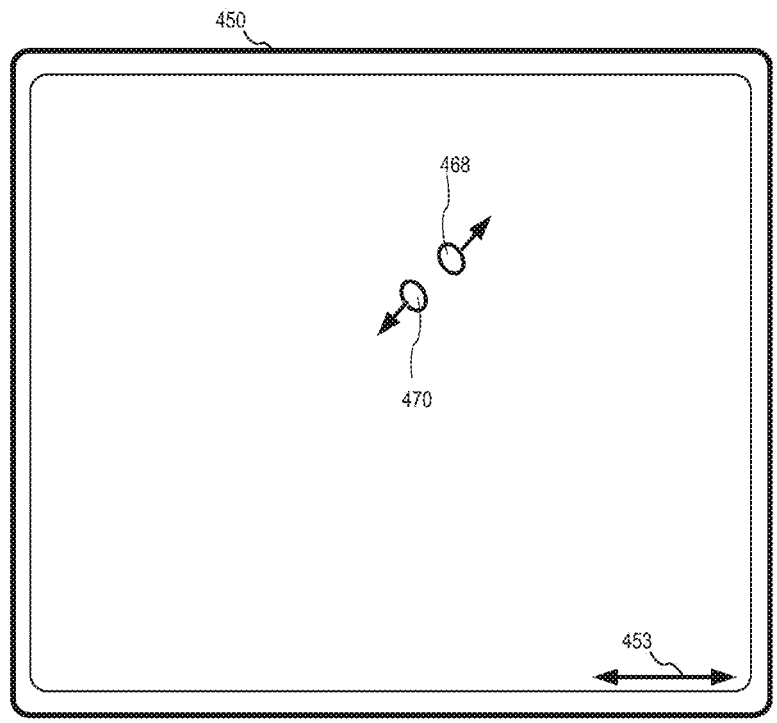
FIG. 4B illustrates an exemplary user interface for a multifunction device with a touch-sensitive surface that is separate from the display in accordance with some embodiments.
Figure 4B:
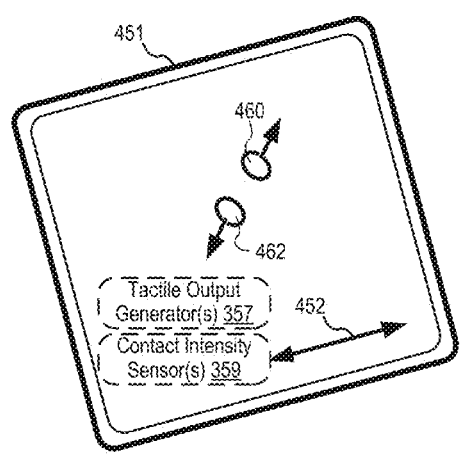

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
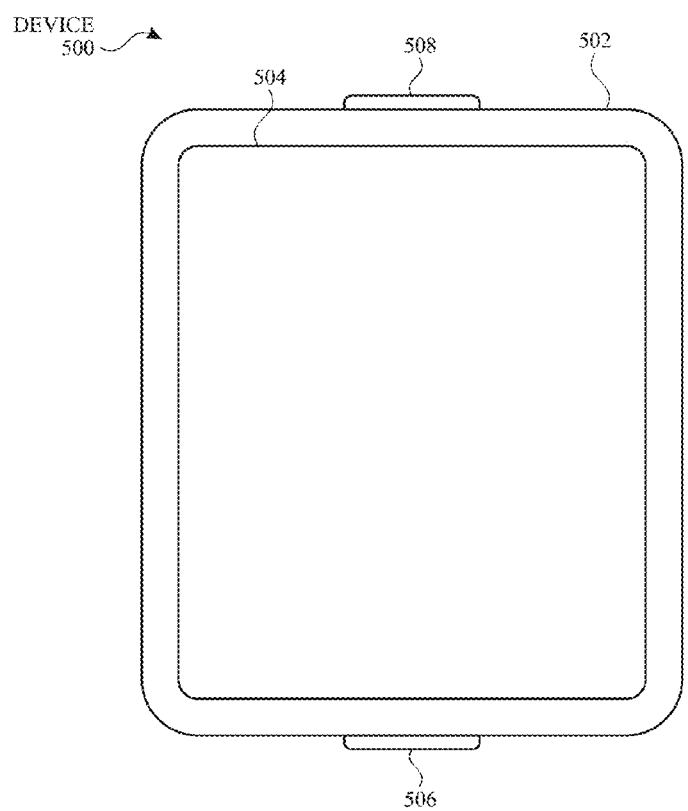
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
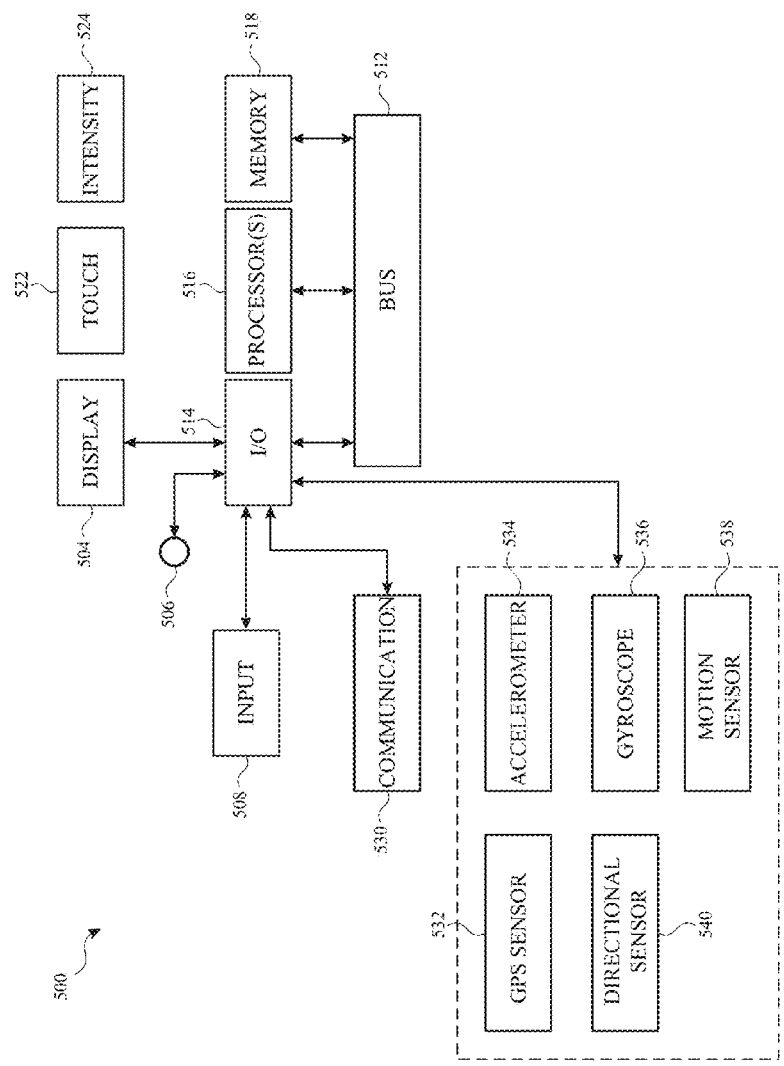
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 1000, 1200, 1400, 1600, 1800, and 2000. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-B, 3, and 5A-H). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
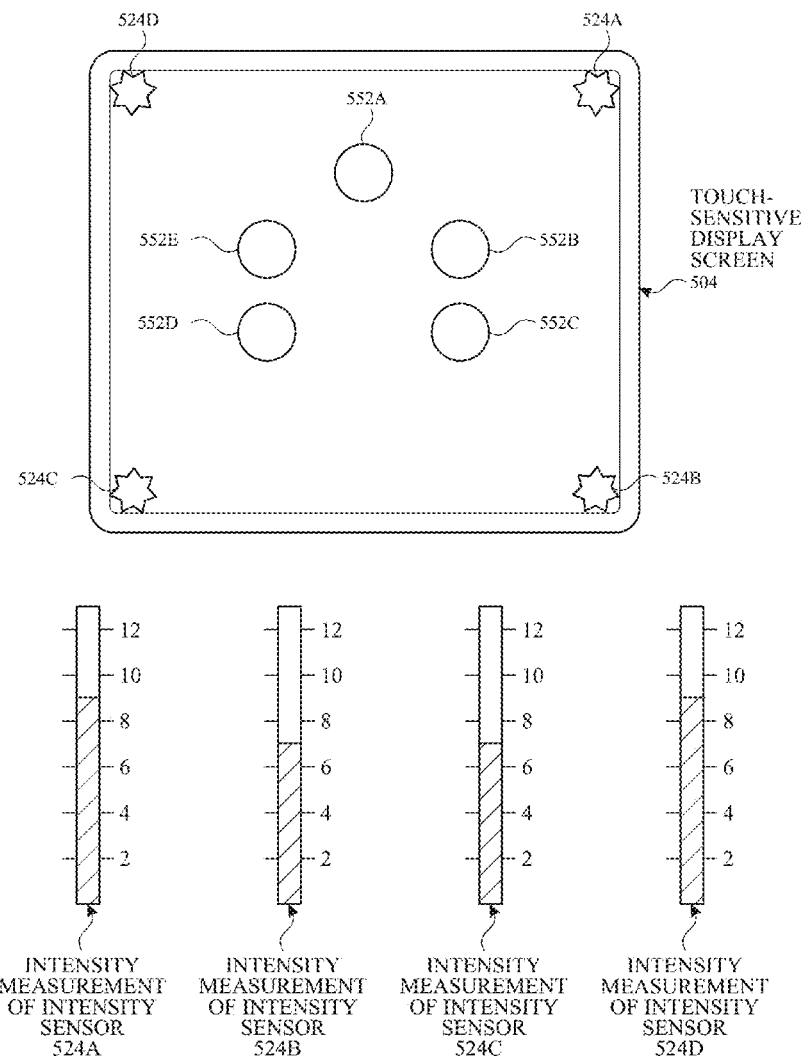
FIGS. 5C-5D illustrate exemplary components of a personal electronic device having a touch-sensitive display and intensity sensors in accordance with some embodiments.
Figure 5D:
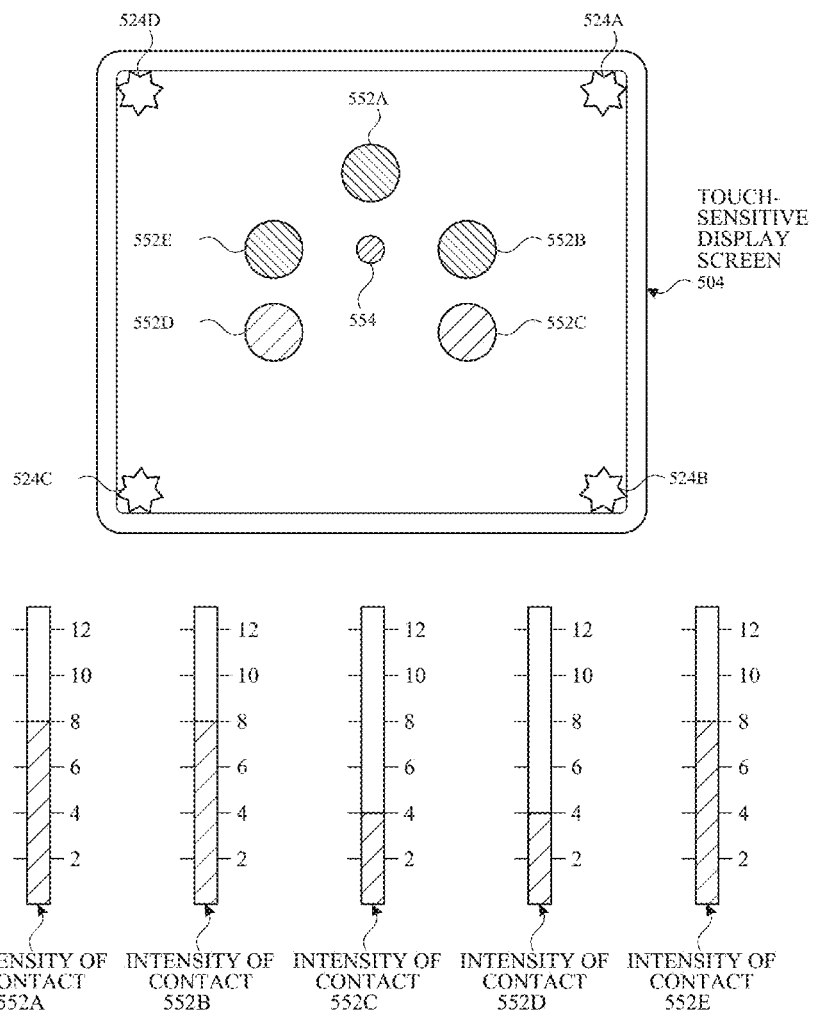

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
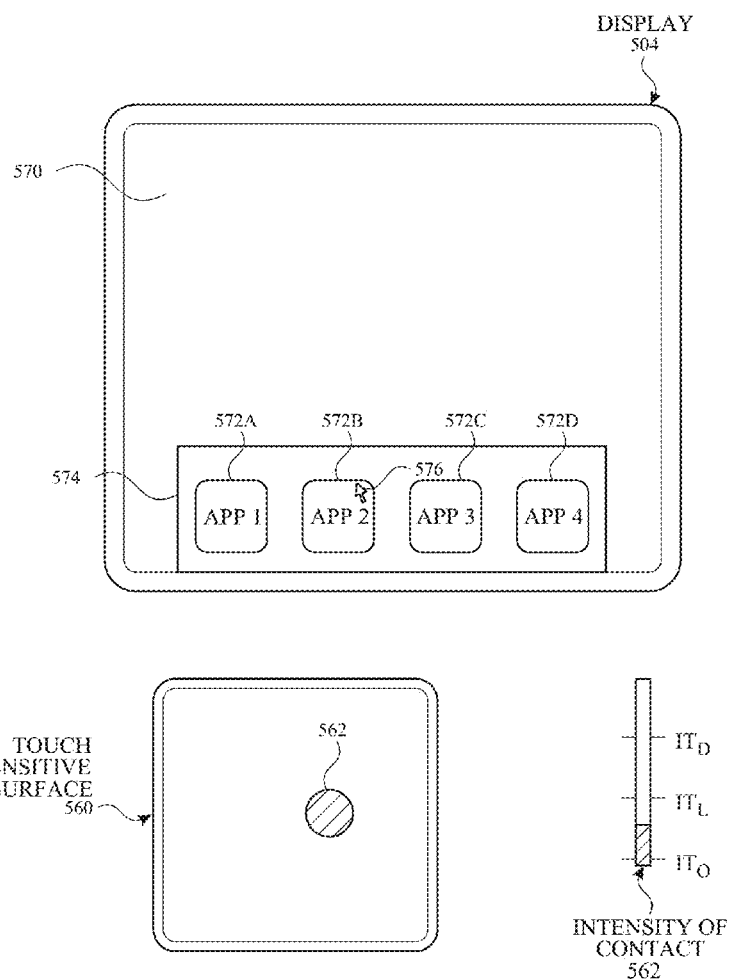
FIGS. 5E-5H illustrate exemplary components and user interfaces of a personal electronic device in accordance with some embodiments.
Figure 5F:
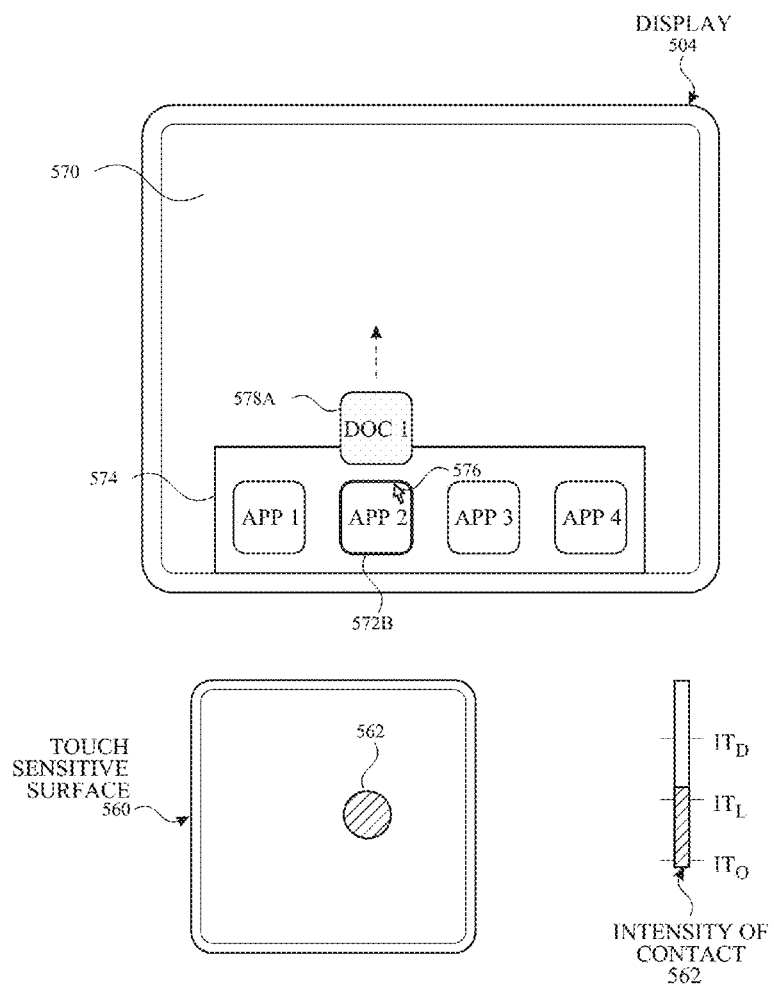
Figure 5G:
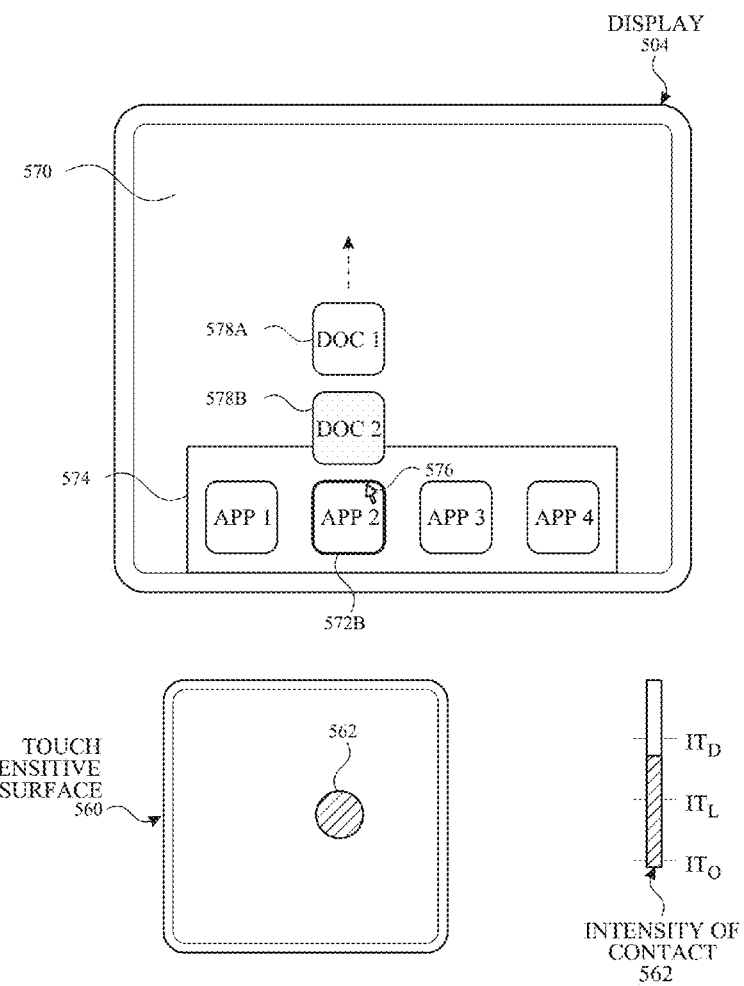
Figure 5H:
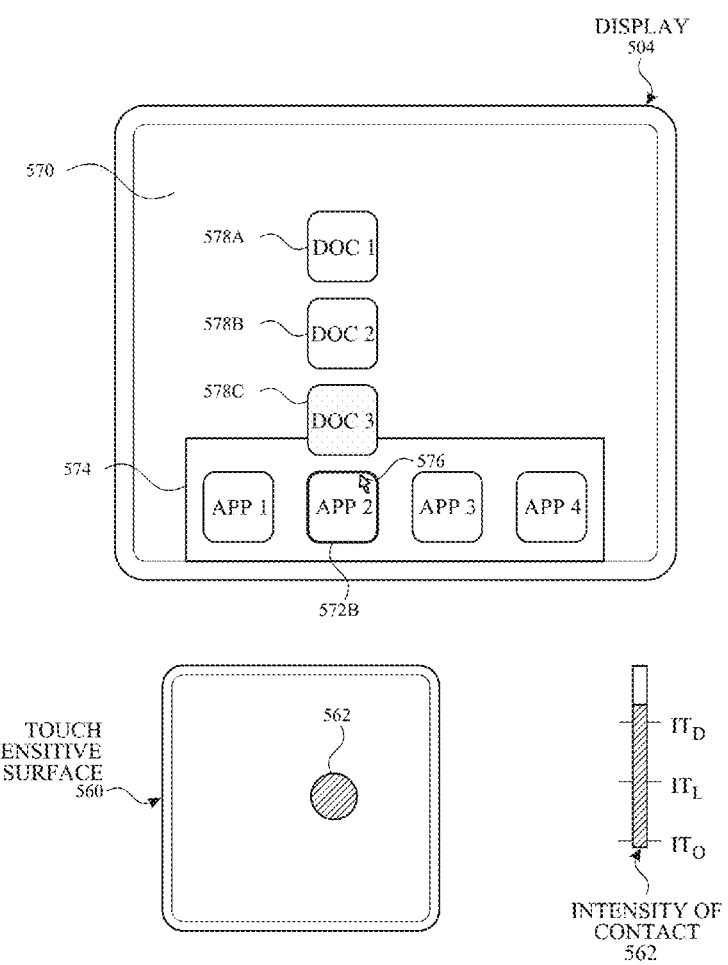

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require buttondepression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some examples, a secure element is a hardware component (e.g., a secure microcontroller chip) configured to securely store data or an algorithm. In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7P illustrate exemplary user interfaces for provisioning cards onto an electronic device (e.g., 100) with one or more input devices and one or more short-range communication radios (e.g., NFC radios), in accordance with some embodiments. The user interfaces in these figures are used to illustrate the processes described below, including the processes in FIGS. 8A-8B.

In accordance with some embodiments, the user has access to a stored-value card and wants to transfer value from the stored-value card to a virtual card that is stored on the electronic device. Prior to performing the value transfer, the electronic device uses a verification procedure to help confirm that the user is the rightful owner of the stored-value card. In some examples, the electronic device communications with the stored-value card (e.g., using NFC) to receive information about the stored-value card, such as an account number of the stored-value card or the current value stored in the stored-value card. The electronic device also separately receives information (e.g., from the user via a displayed keyboard, not using NFC) about the stored-value card. The electronic device verifies ownership based on these two pieces of information. If the ownership is verified, the electronic device transfers (e.g., using NFC) the stored value from the stored-value card to the virtual card of the electronic device. In some examples, such techniques help provide security for the rightful owner of the stored-value card and prevent users of electronic devices from transferring funds out of stored-value cards of other individuals.

FIG. 7A illustrates a user interface for electronic device 100 in accordance with some embodiments. In some examples, the electronic device 100 displays an affordance (e.g., 702A) that includes an indication of a previously provisioned account (e.g., a payment account). In this example, the affordance (e.g., 702A) corresponds to an American Express account. In some examples, the electronic device 100 also displays an affordance (e.g., 702B) that includes an indication of an additional previously provisioned account (e.g., a payment account). In this example, the affordance (e.g., 702B) corresponds to a MasterCard account that is different from the American Express account. When the electronic device 100 detects activation of the affordance that includes an indication of a previously provisioned account (e.g., 702A) or the affordance that includes an indication of an additional previously provisioned account (e.g., 702B), for example by detecting a touch input on a touch-sensitive surface of the electronic device, at a location corresponding to a respective affordance, the electronic device displays information corresponding to the respective account.

In some embodiments, the electronic device 100 displays an affordance (e.g., 702D), which, when activated, causes the electronic device to display a user interface for user-selection of an account to be made available for use without checking authentication, such as described with reference to FIGS. 15A-15M.

In some embodiments, the electronic device 100 displays a selection affordance (e.g., 704) which provides the user with an option to turn off express transit cards. For example, by turning off express transit cards, no account provisioned on the electronic device 100 is designated as an express transit card. In some embodiments, the electronic device 100 receives user input indicating a desire not to have accounts be made available for use without checking authentication (e.g., by receiving user input selecting a "no account" option for use without checking authentication; by moving a selection affordance to the "OFF" position, as illustrated with respect to the selection affordance 704), such as described with reference to FIGS. 15A-15M. In response to receiving the user input indicating the desire not to have accounts be made available for use without checking authentication, the electronic device 100 designates an account of the virtual card (or all accounts of the electronic device) to not be made available for use without checking authentication. Thus, the electronic device 100 provides the user with the option to disable (or enable) an express transit mode (e.g., using the selection affordance 704) by which funds are transmitted in particular transactions without requiring authentication. In some embodiments, when the express transit feature is enabled (e.g., by moving the selection affordance 704 to the "ON" position), the electronic device 100 provides faster access to an account designated as an express transit account. In some embodiments, when the express transit feature is disabled (e.g., by moving the selection affordance 704 to the "OFF" position), the electronic device 100 provides added security for accounts provisioned on the electronic device.

In some embodiments, the electronic device 100 displays an affordance (e.g., 702C) for provisioning an account on the electronic device 100 (or for provisioning an account onto a device different from the electronic device 100). The electronic device detects activation of the affordance (e.g., 702C) for provisioning an account on the electronic device 100. In response to detecting activation of the affordance (e.g., 702C) for provisioning an account on the electronic device 100, the electronic device displays a user interface for selecting from between two (or more) types of accounts (e.g., stored-value accounts and accounts that are not stored-value accounts), as illustrated in FIG. 7B. Thus, in some embodiments, the electronic device 100 displays an affordance (e.g., 706A) for provisioning a non-stored-value account and an affordance (e.g., 706B) for provisioning a stored-value account. In some embodiments, the stored-value account is an account where funds or data (in the form of binary-coded data) associated with the respective account are physically stored on a stored-value card associated with the stored-value account. In some examples, the stored-value card is a closed-loop stored-value card. In some examples, the stored-value card is a transit card (e.g., a stored-value transit card). In some examples, the stored-value transit account stores a transit plan (or transit pass) information. In some examples, the transit plan is a monthly or weekly transit plan. In some examples, the stored-value transit account stores electronic cash. In some examples, the electronic device 100 can transmit funds from a provisioned stored-value transit account using NFC and without accessing an IP network or Internet connection, which conserves power and allows funds to be transmitted from the stored-value transit account even when an IP network or Internet connection is not available.

Figure 7C:
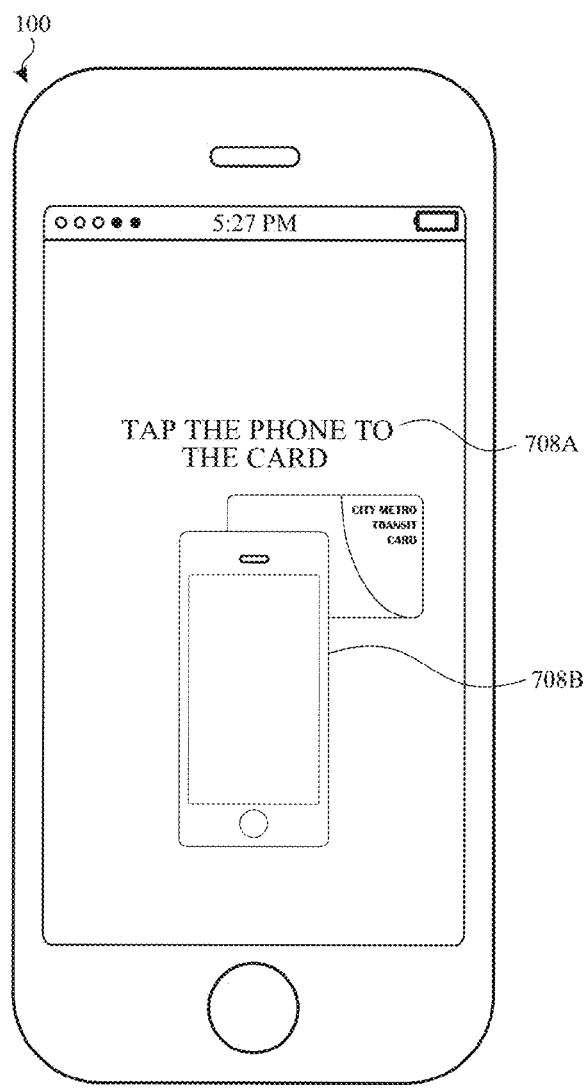

In some embodiments, in response to detecting activation of the affordance (e.g., 706B) for provisioning a stored-value account, as illustrated in FIG. 7B, the electronic device 100 displays, on a display of the electronic device, a prompt (e.g., 708A, 708B) for the user to place the electronic device 100 within communication range (e.g., of the one or more short-range communication radios) of a card with a stored value, as illustrated in FIG. 7C. For example, the prompt (e.g., 708A, 708B) instructs the user to place the electronic device 100 on a stored-value card such that the back of the electronic device (e.g., the side of the electronic device opposite the display) is nearest to the stored-value card. Alternatively, or in addition, the electronic device 100 provides the prompt via a speaker, haptic vibration, or other techniques suitable for prompting the user.

Figure 7D:
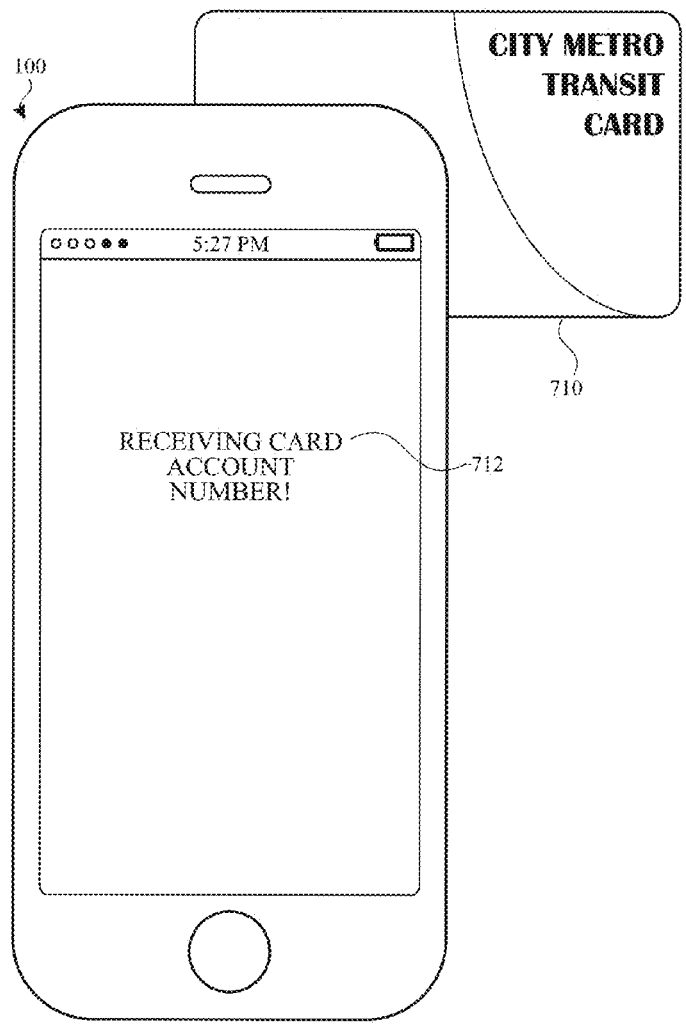
Figure 7E:
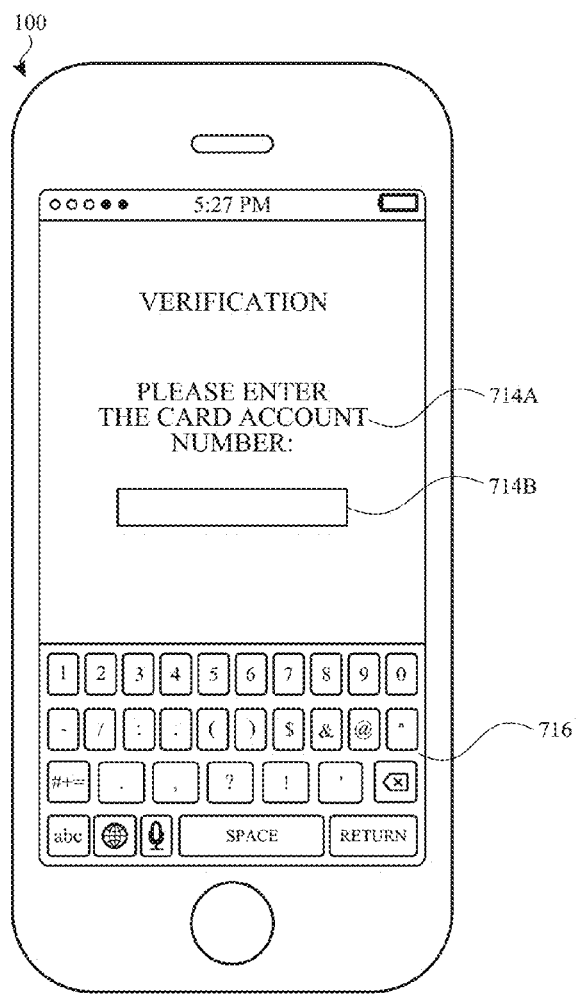
Figure 7F:
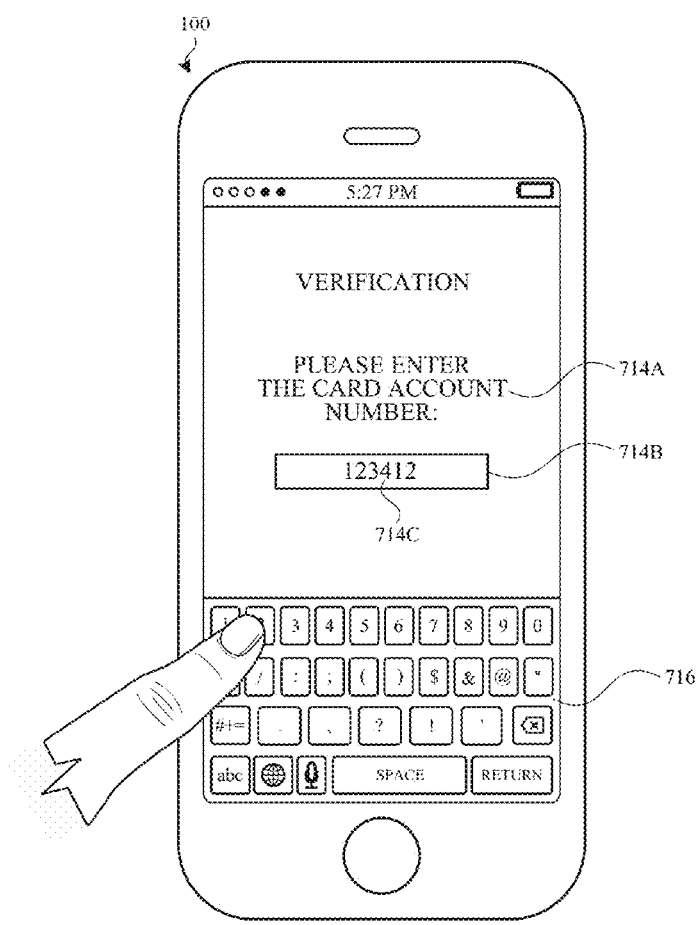
Figure 7G:
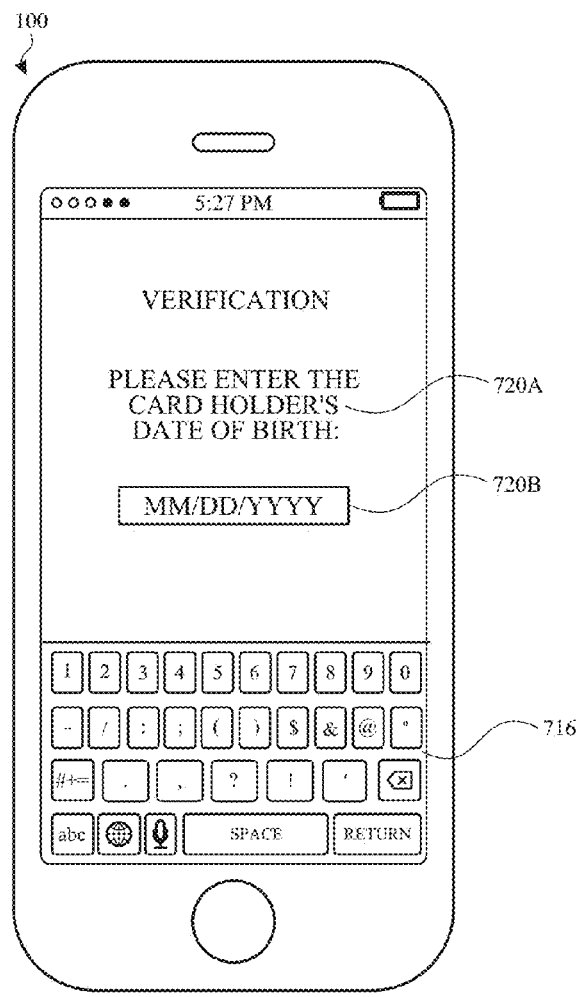
Figure 7H:
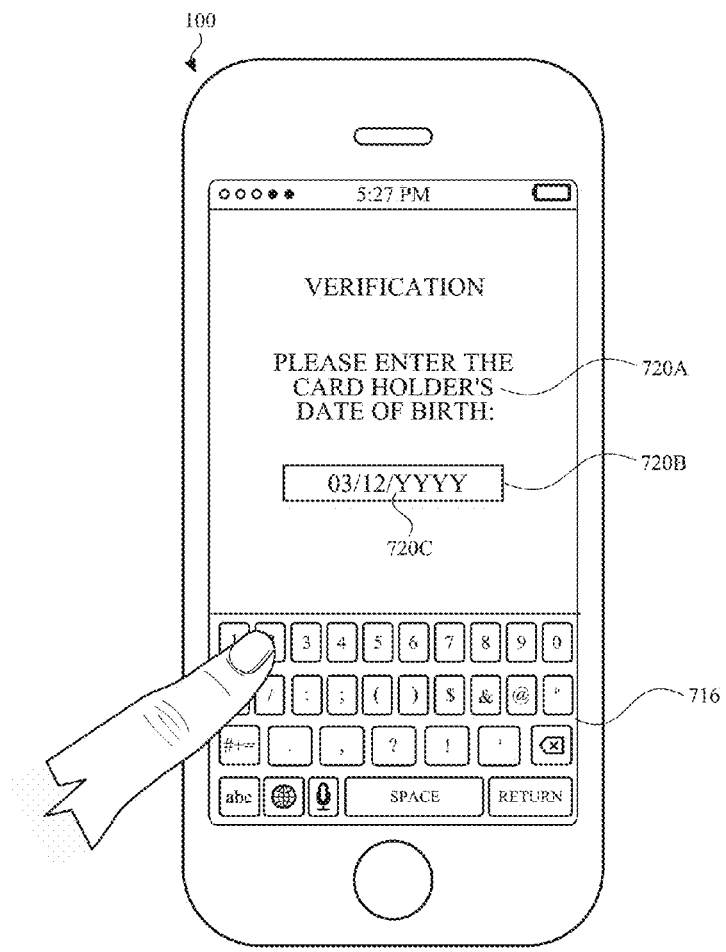
Figure 7I:
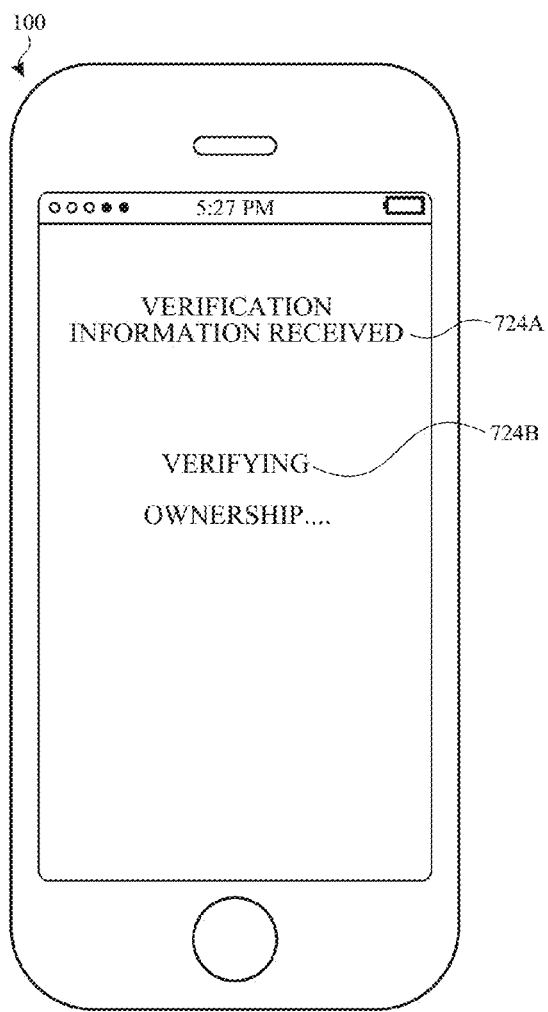
Figure 7J:
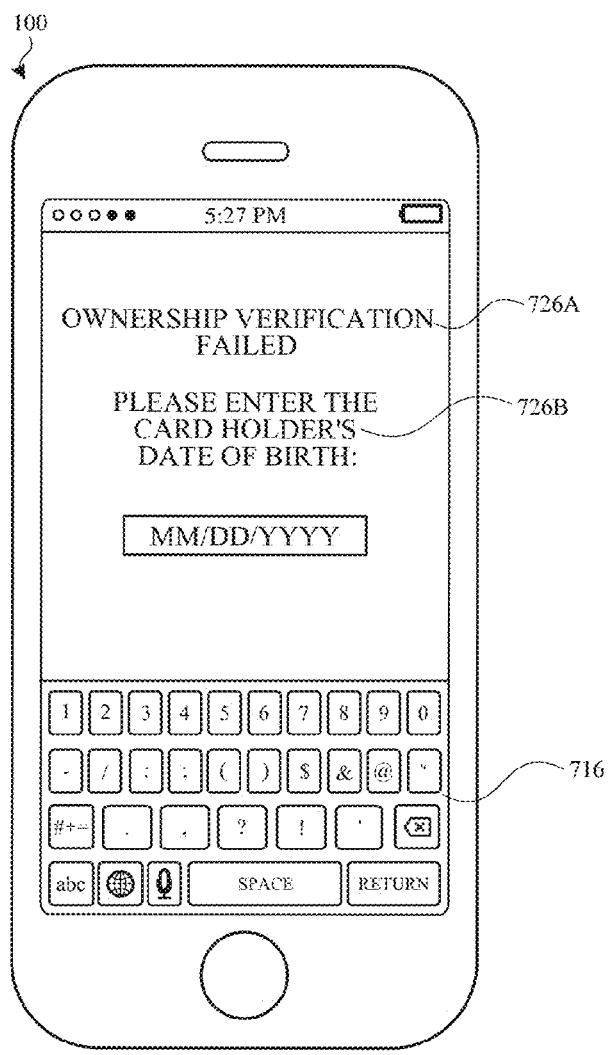
Figure 7K:
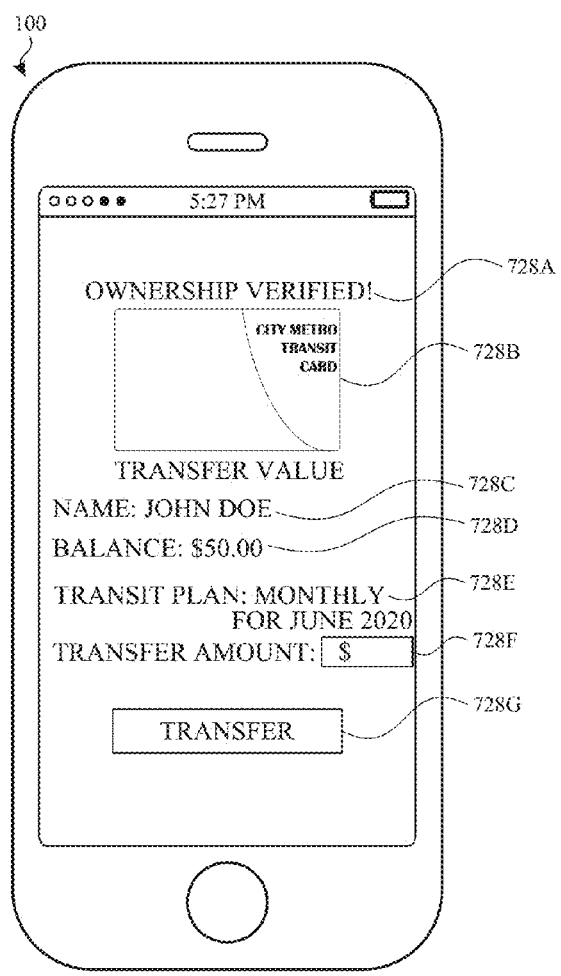

As illustrated in FIG. 7D, once the electronic device 100 is within communication range of the card, the electronic device 100 receives, from the card, by the one or more short-range communication radios (e.g., NFC radios), a card account number of the card (e.g., 710), where the card has a stored value (e.g., 728D shown in FIG. 7K, a stored value greater than 0). For example, the card (e.g., 710) is a stored-value card, an NFC-readable stored-value card, a stored-value transit card, or a stored-value gift card. In some examples, the card account number of the card (e.g., 710) is received by the electronic device 100 from the card using NFC. In some embodiments, the electronic device 100 presents an indication (e.g., 712), while in communication with the card, that the electronic device is receiving the card account number of the card (e.g., 710). In some embodiments, the card account number includes alphanumeric characters. In some examples, the card account number includes numeric characters, but does not include alphabetic characters.

The electronic device 100 requests (e.g., from the user) verification information (e.g., a card number of the card (e.g., 710), the card account number of the card, or a birth date of user registered to the card) to verify ownership of the card (e.g., 710). For example, the electronic device 100 requests that the user enter the card number of the card (e.g., 710). In some embodiments, the electronic device 100 requests the verification information subsequent to receiving the card account number of the card (e.g., 710).

In some embodiments, as illustrated in FIGS. 7E-7F, the electronic device 100 displays an indication (e.g., 714A) requesting the user to provide verification information, such as the card account number of the card (e.g., 710). In some embodiments, the electronic device 100 uses the verification information (e.g., 714C) to confirm that the user is in physical possession (or control) of the card (e.g., 710). As illustrated in FIG. 7E, the electronic device 100 displays a request (e.g., 714A) for the user to enter a card account number into a field (e.g., 714B) using a virtual keypad (e.g., 716). As illustrated in FIG. 7F, the electronic device 100 receives, via the one or more input devices, input from the user of the device (e.g., not by the one or more short-range communication radios) that includes verification information (e.g., 714C) for verifying ownership of the card (e.g., 710).

In some embodiments, the verification information (e.g., 714C) is information that is not shown on the card (e.g., 710). For example, the verification information (e.g., 714C) requested by the electronic device 100 and entered by the user is not displayed on the card (e.g., 710). In some embodiments, in accordance with a determination that the card (e.g., 710) is registered, the requested (and received) verification information is information that is not shown on the card. Thus, in some examples, verification is not possible merely by having possession of the card (e.g., 710); the user must have some additional information corresponding to the card. In some embodiments, the verification information (e.g., 714C) is (or includes) the stored value of the card (e.g., 710), such as the amount of funds currently stored on the card. In some examples, at least some (or all) of the stored value of the card (e.g., 710) can be transferred from the card (e.g., 710) to the virtual card provisioned on the electronic device 100.

In some embodiments, as illustrated in FIGS. 7G-7H, the electronic devices 100 displays an indication (e.g., 720A) requesting the user to provide the verification information, such as the card holder's date of birth. In some examples, the electronic device 100 uses the verification information (e.g., 720C) to confirm that the user is in physical possession (or control) of the card (e.g., 710). As illustrated in FIG. 7G, the electronic device 100 displays a request (e.g., 720A) for the user to enter a birth date (e.g., 720C) into a field (e.g., 720B) using the virtual keypad (e.g., 716). As illustrated in FIG. 7H, the electronic device 100 receives, via the one or more input devices, input from a user of the electronic device (e.g., not by the one or more short-range communication radios) that includes verification information (e.g., 720C) for verifying ownership of the card (e.g., 710). In some embodiments, the user interfaces of FIGS. 7G-7H are alternatives to the user interfaces of FIGS. 7E-7F. In some embodiments, the user interfaces of FIGS. 7G-7H are used in combination with the user interfaces of FIGS. 7E-7F.

In some embodiments, the verification information (e.g., 720C) is information that is not shown on the card (e.g., 710). For example, the verification information (e.g., 720C) requested by the electronic device 100 and entered by the user is not displayed on the card (e.g., 710). In some embodiments, in accordance with a determination that the card (e.g., 710) is registered, the requested (and received) verification information is information that is not shown on the card. Thus, in some examples, verification is not possible merely by having possession of the card (e.g., 710) and the user must have some additional information corresponding to the card. In some embodiments, the verification information (e.g., 720C) is (or includes) the stored value of the card (e.g., 710). In some examples, at least some (or all) of the stored value of the card (e.g., 710) can be transferred from the card to the virtual card provisioned on the electronic device 100.

As illustrated in FIG. 7I, the electronic device 100 verifies ownership of the card (e.g., 710) based on a comparison of the verification information (e.g., 714C, 720C) with separate information associated with the card of the user of the card (e.g., the card account number of the card, a birthday of the registered user of the card). The separate information about the card (e.g., 710) is received separately from the verification information (e.g., 714C, 720C). For example, the separate information is received from a server, service, database, or from the card (e.g., 710) itself. In some embodiments, the comparison of the verification information (e.g., 714C, 720C) with separate information associated with the card (e.g., 710) of the user of the card is performed at a remote server and the result is transmitted to the electronic device 100 from the remote server. In some embodiments, the comparison of the verification information (e.g., 714C, 720C) with separate information associated with the card (e.g., 701) of the user of the card is performed at the electronic device 100. In some embodiments, the electronic device 100 displays an indication (e.g., 724A) that the verification information (e.g., 714C, 720C) was received. In some embodiments, the electronic device 100 displays an indication (e.g., 724B) that verification of ownership is being performed.

In some embodiments, the electronic device 100 transmits the card account number to a server, service, or database (e.g., via a network or Internet connection) and receives, from the server, service, or database, a response regarding a registration status of the card (e.g., 710). In some embodiments, this is done prior to requesting the verification information (e.g., 714C, 720C) from the user. In some embodiments, this is done prior to receiving the input from the user for verifying ownership of the card (e.g., 710). In some embodiments, the electronic device 100 determines, based on the response received from the server, service, or database regarding the registration status of the card (e.g., 710), whether or not the card is registered (e.g., with a server, service, or database). Thus, in some embodiments, the electronic device 100 operates in a "registered mode" (e.g., based on a response received from the server, service, or database indicating that the card is registered), and, in some embodiments, the electronic device 100 operates in an "anonymous mode" (e.g., based on a response received from the server, service, or database indicating that the card is not registered). In some examples, a card is registered when the server, service, or database has registered the card to a particular user or entity. In some examples, a card is registered when the server, service, or database associates the card with a particular user or entity.

In some embodiments, in accordance with a determination that the card (e.g., 710) is registered (e.g., "registered mode"), the electronic device 100 requests (e.g., from the user) verification information to verify ownership of the card (e.g., 710) that includes requesting information that is not shown on the card (e.g., a birth date of the user registered to the card). In some embodiments, the electronic device 100 forgoes requesting verification information that is shown on the card (e.g., 710). In some embodiments, the requested verification information is information that is not shown on the card (e.g., 710).

In some embodiments, in accordance with a determination that the card (e.g., 710) is registered (e.g., "registered mode"), the electronic device 100 transmits (e.g., to the server, service, or database) the card account number of the card and receives (e.g., from the server, service, or database) the separate information. In some examples, the separate information includes information that is personal to the registered user of the card (e.g., 710), not the card account number of the card. For example, the separate information includes a birthday of the user, a mailing address of the user, and/or a mother's maiden name of the user. By requesting information that is personal to the user to which the card (e.g., 710) is registered, a higher level of security is achieved for registered cards. In some embodiments, subsequent to receiving, by the one or more short-range communication radios, a card account number of the card (e.g., 710) and prior to transferring, by the one or more short-range communication radios, at least some (or all) of the stored value from the card (e.g., 710) to a virtual card stored on the electronic device 100, the electronic device forgoes receiving a user-provided account number of the card (e.g., 710) as part of verifying ownership of the card. Thus, the electronic device, by using the separate information for verification helps avoid user's cards from being digitally stolen by passing an NFC reader over the user's pocket or purse that contains the card (e.g., 710).

In some embodiments, in accordance with a determination that the card (e.g., 710) is not registered (e.g., "anonymous mode"), the electronic device 100 requests (e.g., from the user) verification information (e.g., 714C, 720C, a card number of the card, the card account number of the card) to verify ownership of the card which includes information that is shown on the card. In some examples, the electronic device 100 forgoes requesting information that is not shown on the card (e.g., 710). Thus, in some examples, the electronic device 100 can request different information based on whether the card (e.g., 710) is registered or is not registered, and a higher level of security is achieved for registered cards by requesting information that is personal to the registered user of the card.

In some embodiments, in accordance with a determination that the card (e.g., 710) is not registered (e.g., "anonymous mode"), and prior to verifying ownership of the card, the electronic device 100 requests a user-provided account number of the card as part of requesting verification information to verify ownership of the card. In some examples, the electronic device 100 receives the user-provided account number of the card (e.g., 710) as an input from the user of the electronic device (e.g., using a touch-screen keyboard input), and not from the one or more short-range communication radios. The user-provided account number of the card (e.g., 710) includes verification information for verifying ownership of the card. In some examples, the electronic device 100 compares the user-provided account number to the card account number as part of verifying ownership of the card (e.g., 710) by comparing the verification information with the separate information, where the separate information includes the received card account number of the card. In some examples, in accordance with a determination that the card is registered (e.g., "registered mode"), the electronic device 100 does not request (or receive) a user-provided account number of the card (e.g., 710) as part of receiving input from the user of the verification information for verifying ownership of the card.

In some embodiments, in accordance with a determination that the card is not registered (e.g., "anonymous mode"), the electronic device 100 does not present (e.g., does not display on any display of the electronic device) the card account number of the card (e.g., 710) prior to receiving, via the one or more input devices, input from the user of the electronic device that includes verification information for verifying ownership of the card. In some embodiments, in accordance with a determination that the card (e.g., 710) is not registered (e.g., "anonymous mode"), the electronic device 100 does not present (e.g., does not display on any display of the electronic device) the card account number of the card prior to verifying ownership of the card. Thus, in some examples, the user must have access to the card number (or the account number associated with the card 710) through a method other than through the electronic device 100. For example, the user can provide the card number (or the account number associated with the card) to the electronic device 100 (e.g., by providing text input via a displayed virtual keyboard) based on the card number (or the account number associated with the card) printed on a receipt or invoice of the card (e.g., 710) or a card number printed on the card. In some embodiments, in accordance with a determination that the card (e.g., 710) is registered (e.g., "registered mode"), the electronic device 100 does present (e.g., by displaying on a display of the electronic device) the card account number of the card prior to receiving, via the one or more input devices, input from the user that includes verification information for verifying ownership of the card.

In some embodiments, as illustrated in FIG. 7J, in accordance with a determination that verification of ownership is not successful, the electronic device 100 displays and/or generates feedback (e.g., visual feedback displayed on the display, audio, and/or haptic output generated by the device) for the user indicating (e.g., indication 726A) that verification of ownership was not successful. In some examples, a determination that the verification information is not successful is made if the verification information (e.g., 714C, 720C) received from the user is not consistent with the separate information. In some embodiments, in accordance with the determination that verification of ownership is not successful, the electronic device 100 forgoes providing a prompt (e.g., foregoes generating feedback, such as visual feedback displayed on the display, audio, and/or haptic output generated by the device) to perform (e.g., by the user) a value transfer operation for the value transfer, and forgoes transferring any of the stored value from the card (e.g., 710) to the virtual card stored on the electronic device. In some embodiments, as illustrated in FIG. 7J, in accordance with the determination that verification of ownership is not successful, the electronic device 100 again requests (e.g., 726B) (e.g., from the user) verification information (e.g., a card number of the card, the card account number of the card, a birth date of user registered to the card) to verify ownership of the card (e.g., 710). Thus, the electronic device 100 informs the user that the verification of ownership was not successful.

In some embodiments, as illustrated in FIG. 7K, in accordance with a determination that verification of ownership is successful, the electronic device 100 presents (e.g., on a display of the electronic device) an indication (e.g., 728A, 728B) of completion of the successful verification. In some embodiments, the electronic device 100 presents one or more indications of one or more information items (e.g., 728C-728E) associated with the verified card (e.g., 710). In some examples, the electronic device 100 presents an indication (e.g., 728C) of a name of the user associated with the card (e.g., 710). In some examples, the electronic device 100 presents an indication (e.g., 728D) of a current balance of the card (e.g., 710). In some examples, the electronic device 100 presents an indication (e.g., 728E) of a transit plan (or transit pass) information associated with the card (e.g., 710).

In some embodiments, the electronic device 100 displays an affordance or an input field (e.g., 728F) that includes an indication of the amount of stored value of the card (e.g., 710) that is to be transferred from the card to the virtual card stored on the electronic device. In some examples, the electronic device receives user input (e.g., into the input field 728F) of the amount of stored value of the card that is to be transferred from the card (e.g., 710) to the virtual card stored on the electronic device. In some embodiments, the affordance (e.g., 728F), when activated, causes the electronic device to display a user interface for user-selection of an amount to be transferred from the stored-value card (e.g., 710) to the virtual card stored on the electronic device 100. For example, the user can select to transfer the entire amount of the stored value of the card (e.g., 710) from the card to the virtual card on the electronic device 100, as illustrated in FIG. 7L.

Figure 7L:
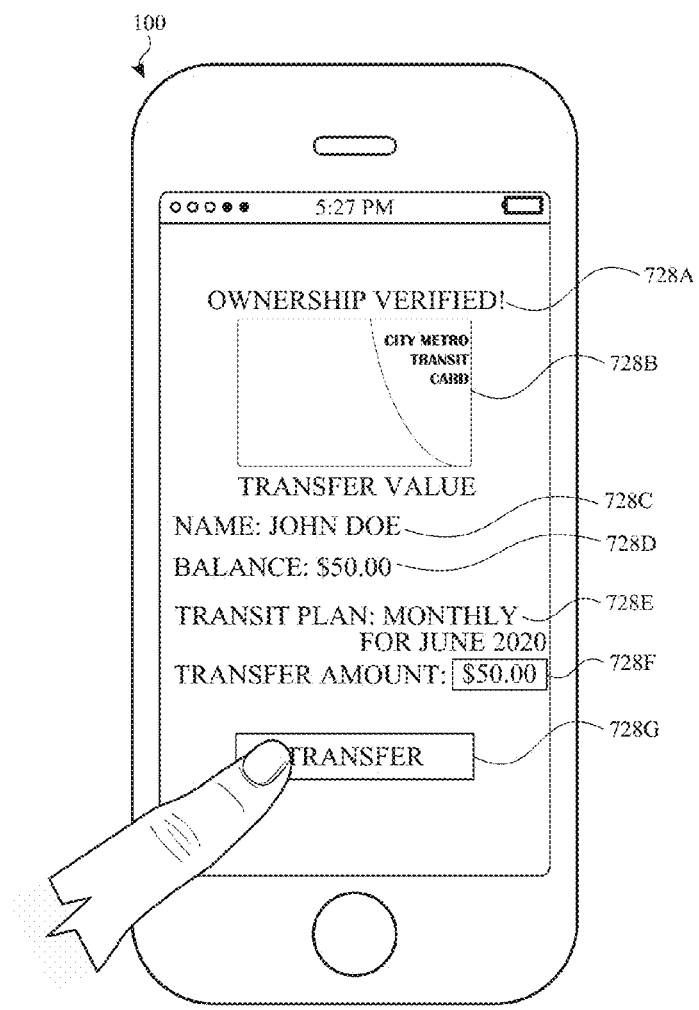

In some embodiments, the electronic device 100 displays an affordance (e.g., 728G) that, as illustrated in FIG. 7L, can be activated by user selection to initiate a process for transferring value. The affordance (e.g., 728G), when activated, initiates the process for transferring value from the card (e.g., 710) to the virtual card on the electronic device 100. In some embodiments, the affordance (e.g., 728G) cannot be activated before the amount of value to be transferred is selected (e.g., using affordance 728F). In some embodiments, when the electronic device has received a transfer value (e.g., using input field 728F), activating the affordance (e.g., 728G) initiates a process for transferring the entire available balance on the card (e.g., 710). In some embodiments, the affordance (e.g., 728G) initiates a process for transferring the entire available balance on the card (e.g., 710) (e.g., even when no transfer value has been entered into field 728F).

Figure 7M:
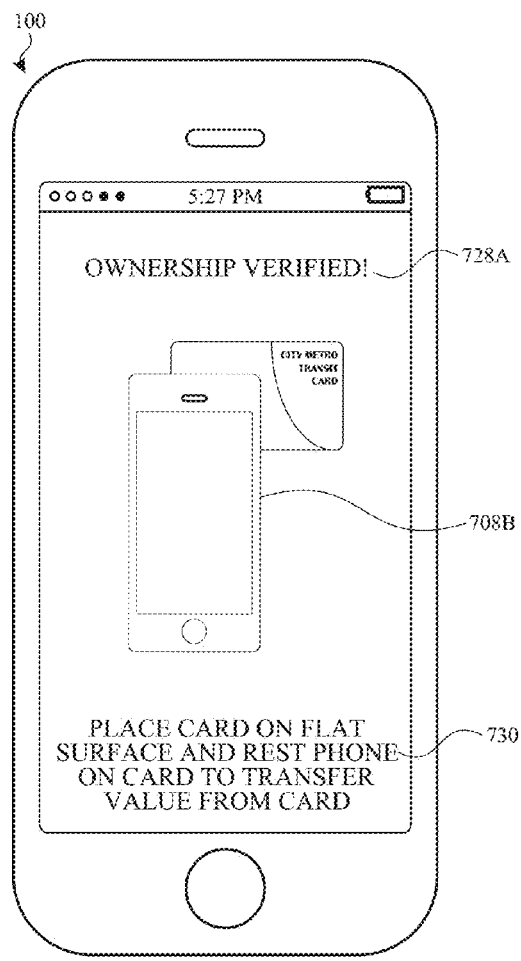
Figure 7N:
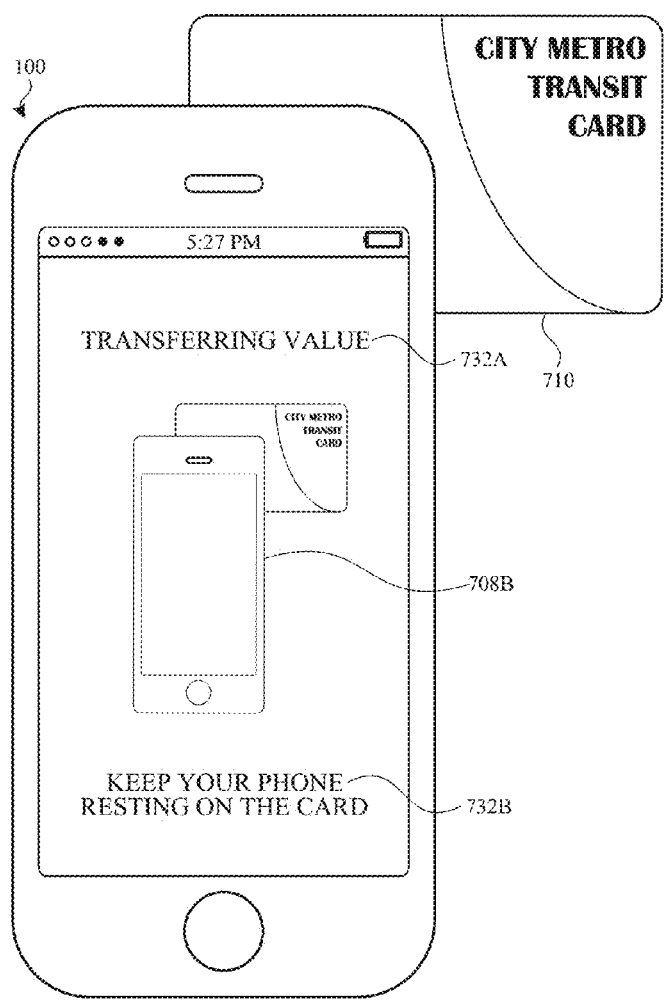

As illustrated in FIG. 7M, in accordance with a determination that verification of ownership is successful (and, in some embodiments, in response to receiving user selection of an affordance (e.g., 728G) to initiate the value transfer as illustrated in FIG. 7L), the electronic device 100 displays and/or generates feedback (e.g., visual feedback displayed on the display, audio, and/or haptic output generated by the device) (e.g., 708B, 730) prompting the user to perform (e.g., by the user) a value transfer operation for a value transfer. In some examples, the prompt or feedback (e.g., 708B, 730) requests prolonged contact of electronic device 100 with the card (e.g., 710) or requests that the electronic device be placed within close proximity of the card (e.g., 710). In some examples, the electronic device 100 determines that the verification of ownership is successful if the verification information (714C, 720C) received from the user is consistent with (e.g., matches) the separate information. As illustrated in FIG. 7N, in conjunction with the value transfer operation (and/or subsequent to providing the prompt or generating feedback) to perform the value transfer operation), the electronic device 100 transfers (e.g., by the one or more short-range communication radios) at least some (or all) of the stored value from the card (e.g., 710) to a virtual card stored on the electronic device. In some embodiments, the virtual card is stored in an account information application (e.g., an electronic wallet) of the electronic device 100. In some embodiments, during the transfer, the electronic device 100 displays and/or generates feedback (e.g., visual feedback displayed on the display, audio, and/or haptic output generated by the device) indicating (e.g., indication 732A) (e.g., to the user) that at least some (or all) of the stored value form the card (e.g., 710) is being transferred to a virtual card on the electronic device, and an indication (e.g., 708B, 732B) (e.g., to the user) to maintain the prolonged contact or proximity of the electronic device to the card while the transfer process is ongoing.

In some embodiments, prior to receiving the card account number of the card (e.g., 710) and prior to verifying ownership of the card, the virtual card is stored (e.g., in the account information application of the electronic device) on the electronic device 100. In some embodiments, the electronic device 100 includes a template virtual card (e.g., a "blank" virtual card) stored on the electronic device and that does not contain any value or funds. In some examples, the electronic device 100 transfers the at least some (or all) of the stored value from the card (e.g., 710) to the template virtual card. Thus, in some examples, there is no need to configure the electronic device 100 with a new virtual card, as the features and/or value associated with the card (e.g., 710) can be moved to the template virtual card. The template virtual card speeds up the process for transferring funds from the stored-value card (e.g., 710) to the electronic device 100 because a new virtual card does not need to be created during the provisioning process or the transfer operation.

In some embodiments, subsequent to successfully transferring the at least some (or all) of the stored value from the card (e.g., 710) to the virtual card stored on the electronic device 100, the virtual card includes the at least some (or all) of the stored value, and the card (e.g., 710) no longer includes the at least some (or all) of the stored value. In some embodiments, transferring the at least some (or all) of the stored value from the card (e.g., 710) to the virtual card stored on the electronic device 100 includes removing the stored value from the card and transmitting a request (e.g., via a network or Internet connection) to a server, service, or database associated with the card to deactivate the card (e.g., kill the card, render the card inoperable). For example, all of the stored value from the card (e.g., 710) is removed and the card is rendered inoperable. Thus, in some embodiments, the features and/or value of the physical card (e.g., 710) are moved in their entirety to the virtual card stored on the electronic device 100, and thereby the virtual card replaces the physical card.

In some embodiments, as illustrated in FIG. 7P, subsequent to successfully transferring the at least some (or all) of the stored-value from the card (e.g., 710) to the virtual card stored on the electronic device 100, the electronic device displays a representation of the virtual card corresponding to the stored-value card. In some embodiments, the representation of the virtual card corresponding to the stored-value card includes an indication (e.g., 736A) of the type of the virtual card. In some embodiments, the representation of the virtual card corresponding to the stored-value card includes a graphical depiction (e.g., 736B) of the virtual card. The indication (e.g., 736A) of the type and the graphical depiction (e.g., 736B) of the virtual card enable the user to differentiate the virtual card from a different card provisioned on the electronic device 100, and, in some examples, are displayed concurrently.

In some embodiments, the representation of the virtual card corresponding to the stored-value card provisioned on the electronic device 100 includes a menu (e.g., 740) that includes a plurality of selectable affordances (e.g., 740A, 740B, 740C). In some examples, the menu (e.g., 740) includes an information affordance (e.g., 740A). In some examples, the menu (e.g., 740) includes a transactions affordance (e.g., 740B). In some examples, the menu (e.g., 740) includes a devices affordance (e.g., 740C). In some embodiments, (e.g., in response to user selection of the information affordance (e.g., 740A), as illustrated in FIG. 7P), the representation of the virtual card displays one or more information items (e.g., 736C-736E), individually or concurrently, about the virtual card corresponding to the provisioned card (e.g., 710). In some examples, the electronic device 100 displays a user name (e.g., 736C) of an account registered to the virtual card. In some examples, the electronic device 100 displays a balance (e.g., 736D) of funds on the virtual card (e.g., the amount of funds stored in the virtual card). In some examples, the electronic device 100 displays transit pass information (e.g., 736E) (e.g., monthly pass, 10-ride pass, etc.) of the virtual card. By displaying the one or more information items (e.g., 736C-E) about the virtual card, the electronic device 100 displays and/or generates feedback (e.g., visual, audio, and/or haptic output generated by the device) including information about the details of the virtual card corresponding to the provisioned card (e.g., 710).

In some embodiments, subsequent to successfully transferring the at least some (or all) of the stored value from the card (e.g., 710) to the virtual card stored on the electronic device 100, the electronic device displays a stored value (e.g., 736D) of the virtual card. In some examples, if an electronic wallet application of the electronic device 100 includes multiple virtual cards (or accounts) of the same type (e.g., multiple transit cards), the values of each of the multiple virtual cards are prominently displayed. This improved feedback enhances the operability of the electronic device by providing the user with the ability to distinguish between multiple virtual cards stored on the electronic device (or accessible by the electronic device) and their corresponding stored values.

Figure 7O:
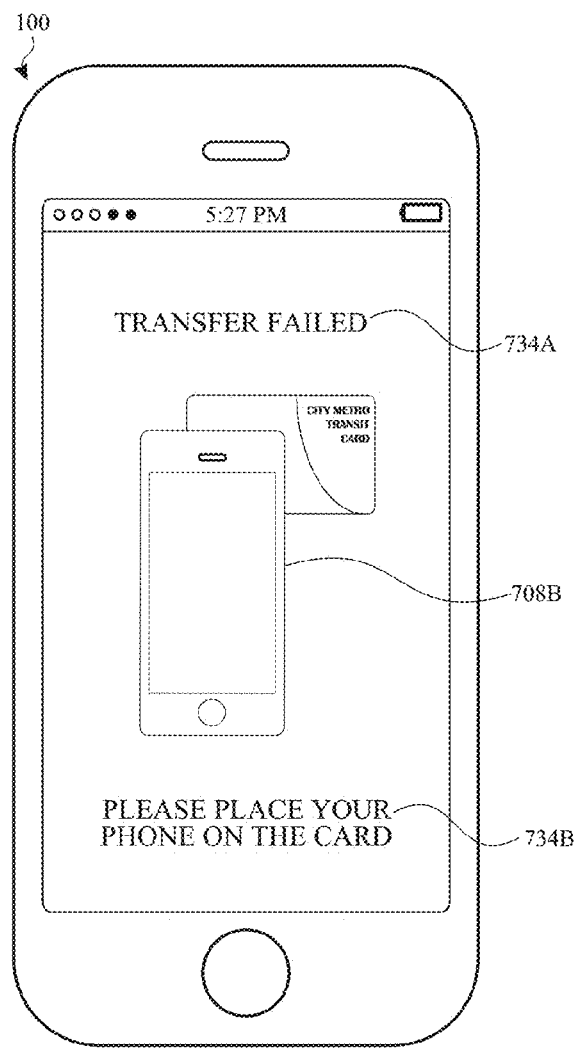

In some embodiments, as illustrated in FIG. 7O, in accordance with a determination that the value transfer is not successful, the electronic device 100 displays and/or generates feedback (e.g., visual, audio, and/or haptic output generated by the device) (e.g., indication 734A) (e.g., to the user) that the value transfer was not successful. In some embodiments, the electronic device 100 displays and/or generates feedback (e.g., visual, audio, and/or haptic output generated by the device) via a second prompt (e.g., 734B, different from the first prompt 730) to repeat performing (e.g., by the user) the value transfer operation for the value transfer. In some examples, the second prompt includes visual, audio, and/or haptic feedback prompting user interaction with the electronic device.

In some embodiments, subsequent to transferring at least some (or all) of the stored value from the card (e.g., 710) to the virtual card stored on the electronic device 100, and in accordance with a determination that the electronic device does not have another linked transit account (e.g., the newly provisioned transit account is the initial (first) transit account and/or the only currently active transit account linked to the electronic device), the electronic device designates (designates by default or prompts the user to designate) an account of the virtual card to be made available for use without checking authentication. In some examples, if the virtual card corresponds to the only provisioned transit account of the electronic device 100, the electronic device 100 designates, based on the determination that the virtual card is the only transit account of the account information application of the electronic device, the virtual card to be an express transit card, such as described with reference to FIGS. 15A-15M. In some embodiments, using the express transit card (e.g., for making a payment or transmitting credentials) does not require, such as described with reference to FIGS. 15A-15M, checking authentication in certain circumstances (e.g., transactions in which the detected wireless signal corresponds to, for example, a request from a transaction terminal or a request for funds from a transit account). Thus, designating the virtual card as an express transit card reduces the number of required user inputs, thereby making the technique more efficient and conserving battery power. Transit transactions are also frequently conducted in crowded transit stations with users (or other passengers) who are in a hurry to make a transit connection. Even with the most accurate and reliable authentication systems there is always some possibility of a false negative result where a valid user is not properly authenticated (e.g., because the user's fingerprint is not correctly identified or the user enters an incorrect password, passcode, or pattern). Using an express transit transaction model where security is provided by establishing the identity of the transaction terminal as a transit transaction terminal (e.g., established by a transaction terminal signal or other contextual information) instead of user authorization for the specific transaction reduces the likelihood that the user (or other passengers) will be inconveniences by false negative results of authentication while conducting a transit transaction with the device.

In some embodiments, subsequent to transferring at least some (or all) of the stored value from the card (e.g., 710) to the virtual card stored on the electronic device 100, and in accordance with a determination that the electronic device has one or more other linked transit accounts, the electronic device 100 forgoes designating (or forgoes prompting the user to designate) the account of the virtual card to be made available for use without checking authentication. In some embodiments, if the virtual card does not correspond to the only provisioned transit account, the electronic device 100 designates (or prompts the user to designate) the account of the virtual card to not be made available for use without checking authentication. Thus, in some examples, the electronic device 100 does not designate, based on a determination the virtual card is not the only transit account of the account information application, the virtual card to be an express transit card.

In some embodiments, subsequent to transferring at least some (or all) of the stored value from the card (e.g., 710) to the virtual card stored on the electronic device 100, and in accordance with a determination that the electronic device does have another linked transit account, and further in accordance with receiving user input indicating a desire not to have accounts be made available for use without checking authentication (e.g., user input removing a prior express transit card of the account information application or declining to add a prior account as an express transit card), the electronic device forgoes designating (or forgoes prompting the user to designate) the account of the virtual card to be made available for use without checking authentication. In some examples, the electronic device 100 designates (or prompts the user to designate) the account of the virtual card to not be made available for use without checking authentication. Thus, in some examples, the electronic device 100 does not designate, based on a determination the virtual card is not the only transit account of the account information application, the virtual card to be an express transit card, thereby accommodates the preferences of the user in designating or forgoing to designate the virtual card as an express transit card.

FIGS. 8A-8B are a flow diagram illustrating a method of provisioning cards onto an electronic device, in accordance with some embodiments. Method 800 is performed at a device (e.g., 100, 300, 500) with one or more input devices, one or more short-range communication radios, and, optionally, a display. Some operations in method 800 are, optionally, combined, the order of some operations is, optionally, changed, and some operations are, optionally, omitted.

As described below, method 800 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

At block 802, the electronic device receives (e.g., from the card, via NFC), by the one or more short-range communication radios (e.g., one or more NFC radios), a card account number of a card (e.g., 710) (e.g., a stored-value card, an NFC-readable stored-value card, a stored-value transit card, a stored-value gift card), wherein the card (e.g., 710) has a stored value (e.g., 728D, a stored value greater than 0). In some examples, the card account number of the card is received from the card using NFC.

In accordance with some embodiments, at block 804, the card is a stored-value card (e.g., the funds and/or data are physically stored on the card, in the form of binary-coded data). For example, the card is a closed-loop stored-value card. In some examples, the card is a transit card (e.g., a stored-value transit card). In some examples, the stored-value transit account stores a transit plan (or transit pass) information. In some examples, the transit plan is a monthly or weekly transit plan. In some examples, the stored-value transit account stores electronic cash.

At block 806, the electronic device requests (e.g., from a user) verification information (e.g., a card number of the card, the card account number of the card, a birth date of user registered to the card) to verify ownership of the card (e.g., 710). In some examples, the electronic device displays an indication (e.g., 714A, 720A) requesting the user to provide the verification information. In some examples, the electronic device uses the verification information (e.g., 714C, 720C) to confirm that the user is in physical possession (or control) of the card (e.g., 710). By the electronic device receiving and using the verification information to confirm that the user is in possession of the card, the electronic device's ability to detect and deter electronic theft or fraud is enhanced.

In accordance with some embodiments, the verification information (e.g., 714C, 720C) is information that is not shown on the card (e.g., 710). For example, the verification information (e.g., 714C, 720C) entered by the user is not displayed on the card (e.g., 710). In some examples, in accordance with a determination that the card is registered (e.g., "registered mode"), the requested (and received) verification information is information that is not shown on the card. Thus, in some examples, verification is not possible merely by having possession of the card. Rather, the user must have some additional information corresponding to the card. In some examples, the verification information is (or includes) the stored value of the card. In such examples, a user that has access to the card and knows the current stored value of the card can transfer at least some (or all) of the stored value from the card (e.g., 710) to the virtual card stored on the electronic device 100.

In accordance with some embodiments, at block 808, in accordance with a determination that the card is registered (e.g., with a server, service, or database) (e.g., "registered mode"), at block 810, requesting (e.g., from a user) verification information (e.g., 714C, 720C) (e.g., a birth date of the user registered to the card) to verify ownership of the card (e.g., 710) includes requesting information that is not shown on the card. In some examples, the electronic device forgoes requesting information that is shown on the card. By determining whether the card is registered, the electronic device can request particular verification information based on the determination that the card is or is not registered, thereby enhancing the operability of the device by including additional security measures for registered cards.

In accordance with some embodiments, at block 812, in accordance with a determination that the card (e.g., 710) is not registered (e.g., "anonymous mode"), at block 814, requesting (e.g., from a user) verification information (e.g., 714C, 720C, a card number of the card, the card account number of the card) to verify ownership of the card includes requesting information that is shown on the card (e.g., 710). In some examples, the electronic device forgoes requesting information that is not shown on the card. Thus, the electronic device can request different information based on whether the card is registered or is not registered. For example, a higher level of security may be achieved for registered cards by requesting information that is personal to the registered user of the card. By determining whether the card is registered, the electronic device can request particular verification information based on the determination that the card is or is not registered, thereby enhancing the operability of the device by not displaying a request for information a user would not have for a card that is not registered, thereby reducing the number of required user inputs.

In accordance with some embodiments, (e.g., in accordance with a determination that the card is not registered (e.g., "anonymous mode")) the electronic device does not present (e.g., on a display of the electronic device) the card account number of the card prior to receiving, via the one or more input devices, input from the user of the electronic device that includes the verification information (e.g., 714C, 720C) for verifying ownership of the card (e.g., 710). In some examples, the electronic device does not present the card account number of the card prior to verifying ownership of the card. Thus, the user must have access to the card (or account) number through a method other than the electronic device. For example, the user can provide the card number based on the card number being printed on a receipt or invoice of the card or based on the card number being printed on the card. In some examples, in accordance with a determination that the card is registered (e.g., "registered mode"), the electronic device presents (e.g., displays on a display of the electronic device) the card account number of the card prior to receiving, via the one or more input devices, input from the user of the electronic device that includes verification information for verifying ownership of the card. By determining whether the card is registered, the electronic device can request particular verification information based on the determination that the card is or is not registered, thereby enhancing the operability of the device by not displaying unnecessary requests for unregistered cards and providing additional security for registered cards.

In some examples, the electronic device determines whether the card is registered (e.g., with a server, service, or database). In accordance with some embodiments, in accordance with a determination that the card (e.g., 710) is not registered (e.g., "anonymous mode") and prior to verifying ownership of the card, the electronic device requests a user-provided account number of the card (e.g., 710) as part of requesting verification information (e.g., 714C, 720C) to verify ownership of the card, receives the user-provided account number of the card (e.g., 710) as part of receiving input from the user of the electronic device (e.g., not by the one or more short-range communication radios) that includes verification information (e.g., 714C, 720C) for verifying ownership of the card, and compares the user-provided account number to the card account number as part of verifying ownership of the card (e.g., 710) by comparing the verification information with separate information, wherein the separate information includes the received card account number of the card. In some examples, in accordance with a determination that the card is registered (e.g., "registered mode"), requesting verification information to verify ownership of the card does not include requesting (or receiving) a user-provided account number of the card (e.g., as part of receiving input from the user of the device that includes verification information for verifying ownership of the card).

At block 816, the electronic device receives, via the one or more input devices, input from a user of the electronic device (e.g., via a virtual keyboard input, not by the one or more short-range communication radios) that includes verification information (e.g., 714C, 720C) for verifying ownership of the card (e.g., 710). In some examples, (e.g., prior to requesting the verification information and/or prior to receiving the input from the user of the device for verifying ownership of the card) the electronic device 100 transmits the card account number to a server and receives, from the server, a response regarding a registration status of the card. In some examples, the electronic device determines whether the card is registered (e.g., with a server, service, or database).

In accordance with some embodiments, (e.g., prior to requesting the verification information, prior to receiving the input from the user of the device for verifying ownership of the card) in accordance with a determination that the card is registered (e.g., "registered mode"), the electronic device transmits (e.g., to the server) the card account number of the card (e.g., 710), and receives (e.g., from the server) the separate information. In some examples, the separate information includes information that is personal to a registered user of the card (e.g., a birthday of the user, a mailing address of the user, a mother's maiden name of the user, not the card account number of the card). Thus, a higher level of security may be achieved for registered cards by requesting information that is personal to the registered user of the card.

In accordance with some embodiments, the electronic device forgoes receiving (e.g., subsequent to receiving, by the one or more short-range communication radios, a card account number of a card and prior to transferring, by the one or more short-range communication radios, at least some (or all) of the stored value from the card to a virtual card stored on the device) a user-provided account number of the card (e.g., as part of verifying ownership of the card).

In accordance with some embodiments, prior to receiving the card account number of the card (e.g., 710) and prior to verifying ownership of the card, the virtual card is stored (e.g., in the account information application) on the electronic device. In some examples, the electronic device includes a "blank" virtual card that does not have any value or funds. The electronic device transfers the at least some (or all) of the stored value from the card to the blank virtual card. Thus, there is no need to configure the electronic device with a new virtual card, as the existing virtual card can be funded. By funding an existing virtual card rather than generating a new card on the device, the electronic device does not need to create the virtual card before transferring funds to the virtual card. In some examples, this enhances the operability of the device by speeding up the process for transferring funds to the electronic device.

At block 818, the electronic device verifies ownership of the card by comparing the verification information (e.g., 714C, 720C) with separate information (e.g., the card account number of the card, a birthday of the registered user of the card) about the card (e.g., 710) that is received separately from the verification information (e.g., 714C, 720C) (e.g., the separate information is received from a server or from the card).

At block 820, in accordance with a determination that verification of ownership is successful (e.g., if the verification information (714C, 720C) received from the user is consistent with the separate information), at block 822, the electronic device displays and/or generates (e.g., visual, audio, and/or haptic output generated by the device) a prompt (e.g., 708B, 730) to perform (e.g., by a user) a value transfer operation (e.g., a prolonged contact or proximity with card) for a value transfer. In some examples, the prompt includes visual, audio, and/or haptic feedback prompting user interaction with the electronic device. Thus, the electronic device, by generating the prompt, informs the user that verification of ownership was successful, thereby prompting the user to perform the value transfer operation.

At block 820, in accordance with a determination that verification of ownership is successful, and at block 824, in conjunction with the value transfer operation (or subsequent to generating the prompt to perform the value transfer operation), the electronic device 100 transfers (e.g., by the one or more short-range communication radios, such as one or more NFC radios) at least some (or all) of the stored value from the card (e.g., 710) to a virtual card stored on the electronic device (e.g., stored in an account information application of the device). In some examples, the electronic device includes a secure element, and wherein transferring at least some of the stored value from the card to the virtual card stored on the electronic device includes storing, in the secure element of the electronic device, information for accessing the stored value of the virtual card. Accordingly, by transferring value to the virtual card stored on the electronic device based on verified ownership, the operability of the electronic device is enhanced by preventing provisioning the device based on funds from an unauthorized card. In some examples, subsequent to transferring the at least some (or all) of the stored value from the card (e.g., 710) to the virtual card stored on the device, the virtual card includes the at least some (or all) stored value and the card (e.g., 710) no longer includes the at least some (or all) stored value.

In accordance with some embodiments, in accordance with a determination that the value transfer is not successful, the electronic device displays and/or generates (e.g., visual, audio, and/or haptic output generated by the device) a second prompt (e.g., 734B, different from the first prompt 730) to perform (e.g., by a user) the value transfer operation (e.g., prolonged contact or proximity with card) for the value transfer. In some examples, the electronic device presents an indication to the user that the value transfer was not successful. In some examples, the electronic device presents another prompt to the user to perform the value transfer operation (e.g., prolonged contact or proximity with card). Thus, the user is alerted that the value transfer was not successful. In some examples, the second prompt includes visual, audio, and/or haptic feedback prompting user interaction with the electronic device. Thus, the electronic device, by generating the second prompt, informs the user that the electronic device has determined that the value transfer was not successful, thereby prompting the user to perform the value transfer operation again.

In accordance with some embodiments, at block 826, in accordance with a determination that verification of ownership is not successful (e.g., if the verification information received from the user is not consistent with the separate information), at block 828, the electronic device 100 displays and/or generates feedback (e.g., visual, audio, and/or haptic output generated by the device) indicating (e.g., indication 726A) that verification of ownership was not successful. In some examples, in accordance with the determination that verification of ownership is not successful, the electronic device forgoes generating (e.g., visual, audio, and/or haptic output generated by the device) the prompt to perform (e.g., by a user) the value transfer operation for the value transfer, and forgoes transferring any of the stored value from the card to the virtual card stored on the device. In some examples, in accordance with the determination that verification of ownership is not successful, the electronic device again requests (e.g., from the user) verification information (e.g., a card number of the card, the card account number of the card, a birth date of user registered to the card) to verify ownership of the card. Thus, the user becomes aware that the verification of ownership was not successful. Thus, the electronic device, by generating the feedback, informs the user that the electronic device has determined that the verification of ownership was not successful, thereby prompting the user to provide information to verify ownership again.

In accordance with some embodiments, subsequent to transferring at least some (or all) of the stored value from the card (e.g., 710) to the virtual card stored on the electronic device, the electronic device displays, on the display, a stored value (e.g., 728D) of the virtual card. For example, when an electronic wallet application of the electronic device includes multiple virtual cards (or accounts) of the same type, the values of the virtual cards are prominently displayed to help the user to distinguish between the multiple virtual cards. By displaying the stored value (e.g., 728D) of the virtual card, the electronic device informs the user as to how much value is stored on the virtual card. This improved feedback enhances the operability of the electronic device by providing the user with the ability to distinguish between multiple virtual cards stored on the electronic device (or accessible by the electronic device) and their corresponding stored values.

In accordance with some embodiments, subsequent to transferring at least some (or all) of the stored value from the card (e.g., 710) to the virtual card stored on the electronic device, the electronic device displays, on the display, transit plan information (e.g., monthly pass, 10-ride pass, etc.) (e.g., 728E) of the virtual card, the transit plan information based on the transferred at least some (or all) of the stored value. Thus, the user becomes informed about the transit plans of the virtual card. This improved feedback informs the user of the state of the electronic device, such as what virtual cards are stored on the device and what, if any, transit plan information the virtual card includes.

In accordance with some embodiments, subsequent to transferring at least some (or all) of the stored value from the card (e.g., 710) to the virtual card stored on the electronic device, the electronic device displays (e.g., concurrently), on the display, one or more of: a balance of the virtual card (e.g., 736D), a username of an account registered to the virtual card (e.g., 736C), and transit plan information (e.g., monthly pass, 10-ride pass, etc.) of the virtual card (e.g., 736E). Thus, the user is informed of the details of the virtual card.

In accordance with some embodiments, transferring at least some (or all) of the stored value from the card to the virtual card stored on the electronic device includes removing the stored value from the card and transmitting a request to a server to deactivate the card (e.g., kill the card, render the card inoperable). For example, the electronic device removes all the value from the card and renders the card inoperable. Thus, in some examples, the full features and/or value of the card is moved to the virtual card and the virtual card replaces the physical card. In some examples, when some or all of the stored value from the card is transferred to the virtual card, information for retrieving the value from the virtual card is stored in the secure element to ensure that the stored value is not accessible in the absence of a properly processed payment transaction that retrieves the information from the secure element.

In accordance with some embodiments, (e.g., subsequent to transferring at least some (or all) of the stored value from the card to a virtual card stored) in accordance with a determination that the electronic device does not have another linked transit account, (e.g., the newly provisioned transit account is the initial (first) provisioned transit account and/or the only current active transit account linked to the electronic device), the electronic device designates (designates by default or prompts the user to designate) an account of the virtual card to be made available for use without checking authentication. In some examples, using the account of the virtual card to participate in a transaction includes releasing information (e.g., transaction information, payment information) from a secure element of the electronic device. Thus, the electronic device designates (based on a determination the virtual card is the only transit account of the account information application) the virtual card to be an express transit card, which the electronic device can use within checking authentication for transactions in which the detected wireless signal corresponds to the first type of request (e.g., a request from a transaction terminal, a request for funds from a transit account). In accordance with some embodiments, in accordance with a determination that the electronic device has one or more other linked transit accounts, the electronic device forgoes designating (or forgoes prompting the user to designate) the account of the virtual card to be made available for use without checking authentication (and/or designating the account of the virtual card to not be made available for use without checking authentication). Thus, the electronic device does not designate (based on a determination the virtual card is not the only transit account of the account information application) the virtual card to be an express transit card. Transit transactions are frequently conducted in crowded transit stations with users (or other passengers) who are in a hurry to make a transit connection. Even with the most accurate and reliable authentication systems there is always some possibility of a false negative result where a valid user is not properly authenticated (e.g., because the user's fingerprint is not correctly identified or the user enters an incorrect password, passcode, or pattern). Using an express transit transaction model where security is provided by establishing the identity of the transaction terminal as a transit transaction terminal (e.g., established by a transaction terminal signal or other contextual information) instead of user authorization for the specific transaction reduces the likelihood that the user (or other passengers) will be inconveniences by false negative results of authentication while conducting a transit transaction with the device.

In accordance with some embodiments, (e.g., subsequent to transferring at least some (or all) of the stored value from the card to a virtual card stored) in accordance with a determination that the electronic device does not have another linked transit account, (e.g., the newly provisioned transit account is the initial (first) provisioned transit account and/or the only current active transit account linked to the electronic device), and in accordance with receiving user input indicating a desire not to have accounts be made available for use without checking authentication (e.g., user input removing a prior express transit card of the account information application or declining to add a prior account as an express transit card), the electronic device forgoes designating (or prompting the user to designate) the account of the virtual card to be made available for use without checking authentication (and/or designating the account of the virtual card to not be made available for use without checking authentication). Thus, the electronic device does not designate (based on a determination the virtual card is not the only transit account of the account information application) the virtual card to be an express transit card. In some examples, in accordance with not receiving user input indicating a desire not to have accounts be made available for use without checking authentication or in accordance with receiving user input indicating a desire to have accounts be made available for use without checking authentication, the electronic device selects the account of the virtual card to be made available for use without checking authentication. Thus, the electronic device designates the virtual card to be an express transit card, which the electronic device can use without checking authentication for transactions in which the detected wireless signal corresponds to the first type of request (e.g., a request from a transaction terminal, a request for funds from a transit account). Accordingly, the electronic device accommodates the preferences of the user in designating the virtual card as an express transit card.

Figure 15D:
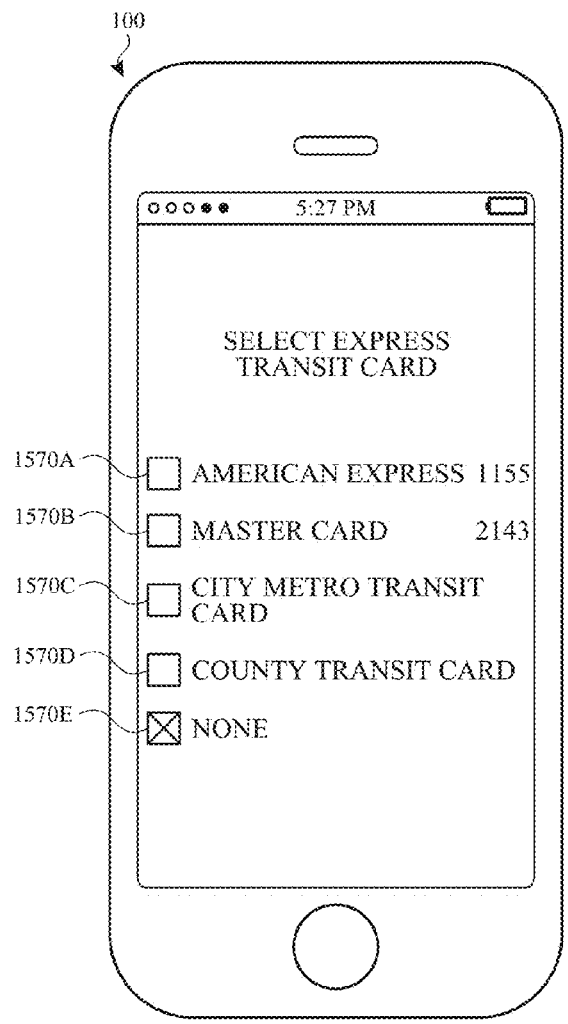
Figure 16A:
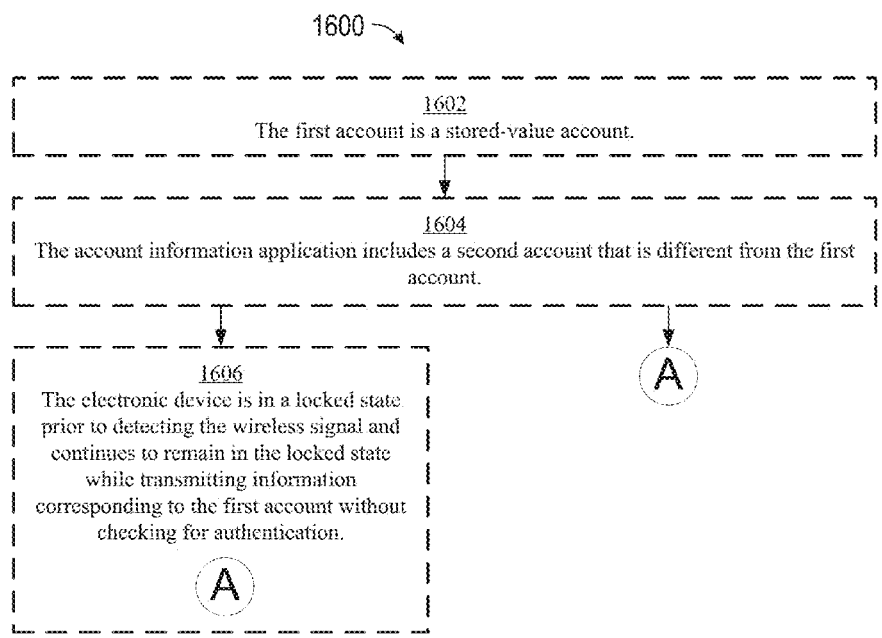
FIGS. 16A-16B are a flow diagram illustrating methods of making an account available for use without checking authentication, in accordance with some embodiments.
Figure 16B:
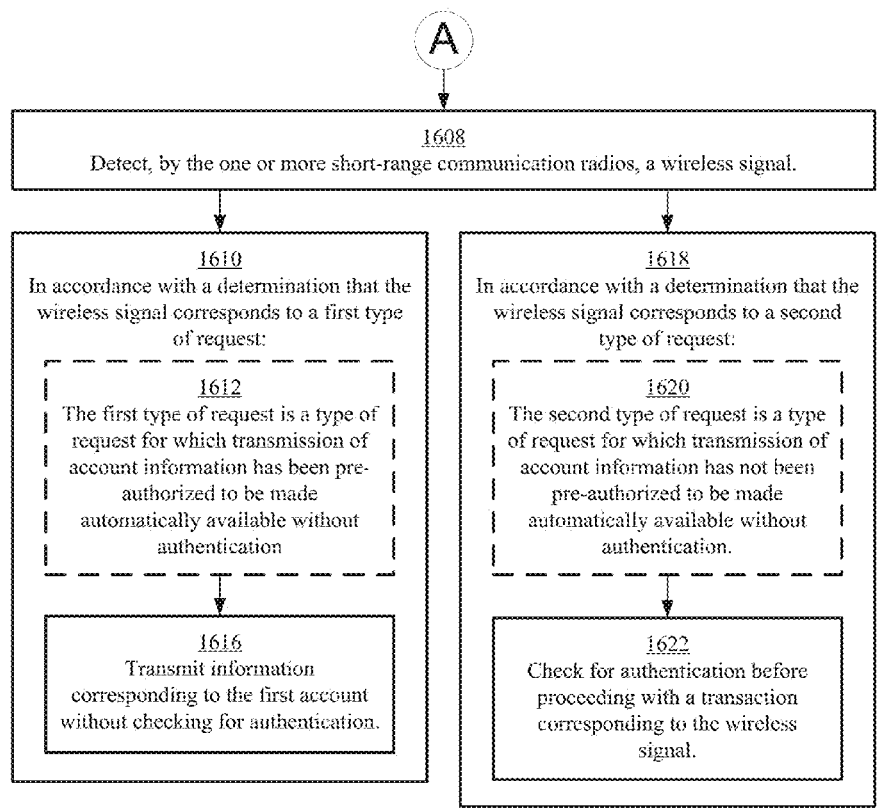

In accordance with some embodiments, the electronic device receives user input indicating a desire not to have accounts be made available for use without checking authentication (e.g., by receiving user input selecting a "no account" option for use without checking authentication, as described in relation to FIG. 15D), and, in response to receiving the user input indicating the desire not to have accounts be made available for use without checking authentication, designates an account of the virtual card (or all virtual cards) to not be made available for use without checking authentication. Thus, the electronic device provides the user with the option to disable an express transit mode by which funds are transmitted in particular transactions without requiring authentication. In some examples, this provides additional security of the accounts on the electronic device.

In accordance with some embodiments, the electronic device receives user input selecting an account (e.g., an account corresponding to the virtual card, from among a plurality of accounts of the account information application) to be made available for use without checking authentication, and, in response to receiving the user input selecting the account to be made available for use without checking authentication, designates the selected account (e.g., of the account information application) to be made available for use without checking authentication, such as described with reference to FIGS. 15A-15M. Thus, the electronic device enables the user to select a preferred account for use as an express transit account. In some examples, the express transit account does not require checking for authentication in certain circumstances, and thus reduces the number of required user inputs, thereby making the technique more efficient and conserving battery power.

Note that details of the processes described above with respect to method 800 (e.g., FIGS. 8A-8B) are also applicable in an analogous manner to the methods described below. For example, methods 1000, 1200, 1400, 1600, 1800, and 2000 optionally include one or more of the characteristics of the various methods described above with reference to method 800. For example, the user interface of FIG. 7A may correspond to the user interfaces of FIGS. 9A and 15B. For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

FIGS. 9A-9N illustrate exemplary user interfaces for provisioning cards onto an electronic device (e.g., 100) with a display, one or more short-range communication radios (e.g., one or more NFC radios), and one or more input devices, in accordance with some embodiments. The user interfaces in these figures are used to illustrate the processes described below, including the processes in FIG. 10.

In accordance with some embodiments, the user has access to a stored-value card and wants to transfer value from the stored-value card to a virtual card that is stored on the electronic device. Prior to performing the value transfer, the electronic device uses a verification procedure to help confirm that the user is the rightful owner of the stored-value card. In some examples, the electronic device receives verification information from the user (e.g., from the user via a displayed keyboard, not using NFC). The electronic device separately receives identifying information (e.g., via NFC) from the stored-value card, such as an account number of the stored-value card or the current value stored in the stored-value card. The electronic device verifies ownership based on these two pieces of information. If the ownership is verified, the electronic device transfers (e.g., using NFC) the stored value from the stored-value card to the virtual card of the electronic device. In some examples, such techniques help provide security for the rightful owner of the stored-value card and prevent users of electronic devices from transferring funds out of stored-value cards of other individuals.

FIG. 9A illustrates a user interface for electronic device 100 in accordance with some embodiments. In some examples, the electronic device 100 displays an affordance (e.g., 902A) that includes an indication of a previously provisioned account (e.g., a payment account). In this example, the affordance (e.g., 902A) corresponds to an American Express account. In some examples, the electronic device 100 also displays an affordance (e.g., 902B) that includes an indication of an additional previously provisioned account (e.g., a separate payment account). In this example, the affordance (e.g., 902B) corresponds to a MasterCard account that is different from the American Express account. When the electronic device 100 detects activation of the affordance that includes an indication of a previously provisioned account (e.g., 902A) or the affordance that includes an indication of an additional previously provisioned account (e.g., 902B), for example by detecting a touch input on a touch-sensitive surface of the electronic device, at a location corresponding to a respective affordance, the electronic device displays information (e.g., balance, previous transaction details) corresponding to the respective account.

In some embodiments, the electronic device 100 displays an affordance (e.g., 902D), which, when activated, causes the electronic device to display a user interface for user-selection of an account to be made available for use without checking authentication, such as described with reference to FIGS. 15A-15M.

In some embodiments, the electronic device 100 displays a selection affordance (e.g., 904) which provides the user with an option to turn off express transit cards. For example, by turning off express transit cards, no account provisioned on the electronic device 100 is designated as an express transit card. In some embodiments, the electronic device 100 receives user input indicating a desire not to have accounts be made available for use without checking authentication (e.g., by receiving user input selecting a "no account" option for use without checking authentication, by moving a selection affordance to the "OFF" position, as illustrated with respect to the selection affordance 904), such as described with reference to FIGS. 15A-15M. In response to receiving the user input indicating the desire not to have accounts be made available for use without checking authentication, the electronic device 100 designates an account of a virtual card (or all accounts of the electronic device 100) to not be made available for use without checking authentication. Thus, the electronic device 100 provides the user with the option to disable (or enable) an express transit mode (e.g., using the selection affordance 904) by which funds are transmitted in particular transactions without requiring authentication. In some embodiments, when the express transit feature is enabled (e.g., by moving the selection affordance 904 to the "ON" position), the electronic device 100 provides faster and more convenient access to an account designated as an express transit account. In some embodiments, when the express transit feature is disabled (e.g., by moving the selection affordance 904 to the "OFF" position), the electronic device 100 provides added security for accounts provisioned on the electronic device.

In some embodiments, the electronic device 100 displays an affordance (e.g., 902C) for provisioning an account to a virtual card on the electronic device (or on a device different from the electronic device). In some embodiments, the virtual card is a transit virtual card. In some examples, the transit virtual card stores transit plan (or transit pass) information. In some examples, the transit plan is a monthly or weekly transit plan. In some examples, the transit virtual card stores electronic cash. In some embodiments, the virtual card is a stored-value virtual card. In some examples, the stored-value virtual card stores electronic cash. Thus, in some examples, the electronic device 100 provides the user with the ability to use the virtual card to provide the user with access to a transit system.

In some embodiments, as illustrated in FIG. 9A, the electronic device detects activation of the affordance (e.g., 902C) for provisioning an account on the electronic device 100. In response to detecting activation of the affordance (e.g., 902C) for provisioning an account on the electronic device 100, the electronic device displays a user interface for selecting from between two types of accounts (e.g., stored-value accounts and accounts that are not stored-value accounts), as illustrated in FIG. 9B. Thus, in some embodiments, the electronic device 100 displays (e.g., concurrently) an affordance (e.g., 906A) for provisioning a non-stored-value account and an affordance (e.g., 906B) for provisioning a stored-value account. In some embodiments, the stored-value account is an account where funds or data (in the form of binary-coded data) associated with the respective account are physically stored on a stored-value card associated with the stored-value account. Thus, the stored-value card has a stored value. In some examples, the stored-value card is a closed-loop stored-value card. In some examples, the stored-value card is a transit card (e.g., a stored-value transit card). In some examples, the stored-value transit account stores transit plan (or transit pass) information. In some examples, the transit plan is a monthly or weekly transit plan. In some examples, the stored-value transit account stores electronic cash. In some examples, the electronic device 100 can transmit funds from the stored-value transit account using NFC and without accessing an IP network or Internet connection, which conserves power and allows funds to be transmitted from the stored-value transit account even when an IP network or Internet connection is not available.

In some embodiments, as illustrated in FIG. 9B, the electronic device 100 detects activation of the affordance (e.g., 906B) for provisioning a stored-value account. FIGS. 9C-9F illustrate user interfaces (e.g., that are displayed in response to detecting activation of the affordance 906B) for prompting and receiving verification information, in accordance with some embodiments. As illustrated in FIGS. 9C-9F, the electronic device 100 requests (e.g., by displaying a prompt on a display of the electronic device) verification information (e.g., 914A-914B, 920A-920B) to verify ownership of a stored-value card and receives, via the one or more input devices, input from the user that includes the verification information (e.g., 914C, 920C) for verifying ownership of the card, where the input from the user that includes the verification information is not received by the one or more short-range communication radios of the electronic device and the verification information includes information that is not shown on the stored-value card. In some examples, the funds and/or data associated with the stored-value card are physically stored on the card in the form of binary-coded data. In some examples, the stored-value card is an NFC-readable stored-value card. In some examples, the stored-value card is a stored-value transit card. In some examples, the stored-value card is a stored-value gift card.

Figure 9C:
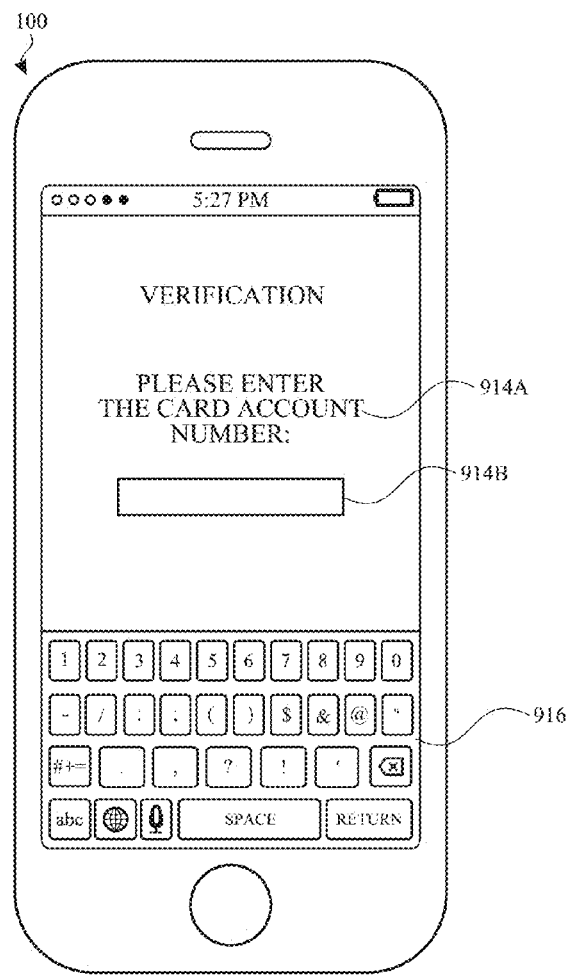
Figure 9D:
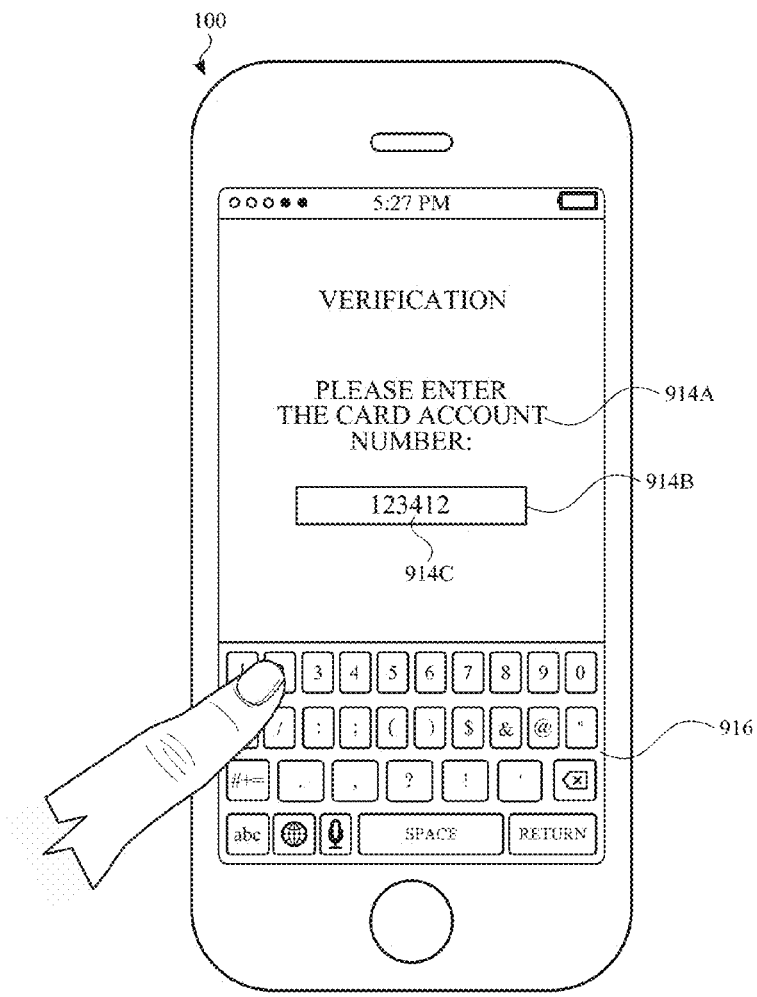
Figure 9E:
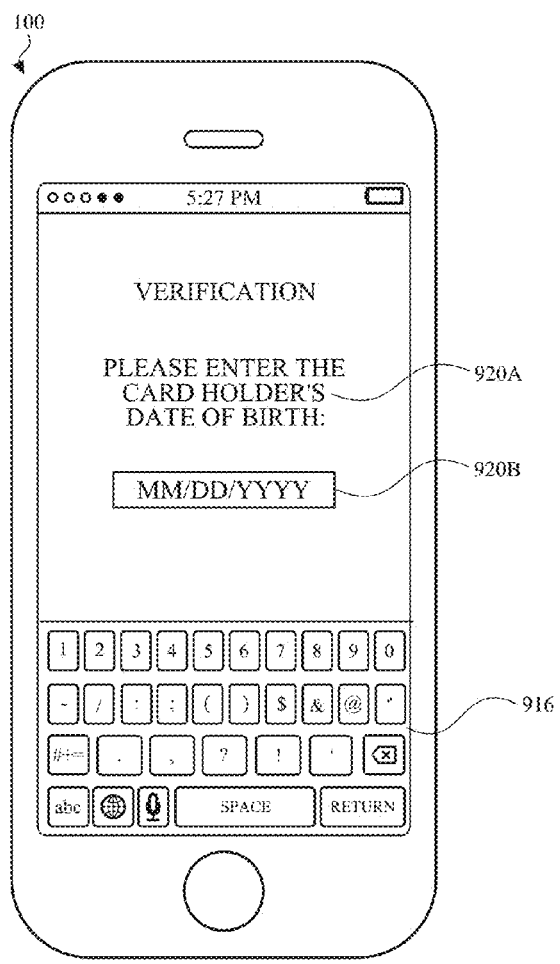

As illustrated in FIGS. 9C and 9E, the electronic device 100 requests (e.g., by displaying a prompt on a display of the electronic device) verification information (e.g., 914A-914B, 920A-920B) to verify ownership of a stored-value card. In some embodiments, the verification information is (or includes) a card number (e.g., 914C) of the stored-value card (e.g., 910). In some embodiments, the verification information is (or includes) information that is personal (e.g., 920C) to a registered user of the stored-value card. In some examples, the verification information is a non-account-number identifier. In some examples, the verification information includes a birth date (e.g., 920C) of the registered user of the stored-value card. In some examples, the verification information includes a mailing address of the registered user of the stored-value card. Thus, in some examples, the electronic device 100 provides additional security by requesting personal information for the verification. In some embodiments, the verification information is (or includes) the stored value of the stored-value card. Thus, in some examples, a user that knows the current stored value of the stored-value card and has access to the card can transfer at least some (or all) of the stored value from the stored-value card to the virtual card stored on the electronic device 100.

Figure 9F:
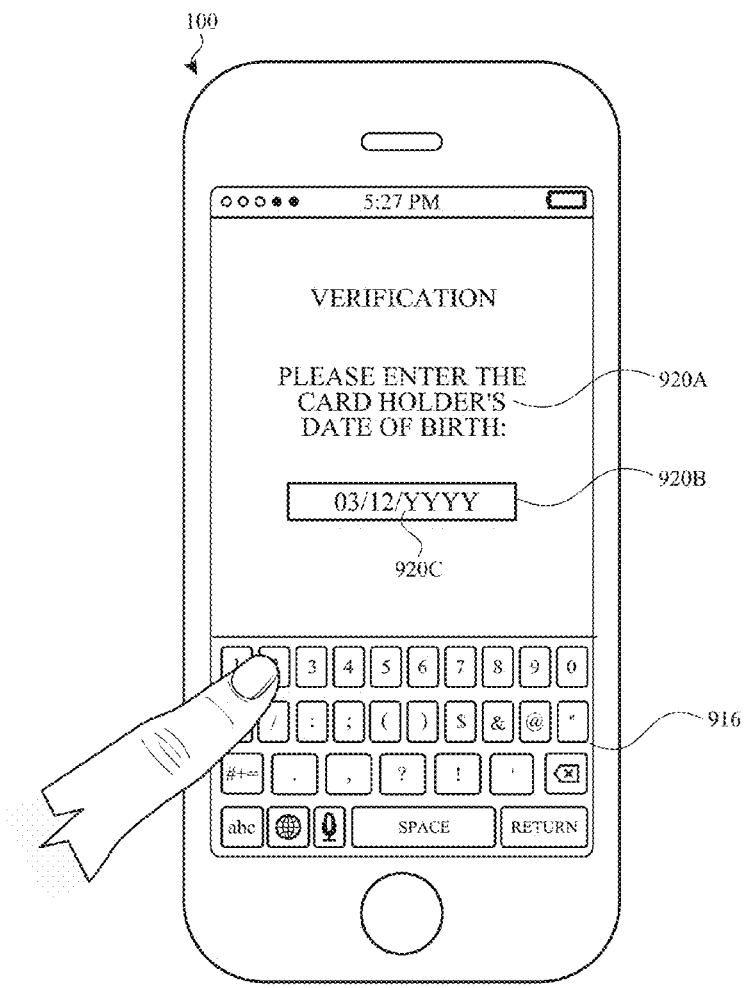

As illustrated in FIGS. 9D and 9F, the electronic device 100 receives, via the one or more input devices (e.g., virtual keypad 916), input from the user that includes the verification information (e.g., 914C, 920C) for verifying ownership of the card, where the input from the user that includes the verification information is not received by the one or more short-range communication radios of the electronic device, and the verification information includes information that is not shown on the stored-value card (e.g., 910). In some examples, the verification information (e.g., 914C, 920C) is received via a first input device (e.g., a touch-sensitive surface, a microphone) of the electronic device 100 that is different from the one or more short-range communication radios.

In some embodiments, the electronic device 100 does not present (e.g., on a display of the electronic device) the card account number of the stored-value card prior to receiving, via the one or more input devices, input from the user of the device that includes the verification information (e.g., 914C, 920C) for verifying ownership of the card. Thus, in some examples, the user must have access to the card (or account) number through a method other than from the electronic device 100. For example, the user can provide the card number to the electronic device 100 based on the card number being printed on a receipt or invoice of the card or based on the card number being printed on the card (e.g., 910). In some examples, in accordance with a determination that the card is registered (e.g., registered mode), the electronic device presents (e.g., on a display of the electronic device) the card account number of the card prior to receiving, via the one or more input devices, input from the user of the device that includes verification information for verifying ownership of the card.

Figure 9G:
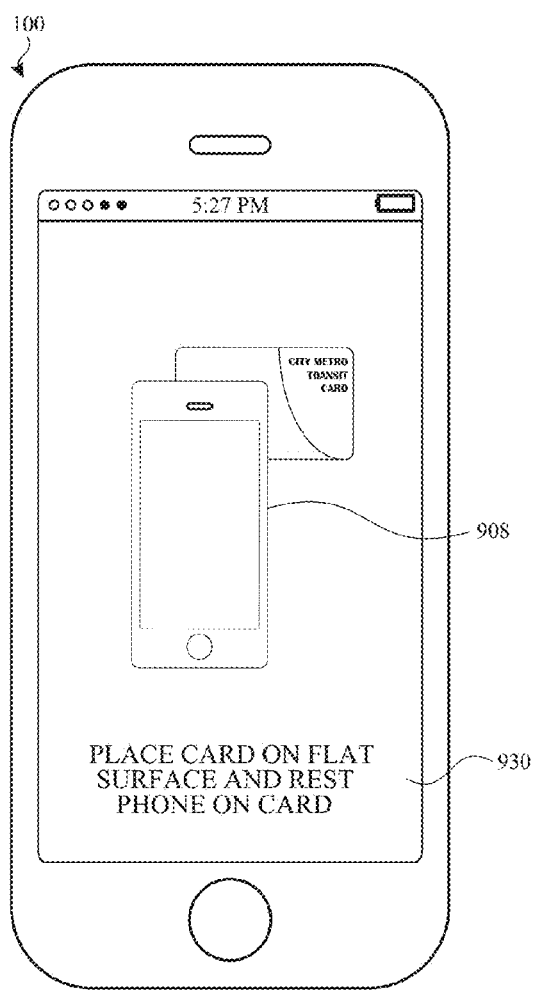

As illustrated in FIG. 9G, the electronic device 100 displays, on the display of the electronic device, a prompt (e.g., 908, 930) for the user to place the electronic device within communication range (e.g., within range of the one or more short-range communication radios) of the stored-value card. For example, the electronic device 100 displays a prompt (e.g., 908, 930) instructing the user to place the electronic device 100 on the stored-value card (e.g., 910) such that the back of the electronic device (e.g., the side of the electronic device opposite the display) is nearest to the stored-value card.

Figure 9H:
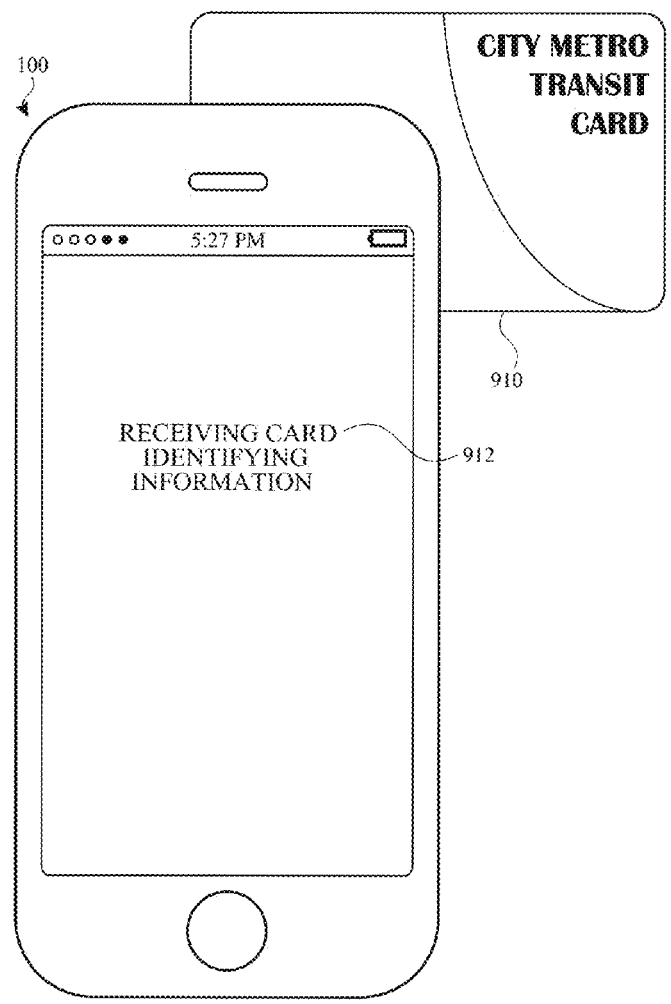

As illustrated in FIG. 9H, in response to the stored-value card (e.g., 910) being placed within range of the one or more short-range communication radios of the electronic device 100 (e.g., the card 910 is placed at the back of the electronic device as illustrated in FIG. 9H), the electronic device 100 receives, by the one or more short-range communication radios (e.g., NFC radios), identifying information (e.g., a card number of the stored-value card, a birth date, a mailing address) from the stored-value card. In some embodiments, the electronic device 100 presents (e.g., to the user) an indication (e.g., 912) that the identifying information is being received from the stored-value card (e.g., 910). In some examples, the received identifying information is a card number of the stored-value card (e.g., 910). In some examples, the received identifying information is a birth date of the registered user of the stored-value card (e.g., 910). In some examples, the received identifying information is a mailing address of the registered user of the stored-value card (e.g., 910). In some embodiments, the electronic device 100 displays and/or generates feedback (e.g., visual, audio, and/or haptic output generated by the device) indicating (e.g., indication 912) (e.g., to the user) that the electronic device is receiving the identifying information from the stored-value card (e.g., 910). For example, the electronic device 100 inspects, via the one or more short-range communication radios (e.g., NFC radios), the stored-value card (e.g., 910) for the identifying information. In some examples, the prompt (e.g., 908, 930) to place the electronic device 100 within communication range of the stored-value card (e.g., 910), as illustrated in FIG. 9G, is generated subsequent to receiving the verification information, as illustrated in FIGS. 9D and 9F.

Figure 9I:
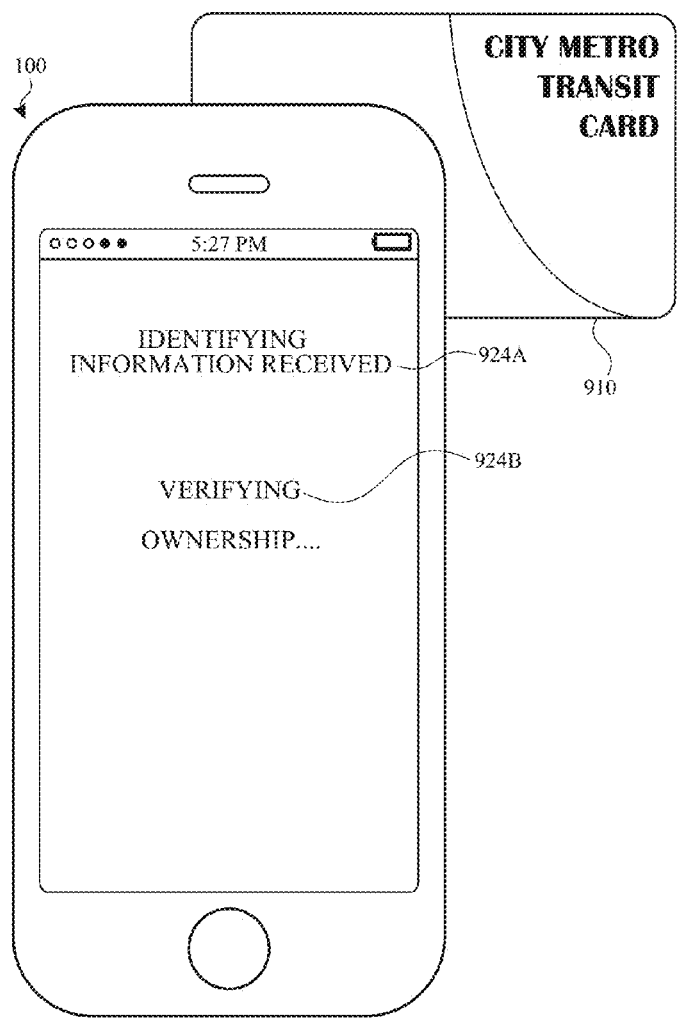

As illustrated in FIG. 9I, after receiving the identifying information, the electronic device 100 verifies ownership of the stored-value card (e.g., 910) by comparing the verification information (e.g., 914C, 920C, entered by the user) to the identifying information received from the stored-value card. In some embodiments, the electronic device 100 presents (e.g., to the user) an indication (e.g., 924A) that the identifying information was received from the stored-value card (e.g., 910). In some embodiments, the electronic device 100 presents (e.g., to the user) an indication (e.g., 924B) that the ownership of the stored-value card (e.g., 910) is being verified by the electronic device. In some embodiments, after receiving the identifying information, the electronic device 100 transmits the identifying information to a remote server. The remote server verifies ownership of the stored-value card (e.g., 910) (e.g., by comparing the verification information (e.g., 914C, 920C, entered by the user) to the identifying information received from the stored-value card), and the remote server sends an indication to the electronic device as to whether verification of ownership was successful (e.g., the values match or correspond to each other). Thus, the determination/verification of ownership can be performed at the electronic device or at a remote device.

Figure 9J:
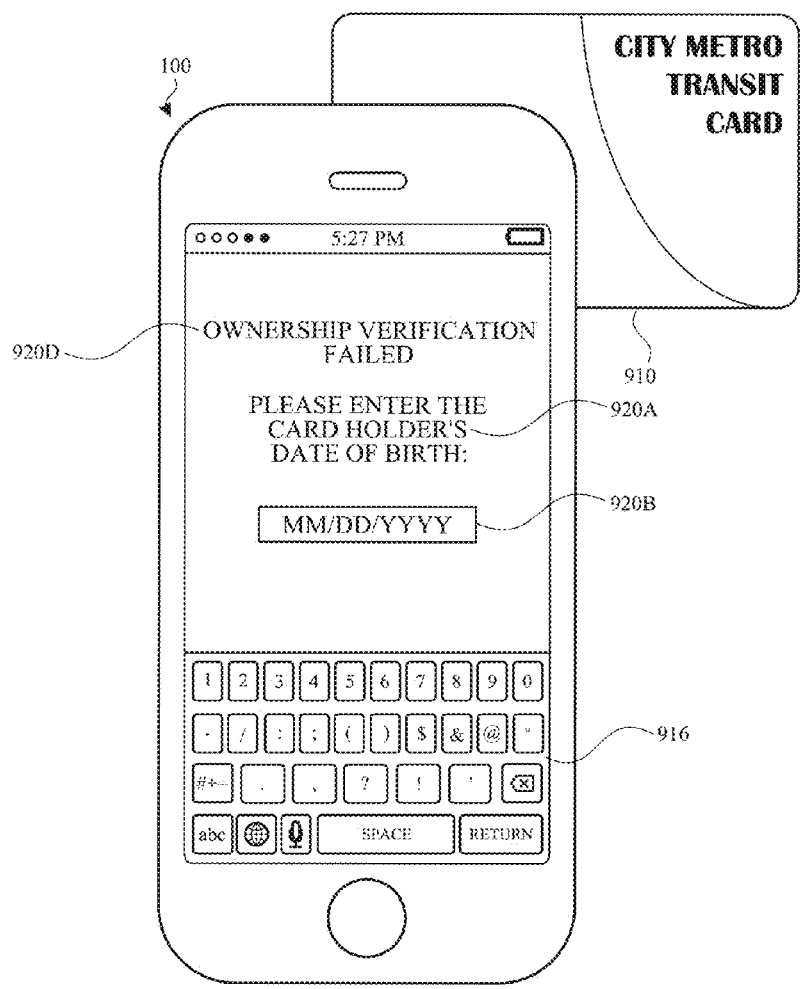

In some embodiments, as illustrated in FIG. 9J, in accordance with a determination that verification of ownership is not successful, the electronic device 100 displays and/or generates feedback (e.g., visual, audio, and/or haptic output generated by the device) indicating (e.g., indication 920D) that verification of ownership was not successful. Thus, in some examples, the electronic device 100 notifies the user if the verification information is incorrect. For example, a determination that the verification of ownership is not successful is made if the verification information (e.g., 914C, 920C) received from the user does not correspond to (or match) the identifying information. In some examples, in accordance with the determination that verification of ownership is not successful, the electronic device 100 again requests (e.g., from the user) verification information (e.g., a card number of the stored-value card, a birth date, a mailing address) to verify ownership of the stored-value card. (e.g., 910). For example, the electronic device 100 displays a prompt (e.g., 920A, 920B), on the display of the electronic device, indicating to the user to again enter verification information.

Figure 9K:
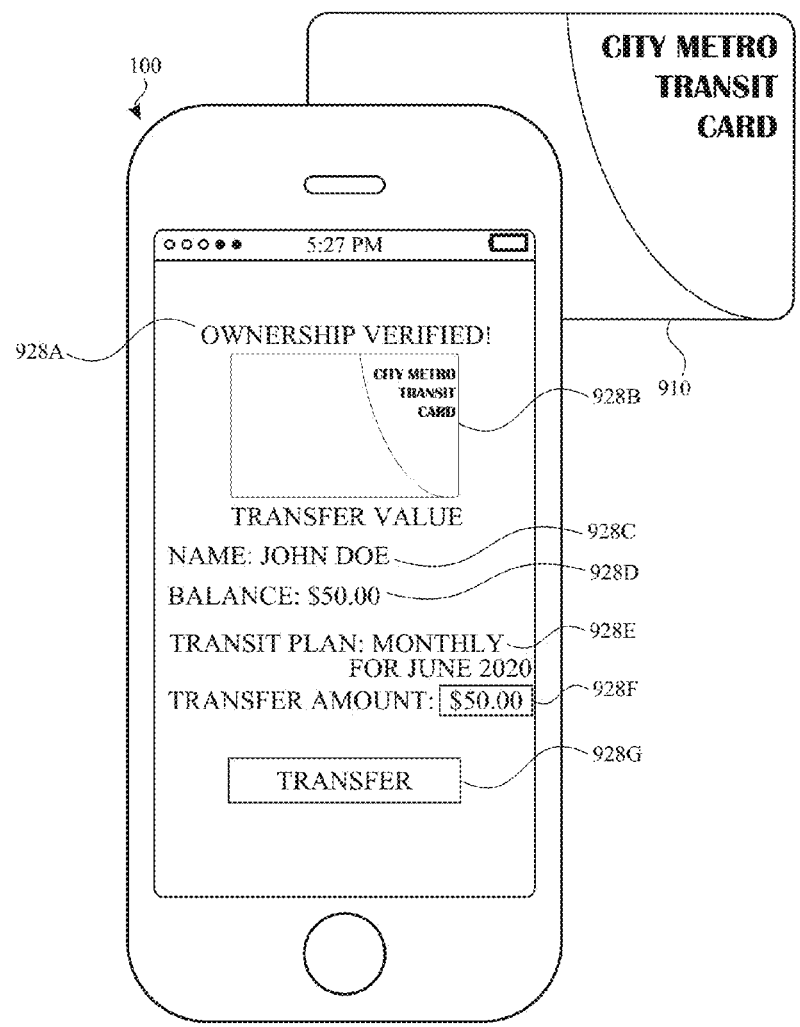

In some embodiments, as illustrated in FIG. 9K, in accordance with a determination that verification of ownership is successful, the electronic device 100 presents (e.g., on a display of the electronic device) an indication of completion of the successful verification (e.g., 928A, 928B). For example, the verification of ownership is successful if the verification information corresponds to (or matches) the identifying information. In some examples, the verification information is a non-account-number identifier (e.g., a birth date) and the identifying information is an account number. Thus, in some examples, the electronic device 100 uses the identifying information to retrieve (e.g., from a remote server) a non-account-number identifier (e.g., a birthday) of the account corresponding to the account number. If the retrieved non-account-number identifier matches the verification information, the verification information is said to correspond to the identifying information and the verification is successful.

In some embodiments, in accordance with a determination that verification of ownership is successful, the electronic device 100 presents (e.g., displays) one or more indications of one or more information items (e.g., 928C-928E) associated with the verified card (e.g., 910). In some examples, the electronic device 100 presents (e.g., displays) an indication of a name of the user (e.g., 928C) associated with the card (e.g., 910). In some examples, the electronic device 100 presents (e.g., displays) an indication of a current balance (e.g., 928D) of the card (e.g., 910). In some examples, the electronic device 100 presents (e.g., displays) an indication of transit plan (or transit pass) information (e.g., 928E) associated with the card (e.g., 910).

In some embodiments, in accordance with a determination that verification of ownership is successful, the electronic device 100 displays an affordance or input field (e.g., 928F) that includes an indication of the amount of stored value of the card (e.g., 910) that is to be transferred from the card to the virtual card stored on the electronic device 100. In some examples, the electronic device receives user input (e.g., into the input field 928F) of the amount of stored value of the card that is to be transferred from the card (e.g., 910) to the virtual card stored on the electronic device. In some embodiments, the affordance (e.g., 928G), when activated, causes the electronic device to display a user interface for user-selection of an amount to be transferred from the stored-value card (e.g., 910) to the virtual card stored on the electronic device 100. For example, the user can select to transfer the entire amount of the stored value of the card (e.g., 910) from the card to the virtual card on the electronic device 100.

In some embodiments, in accordance with a determination that verification of ownership is successful, the electronic device 100 displays an affordance (e.g., 928G) that can be activated by user input to initiate a process for transferring value. The affordance (e.g., 928G), when activated, initiates the process for transferring value from the card (e.g., 910) to the virtual card on the electronic device. In some embodiments, the affordance (e.g., 928G) for initiating the process for transferring value cannot be activated (e.g., by the user) before the amount of value to be transferred is selected/received (e.g., into input field 928F). In some embodiments, if transfer value is selected (e.g., in affordance 928F), activating the affordance (e.g., 928F) initiates a process for transferring the entire available balance on the card (e.g., 910). In some embodiments, the affordance (e.g., 928G) initiates a process for transferring the entire available balance on the card (e.g., 910).

Figure 9L:
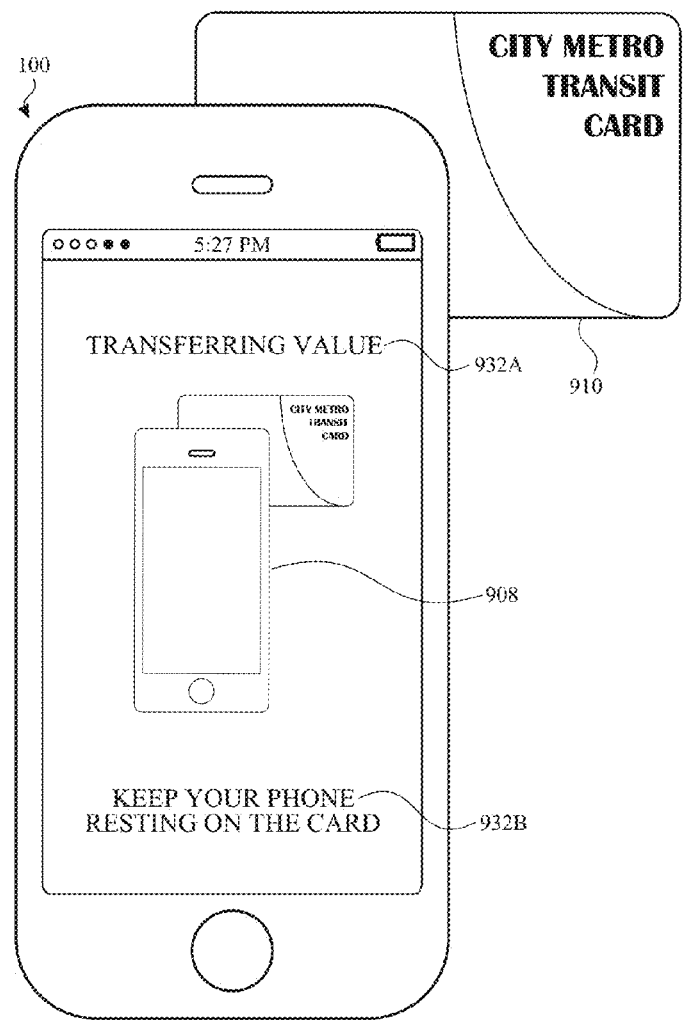

As illustrated in FIG. 9L, the electronic device 100 transfers (e.g., by the one or more short-range communication radios) at least some (or all) of the stored value from the card (e.g., 910) to a virtual card stored on the electronic device. In some embodiments, the virtual card is stored in an account information application (e.g., an electronic wallet) of the electronic device 100. In some embodiments, during the transfer, the electronic device 100 displays and/or generates feedback (e.g., visual, audio, and/or haptic output generated by the device) indicating (e.g., indication 932A) (e.g., to the user) that at least some (or all) of the stored value from the stored-value card (e.g., 910) is being transferred to a virtual card on the electronic device, and indicating (e.g., indication 908, 932B) (e.g., to the user) to maintain the prolonged contact or proximity of the electronic device 100 to the stored-value card (e.g., 910) while the transfer process is ongoing.

In some embodiments, subsequent to successfully transferring the at least some (or all) of the stored value from the stored-value card (e.g., 910) to the virtual card stored on the electronic device 100, the virtual card includes the at least some (or all) of the stored value, and the stored-value card (e.g., 910) no longer includes the at least some (or all) of the stored value. In some embodiments, transferring the at least some (or all) of the stored value from the stored-value card (e.g., 910) to the virtual card stored on the electronic device 100 includes removing the stored value from the stored-value card (e.g., 910) and transmitting a request (e.g., via a network or Internet connection) to a server, service, or database associated with the card (e.g., 910) to deactivate the stored-value card (e.g., kill the card, render the card inoperable). For example, all of the stored value from the stored-value card (e.g., 910) is removed and the stored-value card (e.g., 910) is subsequently rendered inoperable. Thus, in some embodiments, the features and/or value of the physical card (e.g., 910) is moved in their entirety to the virtual card stored on the electronic device 100, and thereby the virtual card replaces the physical card (e.g., 910).

In some embodiments, prior to receiving the card account number of the stored-value card (e.g., 910) and prior to verifying ownership of the card (and/or prior to receiving an indication of verification of ownership of the card), the virtual card is stored (e.g., in the account information application of the electronic device 100) on the electronic device 100 (e.g., as a template virtual card). In some embodiments, the electronic device 100 includes a template virtual card (e.g., a "blank" virtual card) that is already-existing on the electronic device and that does not contain any value or funds. In some examples, the electronic device 100 transfers the at least some (or all) of the stored value from the stored-value card (e.g., 910) to the template virtual card. Thus, in some examples, there is no need to configure the electronic device 100 with a new virtual card, as the features and/or value of the card (e.g., 910) can be moved to the template virtual card. The use of the template virtual card speeds up the process for transferring funds from the stored-value card (e.g., 910) to the electronic device 100 because a new virtual card does not need to be created during provisioning process or the transfer operation.

Figure 9M:
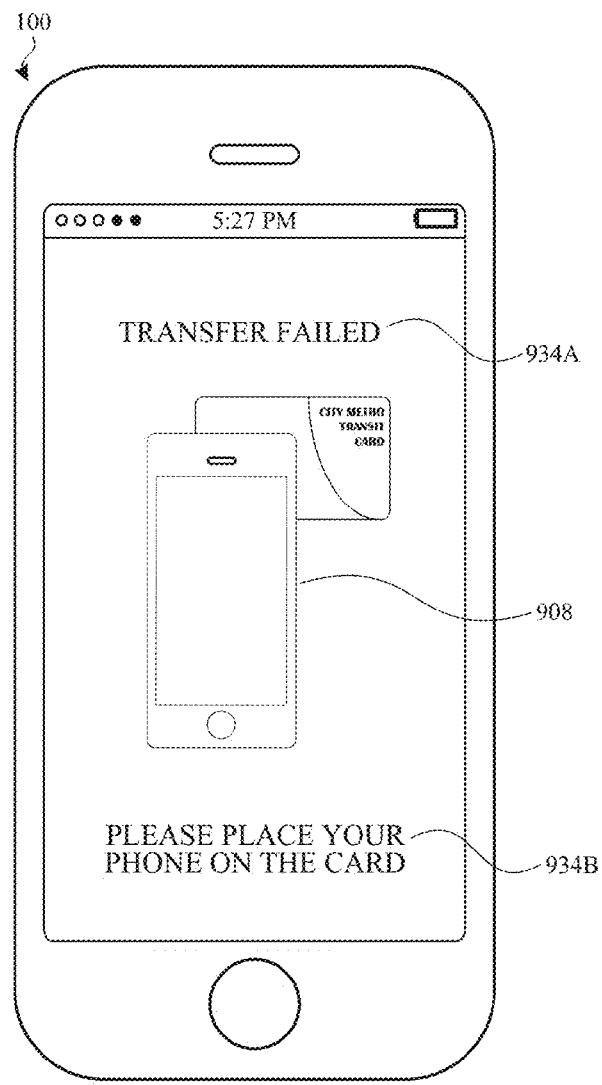

In some embodiments, as illustrated in FIG. 9M, in accordance with a determination that the value transfer is not successful, the electronic device 100 displays and/or generates feedback (e.g., visual, audio, and/or haptic output generated by the device) indicating (e.g., indication 934A) (e.g., to the user) that the value transfer was not successful. In some embodiments, the electronic device 100 displays and/or generates a second prompt (e.g., 934B, different from the first prompt 930) to repeat performing (e.g., by the user) the value transfer operation for the value transfer. In some examples, the second prompt includes visual, audio, and/or haptic feedback prompting user interaction with the electronic device.

In some embodiments, as illustrated in FIG. 9N, subsequent to successfully transferring the at least some (or all) of the stored-value from the card (e.g., 910) to the virtual card stored on the electronic device 100, the electronic device displays a representation of the virtual card corresponding to the stored-value card. In some embodiments, the representation of the virtual card corresponding to the stored-value card includes an indication (e.g., 936A) of the type of the virtual card. In some embodiments, the representation of the virtual card corresponding to the stored-value card includes a graphical depiction (e.g., 936B) of the virtual card. The indication (e.g., 936A) of the type and the graphical depiction (e.g., 936B) of the virtual card enable the user to differentiate the virtual card from a different card provisioned on the electronic device 100.

In some embodiments, the representation of the virtual card corresponding to the stored-value card provisioned on the electronic device 100 includes a menu (e.g., 940) that includes a plurality of selectable affordances (e.g., 940A, 940B, 940C). In some examples, the menu (e.g., 940) includes an information affordance (e.g., 940A). In some examples, the menu (e.g., 940) includes a transactions affordance (e.g., 940B). In some examples, the menu (e.g., 940) includes a devices affordance (e.g., 940C). In some embodiments, (e.g., in response to user selection of the information affordance (e.g., 940A), as illustrated in FIG. 9N), the representation of the virtual card displays one or more information items (e.g., 936C-936E), individually or concurrently, about the virtual card corresponding to the provisioned card (e.g., 910). In some examples, the electronic device 100 displays a user name (e.g., 936C) of an account registered to the virtual card. In some examples, the electronic device 100 displays a balance (e.g., 936D) of funds on the virtual card. In some examples, the electronic device 100 displays a transit pass information (e.g., 936E) (e.g., monthly pass, 10-ride pass, etc.) of the virtual card. One example of the electronic device 100 generating, for the user's perception, information (e.g., visual, audio, and/or haptic output generated by the device) about the details of the virtual card corresponding to the provisioned card (e.g., 910) is displaying, on the display, the information about the details of the virtual card.

In some embodiments, subsequent to successfully transferring the at least some (or all) of the stored value from the stored-value card (e.g., 910) to the virtual card stored on the electronic device 100, the electronic device displays a stored value (e.g., 936D) of the virtual card corresponding to the stored-value card. For example, if an electronic wallet application of the electronic device 100 includes multiple virtual cards (or accounts) of the same type (e.g., multiple transit cards), the values of each of the multiple virtual cards are prominently displayed. This improved feedback enhances the operability of the electronic device by providing the user with the ability to distinguish between multiple virtual cards stored on the electronic device (or accessible by the electronic device) and their corresponding stored values.

In some embodiments, subsequent to transferring at least some (or all) of the stored value from the stored-value card (e.g., 910) to the virtual card stored on the electronic device 100, and in accordance with a determination that the electronic device does not have another linked transit account, (e.g., the newly provisioned transit account is the initial (first) provisioned transit account and/or the only current active transit account linked to the electronic device), the electronic device designates (designates by default or prompts the user to designate) an account of the virtual card to be made available for use without checking authentication. For example, the virtual card corresponds to the only provisioned transit account if the virtual card corresponds to the initial (first) provisioned transit account, and thus is the only current active transit account. In some examples, if the virtual card corresponds to the only provisioned transit account, the electronic device 100 designates, based on the determination that the virtual card is the only transit account of the account information application of the electronic device, the virtual card to be an express transit card. In some embodiments, using the express transit card (e.g., for making a payment or transmitting credentials) does not require, such as described with reference to FIGS. 15A-15M, checking authentication in certain circumstances (e.g., transactions in which the detected wireless signal corresponds to, for example, a request from a transaction terminal or a request for funds from a transit account). Thus, designating the virtual card as an express transit card reduces the number of required user inputs, thereby making the technique more efficient and conserving battery power.

In some embodiments, subsequent to transferring at least some (or transferring all) of the stored value from the stored-value card (e.g., 910) to the virtual card stored on the electronic device 100, and in accordance with a determination that the virtual card does not correspond to the only transit account provisioned on an account information application (e.g., an electronic wallet) of the electronic device, the electronic device forgoes designating (or forgoes prompting the user to designate) the account of the virtual card to be made available for use without checking authentication. For example, the virtual card does not correspond to the only provisioned transit account if the virtual card does not correspond to the initial (first) provisioned transit account, and thus is not the only current active transit account. In some examples, if the virtual card does not correspond to the only provisioned transit account, the electronic device 100 designates (or prompts the user to designate) the account of the virtual card to not be made available for use without checking authentication. Thus, in some examples, the electronic device 100 does not designate, based on a determination the virtual card is not the only transit account of the account information application, the virtual card to be an express transit card.

In some embodiments, subsequent to transferring at least some (or transferring all) of the stored value from the stored-value card (e.g., 910) to the virtual card stored on the electronic device 100, and in accordance with a determination that the electronic device does not have another linked transit account, (e.g., the newly provisioned transit account is the initial (first) provisioned transit account and/or the only current active transit account linked to the electronic device), and further in accordance with receiving user input indicating a desire not to have accounts be made available for use without checking authentication (e.g., user input removing a prior express transit card of the account information application or declining to add a prior account as an express transit card), the electronic device forgoes designating (or forgoes prompting the user to designate) the account of the virtual card to be made available for use without checking authentication. In some examples, the electronic device 100 designates (or prompts the user to designate) the account of the virtual card to not be made available for use without checking authentication. Thus, in some examples, the electronic device 100 does not designate, based on a determination the virtual card is not the only transit account of the account information application, the virtual card to be an express transit card. Thus, in some embodiments, the electronic device 100 accommodates the preferences of the user in designating or forgoing to designate the virtual card as an express transit card. Transit transactions are frequently conducted in crowded transit stations with users (or other passengers) who are in a hurry to make a transit connection. Even with the most accurate and reliable authentication systems there is always some possibility of a false negative result where a valid user is not properly authenticated (e.g., because the user's fingerprint is not correctly identified or the user enters an incorrect password, passcode, or pattern). Using an express transit transaction model where security is provided by establishing the identity of the transaction terminal as a transit transaction terminal (e.g., established by a transaction terminal signal or other contextual information) instead of user authorization for the specific transaction reduces the likelihood that the user (or other passengers) will be inconveniences by false negative results of authentication while conducting a transit transaction with the device.

FIG. 10 is a flow diagram illustrating a method of provisioning accounts onto an electronic device, in accordance with some embodiments. Method 1000 is performed at a device (e.g., 100, 300, 500) with a display, one or more input devices, and one or more short-range communication radios. Some operations in method 1000 are, optionally, combined, the order of some operations is, optionally, changed, and some operations are, optionally, omitted.

As described below, method 1000 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

At block 1002, the electronic device requests (e.g., by displaying a prompt, on a display of the electronic device) verification information (e.g., 914A-914B, 920A-920B) (e.g., a card number of the stored-value card, a birth date, a mailing address) to verify ownership of a stored-value card (e.g., 910) (e.g., the funds and or data are physically stored on the card, in the form of binary-coded data, an NFC-readable stored-value card, a stored-value transit card, a stored-value gift card), wherein the stored-value card has a stored value. For example, the verification information is used to confirm ownership of the stored-value card. Accordingly, by verifying ownership, the operability of the electronic device is enhanced by preventing provisioning the device based on funds from an unauthorized card.

In accordance with some embodiments, the stored-value card (e.g., 910) is a stored-value transit card. In some examples, the stored-value transit card stores transit plan (or transit pass) information. In some examples, the transit plan is a monthly or weekly transit plan. In some examples, the stored-value transit card stores electronic cash. Thus, in some examples, the electronic device provides the user with the ability to provision accounts that can be used to provide the user with access to the transit system.

In accordance with some embodiments, the virtual card is a transit virtual card. In some examples, the transit virtual card stores transit plan (or transit pass) information. In some examples, the transit plan is a monthly or weekly transit plan. In some examples, the transit virtual card stores electronic cash. In accordance with some embodiments, the virtual card is a stored-value virtual card. In some examples, the stored-value virtual card stores electronic cash. Thus, in some examples, the electronic device provides the user with the ability to use the virtual card to provide the user with access to the transit system.

In accordance with some embodiments, the verification information is a card account number of the stored-value card (e.g., 910). In some examples, the verification information is (or includes) the stored value of the stored-value card. Thus, in some examples, a user that knows the current stored value of the card is able to transfer at least some (or all) of the stored value from the card to the virtual card stored on the device.

In accordance with some embodiments, the verification information (e.g., 920C) is information that is personal to a registered user of the stored-value card. In some examples, the verification information is a non-account-number identifier (e.g., a birthday). In some examples, the verification information is a birthday of a registered user of the stored-value card. In some examples, the verification information is a mailing address of a registered user of the stored-value card. Thus, in some examples, the electronic device provides additional security by requesting personal information for the verification. Accordingly, by verifying ownership using information that is personal to the user, the operability of the electronic device is enhanced by providing an enhanced level of security to prevent provisioning the device based on funds from an unauthorized card.

At block 1004, the electronic device receives, via the one or more input devices, input from a user of the electronic device that includes (e.g., not by the one or more short-range communication radios) verification information (e.g., 914C, 920C) for verifying ownership of the card (e.g., 910), wherein the verification information includes information that is not shown on the card. In some examples, the verification information is received via a first input device (e.g., a touch-sensitive surface, a microphone) of the electronic device that is different from the one or more short-range communication radios.

In accordance with some embodiments, the electronic device does not present (e.g., on a display of the electronic device) the card account number of the stored-value card (e.g., 910) prior to receiving, via the one or more input devices, input from the user of the electronic device that includes verification information (e.g., 914C, 920C) for verifying ownership of the card. Thus, the user must have access to the card (or account) number through a method other than through the electronic device. For example, the user can provide the card number based on the card number being printed on a receipt or invoice of the card or based on the card number being printed on the card. In some examples, in accordance with a determination that the card is registered (e.g., "registered mode"), the electronic device presents (e.g., on a display of the electronic device) the card account number of the card prior to receiving, via the one or more input devices, input from the user of the device that includes verification information for verifying ownership of the card.

At block 1006, the electronic device displays, on the display of the electronic device, a prompt (e.g., 908, 930) to place the electronic device within communication range (e.g., of the one or more short-range communication radios) of the stored-value card (e.g., 910). For example, the electronic device displays a prompt instructing the user to place the electronic device on the stored-value card, such that the back of the electronic device (e.g., the side of the electronic device opposite the display) is nearest to the stored-value card. In some examples, the prompt to place the device within communication rage is provided subsequent to receiving the identifying information. Thus, the electronic device, by displaying the prompt, informs the user that the electronic devices is attempting to communicate with the stored-value card, thereby prompting the user to place the electronic device near or on the stored-value card.

At block 1008, the electronic device receives, by the one or more short-range communication radios (e.g., NFC radios), identifying information (e.g., a card number of the stored-value card, a birth date, a mailing address) from the stored-value card (e.g., 910). For example, the electronic device interrogates the stored-value card for identifying information.

At block 1010, the electronic device verifies ownership of the stored-value card (e.g., 910) by comparing the verification information (e.g., 914C, 920C) with the identifying information. Thus, the electronic device, by verifying ownership of the stored-value card provides additional secure by preventing individuals from electronically stealing funds from cards they do not own. In accordance with some embodiments, prior to receiving the card account number of the card (e.g., 910) and prior to verifying ownership of the card, the virtual card is stored (e.g., in the account information application) on the electronic device. In some examples, the electronic device includes a "blank" virtual card that does not have any value (e.g., funds). The electronic device transfers the at least some (or all) of the stored value from the card to the "blank" virtual card. Thus, there is no need to configure the electronic device with a new virtual card, as the existing virtual card can be funded. In some examples, this speeds up the process for transferring funds to the electronic device.

At block 1012, in accordance with a determination that verification of ownership is successful (e.g., that the verification information corresponds to (or matches) the identifying information), at block 1014, the electronic device transfers at least some (or all) of the stored value from the stored-value card (e.g., 910) to a virtual card stored on the electronic device (e.g., transferring to an account stored in an electronic wallet application of the electronic device). In some examples, the electronic device includes a secure element, and wherein transferring at least some of the stored value from the stored-value card to the virtual card stored on the electronic device includes storing, in the secure element of the electronic device, information for accessing the stored value of the virtual card. In some examples, when some or all of the stored value from the card is transferred to the virtual card, information for retrieving the value from the virtual card is stored in the secure element to ensure that the stored value is not accessible in the absence of a properly processed payment transaction that retrieves the information from the secure element. Accordingly, by transferring value to the virtual card stored on the electronic device, the electronic device operability of the device is enhanced because the device becomes capable of participating in transactions using the newly transferred funds stored at the virtual card. In some examples, the verification information is a non-account-number identifier (e.g., a birthday) and the identifying information is an account number. The electronic device uses the identifying information to retrieve (e.g., from a remote server) a non-account-number identifier (e.g., a birthday) of the account corresponding to the account number. If the retrieved non-account-number identifier matches the verification information, the verification information is said to correspond to the identifying information and the verification is successful.

In accordance with some embodiments, transferring at least some (or all) of the stored value from the stored-value card (e.g., 910) to the virtual card stored on the electronic device includes removing the stored value from the stored-value card (e.g., 910) and transmitting a request to a server to deactivate the stored-value card (e.g., 910) (e.g., kill the card, render the card inoperable). For example, the electronic device removes all the value from the stored-value card and renders the card inoperable. Thus, in some examples, the full features and/or value of the stored-value card is moved to the virtual card and the virtual card replaces the physical card.

In accordance with some embodiments, at block 1016, in accordance with a determination that verification of ownership is not successful (e.g., verification information does not correspond to (or match) the identifying information (e.g., verification of ownership is not successful)), the electronic device, at block 1018, displays and/or generates feedback (e.g., visual, audio, and/or haptic output generated by the device) indicating (e.g., indication 920D) (e.g., displaying a notification on a display of the electronic device) that verification of ownership was not successful, and, at block 1020, (again) requests (e.g., from the user) (e.g., by displaying a prompt, on a display of the electronic device) verification information (e.g., a card number of the stored-value card, a birth date, a mailing address) to verify ownership of the stored-value card (e.g., 910). Thus, in some examples, the electronic device notifies the user if the validation information is incorrect. Thus, the electronic device, by generating the feedback, informs the user that the electronic device has determined that the verification of ownership was not successful, thereby prompting the user to provide information to verify ownership again.

In accordance with some embodiments, subsequent to transferring at least some of the stored value from the stored-value card (e.g., 910) to the virtual card stored on the electronic device, the electronic device displays, on the display, a stored value of the virtual card. For example, when an electronic wallet application of the electronic device includes multiple virtual cards (or accounts) of the same type, the values of the virtual cards are prominently displayed to help the user to distinguish between the multiple virtual cards. Thus, the electronic device informs the user of the stored value of the virtual card. This improved feedback enhances the operability of the electronic device by providing the user with the ability to distinguish between multiple virtual cards stored on the electronic device (or accessible by the electronic device) and their corresponding stored values.

In accordance with some embodiments, subsequent to transferring at least some (or all) of the stored value from the stored-value card (e.g., 910) to a virtual card stored on the electronic device, the electronic device displays transit plan information (e.g., monthly pass, 10-ride pass, etc.) of the virtual card, the transit plan information based on the transferred at least some (or all) of the stored value. Thus, the electronic device informs the user about the details of the virtual card. This improved feedback informs the user of the state of the electronic device, such as what virtual cards are stored on the device and what, if any, transit plan information the virtual card includes.

In accordance with some embodiments, subsequent to transferring at least some (or all) of the stored value from the stored-value card (e.g., 910) to a virtual card stored on the electronic device, the electronic device displays (e.g., concurrently) one or more of: a balance of the virtual card (e.g., 936D), a username of an account registered to the virtual card (e.g., 936C), and transit plan information (e.g., monthly pass, 10-ride pass, etc.) of the virtual card (e.g., 936E). Thus, the electronic device informs the user about the details of the virtual card.

In accordance with some embodiments, (e.g., subsequent to transferring at least some (or all) of the stored value from the card to a virtual card stored) in accordance with a determination that the electronic device does not have another linked transit account, (e.g., the newly provisioned transit account is the initial (first) provisioned transit account and/or the only current active transit account linked to the electronic device), the electronic device designates an account of the virtual card to be made available for use without checking authentication. In some examples, using the account of the virtual card to participate in a transaction includes releasing information (e.g., transaction information, payment information) from a secure element of the electronic device. Thus, the electronic device designates (based on a determination the virtual card is the only transit account of the account information application) the virtual card to be an express transit card, which the electronic device can use without checking authentication for transactions in which the detected wireless signal corresponds to the first type of request (e.g., a request from a transaction terminal, a request for funds from a transit account). Thus, by automatically designating a virtual card to be available for use without checking authentication, the operability of the electronic device is enhanced by reducing the number of inputs needed to perform a transaction operation using the virtual card. In accordance with some embodiments, in accordance with a determination that the electronic device has one or more other linked transit accounts, the electronic device forgoes designating (or forgoes prompting the user to designate) the account of the virtual card to be made available for use without checking authentication (and/or designating the account of the virtual card to not be made available for use without checking authentication). Thus, the electronic device does not designate (based on a determination the virtual card is not the only transit account of the account information application) the virtual card to be an express transit card.

In accordance with some embodiments, (e.g., subsequent to transferring at least some (or all) of the stored value from the card to a virtual card stored) in accordance with a determination that the electronic device does not have another linked transit account, (e.g., the newly provisioned transit account is the initial (first) provisioned transit account and/or the only current active transit account linked to the electronic device), and further in accordance with receiving user input indicating a desire not to have accounts be made available for use without checking authentication (e.g., user input removing a prior express transit card of the account information application), the electronic device forgoes designating the account of the virtual card to be made available for use without checking authentication (and/or designating the account of the virtual card to not be made available for use without checking authentication). Thus, the electronic device does not designate (based on a determination the virtual card is not the only transit account of the account information application) the virtual card to be an express transit card. In some examples, in accordance with not receiving user input indicating a desire not to have accounts be made available for use without checking authentication or in accordance with receiving user input indicating a desire to have accounts be made available for use without checking authentication, the electronic device selects the account of the virtual card to be made available for use without checking authentication. Thus, the electronic device designates the virtual card to be an express transit card, which the electronic device can use without checking authentication for transactions in which the detected wireless signal corresponds to the first type of request (e.g., a request from a transaction terminal, a request for funds from a transit account).

In accordance with some embodiments, the electronic device receives user input indicating a desire not to have accounts be made available for use without checking authentication (e.g., by receiving user input selecting a "no account" option for use without checking authentication), and, in response to receiving the user input indicating the desire not to have accounts be made available for use without checking authentication, designates an account of the virtual card to not be made available for use without checking authentication. Thus, the user can disable the features for express transit accounts.

In accordance with some embodiments, the electronic device receives user input selecting an account (e.g., an account corresponding to the virtual card, from among a plurality of accounts of the account information application) to be made available for use without checking authentication, and, in response to receiving the user input selecting the account to be made available for use without checking authentication, designates the selected account (e.g., of the account information application) to be made available for use without checking authentication, such as described with respect to FIGS. 15A-15M. Thus, the user can specify that the selected account should be an express transit account.

Note that details of the processes described above with respect to method 1000 (e.g., FIG. 10) are also applicable in an analogous manner to the methods described above and below. For example, methods 800, 1200, 1400, 1600, 1800, and 2000 optionally include one or more of the characteristics of the various methods described above with reference to method 1000. For example, the user interface of FIG. 7A may correspond to the user interfaces of FIGS. 9A and 15B. For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

FIGS. 11A-11N illustrate exemplary user interfaces for adding value to a stored-value account provisioned on an electronic device (e.g., 100) with a display and one or more input devices, in accordance with some embodiments. The user interfaces in these figures are used to illustrate the processes described below, including the processes in FIGS. 12A-12B.

In accordance with some embodiments, a user wishes to add value to a stored-value account of an electronic device. For example, the user initiates a process that withdraws funds from a payment account (e.g., a revolving credit account) that is also stored on the electronic device and transfers the funds to the stored-value account (e.g., a transit account). In some examples, the user can separately use funds of the stored-value account to participate in transaction (e.g., to pay for transit using NFC) and can use the payment account to participate in a separate transaction (e.g., to pay for a retail purchase using NFC).

FIG. 11A illustrates an exemplary electronic device 100. The electronic device 100 has an electronic wallet application that includes a stored-value account and a payment account. The electronic device 100, displays, on the display of the electronic device, a representation of the stored-value account that includes an activatable add-value option. FIGS. 11A-11B illustrate, in accordance with some embodiments, the representation of the stored-value account displayed on the display of the electronic device 100. In some embodiments, the stored-value account is a payment account. In some examples, the payment account corresponds to a revolving credit account or a debit account. In some embodiments, the stored-value account is transit account. In some examples, the transit account stores a transit plan (or transit pass) information. In some examples, the transit plan is a monthly or weekly transit plan. In some examples, the funds of the stored-value account are physically stored on the electronic device 100, in the form of binary-coded data. In some examples, the stored-value account is a closed-loop stored-value account. In some examples, the stored-value account stores electronic cash. In some embodiments, as illustrated in FIG. 11A, the representation of the stored-value account includes a graphical depiction (e.g., 1142A) of the stored-value account. The graphical depiction (e.g., 1142A) of the stored-value account enables the user to differentiate the stored-value account from a different account provisioned on the electronic device 100. In some embodiments, the representation of the stored-value account includes an indication (e.g., 1142B) of the available credit (e.g., available funds) of the stored-value account.

In some embodiments, the representation of the stored-value account includes a menu (e.g., 1140) that includes a plurality of selectable affordances (e.g., 1140A, 1140B, 1140C). In some examples, the menu (e.g., 1140) includes an information affordance (e.g., 1140A). In some examples, the menu (e.g., 1140) includes a transactions affordance (e.g., 1140B). In some examples, the menu (e.g., 1140) includes a devices affordance (e.g., 1140C). In some embodiments (e.g., in response to user-selection of the information affordance (e.g., 1140A), as illustrated in FIG. 11A), the representation of the stored-value account displays a transfer-account option (e.g., 1146A). Thus, in some examples, the electronic device 100 provides the user with the option to move accounts from one device to another device, such as described with reference to FIGS. 17C-17H.

In some embodiments (e.g., in response to user-selection of the information affordance (e.g., 1140A), as illustrated in FIG. 11A), the representation of the stored-value account displays: an indication (e.g., 1144) of on which device the stored-value account currently resides, of one or more devices of the plurality of devices (e.g., associated with a user account), features and/or data (e.g., current balance, transit pass information) of the stored-value account, a selection affordance (e.g., 1148A) for enabling or disabling notification, a selection affordance (e.g., 1148B) for enabling or disabling having the stored-value account be made available for use without checking authentication, such as described with reference to FIGS. 15A-15M, and a selection affordance (e.g., 1148C) for designating or not designating the stored-value account to be available for use for transactions made at two or more devices (e.g., associated with the user's account), although payment credentials of the stored-value account are stored at only one of the two or more devices at a time (a restriction of the stored-value account being a stored-value account), such as described with reference to FIGS. 19A-19H.

In some embodiments, the electronic device 100 receives user input indicating a desire to receive or not to receive notifications about transactions associated with the stored-value account (e.g., by moving a selection affordance to the "ON" or "OFF" position, as illustrated with respect to selection affordance 1148A). In some embodiments, the electronic device 100 receives user input indicating a desire to have the stored-value account be made available for use without checking authentication (e.g., by moving a selection affordance to the "OFF" position, as illustrated with respect to selection affordance 1148B), such as described with reference to FIGS. 15A-15M. Thus, the electronic device 100 provides the user with the option to designate or not designate the stored-value account as an express transit account (e.g., using the selection affordance 1148B), by which funds are transmitted in particular transactions without requiring authentication. In some embodiments, when the stored-value account is designated as an express transit account (e.g., by moving the selection affordance 1148B to the "ON" position), the electronic device 100 provides faster access to the stored-value account. In some embodiments, when the stored-value account is not designated as an express transit account (e.g., by moving the selection affordance 1148B to the "OFF" position), the electronic device 100 provides added security for accounts provisioned on the electronic device. In some embodiments, the electronic device 100 receives user input (e.g., by receiving input moving a selection affordance to the "ON" or "OFF" position, as illustrated with respect to selection affordance 1148C) designating the stored-value account as an account to be available for use at two or more devices of the plurality of devices (e.g., associated with the user's account). In some examples, the stored-value account is designated to be available for use for transactions made at two or more devices (e.g., associated with the user's account), although credentials of the stored-value account are stored at only one of the two or more devices at a time (e.g., a restriction of the stored-value account being a stored-value account), such as described with reference to FIGS. 19A-19H. Thus, in some examples, the electronic device 100 requests credentials of the stored-value account when the user has specified that the stored-value account be made available at the electronic device.

In some embodiments, the electronic device 100 displays, on a display of the electronic device, a representation of a second payment account that does not include an activatable add-value option. In some examples, the second payment is not a stored-value account, and thus cannot be funded at the electronic device 100. In some examples, the representation of the second payment account includes a current balance (e.g., money owed) of the payment account (e.g., a revolving credit account) while the representation of the stored-value account includes a current balance (e.g., available funds) of the stored-value account.

In some embodiments, in accordance with a determination that the stored-value account is a transit account, the representation of the stored-value account includes an indication of a transit plan (e.g., a weekly or monthly transit plan) associated with the transit account. In some examples, the representation of the stored-value account includes an indication of a transit plan associated with the transit account and also includes an indication of an expiration date of the transit plan. Also, if the user selects options to renew the plan for a predetermined time period (e.g., a month), the new expiration date is shown to indicate that the expiration date is being extended from the current expiration date to a new expiration date by at least one month. Thus, in some examples, the electronic device 100 informs the user of the transit plan associated with the transit account and of the expiration date of the transit plan, thereby enabling the user to make a better-informed decision for funding the stored-value account or otherwise performing a transaction with the stored-value account.

In some embodiments, a payment account number of the payment account is unique to the electronic device 100. In some embodiments, making a payment using the payment account can be authorized without verifying the physical presence of a payment card for the payment account (e.g., by entering the CVV printed on the payment card). In some examples, this technique is performed without displaying, on a display of the electronic device 100, the payment account number of the payment account. In some examples, the payment account number of the payment account to be used in the transaction is not provided by the user. That is, the payment account number has not been previously entered or otherwise provided by the user.

In some examples, the electronic device 100 includes a secure element. The secure element is a hardware component (e.g., a secure microcontroller chip) configured to securely store data or an algorithm. In some examples, the secure element provides (or releases) payment information (e.g., a payment account number and/or a transaction-specific dynamic security code) corresponding to the payment account. In some examples, the secure element provides (or releases) the payment information in response to the electronic device 100 receiving authorization, such as a user authentication that includes authentication information for the device (as opposed to being identification information for the payment account). In some examples, the user authentication is performed by using fingerprint authentication. For example, the electronic device 100 detects a fingerprint at a fingerprint sensor (e.g., a fingerprint sensor integrated into a button) of the electronic device. The electronic device 100 then determines whether the detected fingerprint is consistent with a registered fingerprint on the electronic device. In accordance with a determination that the fingerprint is consistent with the registered fingerprint, the secure element provides (or releases) payment information for the payment account. In accordance with a determination that the fingerprint is not consistent with the registered fingerprint on the electronic device, the secure element forgoes providing (or releasing) payment information for the payment account. In some examples, the user authentication is performed by using passcode authentication or by detecting a double-press (e.g., by the user) of a hardware button on the electronic device 100 when the electronic device is in an unlocked state. In some examples, if the electronic device 100 is on the user's wrist, the user authentication is performed by detecting that the electronic device is in direct contact with the user (e.g., in direct contact with user's skin). In some examples, each payment information provided by the secure element is generated based on an algorithm. In some examples, each payment information provided by the secure element is unique.

As illustrated in FIG. 11A, the representation of the stored-value account displays (e.g., in response to user selection of the information affordance (e.g., 1140A)), an activatable add-value option (e.g., 1146B) which, when activated, causes display of the user interfaces described with reference to FIGS. 11C-11G. As illustrated in FIG. 11B, while displaying the representation of the stored-value account, the electronic device 100 detects, via the one or more input devices, activation (e.g., by the user) of the add-value option (e.g., 1146B, an add-value affordance). In some embodiments, as illustrated by FIG. 11C, in response to receiving the activation of the add-value option (e.g., 1146B), the electronic device 100 displays, on the display of the electronic device, a user interface for user entry of value to add (e.g., to fund) to the stored-value account using the payment account. In some embodiments, the user interface for user entry of value includes a fund-account option (e.g., 1142D, a fund-account affordance).

In some embodiments, the electronic device 100 detects that the current balance of the stored-value account is below a minimum balance notification level. In response to detecting that the current balance of the stored-value account is below the minimum balance notification level, the electronic device 100 displays and/or generates (e.g., displays, such as on a lock screen of the electronic device) a notification that the current balance of the stored-value account is below the minimum balance notification level. Thus, in some examples, the electronic device 100 notifies the user when the funds available in the stored-value account falls below the minimum balance notification level. In some examples, the minimum balance notification level is pre-defined by the user. In some embodiments, if the electronic device 100 receives user input activating the notification indicating that the current balance of the stored-value account is below the minimum balance notification level, the electronic device displays, on the display of the electronic device, the user interface for user entry of value to add (e.g., to fund) to the stored-value account using the payment account. Optionally, the electronic device provides the user with the option to switch between payment accounts for adding value to the stored-value account.

In some embodiments, as illustrated in FIG. 11C, the user interface for user entry of value to add concurrently includes a virtual numeric keypad (e.g., 1150), one or more suggested amounts (e.g., 1150A, 1150B, 1150C) displayed above the virtual numeric keypad (e.g., 1150), and the current balance (e.g., 1142B) of the stored-value account. For example, in the embodiment illustrated in FIG. 11C, the suggested amounts are $10 (1150A), $25 (1150B), and $50 (1150C). In some embodiments, the user interface for user entry of value to add also concurrently includes an indication of the amount to be added (e.g., 1142C, amount to be funded) to the current balance (e.g., 1142B) of the stored-value card. For example, before the user enters a desired amount to be added to the virtual numeric keypad (e.g., 1150), the amount to be added is presented as $0 (e.g., zero dollars) (e.g., 1142C).

In some embodiments, if the stored-value account is a transit account, the electronic device 100 displays (e.g., in response to detecting activation of the add-value option 1146B), on the display of the electronic device, a user interface for funding the transit account using the payment account. In some embodiments, the user interface for funding the transit account concurrently includes one or more suggested amounts (e.g., to add to the available balance of the transit account) and a start date and an end date of a recommended transit plan for the transit account. In some examples, the user interface for funding the transit account does not include display of a current balance of the stored-value account. In some examples, the electronic device 100 receives input selecting the recommended transit plan for adding funds to the stored-value account using the payment account. In some embodiments, in accordance with receiving the input selecting the recommended transit plan and receiving an indication that selection of the transit plan is complete (e.g., detecting activation of the fund-value option 1142D), the electronic device 100 displays the proposed transaction to add funds (e.g., the recommend transit plan) to the stored-value account from the payment account. In some examples, the user interface that includes the proposed transaction to add funds to the stored-value account using the payment account includes a request for authentication (e.g., request for biometric authentication, fingerprint authentication, passcode authentication) to authorize the payment.

In some embodiments, if the stored-value account is a transit account, in accordance with a determination that a transit plan of the stored-value account is due for renewal, the electronic device 100 displays (e.g., on a display) and/or generates (e.g., visual, audio, and/or haptic output generated by the device) a notification (e.g., a display on a lock screen of the electronic device) indicating that the transit plan of the transit account is due for renewal. In some examples, activation (e.g., by the user) of the notification indicating that the transit plan is due for renewal causes the electronic device 100 to display the user interface for funding the transit account using the payment account. In doing so, the electronic device 100 informs the user of the need to renew the transit plan. In some examples, activation of the notification causes display of an add-value user interface (e.g., the user interface for user entry of value to add) with the option to add value to the stored-value card, such as described with reference to FIGS. 11C-11M.

In some embodiments, if the stored-value account is a transit account, the electronic device 100 detects the proximity of the electronic device to a transit station (e.g., using current location information from a GPS of the electronic device). In some examples, the electronic device 100 also (or alternatively) determines an expected destination (e.g., of the user) based on one or more context factors. For example, context factors includes: time of day, day of week, travel history, recently requested or received directions, and/or recently accessed physical addresses. In some examples, in accordance with a determination that the stored-value account does not have sufficient funds for travel from the transit station to the expected destination (e.g., based on a determined cost to travel from the transit station to the expected destination), the electronic device 100 displays and/or generates (e.g., visual, audio, and/or haptic output generated by the device) (e.g., displays on the display of the electronic device 100) a notification for the user that the stored-value account (e.g., the transit account) does not have sufficient funds for travel from the transit station to the expected destination. In some examples, activation (e.g., by the user) of the notification indicating that the stored-value account does not have sufficient funds for travel from the transit station to the expected destination causes the electronic device 100 to display the representation of the stored-value account that includes the activatable add-value option (e.g., 1146B), such as described with reference to FIGS. 11A-11B. Thus, in some examples, the electronic device 100 notifies the user when the stored-value account does not have sufficient funds for travel from the transit station to the expected destination, which permits the user to add funds to the stored-value account in anticipation of payment for the trip using the stored-value account. In some examples, subsequent to notifying the user that the stored-value account does not have sufficient funds for travel from the transit station to the expected destination, the user interface for user entry of value to add to the stored-value account, such as described with reference to FIG. 11C-11G, is displayed. In some examples, the user interface for user entry of value to add is displayed to notify the user that the stored-value account does not have sufficient funds for travel from the transit station to the expected destination. In some examples, in accordance with a determination that the stored-value account does have sufficient funds for travel from the transit station to the expected destination, the electronic device 100 forgoes generating the notification that the stored-value account does not have sufficient funds for travel from the transit station to the expected destination.

Figure 11D:
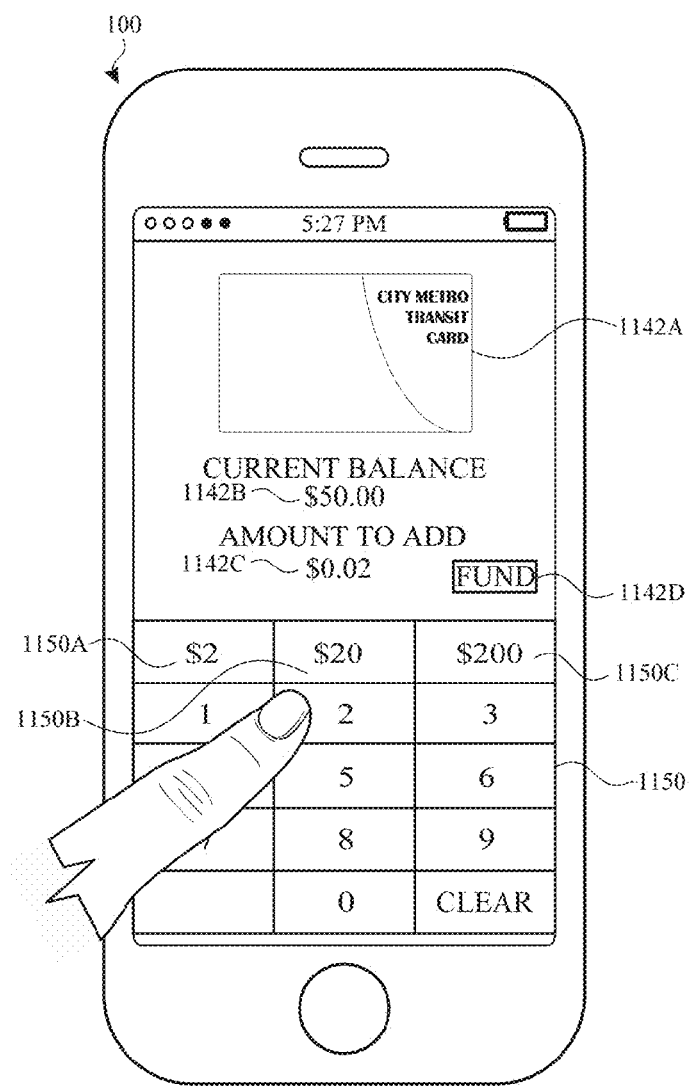
Figure 11E:
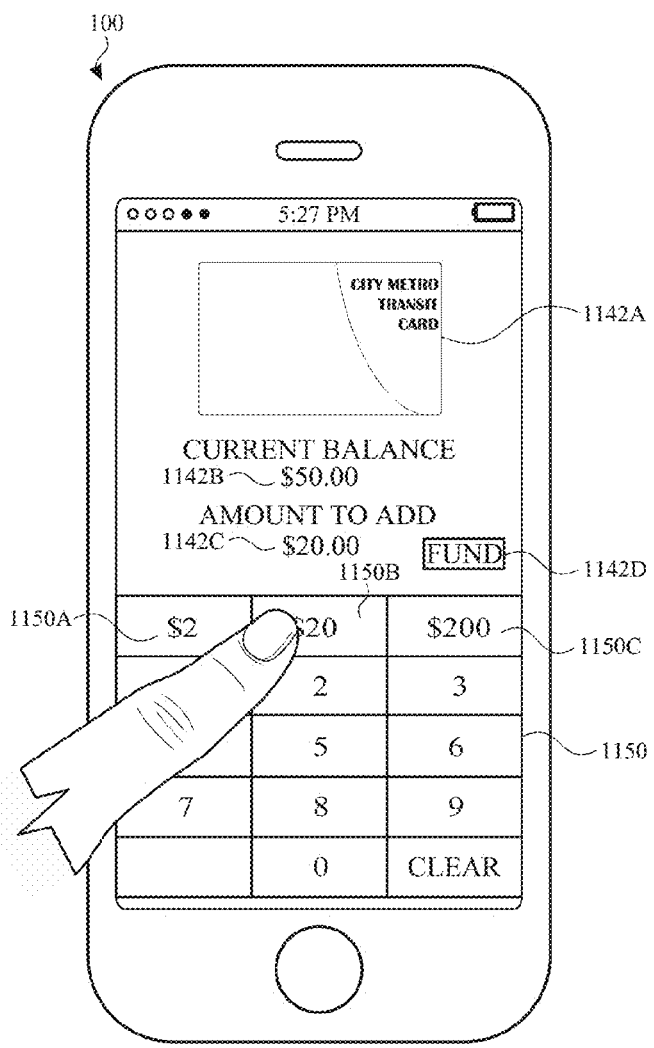

In some embodiments, as illustrated in FIGS. 11D-11E, the electronic device 100 receives input (e.g., from the user) at the virtual numeric keypad (e.g., 1150) of an amount for adding value to (e.g., to fund) the stored-value account using the payment account. In some embodiments, in response to receiving the input at the virtual numeric keypad (e.g., 1150) of an amount for adding value to the stored-value account using the payment account, the electronic device 100 updates the display of the one or more suggested amounts (e.g., 1150A, 1150B, 1150C) based on the input received at the virtual numeric keypad. For example, in response to the user entering a "2" as the first digit of the desired value to the added, the suggested amounts (e.g., 1150A, 1150B, 1150C) change from $10, $25, and $50 to $2 (affordance 1150A), $20 (affordance 1150B), and $200 (affordance 1150C), as illustrated in FIG. 11D. Thus, as illustrated in FIG. 11E, the user can alternatively select the suggested amount of $20 (by selecting the affordance 1150B) instead of making two selections of entering a "2" followed by three "0"s in order to enter an amount of $20.00 (e.g., at 1142C) to be added to the current balance (e.g., 1142B) of the stored-value account. In some examples, in response to receiving the input at the virtual numeric keypad (e.g., 1150), the electronic device 100 updates the display of the current amount (e.g., 1142B) to indicate a projected balance, should the entered value be added to the stored-value account. In some examples, in accordance with receiving the input at the virtual numeric keypad (e.g., 1150) and receiving an indication that the user-selection of an amount to add is complete (e.g., receiving activation of a "fund" affordance 1142D), the electronic device 100 displays, on the display of the electronic device, the proposed transaction to add funds to the stored-value account from the payment account.

In some embodiments, at least one of the one or more suggested amounts (e.g., 1150A, 1150B, 1150C) is based on a previous amount used (e.g., in a previous transaction by the user) for adding value to the stored-value account using the payment account. In some examples, at least one of the one or more suggested amounts (e.g., 1150A, 1150B, 1150C) are based on one or more of: previous activities funding the stored-value account, previous payment activities using the stored-value account, previous transit trips conducted using the stored-value account, and/or an expected future transit trip. This provides the user with relevant suggested amounts for adding funds to the stored-value account.

In some embodiments, at least one of the one or more suggested amounts (e.g., 1150A, 1150B, 1150C) is based on a current day of the current month. For example, if the user typically adds the maximum permissible amount to the stored-value account at the beginning of each month (or several previous months), one of the one or more suggested amounts reflects the maximum permissible amount. This provides the user with relevant suggestions for amounts for adding value to the account. Similarly, if the current day of the month is on or near a day of the month on which a transit pass is due to be purchased, one of the suggested amounts is optionally an amount equal to the cost of the transit pass.

Figure 11F:
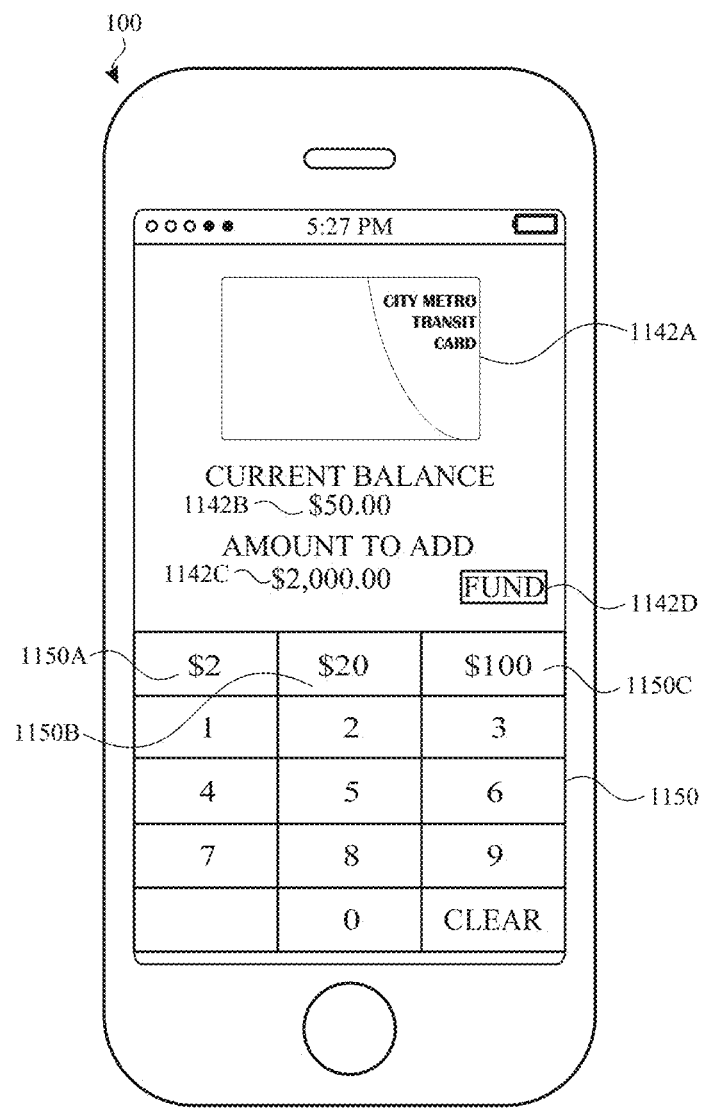

In some embodiments, as illustrated in FIG. 11F, if the input received at the virtual numeric keypad (e.g., 1150) corresponds to an amount ($2,000) exceeding a maximum permissible amount (e.g., $100) for adding value to the stored-value account using the payment account, the electronic device 100 updates the display of the one or more suggested amounts (e.g., 1150A, 1150B, 1150C). In some examples, the display of the one or more suggested amounts (e.g., 1150A, 1150B, 1150C) is updated to reflect the maximum permissible amount (e.g., $100) that is allowed to be added to the stored-value account in one add-value transaction. For example, if the maximum permissible amount is 100 (e.g., dollars), and the user enters a value of 2,000 (e.g., dollars), one of the suggested amounts (e.g., the suggested amount affordance 1150C illustrated in FIG. 11F) is updated to indicate 100 (e.g., dollars). This provides the user with a quick option to fund the stored-value account with the maximum permissible amount without having prior knowledge of the maximum permissible amount. In some examples, in addition to (or instead of) reflecting the maximum permissible amount, one of the one or more suggested amounts (e.g., 1150A, 1150B, 1150C) is updated to reflect an indication that it is the maximum. For example, the suggested amount affordance 1150C in FIG. 11F is updated to indicate "Maximum" (or the like) instead of a numeric monetary value.

In some embodiments, the user interface for user entry of value to add to the stored-value account using the payment account concurrently includes a graphical depiction (e.g., 1142A) of a card corresponding to the stored-value account. In some embodiments, if the received input at the virtual numeric keypad (e.g., 1150) corresponds to an amount exceeding a maximum permissible amount for adding value to the stored-value account using the payment account, in response to receiving the input at the virtual numeric keypad, the electronic device 100 animates the graphical depiction (e.g., 1142A) of the card corresponding to the stored-value account such that the graphical depiction of the card shakes or moves (e.g., from side-to-side) for a certain period of time. In this way, the electronic device 100 informs the user that the amount received as input exceeds the maximum permissible amount. In some examples, the graphical depiction (e.g., 1142A) of the card shaking for a certain period of time is similar to (or the same as) an animation that is used at the electronic device 100 to indicate that a password or a passcode has been entered incorrectly.

Figure 11G:
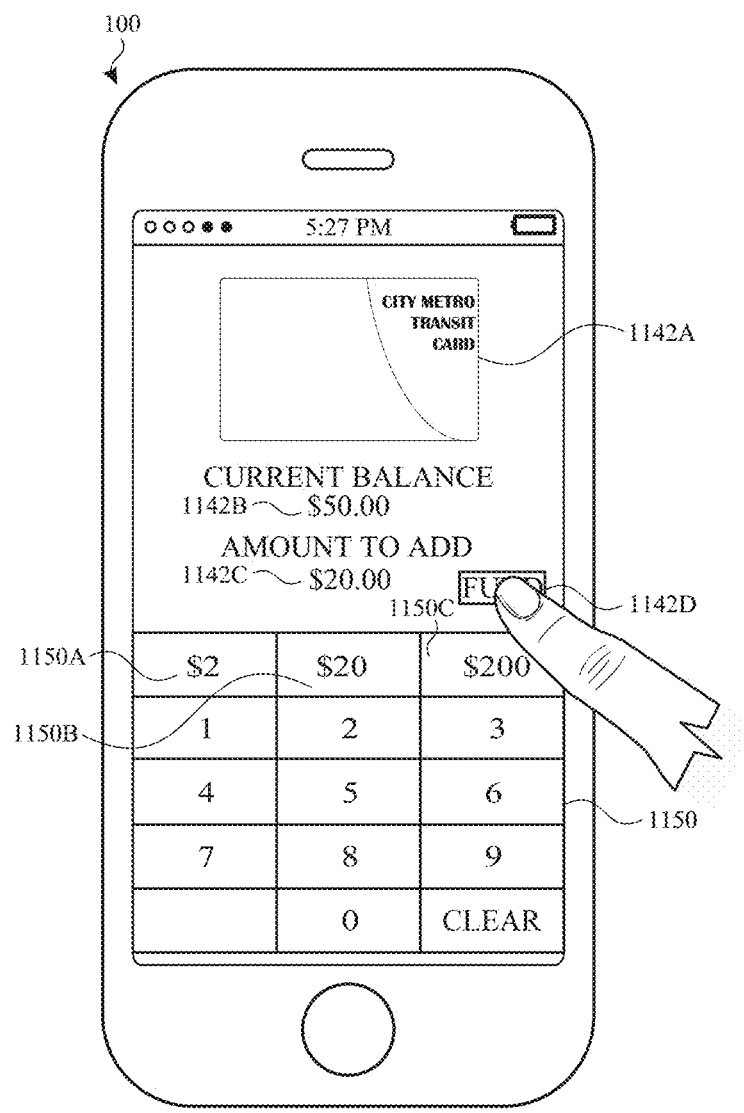

As illustrated in FIG. 11G, the electronic device 100 detects, via the one or more input devices, activation of the fund-account option (e.g., 1142D, a fund-account affordance) to add value to the stored-value account using the payment account of the electronic wallet application. In response to detecting activation of the fund-account option (e.g., 1142D), the electronic device 100 displays, on the display of the electronic device, a user interface requesting authentication (e.g., biometric authentication, fingerprint authentication, passcode authentication). In some examples, the user interface requesting authentication includes the proposed transaction to add funds to the stored-value account from the payment account. In some embodiments, the user interface requesting authentication is a transaction user interface of an electronic wallet application that is different from an add-value application of the user interface for user entry of value to add, where the representation of the stored-value account is displayed in the add-value application. In some embodiments, the user interface requesting authentication is displayed on top of (all of or a portion of) the user interface for user entry of value to add.

Figure 11H:
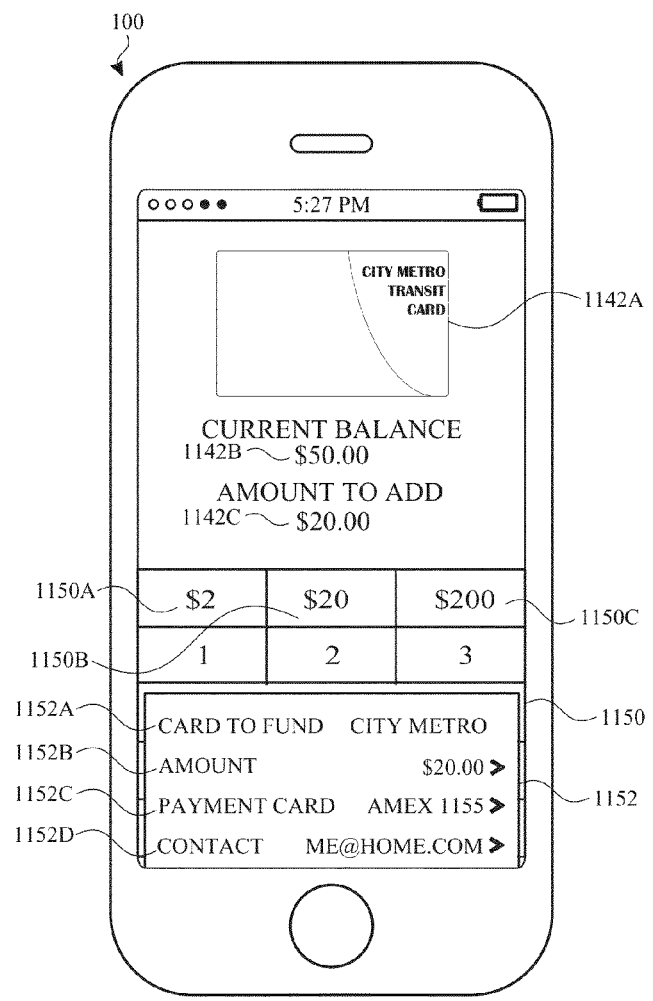
Figure 1I:
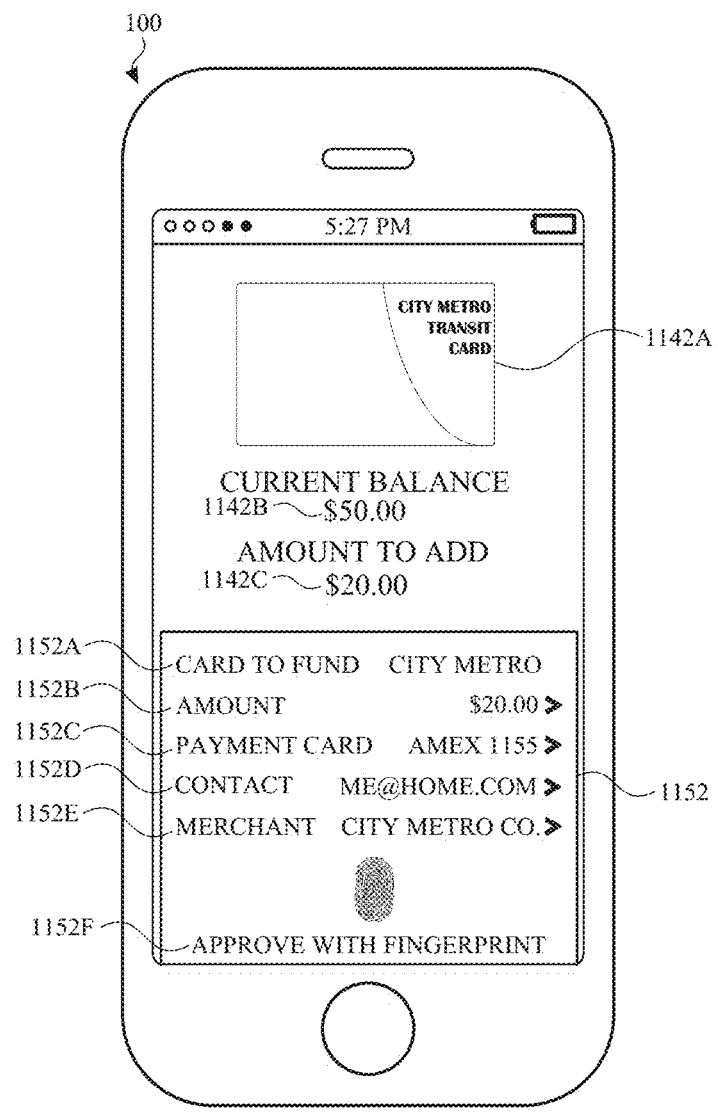

In some embodiments, as illustrated in FIG. 11H, the user interface (e.g., 1152) requesting (e.g., from the user) authentication (e.g., biometric authentication, fingerprint authentication, passcode authentication) corresponds to a user interface sheet of an electronic wallet application that is different from an add-value application of the user interface for user entry of value to add. In some embodiments, the user interface sheet corresponding to the user interface requesting authentication is displayed on top of the user interface for user entry of value to add and covers a portion (or all) of the display of the electronic device 100. In some embodiments, the user interface sheet corresponding to the user interface requesting authentication is moved onto the display of the electronic device 100 from an edge (e.g., bottom side) of the display. For example, the user interface sheet slides into view on the display of the electronic device 100 by shifting up from the bottom of the display to the center of the display. In some embodiments, the user interface sheet corresponds to the transaction user interface of an electronic wallet application that is different from the add-value application, where the representation of the stored-value account is displayed in the add-value application.

In some embodiments, as illustrated in FIG. 11I, prior to receiving authentication information (e.g., from the user), the electronic device 100 displays the user interface (e.g., 1152) requesting authentication (e.g., biometric authentication, fingerprint authentication, passcode authentication), including a prompt (e.g., 1152F) for the user to provide authorization to add value to the stored-value account from the payment account. In some examples, the electronic device 100 prompts the user to provide authorization to add value to the stored-value account from the payment account via audio. Thus, the electronic device 100 informs the user that authorization is required and, in some examples, prompts the user of what type of information (e.g., passcode, fingerprint) to provide to authorize the transaction. In some examples, the user interface (e.g., 1152) requesting authentication (e.g., biometric authentication, fingerprint authentication, passcode authentication) also concurrently displays one or more of: the card to be funded (e.g., 1152A), the payment amount (e.g., 1152B), the payment account (e.g., 1152C), a contact information associated with the user (e.g., 1152D), a name of the merchant of the card to be funded (e.g., 1152E), and an amount of tax.

Figure 11J:
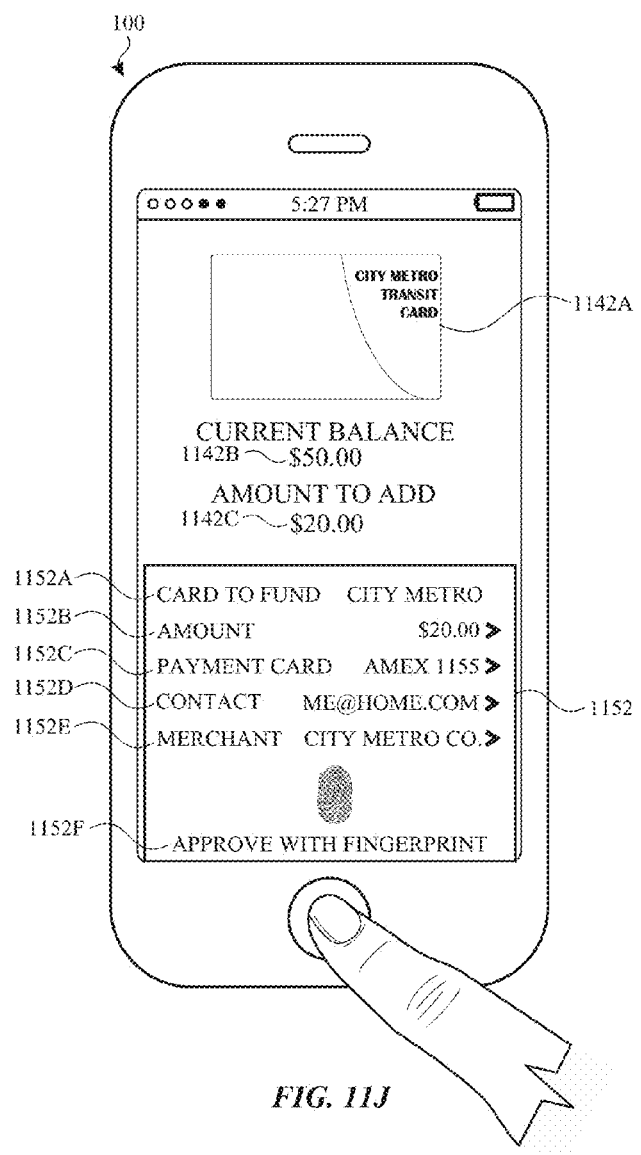

As illustrated in FIG. 11J, while displaying the proposed transaction to add funds to the stored-value account from the payment account (e.g., the user interface 1152 requesting authentication from the user), the electronic device 100 receives (e.g., from the user) authentication information. In some examples, the authentication information is received using a fingerprint reader of the electronic device 100, and thus the authentication information is a fingerprint information. In some examples, additionally or alternatively, the authentication information is received using the one or more input devices of the electronic device 100 other than the fingerprint reader (e.g., the authentication information is passcode information or a double-press of a hardware button of the electronic device).

Figure 11K:
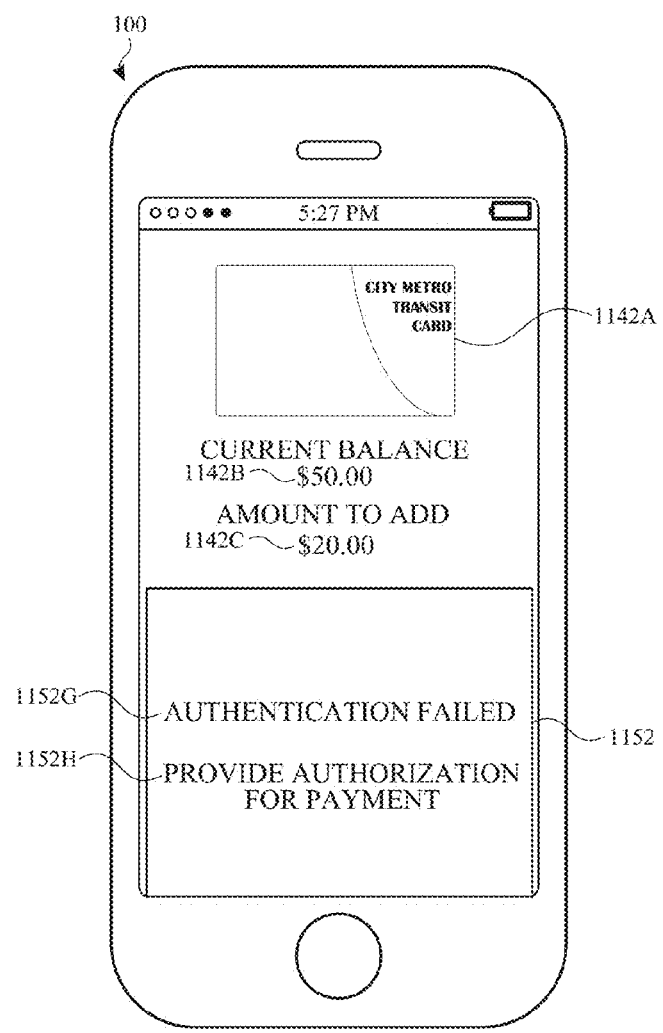

In some embodiments, as illustrated in FIG. 11K, in response to receiving the authentication information and in accordance with a determination that the authentication information is not consistent with enrolled authentication information for performing payment transactions using the payment account, the electronic device 100 forgoes adding value to the stored-value account using the payment account. Thus, the electronic device 100 provides additional security by not funding the stored-value account when the authentication information is not consistent with enrolled authentication information. Additionally, in some embodiments, the user interface (e.g., 1152) requesting authentication displays an indication (e.g., 1152G) that the authentication was not successful. Additionally, in some embodiments, the user interface (e.g., 1152) requesting authentication displays an indication (e.g., 1152H) instructing the user to again provide authentication information.

Figure 11L:
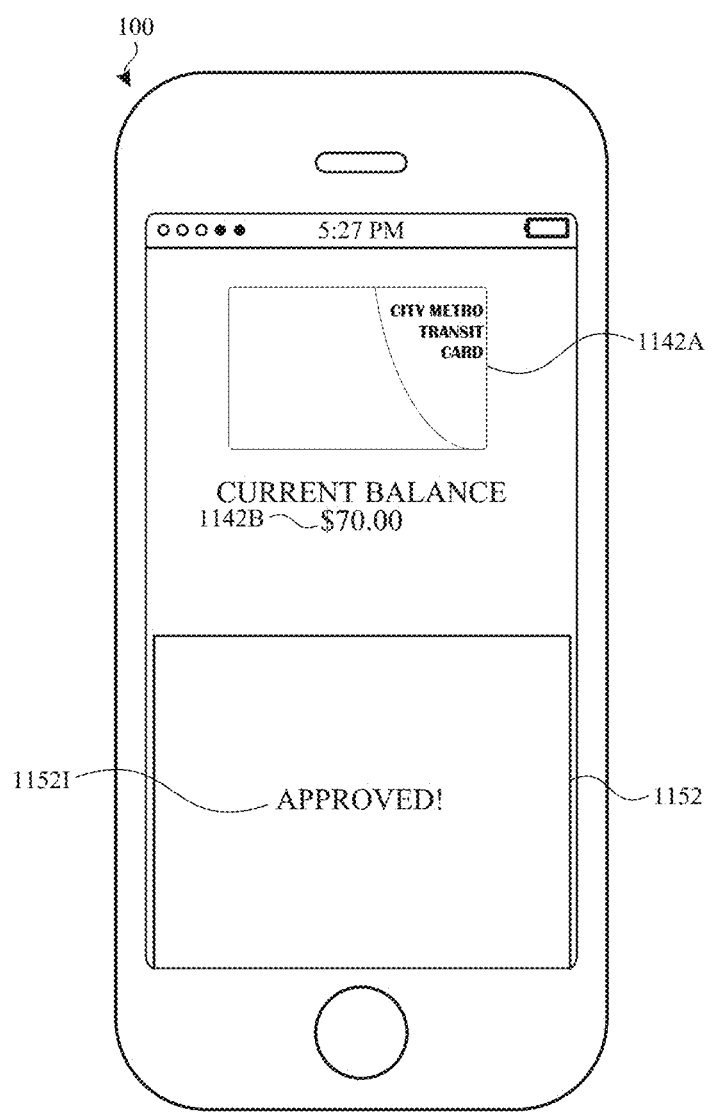

As illustrated in FIG. 11L, in response to receiving the authentication information and in accordance with a determination that the authentication information is consistent with enrolled authentication information for performing payment transactions using the payment account, the electronic device 100 adds value to the stored-value account using the payment account. In some embodiments, the user interface (e.g., 1152) requesting authentication provides an indication (e.g., 11521) that the received authentication information was approved and thus the authentication was successful.

In some embodiments, adding value to (e.g., funding) the stored-value account using the payment account is part of recurring transactions to add value to the stored-value account using the payment account. For example, prior to receiving authorization to add value to the stored-value card, the electronic device 100 receives activation of an option to cause the value to be added to the stored-value card on a recurring (e.g., monthly, weekly, daily) basis. Thus, the user can schedule recurring funding for the stored-value account.

Figure 11M:
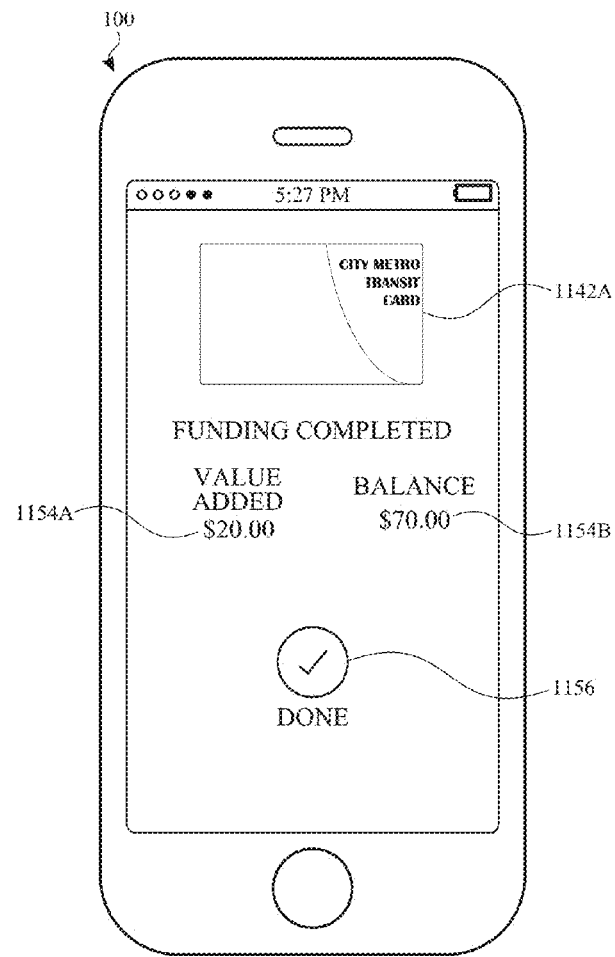

In some embodiments, as illustrated in FIGS. 11L-11M, subsequent to adding value to the stored-value account using the payment account, the electronic device 100 updates display of the current balance (e.g., 1142B, 1154B) of the stored-value account to reflect the newly value added to the stored-value account. Thus, the electronic device 100 informs the user of the updated current balance (e.g., 1142B, 1154B) of the stored-value account, thereby helping the user to make an informed decision about using the stored-value account in a subsequent transaction (e.g., for payment in a subsequent transaction, to add additional value to the stored-value account).

In some embodiments, as illustrated in FIG. 11M, subsequent to adding value to the stored-value account using the payment account, the user interface (e.g., 1152) requesting authentication is no longer displayed on the display of the electronic device 100. Instead, in some examples, the electronic device 100 presents an indication (e.g., 1156) that the value has been added to the stored-value account, and thus that the funding is complete. Further, in some examples, the electronic device 100 displays an indication (e.g., 1154A) of the added value that has been added to the stored-value account by the respective completed funding transaction. Thus, the user is assured that the funding of the stored-value account is complete, and is also reminded of the amount of funds that has been added to the funds in the stored-value account.

In some embodiments, as illustrated in FIG. 11N, subsequent to adding value to the stored-value account using the payment account, the electronic device 100 again displays the representation of the stored-value account, such as the representation of the stored-value account described with reference to FIG. 11A. In some embodiments, the representation of the stored-value account following a funding transaction includes an indication (e.g., 1142B) of the updated balance of the stored-value account.

FIGS. 12A-12B is a flow diagram illustrating methods of adding value to a stored-value account provisioned on an electronic device, in accordance with some embodiments. Method 1200 is performed at a device (e.g., 100, 300, 500) with a display and one or more input devices. Some operations in method 1200 are, optionally, combined, the order of some operations is, optionally, changed, and some operations are, optionally, omitted.

As described below, method 1200 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

At block 1202, the electronic device (e.g., 100) displays, on the display, a representation of a stored-value account that includes an activatable add-value option (e.g., 1146B), wherein the electronic device has an electronic wallet application that includes the stored-value account (e.g., the funds and or data are physically stored on the device, in the form of binary-coded data, a stored-value transit account, a closed-loop stored-value account) and a payment account (e.g., an account different from the stored-value account, an account that is not a stored-value account, an account linked to a credit account).

In some examples, a payment account number of the payment account is unique to the electronic device. In some examples, payment using the payment account can be authorized without verifying the physical presence of a payment card for the payment account (e.g., by entering the CVV printed on the payment card). In some examples, the technique is performed without displaying, on a display of the electronic device, a payment account number of the payment account. In some examples, a payment account number of the payment account to be used in the transaction is not user-provided (e.g., the payment account number was not previously entered or otherwise provided by the user).

In some examples, the electronic device includes a secure element. The secure element is a hardware component (e.g., a secure microcontroller chip) configured to securely store data or an algorithm. In some examples, the secure element provides (or releases) payment information (e.g., a payment account number and/or a transaction-specific dynamic security code) corresponding to the payment account. In some examples, the secure element provides (or releases) the payment information in response to the device receiving authorization, such as a user authentication that includes authentication information for the device (e.g., fingerprint authentication; passcode authentication; detecting double-press of a hardware button when the device is in an unlocked state; and, optionally, while the device is on a user's wrist, such as by detecting that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information for the payment account or stored-value account. In accordance with a determination that the fingerprint is not consistent with the registered fingerprint, the secure element forgoes providing (or releasing) payment information for the payment account or stored-value account. In some examples, each payment information provided by the secure element is generated based on an algorithm. In some examples, each payment information provided by the secure element is unique.

In accordance with some embodiments, the stored-value account is a transit account. Thus, in some examples, the electronic device provides the user with the option to fund an account that can be used to access the transit system.

In accordance with some embodiments, the stored-value account is a gift card account. Thus, in some examples, the electronic device provides the user with the option to fund a gift card account stored on the electronic device that can be used for transactions with particular merchants.

In accordance with some embodiments, the representation of a stored-value account includes a current balance (e.g., 1142B) (e.g., available funds) of the stored-value account. Thus, the activatable add-value option (e.g., 1146B) and the current balance (e.g., 1142B) of the stored-value account are displayed concurrently, providing the user with the current balance and a mechanism to add to the current balance. In some examples, the stored-value account stores electronic cash.

In accordance with some embodiments, the electronic device (e.g., 100) displays, on the display, a representation of a second payment account that does not include an activatable add-value option. In some examples, a second payment account of the electronic device is not a stored-value account, and thus cannot be funded at the electronic device. In some examples, the representation of the second payment account includes a current balance (e.g., money owed) for the payment account (e.g., a revolving credit account) while the representation of the stored-value account includes a current balance (e.g., funds available) for the stored-value account.

In accordance with some embodiments, the stored-value account is a transit account, and the representation of the stored-value account includes an indication (e.g., such as described with reference to 936E of FIG. 9N) of a transit plan (e.g., a weekly, monthly transit plan) associated with the transit account and an indication of an expiration date of the transit plan. Also, if the user selects options to renew the plan for a predetermined time period (e.g., a month), the new expiration date is shown to indicate that the expiration date is being extended from the current expiration date to a new expiration date by at least one month. Thus, in some examples, the electronic device informs the user of the transit plan associated with the transit account and the expiration date of the transit plan. Accordingly, the user can make a more informed decision for funding or otherwise using the stored-value account.

In accordance with some embodiments, the stored-value account is a transit account, and the electronic device displays (e.g., in response to detecting activation of add-value option (e.g., 1146B)), on the display, a user interface for funding the transit account using the payment account, wherein the user interface for funding the transit account concurrently includes one or more suggested amounts (e.g., 1150A, 1150B, 1150C) and a start date and an end date of a recommended transit plan. In some examples, the user interface for funding the transit account does not include display of a current balance of the stored-value account. In some examples, the electronic device receives input selecting the recommended transit plan for adding funds to (e.g., funding) the stored-value account using the payment account. In some examples, in accordance with receiving the input selecting the recommended transit plan and receiving an indication that selection of the transit plan is complete (e.g., detecting activation of the fund-value option 1142D), the electronic device displays the proposed transaction to add funds (e.g., the recommend transit plan) to the stored-value account from the payment account. In some examples, the user interface that includes the proposed transaction to add funds to the stored-value account using the payment account includes a request for authentication (e.g., request for biometric authentication, fingerprint authentication, passcode authentication) to authorize payment.

In accordance with some embodiments, the stored-value account is a transit account, and, in accordance with a determination that a transit plan of the stored-value account is due for renewal, the electronic device displays and/or generates (e.g., visual, audio, and/or haptic output generated by the device) a notification indicating that the transit plan of the stored-value account is due for renewal. In some examples, activation of the notification indicating that the transit plan of the stored-value account is due for renewal causes the electronic device to display the user interface for funding the transit account using the payment account. Thus, the electronic device informs the user of the need to renew the transit plan. In some examples, selection of the notification provides an option to display an add-value user interface with the option to add value to the stored-value card, such as described with reference to FIGS. 11C-11M.

In accordance with some embodiments, the stored-value account is a transit account, and the electronic device detects proximity to a transit station (e.g., using current location, via GPS), determines an expected destination based on one or more context factors (e.g., time of day, day of week, travel history, recently requested or received directions, and recently accessed physical address), and, in accordance with a determination that the stored-value account does not have sufficient funds for travel from the transit station to the expected destination (e.g., based on a determined cost to travel from the transit station to the expected destination), displays and/or generates a notification that the stored-value account does not have sufficient funds for travel from the transit station to the expected destination.

In accordance with some embodiments, displaying the representation of the stored-value account that includes the activatable add-value option (e.g., 1146B) is in response to detecting activation of the notification that the stored-value account does not have sufficient funds. In some examples, in accordance with a determination that the stored-value account has sufficient funds for travel from the transit station to the expected destination (e.g., based on a determined cost to travel from the transit station to the expected destination), the electronic device forgoes generating the notification that the stored-value account does not have sufficient funds for travel from the transit station to the expected destination. Thus, in some examples, the electronic device notifies the user when the stored-value account does not have sufficient funds for travel from the transit station to the expected destination, which permits the user to add funds to the stored-value account in anticipation of payment for the trip using the stored-value account. In some examples, subsequent to notifying the user that the stored-value account does not have sufficient funds for travel from the transit station to the expected destination, the user interface for user entry of value to add to the stored-value account is displayed (e.g., in response to user-activation of a notification notifying the user). In some examples, the user interface for user entry of value to add to the stored-value account (e.g., as illustrated in FIG. 11C) is displayed to notify the user that the stored-value account does not have sufficient funds for travel from the transit station to the expected destination.

At block 1204, while displaying the representation of the stored-value account, the electronic device detects, via the one or more input devices, activation of the add-value option (e.g., 1146B) (e.g., an add-value affordance). In accordance with some embodiments, the electronic device displays (e.g., in response to detecting activation of the add-value option (e.g., 1146B)), on the display, a user interface for user entry of value to add (e.g., to fund) to the stored-value account using the payment account (such as illustrated in FIG. 11C), wherein the user interface for user entry of value to add concurrently includes a virtual numeric keypad (e.g., 1150), one or more suggested amounts (e.g., 1150A, 1150B, 1150C) (e.g., $10, $25, $50 above the keypad), and the current balance of the stored-value account (e.g., 1142B). In accordance with some embodiments, the electronic device receives input at the virtual numeric keypad (e.g., 1150) of an amount for adding value to (e.g., funding) the stored-value account using the payment account, and, in response to receiving the input at the virtual numeric keypad (e.g., 1150), updates display of the one or more suggested amounts (e.g., 1150A, 1150B, 1150C) based on the input received at the virtual numeric keypad. For example, the user enters a 2 and the suggested amounts change from $10, 25, and $50 (as in FIG. 11C) to $2, $20, and $200 (as in FIG. 11D), respectively. In some examples, in response to receiving the input at the numeric keypad, the electronic device updates display of the current amount to indicate a projected balance, should the entered value be added to the available balance of the stored-value account (e.g., add the amount to be added to the current balance). In some examples, in accordance with receiving the input at the numeric keypad and receiving an indication that input at the numeric keypad is complete (e.g., activation of the fund-account option 1142D), the electronic device displays the proposed transaction to add funds to the stored-value account from the payment account.

In accordance with some embodiments, the received input at the virtual numeric keypad (e.g., 1150) corresponds to an amount exceeding a maximum permissible amount for adding value to the stored-value account using the payment account, and updating display of the one or more suggested amounts (e.g., 1150A, 1150B, 1150C) based on the input received at the virtual numeric keypad (e.g., 1150) includes updating display of one of the one or more suggested amounts (e.g., 1150A, 1150B, 1150C) to reflect the maximum permissible amount. For example, if the maximum amount is 250 (e.g., dollars) and the user enters a value of 300, one of the suggested amounts is updated to be 250. Thus, by detecting that the maximum amount has been exceeded and providing access to the maximum amount, the electronic device provides the user with a quick option to add the maximum permissible amount without having prior knowledge of the maximum permissible amount. In some examples, in addition to (or instead of) reflecting the maximum permissible amount, the one of the one or more suggested amounts is updated to reflect an indication that it is the maximum (e.g., updated to indicate "Maximum").

In accordance with some embodiments, at least one of the one or more suggested amounts (e.g., 1150A, 1150B, 1150C) is based on a previous amount used (e.g., in a previous transaction) for adding value to (e.g., funding) the stored-value account using the payment account. In some examples, at least one of the one or more suggested amounts are based on one or more of: previous activities funding the stored-value account, previous payment activities using the stored-value account, previous transit trips conducted using the stored-value account, and an expected future transit trip. Thus, by providing the user with suggested amounts based on previous amount, the electronic device provides the user with relevant suggestions for amounts for adding value to the account, thereby reducing the number of user inputs required, which improves the efficiency of operation of the device.

In accordance with some embodiments, at least one of the one or more suggested amounts (e.g., 1150A, 1150B, 1150C) is based on a current day of the current month. For example, if the user typically adds the maximum permissible amount to the stored-value account at the beginning of each month (or for the several previous months), then one of the one or more suggested amounts reflects the maximum permissible amount when it is the beginning of the month. This provides the user with relevant suggestions for amounts for adding value to the account. Similarly, if the current day of the month is on or near a day of the month on which a transit pass is due to be purchased, one of the suggested amounts is optionally an amount equal to the cost of the transit pass. Thus, by providing the user with suggested amounts based on the current day, the electronic device provides the user with relevant suggestions for amounts for adding value to the account, thereby reducing the number of user inputs required, which improves the efficiency of operation of the device.

In accordance with some embodiments, the user interface for user entry of value to add (e.g., fund) to the stored-value account using the payment account further concurrently includes a graphical depiction (e.g., 1142A) of a card corresponding to the stored-value account, the received input at the virtual numeric keypad (e.g., 1150) corresponds to an amount exceeding a maximum permissible amount for adding value to the stored-value account using the payment account, and, in response to receiving the input at the virtual numeric keypad (e.g., 1150), the electronic device animates the graphical depiction (e.g., 1142A) of the card corresponding to the stored-value account to shake (e.g., from side-to-side) for a period of time. Thus, in some examples, the electronic device informs the user that the amount received as input exceeds the maximum permissible amount. In some examples, the graphical depiction of the card shaking for a period of time is similar to an animation that is used at the device to indicate that a password or passcode has been input incorrectly.

In accordance with some embodiments, the electronic device receives user input of a selected amount (e.g., 1142C) (e.g., the amount for adding value to (e.g., funding) the stored-value account, a suggested amount of the one or more suggested amounts) to add value to (e.g., fund) the stored-value account, and, in response to receiving user input of the selected amount (e.g., 1142C) (and, e.g., prior to receiving authentication information at the electronic device), the electronic device (e.g., 100) displays, on the display, a user interface (e.g., 1152) (e.g., of an electronic wallet application different from a add-value application, wherein the representation of the stored-value account is displayed in the add-value application) requesting (e.g., from the user) authentication (e.g., biometric authentication, fingerprint authentication, passcode authentication). In some examples, the user interface requesting authentication also includes the proposed transaction to add funds to the stored-value account from the payment account.

At block 1206, the electronic device detects, via the one or more input devices, activation of a fund-account option (e.g., 1142D) (e.g., a fund-account affordance) to add value to the stored-value account using the payment account of the electronic wallet application.

At block 1208, while displaying a proposed transaction to add funds to the stored-value account from the payment account, at block 1212, the electronic device receives (e.g., using a fingerprint reader of the electronic device, using the one or more input devices) authentication information (e.g., fingerprint authorization, passcode authorization, double-press of a mechanical button of the electronic device) at the electronic device.

In accordance with some embodiments, at block 1210, prior to receiving the authentication information, the electronic device displays and/or generates (e.g., visual, audio, and/or haptic output generated by the device) a prompt (e.g., 1152F) (e.g., to the user) to provide authorization to add value to the stored-value account from the payment account. Thus, the electronic device informs the user that authorization is required and, in some examples, prompts the user what information (e.g., passcode, fingerprint) to provide to authorize the transaction.

At block 1214, in response to receiving the authentication information and, at block 1216, in accordance with a determination that the authentication information is consistent with enrolled authentication information for performing payment transactions using the payment account, at block 1218, the electronic device adds value to (e.g., funds) the stored-value account using the payment account. In some examples, the electronic device includes a secure element, and wherein adding value to the stored-value account using the payment account includes storing, in the secure element of the electronic device, information for accessing the stored value of the stored-value account. In some examples, when value is added to the stored-value account, information for retrieving the value from the stored-value account is stored in the secure element of the electronic device to ensure that the stored value is not accessible in the absence of a properly processed payment transaction that retrieves the information from the secure element. By checking for valid authentication, the operability of the device is enhanced by providing additional security for funding the stored-value account, which helps to prevent unauthorized transactions.

In accordance with some embodiments, subsequent to adding value to (e.g., funding) the stored-value account using the payment account, the electronic device updates display of the current balance (e.g., 1142B) of the stored-value account to reflect the value added to the stored-value account (e.g., 1154B). Thus, the electronic device informs the user as to the updated current balance of the stored-value account. This helps the user make informed decisions about use of the stored-value account (e.g., to use the account for payment in a subsequent transaction, to add additional value to the stored-value account). Thus, the electronic device, by informs the user as to the updated current balance of the stored-value account, informs the user of the current balance available, thereby prompting the user to add additional funds, if desired.

In accordance with some embodiments, at block 1220, in accordance with a determination that the authentication information is not consistent with enrolled authentication information for performing payment transactions using the payment account, at block 1222, the electronic device forgoes adding value to (e.g., forgoes funding) the stored-value account using the payment account. Thus, the electronic device provides additional security by not funding the stored-value account when the authentication information is not consistent with enrolled authentication information. By checking for valid authentication, the operability of the device is enhanced by providing additional security for funding the stored-value account, which helps to prevent unauthorized transactions.

In accordance with some embodiments, adding value to (e.g., funding) the stored-value account using the payment account is part of recurring transactions to add value to the stored-value account using the payment account. For example, prior to receiving authorization to add value to the stored-value card, the electronic device receives activation of an option to cause the value to be added to the stored-value card on a recurring (e.g., monthly, weekly, daily) basis. Thus, the user can schedule recurring funding for the stored-value account.

In accordance with some embodiments, the electronic device detects that a current balance of the stored-value account is below a minimum balance (e.g., a user-defined minimum balance) notification level, and, in response to detecting that the current balance of the stored-value account is below the minimum balance notification level, displays and/or generates (e.g., visual, audio, and/or haptic output generated by the device) a notification (e.g., on the display of the electronic device) that the current balance of the stored-value account is below the minimum balance notification level. Thus, in some examples, the electronic device notifies the user when the funds available in the stored-value account falls below the minimum balance notification level.

In accordance with some embodiments, the electronic device receives user input activating the notification, and, in response to receiving the user input activating the notification, displays, on the display, the user interface for user entry of value to add (e.g., funding) to the stored-value account using the payment account. Optionally, the electronic device provides the user with the option to switch between payment accounts for adding value to the stored-value account.

Note that details of the processes described above with respect to method 1200 (e.g., FIGS. 12A-12B) are also applicable in an analogous manner to the methods described above and below. For example, methods 800, 1000, 1400, 1600, 1800, and 2000 optionally include one or more of the characteristics of the various methods described above with reference to method 1200. For example, the user interface of FIG. 7A may correspond to the user interfaces of FIGS. 9A and 15B. For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

FIGS. 13A-13N illustrate exemplary user interfaces for transferring credentials of a stored-value account to a terminal using an electronic device (e.g., 100) with a display, one or more short-range communication radios (e.g., NFC radios), and an electronic wallet application that includes a stored-value account (e.g., a stored value transit account, a stored-value gift card), in accordance with some embodiments. The user interfaces in these figures are used to illustrate the processes described below, including the processes in FIGS. 14A-14B.

In some embodiments, the stored-value account provisioned on the electronic device 100 is a stored-value transit account. The stored-value account provisioned on the electronic device 100 can be used to make a payment at a contactless transaction terminal that is external to the electronic device. The electronic device 100 communicates with the contactless transaction terminal using the one or more short-range communication radios (e.g., NFC radios) on the electronic device. In some examples, the stored-value transit account stores a transit plan (or transit pass) information. In some examples, the transit plan is a monthly or weekly transit plan. In some examples, the stored-value transit account stores electronic cash. Thus, in some examples, the electronic device 100 provides the user with details about the stored-value account as it pertains to a transit system. Further, in some examples, the electronic device 100 provides the user with access to the transit system using the stored-value account.

Figure 13B:
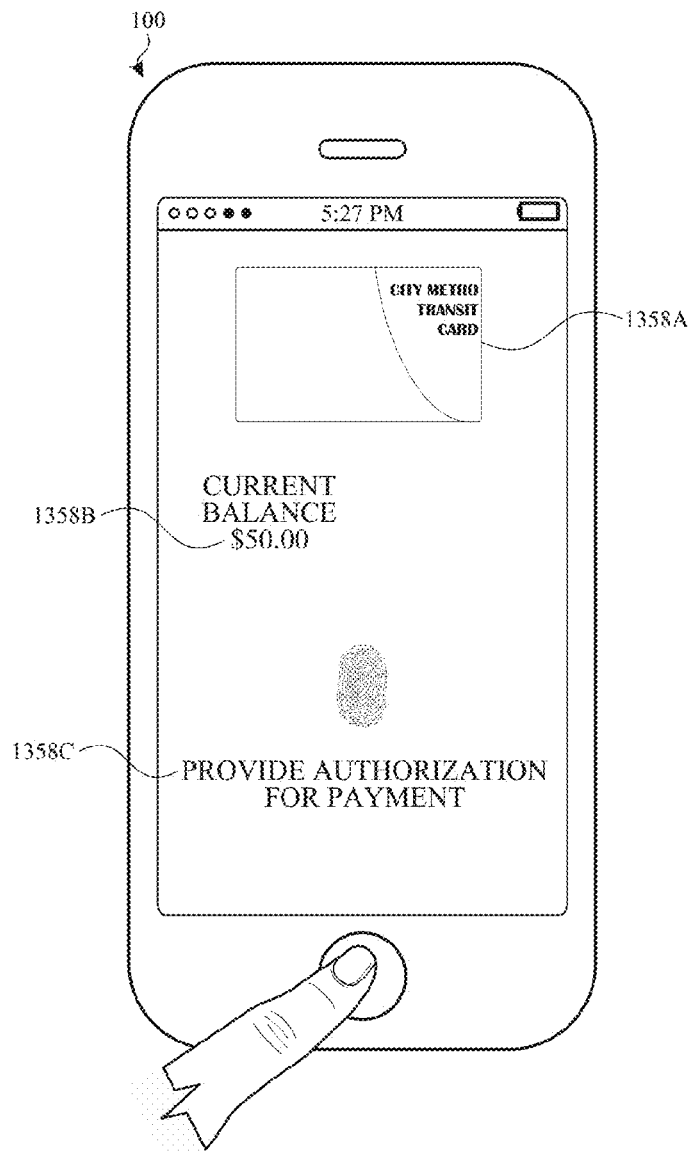

As illustrated in FIG. 13A-13B, the electronic device 100 displays, on the display of the electronic device, an indication (e.g., 1358B) of an available credit of the stored-value account. In some examples, the available credit of the stored-value account is a stored value (e.g., funds) that is physically stored on the electronic device 100 in the form of binary-coded data. In some examples, the available credit is a commuter plan (e.g., a transit plan) that is physically stored on the electronic device 100 in the form of binary-coded data. In some embodiments, as illustrated in FIG. 13A, the electronic device 100 concurrently displays, on the display of the electronic device, a graphical depiction (e.g., 1358A) of the stored-value account with an indication (e.g., 1358B) of the available credit. Thus, the user can quickly and easily identify the stored-value account to which the available credit corresponds. This is particularly helpful to the user when the electronic device includes multiple accounts (e.g., in an electronic wallet application of the electronic device).

In some embodiments, the electronic device 100 requests authentication (e.g., biometric authentication, fingerprint authentication, passcode authentication) to transfer credentials of the stored-value account to the contactless transaction terminal. In some examples, the electronic device requests the authentication prior to transferring credentials of the stored-value account to the contactless transaction terminal and prior to replacing display of the indication (e.g., 1358B) of the available credit with display of an indication of the transaction corresponding to the transfer of credentials to the contactless transaction terminal. In some examples, transferring the credentials of the stored-value account corresponds to transferring the stored-value funds out of the stored-value account. In some examples, transferring the credentials of the stored-value account corresponds to transmitting an account number of the stored-value account to the contactless communication terminal. In some embodiments, the electronic device 100 requests authentication to transfer the credentials of the stored-value account to the contactless transaction terminal by presenting an indication (e.g., 1358C) requesting the authentication to transfer the credentials of the stored-value account to the contactless transaction terminal, as illustrated by FIG. 13A. In some examples, the indication requesting the authentication is part of information displayed on the display of the electronic device 100. In some examples, the indication requesting the authentication is audio played at a speaker of the electronic device 100. In some examples, the indication requesting the authentication is a haptic vibration caused at the electronic device 100.

In some embodiments, subsequent to requesting authentication, the electronic device 100 receives authentication information (e.g., detects a fingerprint or detects input of a passcode) from the user. For example, if the indication (e.g., 1358C) requesting authentication requests for a biometric (e.g., fingerprint) authentication, as illustrated in FIG. 13A, the user can provide the requested biometric authentication by touching a fingerprint reader of the electronic device 100 to provide the user's biometric information, as illustrated in FIG. 13B. Thus, in this example, the electronic device receives authentication information that is based on biometric information. In some embodiments, the electronic device 100 transfers (e.g., using NFC, via one or more radios of the electronic device) the credentials of the stored-value account to the contactless transaction terminal in accordance with a determination that the received authentication information is consistent with enrolled authentication information (e.g., enrolled biometric information, an enrolled fingerprint, an enrolled passcode) that is enabled to authorize transactions.

In some embodiments, in accordance with a determination that the authentication information is not consistent with enrolled authentication information that is enabled to authorize transactions, the electronic device 100 forgoes transferring (e.g., foregoes transmitting via NFC) the credentials of the stored-value account to the contactless transaction terminal. Thus, in some examples, the electronic device 100 provides additional security for transferring credentials of the stored-value account to the contactless transaction terminal by checking for authorization prior to allowing the transfer.

Figure 13C:
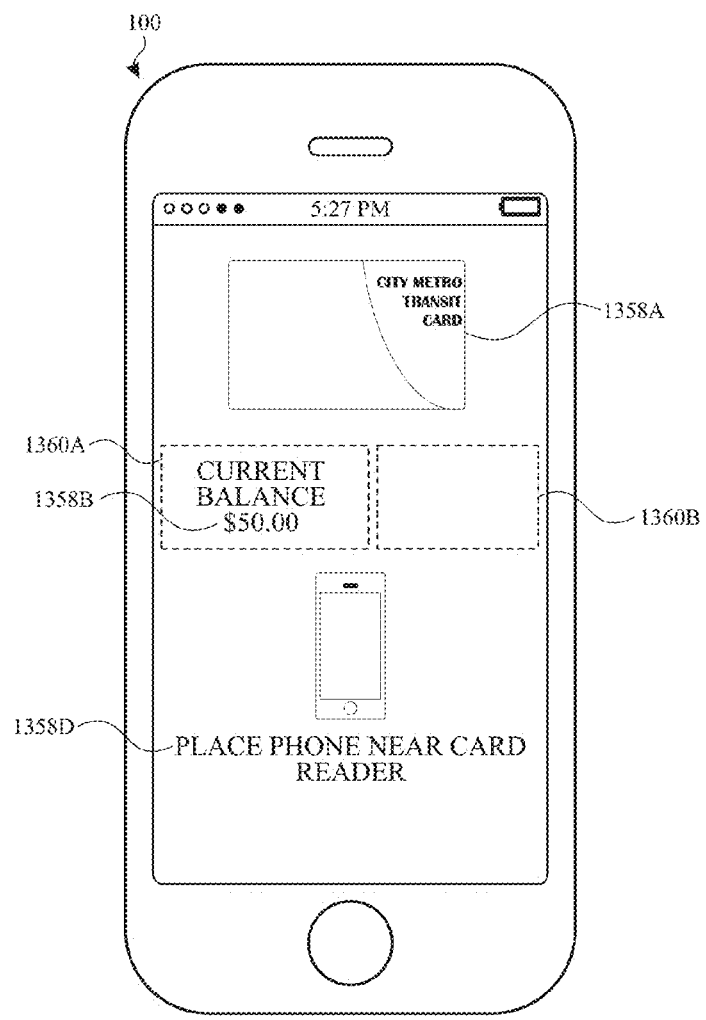

In some embodiments, as illustrated in FIG. 13C, in accordance with a determination that the authentication information is consistent with enrolled authentication information that is enabled to authorize transactions, the electronic device 100 concurrently displays, on the display of the electronic device, the graphical depiction (e.g., 1358A) of the stored-value account with the indication (e.g., 1358B) of the available credit (e.g., available funds) and an indication (e.g., 1358D) requesting the user to proceed with a transaction by placing the electronic device near a contactless transaction terminal. Thus, the user is made aware that the authentication was successful, and that the electronic device 100 is ready to be used in a transaction with a contactless transaction terminal. In some embodiments, the electronic device 100 displays the indication (e.g., 1358B) of the available credit at a first location (e.g., 1360A) of the display. In some embodiments, the electronic device 100 does not display the indication of the available credit (or any indication of amount) at a second location (e.g., 1360B) of the display.

Figure 13D:
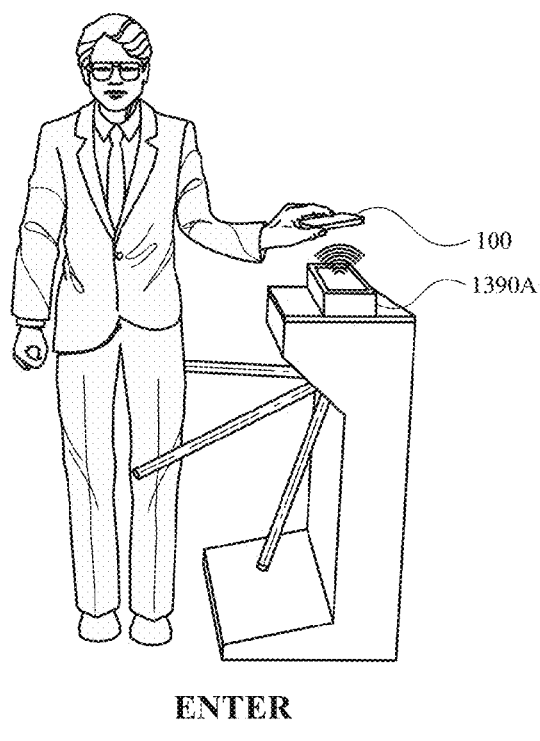

As illustrated in FIG. 13D, when the user places the electronic device 100 near a contactless transaction terminal (e.g., 1390A) that is separate from the electronic device (e.g., places the electronic device into a field of the contactless transaction terminal 1390A), the electronic device transfers (e.g., transmits), using the one or more short-range communication radios (e.g., NFC radios), the credentials of the stored-value account to the contactless transaction terminal. In some examples, transferring the credentials of the stored-value account corresponds to transferring the stored-value funds out of the stored-value account. In some examples, transferring the credentials of the stored-value account corresponds to transmitting an account number of the stored-value account to the contactless communication terminal.

In some embodiments, determining that the transaction has been performed with the contactless transaction terminal (e.g., 1390A) using the credentials of the stored-value account includes detecting that the available credit of the stored-value account has changed. Thus, in some examples, the electronic device 100 detects the transaction by monitoring the available credit (e.g., the available funds) of the stored-value account (e.g., the available funds of the stored-value account have been reduced). In some examples, determining that the transaction has been performed using the credentials of the stored-value account includes detecting that a transit pass credential has been transmitted (e.g., to the contactless transaction terminal 1390A).

Based on a transaction being performed with the contactless transaction terminal (e.g., 1390A) using the credentials of the stored-value account that has been transferred to the contactless transaction terminal using the one or more short-range communication radios, the electronic device 100 replaces the display of the indication (e.g., 1358B) of the available credit with display of an indication of the transaction corresponding to the transfer of credentials to the contactless transaction terminal. For example, the transaction corresponding to the transfer of credentials to the contactless transaction terminal is a commuter plan used. For another example, the transaction corresponding to the transfer of credentials to the contactless transaction terminal is a cost of the most recent transaction. For another example, the transaction corresponding to the transfer of credentials to the contactless transaction terminal is a trip in progress indication.

Figure 13E:
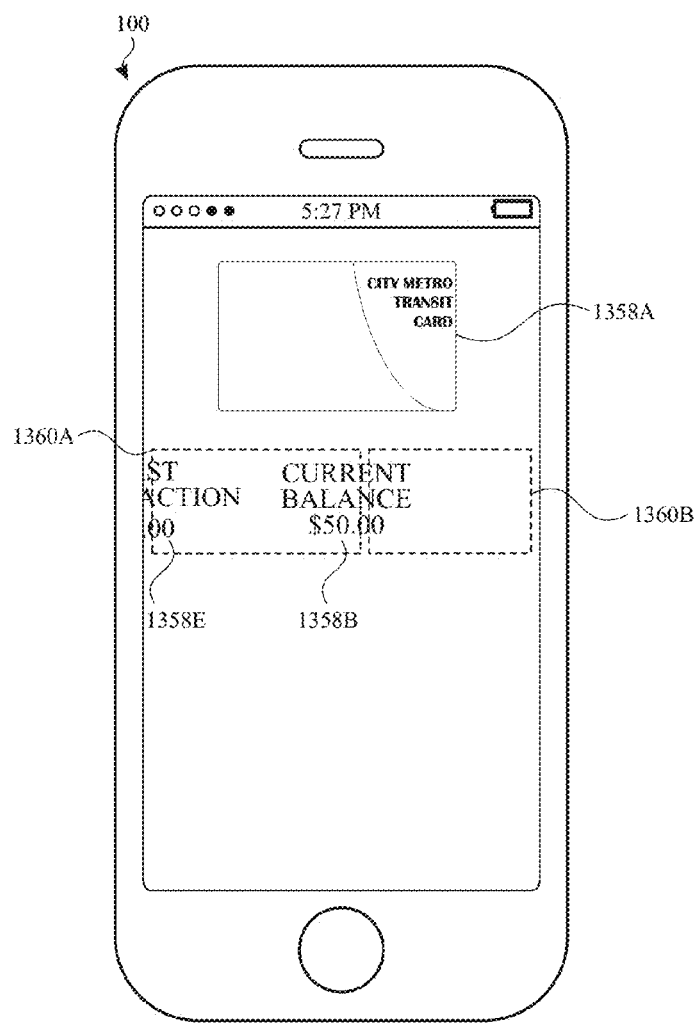
Figure 13F:
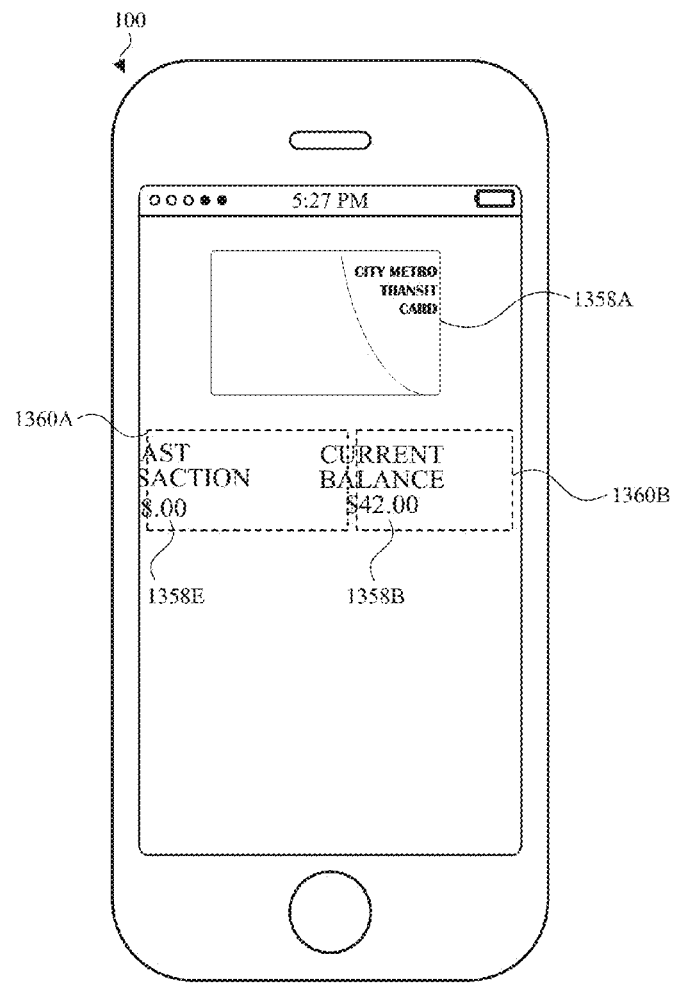
Figure 13G:
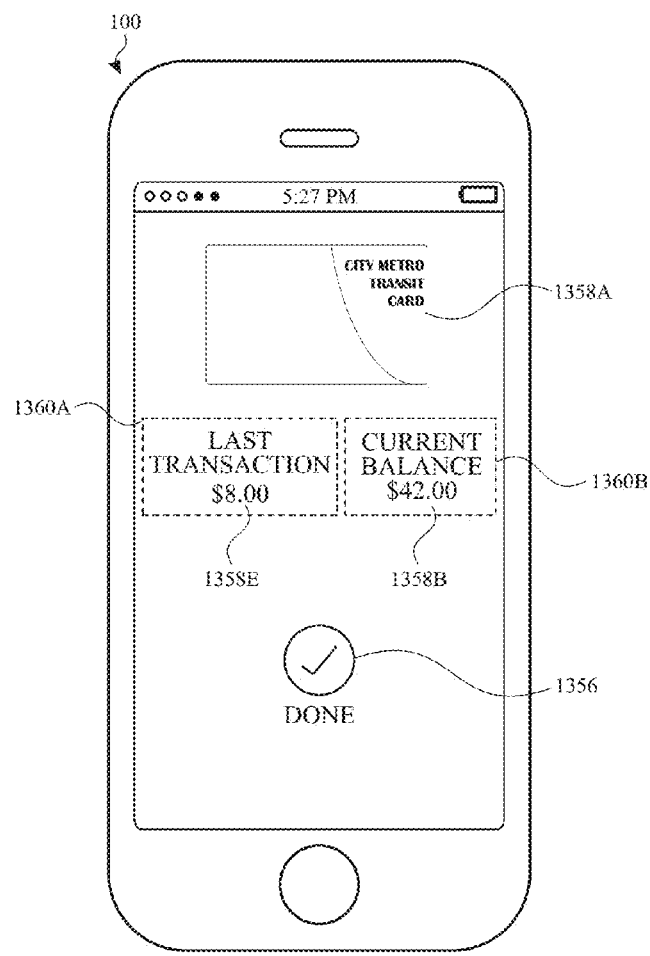

FIGS. 13E-13G illustrate exemplary user interfaces of the electronic device 100 replacing display of the indication (e.g., 1358B) of the available credit (e.g., available funds) with display of an indication (e.g., 1358E) of the transaction corresponding to the transfer of credentials to the contactless transaction terminal (e.g., 1390A). In some embodiments, prior to transfer of credentials to the contactless transaction terminal, the indication (e.g., 1358B) of the available credit (e.g., a stored value or a commuter plan) of the stored-value account is displayed at the first location (e.g., 1360A) of the display of the electronic device 100 (as illustrated in FIG. 13C). In some embodiments, as illustrated by FIG. 13G, the electronic device 100 replaces the display of the indication (e.g., 1358B) of the available credit at the first location (e.g., 1360A) of the display of the electronic device with display of an indication (e.g., 1358E) of the transaction corresponding to the transfer of credentials to the contactless transaction terminal (e.g., 1390A) and displays the indication (e.g., 1358B) of the available credit at the second location (e.g., 1360B) of the display. By replacing the indication (e.g., 1358B) of the available credit with the indication (e.g., 1358E) of the transaction at the first location (e.g., 1360A) of the display, the electronic device 100 informs the user that a transaction was performed with the contactless transaction terminal using the credentials of the stored-value account. Further, in some embodiments, such as the embodiment illustrated in FIGS. 13E-13G, the electronic device 100 concurrently displays, on the display of the electronic device, the graphical depiction (e.g., 1358A) of the stored-value account with the indication (e.g., 1358B) of the available credit and an indication (e.g., 1358E) of the transaction corresponding to the transfer of credentials. This allows the user to quickly and easily identify the stored-value account to which the available credit corresponds. This is particularly helpful to the user when the electronic device 100 includes multiple accounts, for example within an electronic wallet application of the electronic device.

In some embodiments, replacing the display of the indication (e.g., 1358B) of the available credit with the display of the indication (e.g., 1358E) of the transaction corresponding to the transfer of credentials to the contactless transaction terminal (e.g., 1390A) at the first location (e.g., 1360A) of the display of the electronic device 100 is in response to detecting that the available credit of the stored-value account has changed. Thus, the electronic device 100 informs the user of the transaction after detecting that the available credit of the stored-value account has changed.

In some embodiments, as illustrated in FIGS. 13E-13G, the electronic device 100 replaces the display of the indication (e.g., 1358B) of the available credit with the display of the indication (e.g., 1358E) of the transaction corresponding to the transfer of credentials to the contactless transaction terminal (e.g., 1390) at the first location (e.g., 1360A) of the display by, concurrently: sliding (e.g., via a direct linear path) in a first direction (e.g., horizontally to the right, horizontally to the left), on the display of the electronic device, the indication (e.g., 1358B) of the available credit from the first location (e.g., 1360A) to the second location (e.g., 1360B) that is different from the first location, and sliding (e.g., via a direct linear path) in the first direction (e.g., to the right, to the left), onto the display of the electronic device (e.g., from off of the display to onto the display), the indication (e.g., 1358E) of the transaction to the first location (e.g., 1360A). By sliding the indication (e.g., 1358B) of the available credit and the indication (e.g., 1358E) of the transaction, the electronic device 100 indicates to the user that a transaction has been performed with the contactless transaction terminal (e.g., 1390A) using the credentials of the stored-value account. Further, in some examples, the user can look to the same location on the display of the electronic device 100 for pertinent information. For example, the indication (e.g., 1358B) of the available credit is displayed at a location and, subsequently, the indication of the available credit slides over to create space for display of the indication (e.g., 1358E) of the transaction at the same location.

In some embodiments, as illustrated in FIG. 13G, after transferring the credentials of the stored-value account to the contactless transaction terminal (e.g., 1390A), the electronic device 100 concurrently displays, on the display of the electronic device, the indication (e.g., 1358B) of the available credit, the indication (e.g., 1358E) of the transaction corresponding to the transfer of credentials to the contactless transaction terminal, and an indication (e.g., 1356, "Complete," "Payment Completed!") that the transfer of credentials of the stored-value account to the contactless transaction terminal is complete. Thus, the electronic device 100 simultaneously informs the user of the available credit (e.g., available funds) on the account, the indication of the transaction (e.g., the amount paid or transferred for the transaction), and that the transaction is complete. In some examples, the indication (e.g., 1358B) of the available credit is presented at the second location (e.g., 1360B) of the display. In some examples, the indication (e.g., 1358E) of the transaction corresponding to the transfer of credentials to the contactless transaction terminal (e.g., 1390A) is displayed at the first location (e.g., 1360A) of the display. In some examples, the indication (e.g., 1358E) of the transaction corresponding to the transfer of credentials to the contactless transaction terminal (e.g., 1390A) includes an amount (e.g., "$8.00") corresponding to the transfer of credentials.

In some embodiments, as also illustrated in FIGS. 13F-13G, the electronic device 100 updates the indication (e.g., 1358B) of the available credit (e.g., available funds) to reflect the available credit on the stored-value account after the transfer of credentials (e.g., changes from $50.00 to $42.00). In some embodiments, the electronic device 100 updates the indication (e.g., 1358B) of the available credit while replacing the display of the indication (e.g., 1358B) of the available credit with the display of the indication (e.g., 1358E) of the transaction, such as described with reference to FIGS. 13E-13G). In some examples, the non-updated available credit transforms into the updated available credit. In some examples, the non-updated available credit fades out and the updated available credit fades in. In some examples, the non-updated credit is updated in a slot-machine-like fashion using simulated mechanical reels that spin and stop to reveal the updated available credit. Thus, the electronic device 100 informs the user as to the updated available credit of the stored-value account.

Figure 13H:
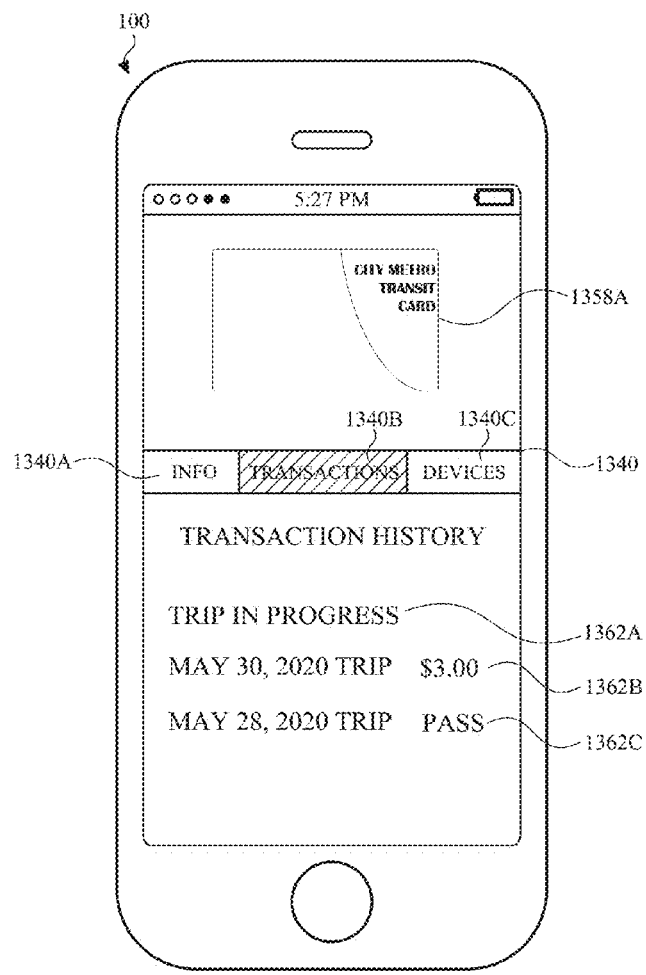
Figure 13I:
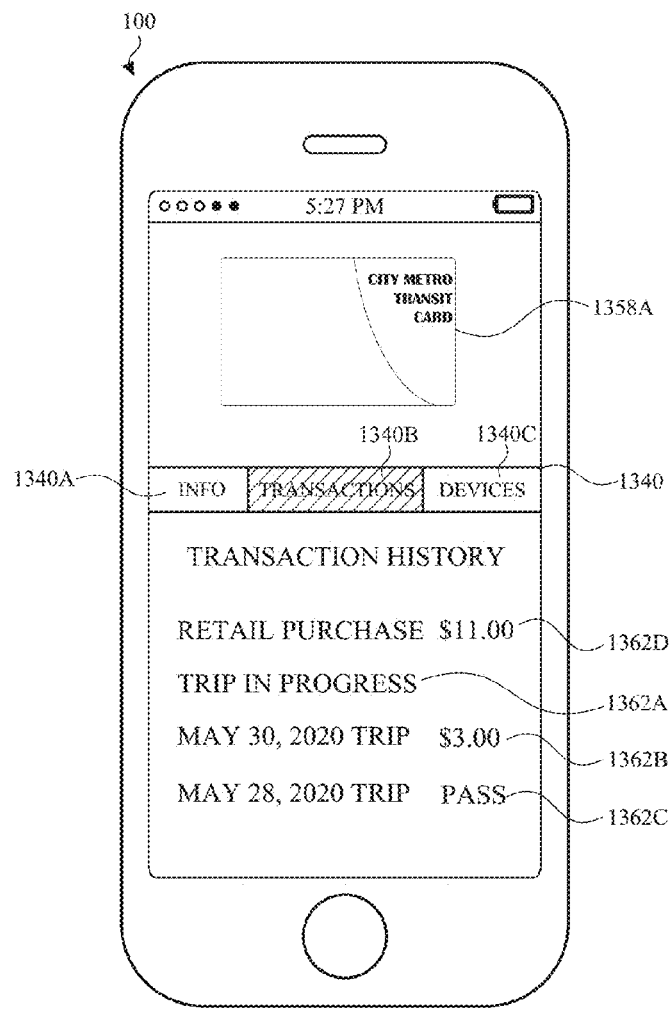

FIGS. 13H-13I illustrate, in accordance with some embodiments, a user interface displaying a representation of a history of transactions performed using the stored-value account on the electronic device 100. In some embodiments, subsequent to transferring the credentials of the stored-value account to the contactless transaction terminal (e.g., 1390A), the electronic device 100 displays a representation of a history of transactions performed using the stored-value account on the electronic device 100, as illustrated in FIG. 13H. In some embodiments, the representation of the history of transactions includes a menu (e.g., 1340) that includes a plurality of selectable affordances (e.g., 1340A, 1340B, 1340C). In some examples, the menu (e.g., 1340) includes an information affordance (e.g., 1340A). In some examples, the menu (e.g., 1340) includes a transactions affordance (e.g., 1340B). In some examples, the menu (e.g., 1340) includes a devices affordance (e.g., 1340C).

In some embodiments (e.g., when the transactions affordance 1340B is selected, as illustrated in FIG. 13H), the representation of the history of transactions displays one or more representations of transit trips (e.g., 1362A, 1362B, 1362C). In some examples, the electronic devices 100 displays an indication (e.g., 1362B) of the transaction corresponding to the transfer of credentials of a first trip of the one or more of transit trips (e.g., 1362A, 1362B, 1362C). In some examples, the electronic device 100 also concurrently displays a description (e.g., travel from zone 2 to zone 3) corresponding to the transfer of credentials of the first trip. In some examples, the electronic device 100 concurrently displays indications of transactions and descriptions of trips corresponding to a plurality of transit trips. In some examples, the electronic device 100 displays the history of transit trips in response to receiving user input requesting display of the history of transit trips. Thus, in some examples, the electronic device 100 provides a historical view of transactions to the user.

In some embodiments, the displayed representation of the history of transactions (e.g., of the stored-value account) includes one or more representations of transit trips (e.g., 1362A, 1362B, 1362C) indicated as being covered by a transit plan or a transit pass (e.g., 1362C). In some examples, the displayed history of transit trips (e.g., 1362A, 1362B, 1362C) also includes one or more representations of transit trips not indicated as being covered by the transit plan or transit pass (e.g., 1362B), such as transit trips where a cost is calculated on a per-trip basis rather than being included in a monthly or weekly transit plan. Thus, in some examples, the electronic device 100 provides a historical view of transactions covered by the transit plan to the user, enabling the user to differentiate amongst transit trips covered and not covered by the transit plan.

In some embodiments, the displayed representation of the history of transactions (e.g., of the stored-value account) includes one or more representations of transit trips (e.g., 1362A, 1362B, 1362C) that are in progress and the one or more representations of transit trips that are in progress are indicated (e.g., 1362A) as being in progress. For example, an in-progress transit trip is an en-route trip for which the value of the trip will not be computed until the user reaches the destination and exits the transit system at the destination (e.g., "tags off" the transit system). Thus, in some examples, the electronic device 100 provides the user with a view of the transactions that are currently in progress.

In some embodiments, the indication (e.g., 1362A) of the transit trip that is in progress is at the top of the list (e.g., 1362A, 1362B, 1362C) of the history of transactions (e.g., of the stored-value account). In some embodiments, subsequent to displaying the list (e.g., 1362A, 1362B, 1362C) of the history of transactions including the indication (e.g., 1362A) of transit trip that is in progress at the top of the list of the history of transactions, the electronic device 100 transfers, using the one or more short-range communication radios, the credentials of the stored-value account to a second contactless transaction terminal for a non-transit transaction. For example, the electronic device 100 transfers stored-value funds out of the stored-value account or transmits an account number of the stored-value account to the second contactless transaction terminal for the non-transit transaction. Then, in some embodiments, as illustrated in FIG. 13I, the electronic device 100 moves (e.g., shifts down) the display of the indication (e.g., 1362A) of transit trip that is in progress in the list (e.g., 1362A, 1362B, 1362C) of the history of transactions (e.g., of the stored-value account) and displays an indication (e.g., 1362D) of the non-transit transaction at a location previously occupied by the indication (e.g., 1362A) of the transit trip that is in progress. Thus, for example, the electronic device 100 displays the indication (e.g., 1362D) of the non-transit transaction at the top of the list (e.g., 1362A, 1362B, 1362C) of the history of transactions, as illustrated in FIG. 13I.

Figure 13J:
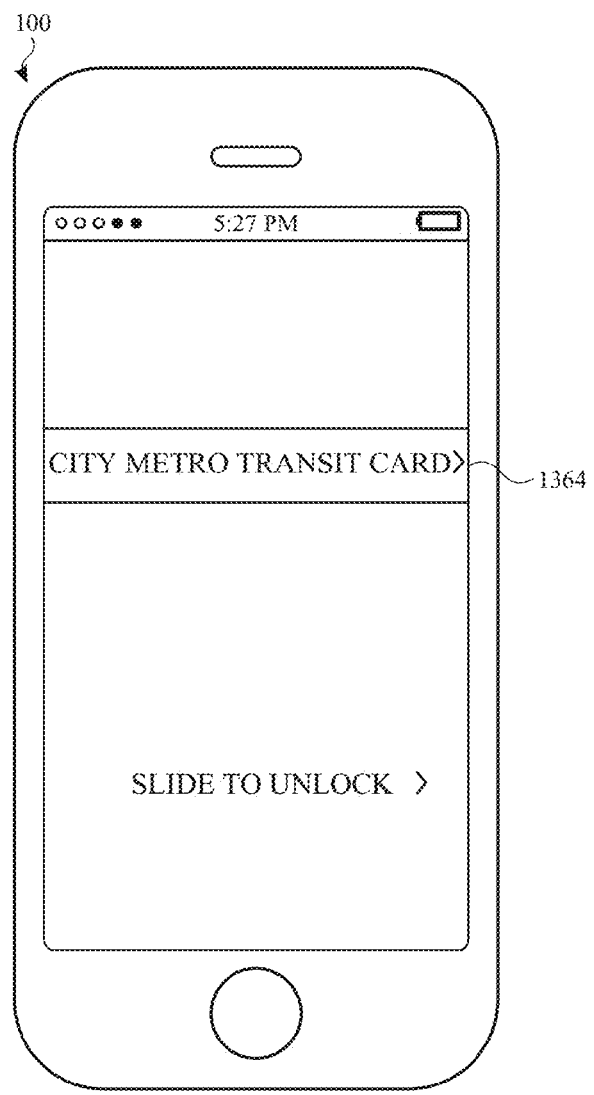
Figure 13K:
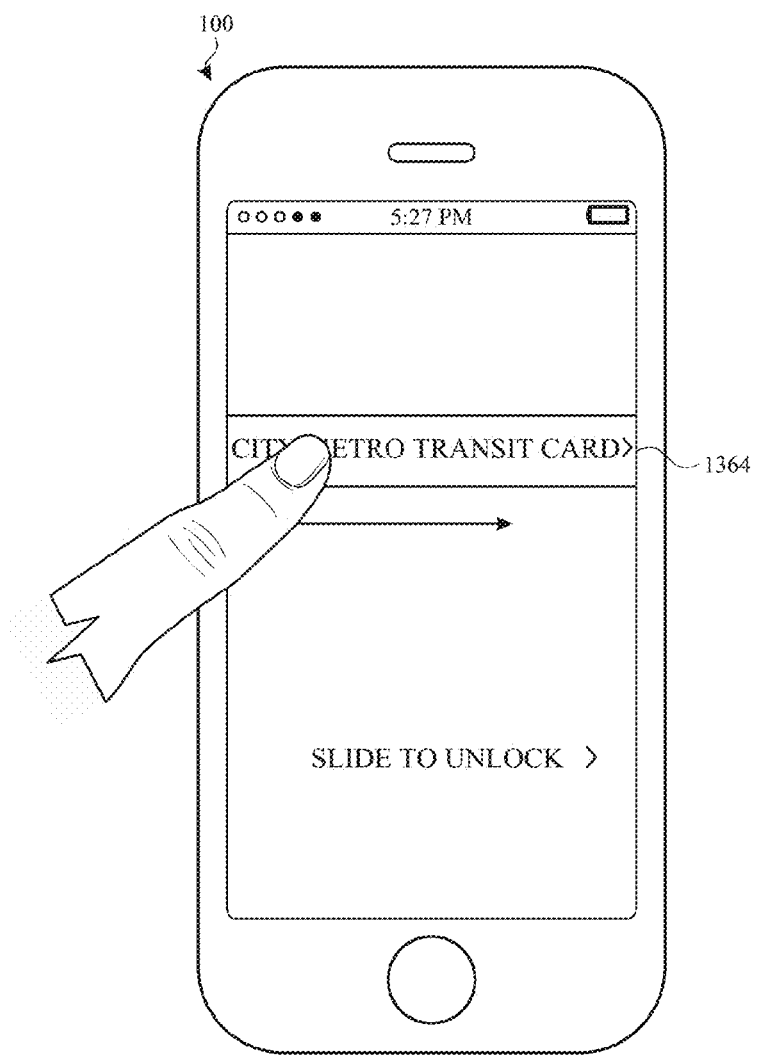

FIGS. 13J-13K illustrate, in accordance with some embodiments, exemplary user interfaces for displaying a stored-value account (such as a stored value account that is a transit account), on a lock screen of the electronic device 100 while the electronic device is "tagged on" (e.g., the stored-value account is entered into and in use a transit system, but has not yet been used to exit the transit system (e.g., the trip is in progress)). In some embodiments, in accordance with transferring the credentials of the stored-value account to a contactless transaction terminal (e.g., 1390A) of a transit system (e.g., the electronic device 100 is "tagging on" in the transit system), the stored-value account is marked by the electronic device as being in a tagged on state for an in-progress transit trip. In some embodiments, in accordance with the stored-value account being in use in a transit system (e.g., tagged on in the transit system) and in accordance with the electronic device 100 being in a locked state, the electronic device displays, on the lock screen on the display of the electronic device (e.g., as illustrated in FIG. 13J), an indication (e.g., 1364) of the stored-value account (or of the in-progress trip associated with the stored-value account). In some examples, in accordance with the stored-value account not being tagged on (e.g., after the stored-value account is tagged off) and in accordance with the electronic device 100 being in a locked state, the electronic device forgoes displaying, on the lock screen on the display of the electronic device, the indication (e.g., 1364) of the stored-value account.

In some embodiments, as illustrated in FIG. 13K, the user can access the stored-value account on the electronic device 100 by activating (e.g., by selecting, by swiping in a certain direction) the indication (e.g., 1364) of the stored-value account (or of the in-progress trip associated with the stored-value account) displayed on the lock screen of the electronic device. Thus, the electronic device 100 provides the user with quick access to the stored-value account when the electronic device is in a locked state. In some embodiments, other items from the electronic wallet application of the electronic device 100 are displayed on the lock screen of the electronic device when the other items are contextually relevant. For example, a stored-value account that is a transit account is determined to be contextually relevant when the user has used the transit account to tag on to a transit system.

Figure 13L:
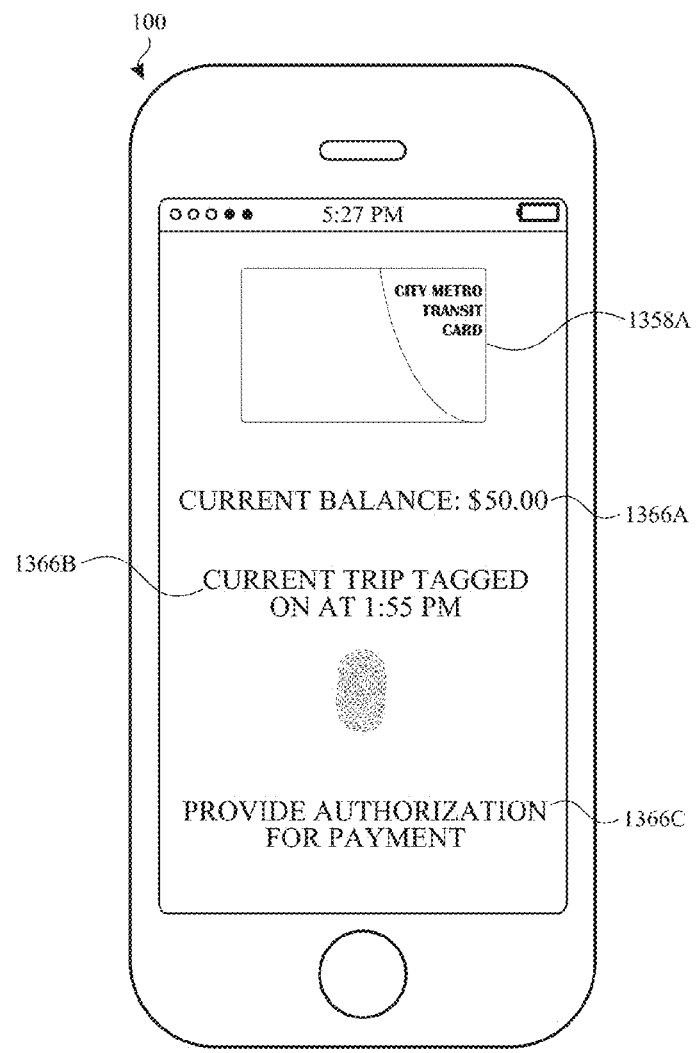

In some embodiments, as illustrated in FIG. 13L, in response to detecting activation of the indication (e.g., 1364) of the stored-value account illustrated in FIGS. 13J-13K, the electronic device 100 displays a virtual boarding pass. In some embodiments, the virtual boarding pass is displayed as part of the electronic wallet application of the electronic device 100. In some embodiments, the virtual boarding pass includes one or more details about the in-progress transit trip associated with the stored-value account. In some examples, the one or more details about the in-progress transit trip include a graphical depiction (e.g., 1358A) of the stored-value account used for the in-progress transit. In some examples, the one or more details about the in-progress transit trip include an indication (e.g., 1366A) of the available credit of the stored-value account used for the in-progress transit. In some examples, the one or more details about the in-progress transit trip include an indication (e.g., 1366) of the time at which the stored-value account used for the in-progress transit was tagged on to the transit system.

Figure 13M:
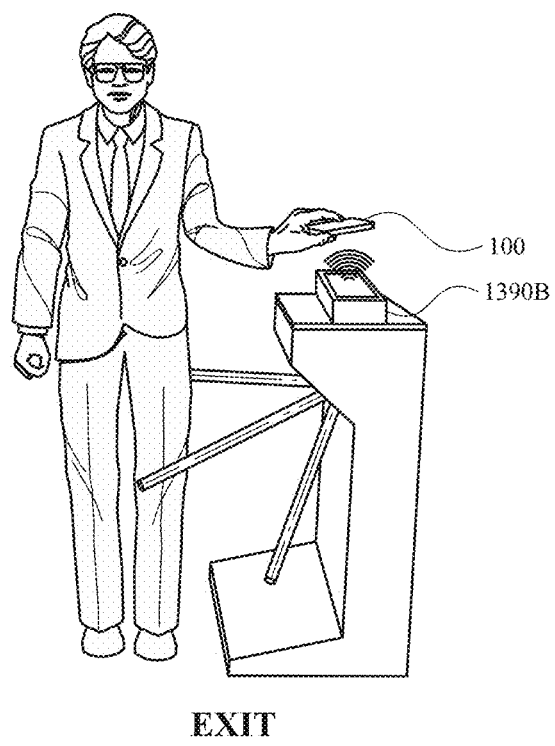

In some embodiments, the one or more details about the in-progress transit trip include a request (e.g., 1366C) for authentication (e.g., biometric authentication, fingerprint authentication, passcode authentication) to obtain authorization for payment when the electronic device 100 is "tagged off" the transit system. In some embodiments, to tag off the transit system (e.g., to end the in-progress transit trip), the electronic device 100 transfers (e.g., transmits), using the one or more short-range communication radios (e.g., NFC radios), credentials of the stored-value account to a third contactless transaction terminal (e.g., 1390B) for the transit trip, as illustrated in FIG. 13M. In some embodiments, the virtual boarding pass is deleted once the stored-value account is "tagged off," which indicates that the transit trip has been completed (e.g., the transit trip is no longer in progress). In some embodiments, the virtual boarding pass is identified as inactive, complete, or expired once the stored-value account is "tagged off," which indicates that the transit trip has been completed (e.g., the transit trip is no longer in progress). Thus, the electronic device 100 provides the user with quick access to the stored-value account (e.g., by detecting activation of the indication 1364 of the stored-value account) when the electronic device is in a locked state.

In some embodiments, the electronic device receives a request to display a device-status user interface (e.g., a lock screen, a notification center, a control center, or other status user interface). In response to receiving the request to display the device-status user interface, displaying the device-status user interface, including: in accordance with a determination that the device is using the stored-value account for an in-progress transit trip (e.g., based on having entered a transit system using the transit account and not exited the transit system, or having recently purchased a ticket on the transit system), displaying information about the use of the transit account for the in-progress transit trip in the device-status user interface; and in accordance with a determination that the device is not using the stored value account for an in-progress transit trip, displaying the device-status user interface without displaying information about the transit account for a transit trip.

In some embodiments, in response to detecting activation of the indication (e.g., 1364) of the stored-value account, the electronic device 100 displays a card detail view of the stored-value account that includes information about recent transactions for which the stored-value account was used, as illustrated in FIG. 13N and as described with reference to FIGS. 13H-13I. In some embodiments, the card detail view of the stored-value account is displayed after the electronic device has been "tagged off" the transit system (e.g., as illustrated in FIG. 13M).

In some embodiments, as illustrated in FIG. 13N, in response to transferring the credentials of the stored-value account to the third contactless transaction terminal (e.g., 1390B) for the transit trip that is in progress (e.g., in response to making a final payment for the transit trip), the electronic device 100 moves (e.g., shifting down) the display of the indication (e.g. 1362D) of the non-transit transaction to accommodate moving the display of the indication (e.g., 1362A) of the transit trip that was in progress to the top of the list (e.g., 1362A-1362D) of the history of transactions. In some examples, the display of the indication (e.g., 1362A) of the transit trip that was in progress is updated to reflect the cost of the completed trip. Thus, in some examples, the electronic device 100 provides the user with a historical view of transactions displayed chronologically, enabling the user to more easily view and understand how the stored-value account has been used in previous transactions.

FIGS. 14A-14B are a flow diagram illustrating methods transferring credentials of a stored-value account to a terminal, in accordance with some embodiments. Method 1400 is performed at an electronic device (e.g., 100, 300, 500) with a display, one or more short-ranged communication radios, and an electronic wallet application. Some operations in method 1400 are, optionally, combined, the order of some operations is, optionally, changed, and some operations are, optionally, omitted.

As described below, method 1400 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

At block 1402, the electronic device displays, on the display, an indication (e.g., 1358B) of an available credit (e.g., a stored value or commuter plan) of the stored-value account (e.g., the funds and or data are physically stored on the electronic device, in the form of binary-coded data.).

In accordance with some embodiments, the stored-value account is a stored-value transit account. In some examples, information for retrieving the value from the stored-value account is stored in the secure element of the electronic device to ensure that the stored value is not accessible in the absence of a properly processed payment transaction that retrieves the information from the secure element. In some examples, the stored-value transit account stores transit plan (or transit pass) information. In some examples, the transit plan is a monthly or weekly transit plan. In some examples, the stored-value transit account stores electronic cash. Thus, in some examples, the electronic device can provide the user with details about the stored-value account as it pertains to a transit system. In addition, in some examples, the electronic device provides the user with access to the transit system using the stored-value account.

At block 1412, the electronic device transfers, using the one or more short-range communication radios, credentials (e.g., transfer of stored-value funds out of the stored-value account; transmitting an account number of the stored-value account) of the stored-value account to a contactless transaction terminal (e.g., 1390A) that is separate from the electronic device. Alternatively, or in addition, the electronic device detects a transaction. In some examples, the electronic device includes a secure element, and wherein transferring credentials of the stored-value account to the contactless transaction terminal includes releasing, from the secure element of the electronic device, information for accessing the credentials of the stored-value account. For example, the electronic device determines that the balance of the stored-value account has changed (e.g., has decreased). In some examples, using the stored-value account to participate in a transaction includes releasing information (e.g., transaction information, payment information) from a secure element of the electronic device.

In accordance with some embodiments, in response to transferring the credentials of the stored-value account to the contactless transaction terminal (e.g., 1390A) (and/or in response to detecting the transaction), the electronic device concurrently displays, on the display: the indication (e.g., 1358B) of the available credit, the indication (e.g., 1358E) of the transaction corresponding to the transfer of credentials to the contactless transaction terminal (e.g., 1390A), and an indication (e.g., 1356) (e.g., "Payment completed!") that the transfer of credentials of the stored-value account to the contactless transaction terminal (e.g., 1390A) is complete. Thus, the electronic device simultaneously informs the user of the available credit on the account, the indication of the transaction (e.g., amount paid/transferred for the transaction), and that the transaction is complete. Thus, the electronic device, by concurrently displaying the indication of the available credit and the indication of the transaction, informs the user that the electronic device has automatically detected a transaction.

In accordance with some embodiments, a determination that the transaction was performed using the credentials of the stored-value account includes detecting that the available credit of the stored-value account has changed. Thus, in some examples, the electronic device detects the transaction by monitoring the available credit of the stored-value account. In some examples, a determination that the transaction was performed using the credentials of the stored-value account includes detecting that a transit pass credential was transmitted (e.g., to the contactless transaction terminal).

In accordance with some embodiments, the electronic device receives a request to display a device-status user interface (e.g., a lock screen, a notification center, a control center, or other status user interface). In response to receiving the request to display the device-status user interface, displaying the device-status user interface, including: in accordance with a determination that the device is using the stored-value account for an in-progress transit trip (e.g., based on having entered a transit system using the transit account and not exited the transit system, or having recently purchased a ticket on the transit system), displaying information about the use of the transit account for the in-progress transit trip in the device-status user interface; and in accordance with a determination that the device is not using the stored value account for an in-progress transit trip, displaying the device-status user interface without displaying information about the transit account for a transit trip. Thus, the electronic device communicates the state of the device (e.g., whether or not a transit account is currently in use for a transit trip) to the user by displaying information about the transit account for an in-progress transit trip.

In accordance with some embodiments, while using (e.g., in use in a transit system, such as when the stored-value account has been used to enter a transit system but has not yet been used to exit the transit system) the stored-value account (e.g., marks the stored-value account as in the tagged on state) for an in progress transit trip in accordance with transferring the credentials of the stored-value account to the contactless transaction terminal (e.g., 1390A), and, in accordance with the stored-value account being in use in a transit system (e.g., when the stored-value account has been used to enter a transit system but has not yet been used to exit the transit system) and in accordance with the electronic device being in a locked state, the electronic device displays, on a lock screen of the display, an indication (e.g., 1364) of the stored-value account (or of the in progress trip associated with the stored-value account). In some examples, in accordance with the stored-value account not being tagged on (e.g., after the stored-value account is tagged off) and in accordance with the electronic device being in a locked state, the electronic device forgoes displaying, on the lock screen of the display, the indication of the stored-value account. Thus, the electronic device provides the user with quick access to the stored-value account (e.g., through detecting activation of the indication of the stored-value account) when the electronic device is locked. In some embodiments, other items from the wallet application are displayed on the lock screen when they are contextually relevant, and the transit card is determined to be contextually relevant when the user has used the card.

In accordance with some embodiments, the electronic device detects activation of the indication (e.g., 1364) of the stored-value account, and, in response to detecting activation of the indication (e.g., 1364) of the stored-value account, displays a card detail view for the stored-value account that includes information about recent transactions (e.g., 1364A-1362D) for which the stored-value account was used (and, optionally information about the transit trip and/or a value balance in the stored-value account).

In accordance with some embodiments, the electronic device detects activation of the indication (e.g., 1364) of the stored-value account, and, in response to detecting activation of the indication (e.g., 1364) of the stored-value account, displays a virtual boarding pass (e.g., in an electronic wallet application of the electronic device), the virtual boarding pass including one or more details (e.g., 1366A, 1366B) about the in progress transit trip associated with the stored-value account. In some examples, the virtual boarding pass is deleted once the stored-value account is tagged off, which indicates that the transit trip is completed (e.g., is no longer in progress). Thus, the electronic device provides the user with quick access to the stored-value account (e.g., through detecting activation of the indication of the stored-value account) when the electronic device is locked.

At block 1414, the electronic device replaces (e.g., in response to transferring the credentials), based on a transaction performed with the contactless transaction terminal (e.g., 1390A) using the credentials of the stored-value account that were transferred to the contactless transaction terminal using the one or more short-range communication radios, display of the indication (e.g., 1358B) of the available credit with display of an indication (e.g., 1358E) of the transaction corresponding to the transfer of credentials to the contactless transaction terminal (e.g., commuter plan used, cost of last transaction, trip in progress indication). The electronic device indicates to the user that the transaction has been performed by automatically replacing display of the indication of the available credit with display of the indication of the transaction when a transaction is performed and without requiring further user input.

In accordance with some embodiments, at block 1402, displaying, on the display, the indication (e.g., 1358B) of the available credit (e.g., a stored value or commuter plan) of the stored-value account includes, at block 1404, displaying, at a first location (e.g., 1360A) on the display, the indication (e.g., 1358B) of the available credit (e.g., a stored value or commuter plan) of the stored-value account. In accordance with some embodiments, at block 1414, replacing display of the indication (e.g., 1358B) of the available credit with display of the indication (e.g., 1358E) of the transaction corresponding to the transfer of credentials to the contactless transaction terminal (e.g., 1390A) includes, at block 1416, displaying, at a second location (e.g., 1360B) on the display, the indication (e.g., 1358B) of the available credit, wherein the second location is different from the first location (e.g., 1360A), and, at block 1418, displaying, at the first location (e.g., 1360A) on the display, the indication (e.g., 1358E) of the transaction corresponding to the transfer of credentials to the contactless transaction terminal (e.g., 1390A). Thus, by replacing the indication of the available credit with the indication of the transaction, the electronic device informs the user that a transaction was performed with the contactless transaction terminal using the credentials of the stored-value account.

In accordance with some embodiments, at block 1414, replacing display of the indication (e.g., 1358B) of the available credit with display of the indication (e.g., 13658E) of the transaction corresponding to the transfer of credentials to the contactless transaction terminal (e.g., 1390A) includes, at block 1420, concurrently, at block 1422, sliding (e.g., via a direct linear path) in a first direction (e.g., horizontally to the right, horizontally to the left), on the display, the indication (e.g., 1358B) of the available credit from a first location (e.g., 1360A) to a second location (e.g., 1360B) that is different from the first location, and, at block 1424, sliding (e.g., via a direct linear path) in the first direction (e.g., to the right, to the left), onto the display (e.g., from off of the display to onto the display), the indication (e.g., 1358E) of the transaction corresponding to the transfer of credentials to the contactless transaction terminal (e.g., 1390A). Thus, by sliding the indication of the available credit and the indication of the transaction, the electronic device indicates to the user that a transaction was performed with the contactless transaction terminal using the credentials of the stored-value account. Further, in some examples, the user can look to the same location on the display for pertinent information. For example, the available credit is displayed at a location and then the available credit slides over to create space for display of the indication of the transaction at the same location (e.g., because after a transaction the indication of the transaction is more relevant than the available credit).

In accordance with some embodiments, replacing display of the indication (e.g., 1358B) of the available credit with display of the indication (e.g., 1358E) of the transaction corresponding to the transfer of credentials to the contactless transaction terminal (e.g., 1390A) is in response to detecting that the available credit of the stored-value account has changed.

In accordance with some embodiments, the electronic device updates (e.g., while replacing display of the indication of the available credit with display of the indication of the transaction) the indication (e.g., 1358B) of the available credit to reflect the transfer of credentials. In some examples, the non-updated available credit morphs into the updated available credit. In some examples, the non-updated available credit fades out and the updated available credit fades in. In some examples, the non-updated credit is updated in a slot-machine-like fashion using simulated mechanical reels that spin and stop to reveal the updated available credit. Thus, the electronic device informs the user as to the updated available credit of the account.

In accordance with some embodiments, prior to transferring, at block 1412, using the one or more short-range communication radios, credentials (e.g., transfer of stored-value funds out of the stored-value account; transmitting an account number of the stored-value account) of the stored-value account to the contactless transaction terminal and prior to replacing, at block 1414, display of the indication (e.g., 1358B) of the available credit with display of the indication (e.g., 1358E) of the transaction corresponding to the transfer of credentials, the electronic device, at block 1406, presents an indication (e.g., display a notification on a display of the electronic device, playing audio at a speaker of the electronic device, causing a haptic output at the electronic device) requesting authentication (e.g., biometric authentication, fingerprint authentication, passcode authentication) to transfer credentials of the stored-value account to the contactless transaction terminal (e.g., 1390A) and, at block 1408, receives (e.g., responsive to the request for authentication) authentication information (e.g., detecting a fingerprint, detecting input of a passcode), wherein, at block 1410, transferring (e.g., using near-field communications, using NFC) credentials of the stored-value account to the contactless transaction terminal (e.g., 1390A) is in accordance with a determination that the authentication information is consistent with enrolled authentication information (e.g., enrolled biometric information, an enrolled fingerprint, an enrolled passcode) that is enabled to authorize transactions.

In some embodiments, in accordance with a determination that the authentication information is not consistent with enrolled authentication information that is enabled to authorize transactions, the electronic device forgoes transferring the credentials of the stored-value account to the contactless transaction terminal. Thus, in some examples, the electronic device provides additional security for transferring credentials of the stored-value account to the contactless transaction terminal by checking for authorization prior to the transfer. Thus, the operability of the electronic device is enhanced by providing added security to help prevent unauthorized use of funds by checking for valid authentication prior to transferring credentials to the transaction terminal.

In accordance with some embodiments, the electronic device concurrently displays, on the display, a graphical depiction (e.g., 1358A) of the stored-value account with the indication (e.g., 1358B) of the available credit and the indication (e.g., 1358E) of the transaction corresponding to the transfer of credentials. Thus, the user can quickly and easily identify the stored-value account to which the available credit corresponds. This is particularly helpful to the user when the electronic device includes multiple accounts (e.g., in an electronic wallet application of the electronic device).

In accordance with some embodiments, subsequent to transferring, using the one or more short-range communication radios, credentials (e.g., transfer of stored-value funds out of the stored-value account; transmitting an account number of the stored-value account) of the stored-value account to the contactless transaction terminal (e.g., 1390A), the electronic device displays, on the display, a history of transactions, the history of transactions including one or more (or a plurality of) representations of transit trips (e.g., 1362A, 1362B, 1362C). In some examples, the electronic device displays an indication of the transaction corresponding to the transfer of credentials of a first trip of the one or more (or a plurality) transit trips. In some examples, the electronic device also concurrently displays a description (e.g., travel from zone 2 to zone 3) corresponding to the transfer of credentials of the first trip. In some examples, the electronic device concurrently displays indications of transactions and descriptions of trips corresponding to a plurality of transit trips. In some examples, the electronic device displays the history of transit trips in response to receiving user input requesting display of the history of transit trips. Thus, in some examples, the electronic device provides a historical view of transactions to the user.

In accordance with some embodiments, the displayed history of transactions (e.g., of the stored-value account) includes one or more representations of transit trips indicated as being covered by a transit plan (or transit pass) (e.g., 1362C). In some examples, the displayed history of transit trips also includes one or more representations of transit trips not indicated as being covered by the transit plan (or transit pass), such as transit trips where a cost is calculated on a per-trip basis rather than being included in a monthly or weekly transit plan. Thus, in some examples, the electronic device provides a historical view of transactions covered by the transit plan to the user, enabling the user to differentiate among representations of transit trips covered and not covered by the transit plan.

In accordance with some embodiments, the displayed history of transactions (e.g., of the stored-value account) includes one or more representations of transit trips that are in progress and the one or more representations of transit trips that are in progress include a displayed status indication that indicates that the one or more transit trips are in progress (e.g., 1362A) (e.g., en-route trips whose value will not be computed until the user reaches their destination and tags off). Thus, in some examples, the electronic device provides the user with a view of transactions that are in progress.

In accordance with some embodiments, an indication (e.g., 1362A) of a transit trip that is in progress is at the top of a list of the history of transactions (e.g., of the stored-value account), and, subsequent to displaying the history of transactions (e.g., of the stored-value account) including the indication (e.g., 1362A) of transit trip that is in progress at the top of the list of the history of transactions, the electronic device transfers, using the one or more short-range communication radios, credentials (e.g., transfer of stored-value funds out of the stored-value account; transmitting an account number of the stored-value account) of the stored-value account to a second contactless transaction terminal for a non-transit transaction. In accordance with some embodiments, the electronic device moves (e.g., shifting down) the display of the indication (e.g., 1362A) of transit trip that is in progress in the list of the history of transactions (e.g., of the stored-value account) and displays an indication (e.g., 1362D) of the non-transit transaction at a location previously occupied by the indication of the transit trip that is in progress (e.g., displaying the non-transit transaction at the top of the list of the history of transactions). In accordance with some embodiments, the electronic device transfers, using the one or more short-range communication radios, credentials (e.g., transfer of stored-value funds out of the stored-value account; transmitting an account number of the stored-value account) of the stored-value account to a third contactless transaction terminal (e.g., 1390B) for the transit trip that is in progress (e.g., to tag off) to end the trip. In accordance with some embodiments, in response to transferring credentials of the stored-value account to the third contactless transaction terminal (e.g., 1390B) for the transit trip that is in progress (e.g., making a final payment for the transit trip), the electronic device moves (e.g., shifting down) the display of the indication (e.g., 1362D) of the non-transit transaction to accommodate moving the display of the indication (e.g., 1362A) of the transit trip that was in progress to the top of the list of the history of transactions. In some examples, the display of the indication of transit trip that was in progress is also updated to reflect the cost of the completed trip. Thus, in some examples, the electronic device provides a historical view of transactions that are displayed chronologically, enabling the user to better understand how the stored-value account has previously been used.

Note that details of the processes described above with respect to method 1400 (e.g., FIGS. 14A-14B) are also applicable in an analogous manner to the methods described above and below. For example, methods 800, 1000, 1200, 1600, 1800, and 2000 optionally include one or more of the characteristics of the various methods described above with reference to method 1400. For example, the user interface of FIG. 7A may correspond to the user interfaces of FIGS. 9A and 15B. For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

FIGS. 15A-15M illustrate exemplary user interfaces for making an account available for use without checking authentication using an electronic device (e.g., 100) with one or more short-range communication radios (e.g., NFC radios) and an account information application that includes a first account (e.g., an express transit account), in accordance with some embodiments. The user interfaces in these figures are used to illustrate the processes described below, including the processes in FIGS. 16A-16B.

In accordance with some embodiments, a user particular accounts that can be used in transactions without checking authentication under certain circumstances. For example, a user can specify a particular transit account of an electronic device such that funds from the transit account are provided to a terminal when funds are requested, without the electronic device requiring the user to provide fingerprint authorization after the terminal requests the funds. This allows a user to use the electronic device to quickly participate in transaction (e.g., make payments, transmit information corresponding to the transit account), with fewer user inputs.

In some embodiments, the first account of the account information application of the electronic device 100 is a stored-value account. In some examples, the funds of the first account are physically stored on the electronic device 100 in the form of binary-coded data. In some examples, the first account is a closed-loop stored-value account. In some examples, the stored-value account stores electronic cash. Thus, for example, the electronic device 100 can transmit (e.g., to a transaction terminal) information (e.g., account number or funds) corresponding to the first account using NFC (and without using an IP network or Internet connection).

In some embodiments, the first account of the account information application of the electronic device 100 is an identification account. In some examples, the first account is a user identification account. In some examples, the first account is a personal identification account. In some examples, the first account is a government-issued personal identification account. In some examples, the first account is a government-issued driver's license account. In some examples, the first account is a government-issued passport account. In some examples, the first account is a company identification account or a school identification account. In some examples, the electronic device 100 is configured to store only a single identification account. In some examples, the electronic device 100 uses the first account to transmit identifying information of the identification account, rather than to transmit payment information.

In some embodiments, the first account of the account information application of the electronic device 100 is an express transit account. In some embodiments, the account information application includes a second account that is different from the first account. For example, the first account is an express transit account and the second account is not an express transit account. In some embodiments, the first account and the second account are of different account types. For example, the first type of request corresponds to the first account (or to the type of the first account) and the second type of request corresponds to the second account (or to the type of the second account). In some embodiments, the first account is designated as an express transit account and the second account is not designated as an express transit account. In some embodiments, the first account is a transit account and the second account is a payment account. In some embodiments, the first account is a stored-value account and the second account is not a stored-value account. In some embodiments, the first account and the second account are of the same account type. In some embodiments, the electronic device 100 is a personal electronic device of the user and is configured to provide access to private information specific to the user that is stored on the personal electronic device (e.g., and accessible by the account information application), the private information including information for authorizing transactions (such as payments) with a plurality of different accounts. In some examples, the multiple accounts enable the user to select between the accounts for various transactions.

FIG. 15A illustrates a user interface for a lock screen of the electronic device 100 with an indication (e.g., 1568) informing a user of an action that unlocks the electronic device, in accordance with some embodiments. In some embodiments, the electronic device 100 unlocks in response to detecting a gesture. In some embodiments, the electronic device 100 unlocks in response to receiving authentication information (e.g., fingerprint information detected by a fingerprint sensor, password received at a (virtual) keyboard) that corresponds to authentication information enabled to unlock the electronic device.

In some embodiments, in response to (or subsequent to) the user unlocking the electronic device 100 (e.g., by the electronic device detecting a slide input on a touch-sensitive surface of the device, such as on the lock screen of the electronic device, as illustrated in FIG. 15A), the electronic device displays a user interface with one or more affordances (e.g., 1502A-1502D, 1504) as illustrated in FIG. 15B. The one or more affordances (e.g., 1502A-1502D, 1504) include representations of one or more accounts (e.g., 1502A-1502B) of the account information application of the electronic device 100.

In some examples, the electronic device 100 displays an affordance (e.g., 1502A) that includes an indication of a previously provisioned account (e.g., a payment account). In this example, the affordance (e.g., 1502A) corresponds to an American Express account. In some examples, the electronic device 100 also displays an affordance (e.g., 1502B) that includes an indication of an additional previously provisioned account (e.g., another payment account). In this example, the affordance (e.g., 1502B) corresponds to a MasterCard account that is different from the American Express account. When the electronic device 100 detects activation of the affordance that includes an indication of a previously provisioned account (e.g., 1502A) or the affordance that includes an indication of an additional previously provisioned account (e.g., 1502B), for example by detecting a touch input on a touch-sensitive surface of the electronic device, at a location corresponding to a respective affordance, the electronic device displays information corresponding to the respective account. In some embodiments, the electronic device 100 displays an affordance (e.g., 1502C) for provisioning an account on the electronic device 100 (or for another device different from the electronic device 100).

In some embodiments, the electronic device 100 displays an affordance (e.g., 1502E) that includes an indication of an additional previously provisioned account that is a stored-value account. In some examples, the stored-value action is a transit account. In some embodiments, the electronic device 100 displays an affordance (e.g., 1502D), which, when activated, causes the electronic device to display a user interface for user-selection of an account to be made available for use without checking authentication, such as described with reference to FIGS. 15D-15F. Thus, the electronic device 100 enables the user to select a preferred account for use as an express transit account.

In some embodiments, the electronic device 100 displays a selection affordance (e.g., 1504) which provides the user with an option to turn off express transit cards. For example, by turning off express transit cards, no account provisioned on the electronic device 100 is designated as an express transit card. In some embodiments, the electronic device 100 receives user input indicating a desire not to have accounts be made available for use without checking authentication (e.g., by receiving user input selecting a "no account" option for use without checking authentication, by moving a selection affordance to the "OFF" position, as illustrated with respect to the selection affordance 1504). In response to receiving the user input indicating the desire not to have accounts be made available for use without checking authentication, the electronic device 100 designates an account of the virtual card (or all accounts of the electronic device 100) to not be made available for use without checking authentication. Thus, the electronic device 100 provides the user with the option to disable (or enable) an express transit mode (e.g., using the selection affordance 1504) by which funds are transmitted in particular transactions without requiring authentication. In some embodiments, when the express transit feature is enabled (e.g., by moving the selection affordance 1504 to the "ON" position), the electronic device 100 provides faster access to an account designated as an express transit account. In some embodiments, when the express transit feature is disabled (e.g., by moving the selection affordance 1504 to the "OFF" position), the electronic device 100 provides added security for accounts provisioned on the electronic device.

In some embodiments, as illustrated by FIG. 15C, the electronic device 100 detects input (e.g., from the user) activating the affordance (e.g., 1502D) which, when activated, causes the electronic device to display a user interface for user-selection of an account to be made available for use without checking authentication, as illustrated in and described with reference to FIGS. 15D-15F. In some embodiments, the user interface for user-selection of an account to be made available for use without checking authentication includes representations of a plurality of accounts stored by (or accessible by) the account information application, including one or more additional accounts that are not transit accounts (e.g., payment accounts, loyalty accounts), represented by user-selectable representations (e.g., 1570A-1570D) for each of the plurality of accounts. In some embodiments, the user interface for user-selection of an account to be made available for use without checking authentication also includes a user-selectable representation (e.g., 1570E) designating none of the plurality of accounts as selected by the user to be made available for use without checking authentication, as illustrated in FIG. 15D. In some embodiments, the first account is one of the plurality of transit accounts stored by (or accessible by) the account information application (e.g., represented by the user-selectable indication 1570C).

Figure 15E:
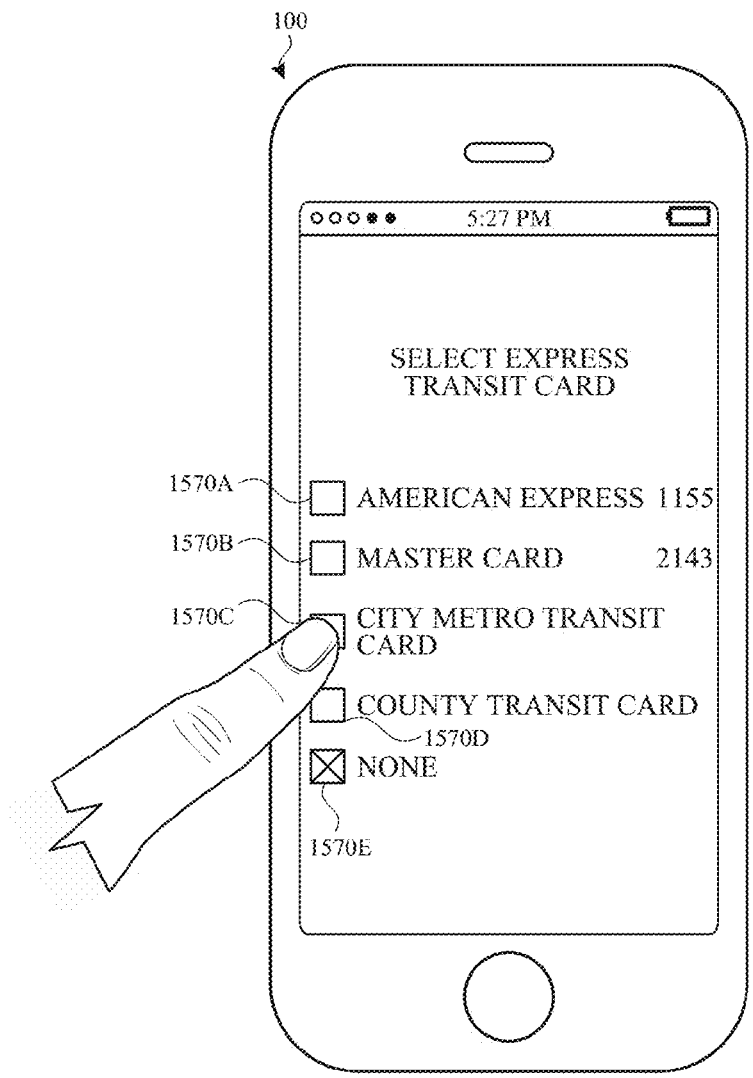

In some embodiments, as illustrated in FIG. 15E, prior to detecting, by the one or more short-range communication radios, a wireless signal (e.g., from a transaction terminal that indicates that information about a payment account is requested), the electronic device 100 receives user input on the representation (e.g., 1570C) of the first account to select the first account (e.g., from among the plurality of transit accounts) as an account to be made available for use without checking authentication. Thus, in some examples, the electronic device 100 receives a user selection of the representation (e.g., 1570C) of the first account to be an express transit account that can be used in transactions with contactless transaction terminals without checking for authentication (e.g., without checking for authentication after detecting a wireless signal from the contactless transaction terminal and prior to transmitting information to the contactless transaction terminal).

Figure 15F:
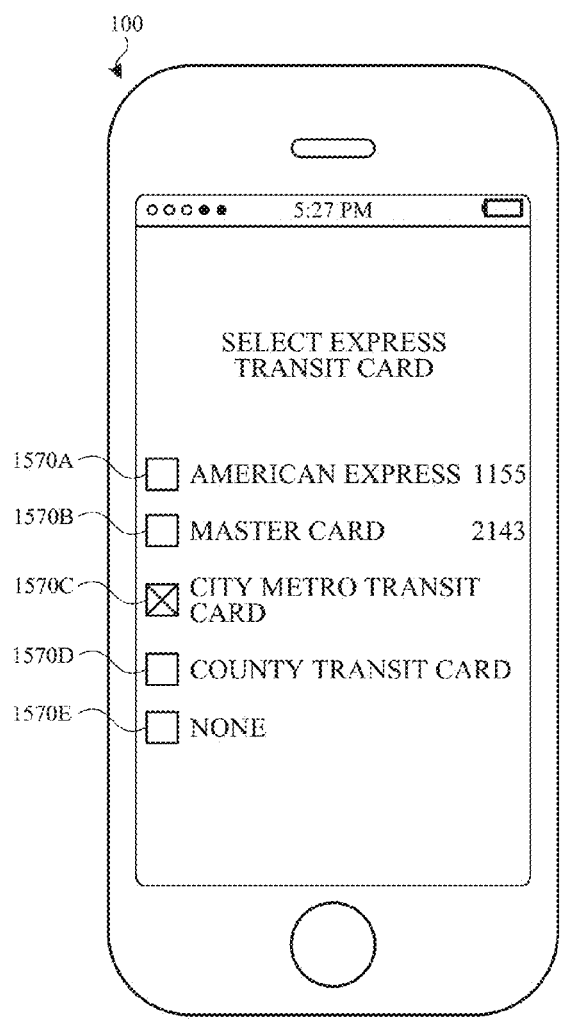

In some embodiments, as illustrated in FIG. 15F, in response to receiving the user input selecting the representation (e.g., 1570C) of the first account as an account to be made available for use without checking authentication, the electronic device 100 designates the first account to be made available for use without checking authentication. Thus, the electronic device 100 permits the user to specify which transit card should be designated as an express transit card, which can then be used without checking authentication when performing transactions in which a detected wireless signal corresponds to a first type of request, such as a request from a contactless transaction terminal or a request from for funds from a transit account. In some examples, only one card of the electronic device can be identified as an express transit card at a time. In some examples, multiple cards of the electronic device can be concurrently identified as express transit cards.

Figure 15G:
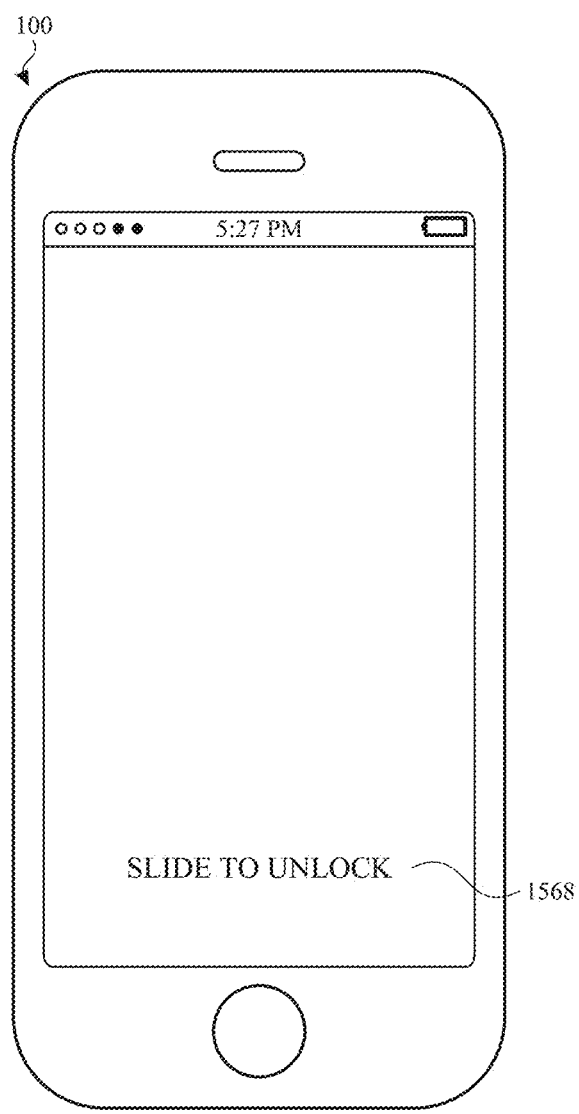

At FIG. 15G, the electronic device is in a locked state. Thus, some functions of the electronic device are inaccessible until the electronic device is unlocked.

Figure 15H:
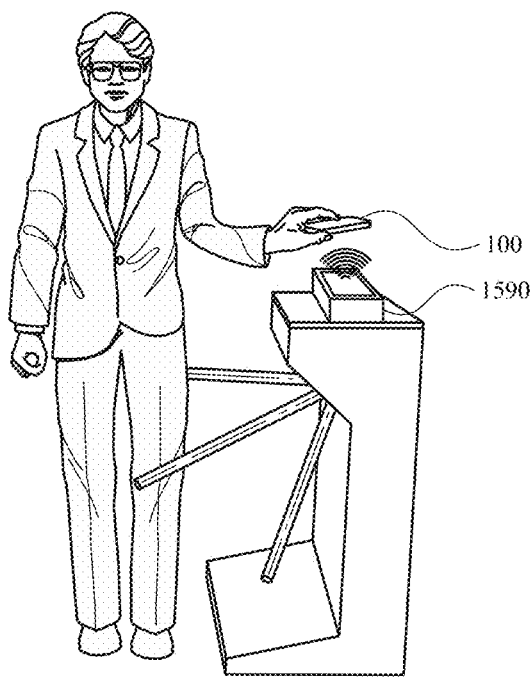

As illustrated in FIG. 15H, (and, for example, while remaining in the locked state), the electronic device 100 detects, by the one or more short-range communication radios, a wireless signal. In some embodiments, the wireless signal is received from a contactless transaction terminal (e.g., 1590) used to access (or depart) a transit system, such as described with reference to FIGS. 13D-13M. In some embodiments, the detected wireless signal requests information about a payment account from the electronic device 100. In some embodiments, the detected wireless signal is from a transaction terminal (e.g., 1590, a contactless transaction terminal that is separate from the electronic device 100).

In accordance with (or in response to) a determination (e.g., based on the content of the detected wireless signal) that the detected wireless signal (e.g., from transaction terminal 1590) corresponds to a first type of request (e.g., a request from a transaction terminal 1590, a request for funds from a transit account), the electronic device 100 transmits (e.g., to the transaction terminal) information (e.g., account number, funds) corresponding to the first account without checking authentication. Thus, in some examples, the electronic device 100 transmits (e.g., to the transaction terminal 1590) information corresponding to the first account without receiving authentication information from the user, such as fingerprint authentication or passcode authentication, subsequent to detecting the wireless signal, even while the electronic device remains in the locked state. In some examples, this allows the transmission of the information corresponding to the first account between the electronic device 100 to the transaction terminal (e.g., 1590) to occur more quickly and without requiring the user to unlock the device or provide authentication. In some embodiments, this first type of request may be referenced to as an "Express Transit" request.

In some embodiments, the first type of request (e.g., the "Express Transit" request) is a type of request for which transmission of account information has been pre-authorized (e.g., before detecting the wireless signal) to be made automatically available without authentication (e.g., without biometric or passcode authentication by the user). In some embodiments, transmitting the information (e.g., payment information, account number, funds) corresponding to the first account without checking for authentication includes transmitting the information corresponding to the first account without the electronic device requiring (or receiving) user input subsequent to detecting, by the one or more short-range communication radios of the electronic device 100, the wireless signal. In some embodiments, by not requiring user input subsequent to detecting the wireless signal, the electronic device 100 does not need to request, and thus does not receive, authentication information (e.g., fingerprint authentication or passcode authentication) from the user. In some embodiments, to not require user input subsequent to detecting the wireless signal, the electronic device 100 bypasses the authentication routines that are typically used for payment transactions. In some examples, this reduces the number of inputs required from the user and received by the electronic device, thereby speeding up the transaction process and reducing the power consumption of the electronic device.

In some embodiments, the information corresponding to the first account includes an account number (e.g., a unique account number) of the first account (e.g., a transit account, a stored-value transit account). In some examples, the electronic device 100 transmits the account number to a transaction terminal (e.g., at a first transit station) to allow the user to enter a transit boarding area (e.g., tag on to a transit system), for example as described with reference to FIG. 13D. In some examples, the electronic device 100 subsequently transmits the account number to a second transaction terminal (e.g., at a second transit station) to allow the user to exit a transit arrival area (e.g., tag off a transit system), for example as described with reference to FIG. 13M. Thus, the transit system can determine the entry and exit stations of the user and charge the first account in accordance with the transit price associated with the entry and exit transit stations (e.g., based on distance or number of stations traveled). In some examples, the electronic device 100 transmits funds (instead of the account number) to the second transaction terminal (e.g., at the second transit station) to allow the user to exit the transit arrival area (e.g., tag off the transit system). Thus, the transit system determines the entry and exit stations of the user and the electronic device 100 can perform a corresponding payment using the first account.

In some embodiments, the first account is a stored-value account and the information corresponding to the first account includes funds (e.g., electronic cash or currency such as dollars, yen, euros, francs, yuans, and hones) from the first account. In some examples, the electronic device 100 transmits (e.g., transfers) the funds to a transaction terminal (e.g., at a transit station) to allow the user to exit the transit arrival area (e.g., exit the transit station). Thus, in some examples, the electronic device 100 transmits funds using NFC and without using an IP network or Internet connection, which conserves power and allows the transaction to occur even when an IP network or Internet connection is not available. In some embodiments, the first account is a payment account (e.g., a revolving credit account, a debit account) and the information corresponding to the first account includes payment account information (e.g., account number, credit card number) of the first account. In some examples, the electronic device 100 transmits payment account information to a transaction terminal (e.g., at a transit station) to allow the user to exit the transit arrival area (or the station). In some examples, the transaction terminal uses the payment account information to retrieve funds from a corresponding account. In some examples, the first account is a transit commuter account (e.g., a monthly unlimited transit pass, a 10-ride pass) and the information corresponding to the first account includes transit pass information (e.g., account number) of the first account. In some examples, the electronic device 100 transmits transit tokens to a transaction terminal (e.g., at a transit station) to allow the user to enter (e.g., tag on the transit system) or exit (e.g., tag off the transit system) a transit area (or station). In some examples, the first account is a stored-value transit account that, for example, stores transit passes that are transferred to the transaction terminal. Thus, in some examples, the electronic device 100 is enabled to provide the user with access to a transit (e.g., bus, train, rail, ferry) network.

In some embodiments, the determination that the wireless signal corresponds to the first type of request is based on contextual information of the electronic device that corresponds to the time when the wireless signal was detected by the electronic device, such as a location, detection of other wireless signals, time of day, or direction of travel of the electronic device 100. In some embodiments, the determination that the signal corresponds to the first type of request is based on one or more of: the content of the wireless signal received from a terminal (e.g., that is separate from the electronic device 100), detection of one or more wireless signals different from the wireless signal (e.g., one or more beacons placed near the terminal, such as one or more iBeacons™ or short-range communication location/proximity beacons), and/or location information (e.g., GPS or other location information that corresponds to the electronic device being at a certain location). In some examples, the location information corresponds to a transit location (e.g., a subway station). In some embodiments, the electronic device 100 uses heuristics to determine that the user signal corresponds to the first type of request. In some embodiments, the determination includes determining that the electronic device is at a physical location associated with public transportation, such as a transit station, a train station, and the like. In some examples, the determination that the signal corresponds to the first type of request includes determining that the electronic device 100 is heading towards a physical location, such as heading towards a train station platform. Thus, the electronic device 100 can use various techniques (either alone or in combination) to determine that the request is of the first type.

In some embodiments, the determination that the wireless signal corresponds to the first type of request includes a determination that a set of one or more contextual conditions has been met. In some examples, a first contextual condition of the set of one or more contextual conditions is met if content of the wireless signal (e.g., from the transaction terminal) includes a predetermined value (e.g., a "003" code). In some examples, a second contextual condition of the set of one or more contextual conditions is met if a current physical location of the electronic device 100 (e.g., determined using GPS and/or one or more iBeacons™) corresponds to a predetermined location, for example as a transit station. Thus, the electronic device 100 can use the current location (either alone or in combination with other techniques) to determine that the request is of the first type. In some examples, a third contextual condition of the set of one or more contextual conditions is met if the electronic device 100 is within range of or within a certain proximity to one or more wireless signals different from the wireless signal (e.g., one or more beacons placed near the terminal, such as one or more iBeacons™ or short-range communication location/proximity beacons). Thus, this technique allows the electronic device 100 (either alone or in combination with other techniques) to determine that the request is of the first type. The above-described contextual conditions of the set of one or more contextual conditions enable, for example, the electronic device 100 to more accurately determine that the request is of the first type.

In some embodiments, a fourth contextual condition of the set of one or more contextual conditions is met if the wireless signal includes a request for an amount of funds that does not exceed a fund threshold. In some examples, the fund threshold is a maximum per-transaction amount. In some examples, the fund threshold is an amount of funds such that transmitting the requested amount of funds would not cause the total transmission of funds, such as from the first account or from one or more accounts, to exceed a maximum per-day amount. In some examples, the fund threshold is an amount selected (e.g., set, pre-configured) by the user. In some embodiments, if the request for the amount of funds exceeds the fund threshold, the electronic device 100 checks for authentication before proceeding. This enables the electronic device 100 to avoid making payments that exceed an amount specified by the user without receiving authorization from the user.

Figure 15I:
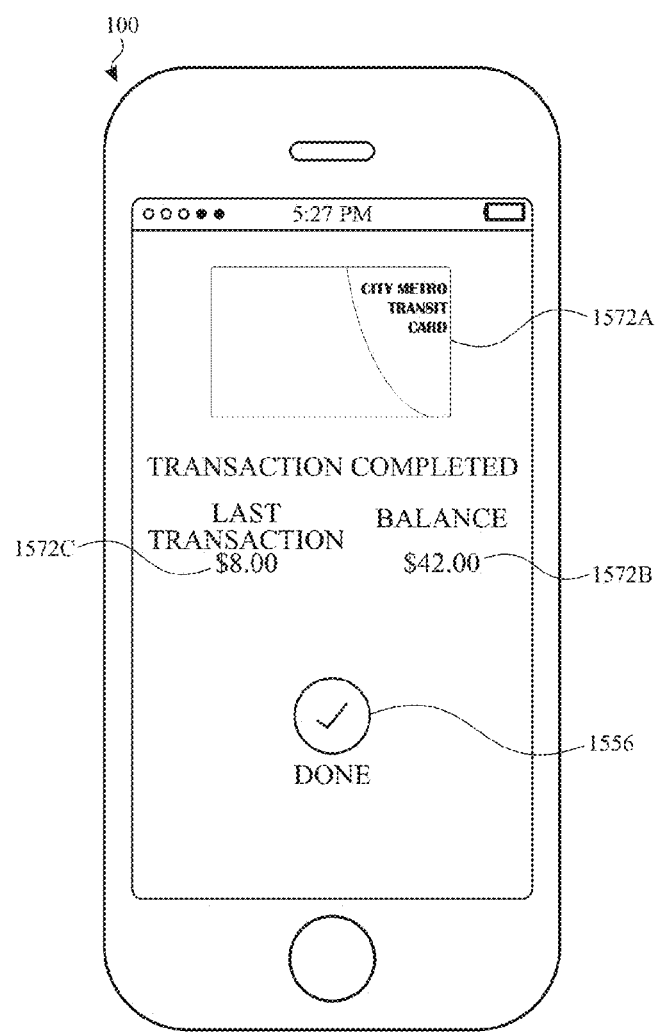

In some embodiments, as illustrated in FIG. 15I, in accordance with the determination that the detected wireless signal (e.g., from transaction terminal 1590) corresponds to the first type of request (e.g., a request from a transaction terminal 1590, a request for funds from a transit account) and after transmitting (e.g., to the transaction terminal) the information (e.g., account number, funds) corresponding to the first account without checking authentication, the electronic device 100 presents a user interface indicating that the transaction is complete (e.g., without checking authentication). In some examples, the user interface indicating that the transaction is complete includes a graphical depiction (e.g., 1572A) of the account (e.g., the first account) used to complete the transaction. In some examples, the user interface indicating that the transaction is complete includes an indication (e.g., 1572B) of an available balance of the account (e.g., the first account) used to complete the transaction. In some examples, the user interface indicating that the transaction is complete includes an indication (e.g., 1572C) of the transaction amount. In some examples, the user interface indicating that the transaction is complete without checking authentication includes a graphical depiction (e.g., 1556) informing the user that the transaction is complete.

In some embodiments, as illustrated in FIG. 15I, the electronic device 100 does not present (or generate) any indication requesting authentication (e.g., fingerprint authentication or passcode authentication) (e.g., subsequent to entering the locked state in FIG. 15G and prior to transmitting (e.g., to the transaction terminal) information (e.g., account number, funds) corresponding to the first account). For example, when the device is conducting an express transit transaction, the electronic device 100 does not display a notification on the display of the electronic device requesting authentication, does not play audio at a speaker of the electronic device indicating a request for authentication, and does not cause a haptic vibration at the electronic device indicating a request for authentication. This way, the electronic device 100 conserves battery power by not generating any indication requesting authentication.

In some embodiments, the electronic device 100 is in a locked state or an unlocked state. In the locked state, the electronic device 100 is powered on and operational but is prevented from performing a predefined set of operations in response to user input. The predefined set of operations may include navigation between user interfaces, activation or deactivation of a predefined set of functions, and activation or deactivation of certain applications. The locked state may be used to prevent unintentional or unauthorized use of some functionality of the electronic device 100 or activation or deactivation of some functions on the electronic device (e.g., access to sensitive personal information and settings for removing content from the device and/or deleting applications). In the unlocked state, the electronic device 100 is power on and operational and is not prevented from performing at least a portion of the predefined set of operations that cannot be performed while in the locked state. When the electronic device 100 is in the locked state, the device is said to be locked. When the electronic device 100 is in the unlocked state, the device is said to be unlocked. In some embodiments, the electronic device 100 in the locked state may respond to a limited set of user inputs, including input that corresponds to an attempt to transition the device to the unlocked state or input that corresponds to powering the device off.

In some embodiments, the electronic device 100 is in a locked state prior to detecting the wireless signal and continues to remain in the locked state while transmitting (e.g., to a transaction terminal 1590) the information (e.g., account number, funds) corresponding to the first account without checking for authentication. Thus, the electronic device 100 does not require the user to unlock the electronic device to transmit (e.g., to the transaction terminal 1590) the information corresponding to the first account. This allows for, among other benefits, better efficiency in transmitting the information and requires fewer user inputs than other techniques, as well as removing any delay in processing authentication information to verify the identity of the user of the electronic device 100 (e.g., delay in comparing a detected fingerprint to stored fingerprint information or delay in comparing an entered password or passcode to a stored password or passcode). In some examples, the electronic device 100 remains in the locked state while proceeding with the transaction. Thus, for example, the transaction can proceed without unnecessarily providing user-access to other functions of the electronic device 100, thereby maintaining extra security. Further, the transaction can proceed with fewer inputs from the user because, for example, a user input to unlock the electronic device 100 is not required to proceed with the transaction.

In some embodiments, the determination that the wireless signal corresponds to the first type of request includes a determination that a set of one or more unlock conditions has been met. In some examples, a first unlock condition of the set of one or more unlock conditions is met if the electronic device 100 has been unlocked (e.g., at least once), from a locked state as illustrated in FIG. 15A, within a certain previous amount of time. For example, the first unlock condition is met if the electronic device 100 has been unlocked at least once in the past 24 hours (prior to transmitting information (e.g., account number, funds) corresponding to the first account or prior to detecting the wireless signal). For another example, the first unlock condition is met if the electronic device 100 has been unlocked at least once in the past 5 hours. In some examples, a second unlock condition of the set of one or more unlock conditions is met if the electronic device 100 has been unlocked (e.g., at least once during the current day) after a predetermined time on the day that the wireless signal is detected. For example, the second unlock condition is met for the current day if the electronic device 100 has been unlocked at a certain specific time or time range during the current day (and before the determination that the wireless signal corresponds to the first type of request). For another example, the second unlock condition is met for the current day if the electronic device 100 has been unlocked at any time during the current day (and before the determination that the wireless signal corresponds to the first type of request). Thus, in this example, the second unlock condition is met and satisfied for the entire day after the first time the user unlocks the electronic device 100 in the morning of that day. However, in this example, the second unlock condition will no longer be satisfied after midnight of the next day; the user must again unlock the electronic device 100 again at some time during the next day. In some examples, a third unlock condition of the set of one or more unlock conditions is met if the electronic device 100 has been (e.g., at least once during the current day) unlocked after a restart (e.g., reboot) of the electronic device. For example, the third unlock condition is met if the electronic device 100 has been unlocked (e.g., at least once during the current day) subsequent to the most recent restart (e.g., reboot) of the electronic device. Thus, in this example, the third unlock condition is no longer met after the electronic device 100 restarts unless the user unlocks the device subsequent to the restart. The embodiments and examples described with respect to the set of one or more unlock conditions provide a measure of security by having the electronic device 100 confirm within a certain previous amount of time that the authorized user (e.g., the owner of the electronic device) is in possession of the device.

Figure 15J:
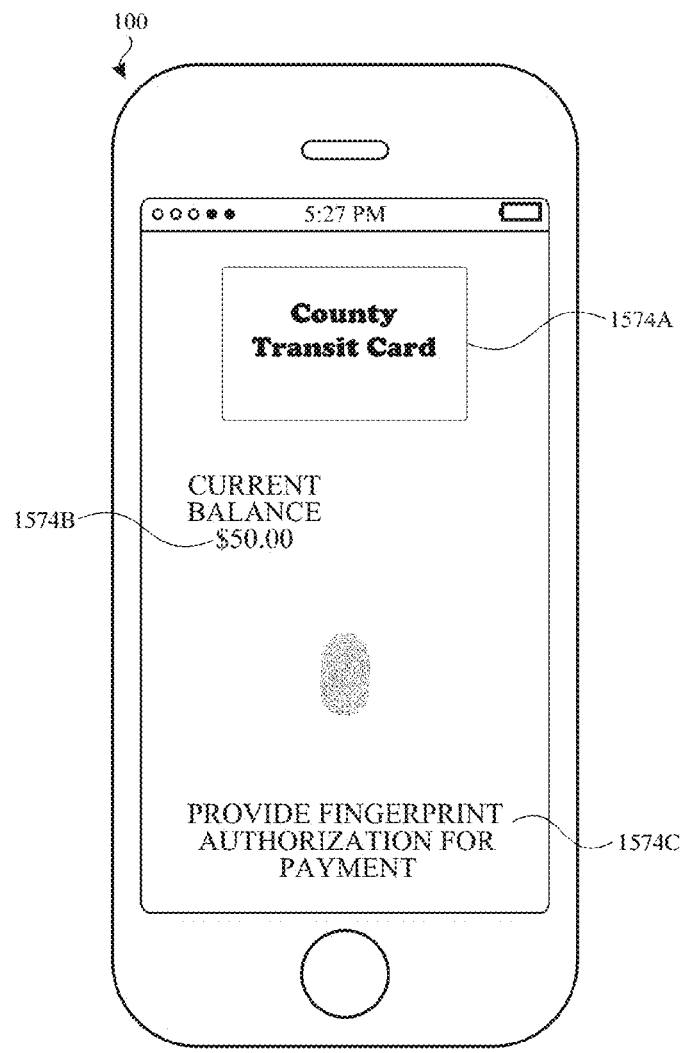
Figure 15K:
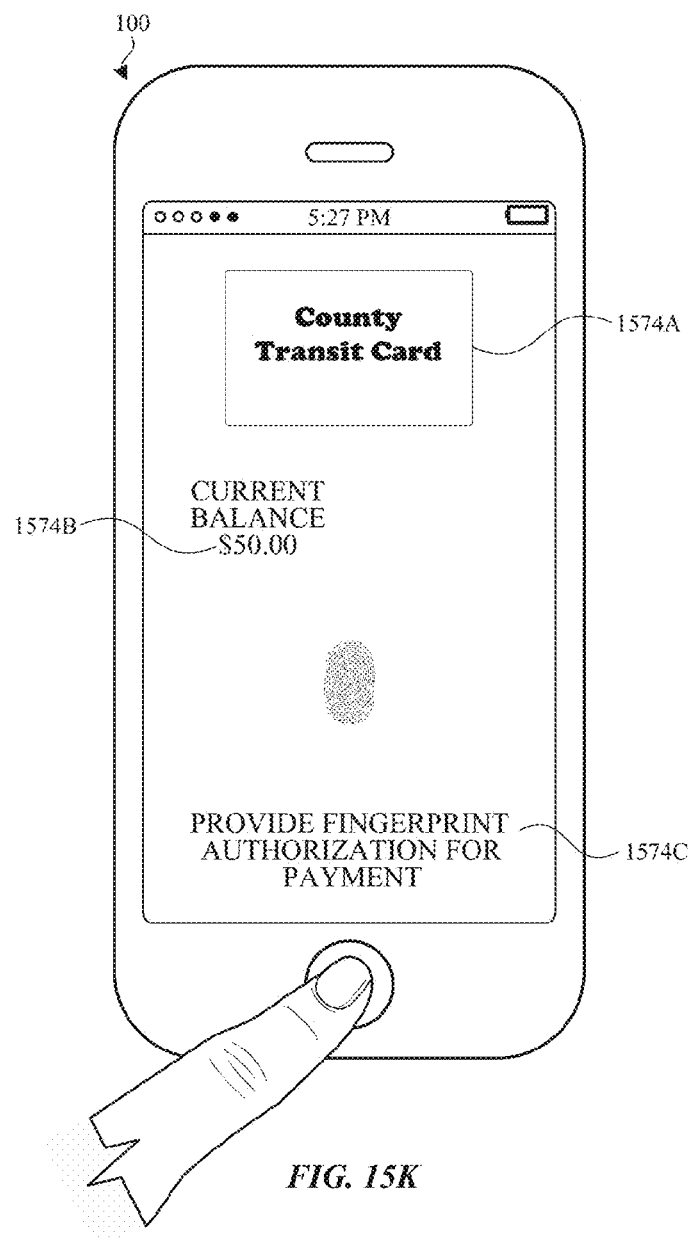
Figure 15L:
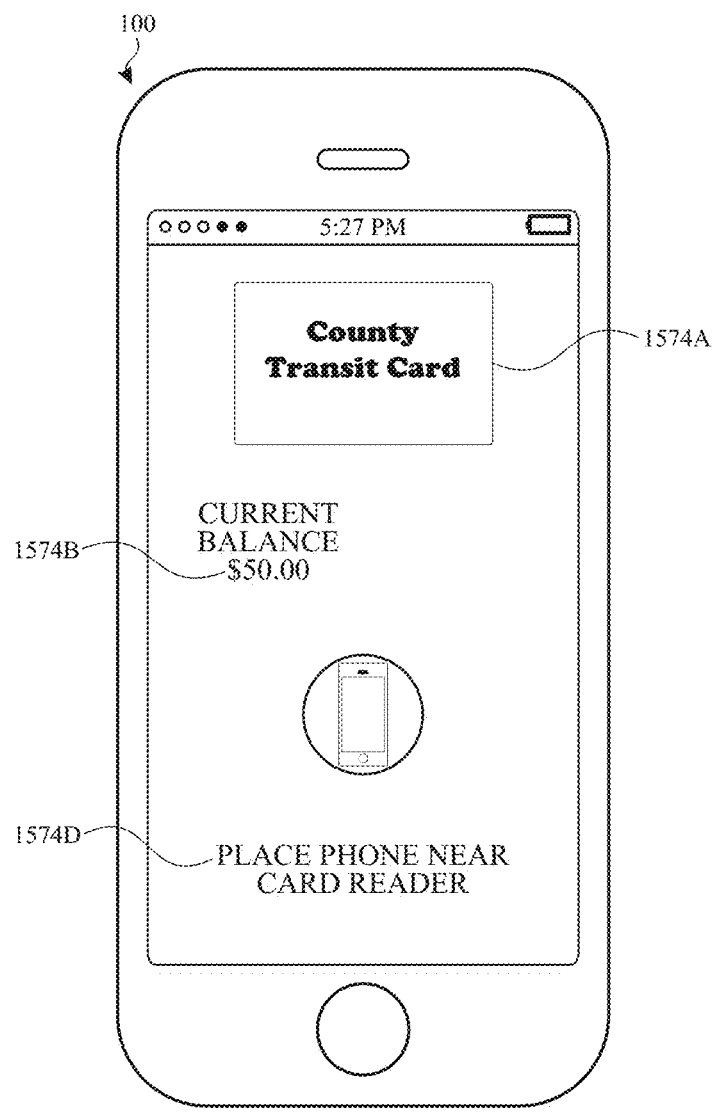

FIGS. 15J-15L illustrate the electronic device 100 checking for authentication before proceeding with a transaction in accordance with some embodiments. In accordance with (or in response to) a determination (e.g., based on the content of the detected wireless signal) that the detected wireless signal corresponds to a second type of request, the electronic device checks for authentication before proceeding with a transaction corresponding to the wireless signal. The second type of request is a request that is different from the first type of request. In some examples, this provides additional security for transactions corresponding to the second type of request. This second type of request may be referenced to as a "non-Express Transit" request.

In some embodiments, the second type of request is a type of request for which transmission of account information has not been pre-authorized to be made automatically available without authentication. In some examples, the electronic device 100 differentiates between different signal types (e.g., between the first type of request and the second type of request) and, when appropriate, automatically transmits (e.g., to a transaction terminal 1590) the information (e.g., account number, funds) corresponding to the first account without checking for authentication. Thus, fewer inputs are required from the user, thereby enabling the user to experience fewer delays when moving through and making a payment at an entry transmit terminal of a high-speed payment transaction system, such as a heavily-used public transit system.

FIGS. 15J-15K illustrate exemplary user interfaces for requesting user authentication if the detected wireless signal corresponds to the second type in accordance, with some embodiments. In some embodiments, as illustrated in FIG. 15J, the electronic device 100 presents a graphical depiction (e.g., 1574A) of an account corresponding to the second type of request for which transmission of account information has not been pre-authorized to be made automatically available without authentication, an indication (e.g., 1574B) of the available balance of the account corresponding to the second type of request or which transmission of account information has not been pre-authorized to be made automatically available without authentication, and an indication (e.g., 1574C) requesting authentication (e.g., fingerprint authentication or passcode authentication). For example, the electronic device 100 displays a notification on the display of the electronic device or plays audio at a speaker of the electronic device to present the indication requesting authentication.

In some embodiments, in accordance with a determination that the request is of the second type, the electronic device 100 receives (e.g., in response to the request for authentication) authentication information (e.g., detecting a fingerprint or detecting input of a passcode from the user), as illustrated in FIG. 15K. In some embodiments, in accordance with a determination that the authentication information (e.g., received from the user) is consistent with enrolled authentication information (e.g., an enrolled fingerprint, an enrolled passcode) that is enabled to authorize transactions, the electronic device 100 presents an indication (e.g., 1574D) to place the electronic device 100 near a transaction terminal to proceed with the transaction, as illustrated in FIG. 15L. The electronic device 100 proceeds with the transaction when the electronic device is placed within communication range of the transaction terminal.

In some embodiments, in accordance with a determination that the authentication information is consistent with enrolled authentication information (e.g., an enrolled fingerprint, an enrolled passcode) that is enabled to authorize transactions, the electronic device 100 proceeds with the transaction. In some embodiments, the electronic device 100 proceeds with the transaction using the first account by, for example, transmitting the information (e.g., the account number, funds) corresponding to the first account to the transaction terminal. In some embodiments, the electronic device 100 proceeds with the transaction using information, such as the account number or funds, corresponding to a second account (e.g., transmitting information, such as the account number or funds, corresponding to the second account to the transaction terminal). In some embodiments, in accordance with a determination that the authentication information is not consistent with enrolled authentication information that is enabled to authorize transactions, electronic device 100 forgoes proceeding with the transaction (e.g., forgoes transmitting information, such as the account number or funds, corresponding to the first account, second account, or any other account to the transaction terminal). Thus, under certain circumstances, the user-provided information is checked against the enrolled authentication information to provide an additional level of security (e.g., such as to confirm that an authorized user is performing the operation).

In some embodiments, the electronic device 100 proceeds with the transaction by transmitting (e.g., to a transaction terminal) the information (e.g., account number, funds) corresponding to the first account. Thus, the same account can be used for both express transit transactions (without authentication) and regular payment transactions (with authentication, such as fingerprint authentication or passcode authentication), depending on context. For example, the context is whether the signal corresponds to the first type of request or to a second type of request. Thus, the electronic device 100 allows for, for the same account, faster transmission of information if the signal corresponds to the first type of request, and provides additional security if the request corresponds to the second type of request.

In some embodiments, the electronic device 100 must perform a second communication (for payment) (e.g., with a second transaction terminal) using the first account. For example, a second communication for payment with a second transaction terminal is required when the user to exits a destination transit station. In some embodiments, the first account used for the second communication is a stored-value account and the information corresponding to the first account includes an account number (e.g., a unique account number) of the first account (e.g., a transit account, a stored-value transit account). In some embodiments, the electronic device 100 detects (e.g., subsequent to detecting the (first) wireless signal), by the one or more short-range communication radios, a second wireless signal that includes a request for an amount of funds. In some embodiments, the detected second wireless signal is from a second transaction terminal (e.g., a second contactless transaction terminal that is separate from the electronic device 100). In some embodiments, in accordance with (or in response to) a determination (e.g., based on the content of the detected second wireless signal) that the detected second wireless signal corresponds to the first type of request, the electronic device 100 transmits (e.g., to the second transaction terminal) funds from the first account without checking for authentication. For example, the electronic device 100 transmits funds from the first account to the second transaction terminal without receiving authentication information subsequent to detecting the second wireless signal, thereby allowing the transmission of funds to occur more quickly. Thus, the electronic device 100 provides information to the transaction terminal and subsequently provides funds to the second transaction terminal (e.g., at the destination transit station) to allow the user to exit the transit arrival area (e.g., at the destination transit station). In some examples, in accordance with (or in response to) a determination (e.g., based on the content of the detected second wireless signal) that the detected second wireless signal corresponds to a third type of request (different from the first type of request), the electronic device 100 checks for authentication before proceeding with a transaction corresponding to the second wireless signal.

In some embodiments, the information corresponding to the first account includes an account number (e.g., a unique account number) of the first account (e.g., a transit account, a stored-value transit account). In some embodiments, the electronic device 100 detects (e.g., subsequent to detecting the wireless signal), by the one or more short-range communication radios, a second wireless signal that includes a request for an amount of funds. In some examples, the detected second wireless signal is from a second transaction terminal. In some embodiments, subsequent to detecting the second wireless signal that includes the request for an amount of funds, the electronic device 100 determines an expected cost. For example, the expected cost is based on a transit entry location detected in response to detecting the wireless signal and a transit exit location detected in response to detecting the second wireless signal. In some embodiments, in accordance with (or in response to) a determination (e.g., based on the content of the second wireless signal) that the second wireless signal corresponds to the first type of request, and in accordance with a determination that the requested amount of funds does not exceed a pre-authorized transaction amount (e.g., the requested amount of funds corresponds to an expected cost or the requested amount of funds is equal to or less than an expected cost), the electronic device 100 transmits (e.g., to the transaction terminal) funds from the first account (e.g., to the second transaction terminal) without checking for authentication. Additionally, in some embodiments, further in accordance with a determination that the requested amount of funds exceeds the pre-authorized transaction amount (e.g., the requested amount of funds does not correspond to an expected cost or the requested amount of funds is more than an expected cost), the electronic device 100 displays and/or generates (e.g., visual, audio, and/or haptic output generated by the device) an indication for the user that the requested amount of funds does not correspond to an expected cost. For example, the electronic device 100 provides the indication by displaying a notification on the display of the electronic device, by performing a haptic alert at the electronic device, or by playing audio at the electronic device. Further, in some examples, the electronic device 100 requests second authentication information from the user. Further, in some embodiments, the electronic device 100 checks, for example subsequent to generating the indication that the requested amount of funds does not correspond to an expected cost, or subsequent to detecting the second wireless signal, or in response to the determination that the request amount of funds exceeds the pre-authorized transaction amount, for authentication to proceed with the transaction (e.g., by transmitting, to the second transaction terminal, funds based on the requested amount of funds from the first account). Thus, when the requested amount of funds does not correspond to the expected cost, the electronic device 100 forgoes transmitting (e.g., to the second transaction terminal) funds unless the user provides authentication. In some examples, checking for authentication includes an audio, visual, or haptic prompt to the user requesting authentication. In some examples, checking for authentication includes receiving user input from the user, such as a fingerprint or a password. This allows, for example, the electronic device 100 to avoid transmitting an unexpected amount of funds without receiving user approval.

In some embodiments, in accordance with (or in response to) the determination (e.g., based on the content of the detected second wireless signal) that the second wireless signal corresponds to the first type of request, and in accordance with the determination that the requested amount of funds exceeds the pre-authorized transaction amount (e.g., the requested amount of funds does not correspond to an expected cost or the requested amount of funds is more than an expected cost), the electronic device 100 receives (e.g., in response to the request for authentication) second authentication information. Further, in some embodiments, in accordance with a determination that the second authentication information is consistent with enrolled authentication information that is enabled to authorize transactions, the electronic device 100 proceeds with the transaction. Further, in some embodiments, in accordance with a determination that the second authentication information is not consistent with enrolled authentication information that is enabled to authorize transactions, the electronic device 100 forgoes proceeding with the transaction.

Figure 15M:
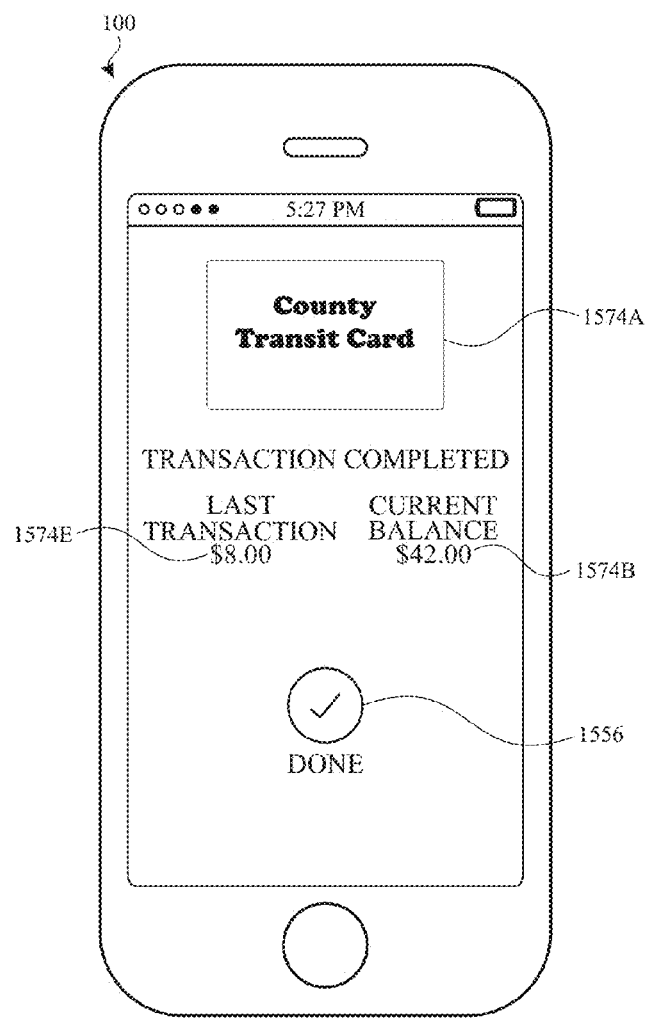

In some embodiments, as illustrated in FIG. 15M, after transmitting (e.g., to a transaction terminal) the information (e.g., account number, funds) corresponding to the first account, the electronic device 100 concurrently displays, on the display of the electronic device, the indication (e.g., 1574B) of the available credit (e.g., available funds), an indication (e.g., 1574E) of the transaction corresponding to the transmission (e.g., to a transaction terminal) of the information (e.g., account number, funds) corresponding to the first account, and an indication (e.g., 1556, "Complete," "Payment Completed!") that the transmission (e.g., to a transaction terminal) the information (e.g., account number, funds) corresponding to the first account is complete. Thus, the electronic device 100 simultaneously informs the user of the available credit on the account, the indication of the transaction (e.g., the amount paid or transferred for the transaction), and that the transaction is complete.

FIGS. 16A-16B are a flow diagram illustrating methods of making an account available for use without checking authentication, in accordance with some embodiments. Method 1600 is performed at a device (e.g., 100, 300, 500) with one or more short-range communication radios and an account information application that includes a first account. Some operations in method 1600 are, optionally, combined, the order of some operations is, optionally, changed, and some operations are, optionally, omitted.

As described below, method 1600 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

In accordance with some embodiments, at block 1602, the first account (e.g., 1572A) is a stored-value account (e.g., the funds of the first account are physically stored on the electronic device, in the form of binary-coded data). In some examples, the first account is a closed-loop stored-value account. In some examples, the stored-value account stores electronic cash, and, as a result, the electronic device transmits (e.g., to a transaction terminal) information (e.g., account number, funds) corresponding to the first account without a network or Internet connection. In accordance with some embodiments, the first account (e.g., 1572A) is an identification account. In some examples, the first account is a user identification account, a personal identification account, a company identification account, a school identification account, a company identification account, a school identification account, a government-issued personal identification account, a government-issued driver's license account, a government-issued passport account, and the like. In some examples, the electronic device is configured to store (at a maximum) a single identification account. In some examples, the electronic device uses the first account to transmit identifying information of the identification account, rather than payment information. In some examples, information for retrieving the value/data from the first account is stored in the secure element of the electronic device to ensure that the stored value/data is not accessible in the absence of a properly processed transaction that retrieves the information from the secure element.

In accordance with some embodiments, at block 1604, the account information application includes a second account (e.g., not an express transit account) that is different from the first account (e.g., 1572A) (e.g., an express transit account). In some embodiments, the first account and the second account are of different account types. For example, the first type of request corresponds to the first account (or to the type of the first account) and the second type of request corresponds to the second account (or to the type of the second account). In some embodiments, the first account is designated as an express transit account and the second account is not designated as an express transit account. In some embodiments, the first account is a transit account and the second account is a payment account. In some embodiments, the first account is a stored-value account and the second account is not a stored-value account. In some embodiments, the first account and the second account are of the same account type. In some embodiments, the electronic device is a personal electronic device of the user and is configured to provide access to private information (e.g., payment information) specific to the user that is stored on the personal electronic device (e.g., and accessible by the account information application), the private information including information for authorizing transactions (such as payments) with a plurality of different accounts. In some examples, the multiple accounts enable the user to select between the accounts for various transactions. In some examples, information for retrieving the value/data from the second account is stored in the secure element of the electronic device to ensure that the stored value/data is not accessible in the absence of a properly processed transaction that retrieves the information from the secure element.

At block 1608, the electronic device detects, by the one or more short-range communication radios, a wireless signal (e.g., a signal that indicates that information about a payment account is requested). In some embodiments, the detected wireless signal is from a transaction terminal (e.g., a contactless transaction terminal that is separate from the electronic device). In some embodiments, the detected wireless signal is an NFC signal detected while the electronic device is within communication range of the transaction terminal.

In accordance with some embodiments, the first account is one of a plurality of transit accounts stored by (or accessible by) the account information application and the account information application stores one or more additional accounts that are not transit accounts (e.g., payment accounts, loyalty accounts), and, prior to detecting, by the one or more short-range communication radios, the wireless signal, the electronic device receives user input selecting the first account (e.g., 1572A) (e.g., from among the plurality of transit accounts) as an account to be made available for use without checking authentication. For example, the electronic device displays representations of the plurality of transit accounts (including the first account) and receives a user selection of the representation of the first account to be an express transit account that can be used in transactions with transaction terminals without checking for authentication (e.g., after detecting the wireless signal and prior to transmitting information). In accordance with some embodiments, in response to receiving user input selecting the first account (e.g., 1572A) as an account to be made available for use without checking authentication, the electronic device designates the first account to be made available for use without checking authentication. Thus, the device permits the user to specify which transit card should be designated as an express transit card, which the electronic device can use without checking for authentication for transactions in which the detected wireless signal corresponds to the first type of request. In some examples, only one card can be identified as an express transit card at a time (although the user is provided with the opportunity to select a different card via a settings user interface). Transit transactions are frequently conducted in crowded transit stations with users (or other passengers) who are in a hurry to make a transit connection. Even with the most accurate and reliable authentication systems there is always some possibility of a false negative result where a valid user is not properly authenticated (e.g., because the user's fingerprint is not correctly identified or the user enters an incorrect password, passcode, or pattern). Using an express transit transaction model where security is provided by establishing the identity of the transaction terminal as a transit transaction terminal (e.g., established by a transaction terminal signal or other contextual information) instead of user authorization for the specific transaction reduces the likelihood that the user (or other passengers) will be inconveniences by false negative results of authentication while conducting a transit transaction with the device.

At block 1610, in accordance with (and/or in response to) a determination (e.g., a determination based on the content of the wireless signal) that the wireless signal corresponds to a first type of request (e.g., a request from a transaction terminal, a request for funds from a transit account), at block 1616, the electronic device transmits (e.g., to a transaction terminal) information (e.g., account number, funds) corresponding to the first account (e.g., 1572A) without checking for authentication (e.g., without receiving fingerprint authentication and without receiving passcode authentication). In some examples, the electronic device includes a secure element, and wherein transmitting information corresponding to the first account without checking for authentication includes releasing, from the secure element of the electronic device, information for accessing the information corresponding to the first account. In some examples, using the first account to participate in a transaction includes releasing information (e.g., transaction information, payment information) from a secure element of the electronic device. For example, the electronic device transmits the information corresponding to the first account to the transaction terminal without receiving authentication information subsequent to detecting the wireless signal. In some examples, this allows the transmission of the information to occur more quickly. This first type of request may be referenced as an Express Transit request. Transit transactions are frequently conducted in crowded transit stations with users (or other passengers) who are in a hurry to make a transit connection. Even with the most accurate and reliable authentication systems there is always some possibility of a false negative result where a valid user is not properly authenticated (e.g., because the user's fingerprint is not correctly identified or the user enters an incorrect password, passcode, or pattern). Using an express transit transaction model where security is provided by establishing the identity of the transaction terminal as a transit transaction terminal (e.g., established by a transaction terminal signal or other contextual information) instead of user authorization for the specific transaction reduces the likelihood that the user (or other passengers) will be inconveniences by false negative results of authentication while conducting a transit transaction with the device.

In accordance with some embodiments, transmitting information (e.g., account number, funds) corresponding to the first account (e.g., 1572A) without checking for authentication includes transmitting the information corresponding to the first account without requiring (or receiving) user input subsequent to detecting, by the one or more short-range communication radios, the wireless signal. In some embodiments, without requiring user input subsequent to detecting the wireless signal includes without requesting and without receiving authentication information (e.g., fingerprint authentication or passcode authentication). In some embodiments, this is achieved by completely bypassing the authentication routines that are typically used for payment transactions. In some examples, this reduces the number of inputs required from the user and speeds up the transmitting process. Bypassing the authentication step saves time and removes the possibility that the transaction will fail due to a failed authentication, thereby increasing the speed and reliability of the transaction, which is particularly important for the transit transactions that are performed when entering a busy transit station.

In accordance with some embodiments, in accordance with the determination (e.g., the determination based on the content of the wireless signal) that the wireless signal corresponds to the first type of request (e.g., a request from a transaction terminal, a request for funds from a transit account), the electronic device forgoes presenting any indication (e.g., 1574C) requesting authentication (e.g., fingerprint authentication or passcode authentication). For example, when the device is conducting an express transit transaction the device does not display a notification on a display of the electronic device requesting authentication, does not play audio at a speaker of the electronic device indicating a request for authentication, and does not cause a haptic vibration at the electronic device indicating a request for authentication. Thus, the device conserves battery by not providing any indication requesting authentication.

In some embodiments, the electronic device is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device (e.g., access to sensitive personal information and settings for removing content from the device and/or deleting applications). In the unlocked state, the electronic device is power on and operational and is not prevented from performing at least a portion of the predefined set of operations that cannot be performed while in the locked state. When the device is in the locked state, the device is said to be locked. When the device is in the unlocked state, the device is said to be unlocked. In some embodiments, the device in the locked state may respond to a limited set of user inputs, including input that corresponds to an attempt to transition the device to the unlocked state or input that corresponds to powering the device off.

In accordance with some embodiments, at block 1606, the electronic device is in a locked state prior to detecting the wireless signal and continues to remain in the locked state while transmitting (e.g., to a transaction terminal) information (e.g., account number, funds) corresponding to the first account without checking for authentication. Thus, the electronic device does not require the user to unlock the device to transmit the information corresponding to the first account. This provides, among other benefits, a more efficient process for transmitting the information and requires fewer user inputs than some other techniques, as well as removing any delay in processing authentication information to verify the identity of the user of the device (e.g., delay in comparing a detected fingerprint to stored fingerprint information or delay in comparing an entered password or passcode to a stored password or passcode). In some examples, the electronic device remains in the locked state while proceeding with the transaction. This allows, for example, the technique to operate without unnecessarily providing user-access to some functions of the electronic device, therefore providing extra security. Thus by not requiring the electronic device to be unlocked, the electronic device requires fewer user inputs (e.g., inputs to unlock the device are not required), thereby reducing the time it takes to complete the task and saving battery power.

In accordance with some embodiments, the information corresponding to the first account (e.g., 1572A) includes an account number (e.g., a unique account number) of the first account (e.g., a transit account, a stored-value transit account). In some examples, the electronic device transmits the account number to a transaction terminal (e.g., at a first transit station) to allow the user to enter a transit boarding area (e.g., tagging on). In some examples, the electronic device subsequently transmits the account number to a second transaction terminal (e.g., at a second transit station) to allow the user to exit a transit arrival area (e.g., tagging off). Thus, the transit system can determine the entry and exit stations for the user and charge the first account of the user according to the entry and exit transit stations (e.g., based on distance traveled). In some examples, the electronic device subsequently transmits funds (rather than the account number) to the second transaction terminal (e.g., at the second transit station) to allow the user to exit the transit arrival area (e.g., tagging off). Thus, the transit system can determine the entry and exit stations for the user and the electronic device can make a corresponding payment using the first account.

In accordance with some embodiments, the first account (e.g., 1572A) is a stored-value account and the information corresponding to the first account includes funds (e.g., electronic cash, currency, such as dollars, yen, euros, francs, yuans, and hones) from the first account. In some examples, the electronic device transmits (e.g., transfers) the funds to a transaction terminal (e.g., at a transit station) to allow the user to exit the transit arrival area (or the station). Thus, in some examples, the electronic device can transmit funds using NFC and without using an IP network or Internet connection, which conserves power and allows the feature to function when an IP network or Internet connection is not available.

In accordance with some embodiments, the first account (e.g., 1572A) is a payment account (e.g., a revolving credit account, a debit account) and the information corresponding to the first account includes payment account information (e.g., account number, credit card number) of the first account. In some examples, the electronic device transmits payment account information to a transaction terminal (e.g., at a transit station) to allow the user to exit the transit arrival area (or the station). In some examples, the transaction terminal uses the payment account information to retrieve funds from a corresponding account.

In accordance with some embodiments, the first account (e.g., 1572A) is a transit commuter account (e.g., a monthly unlimited transit pass, a 10-ride pass) and the information corresponding to the first account includes transit pass information (e.g., account number) of the first account. In some examples, the electronic device transmits transit tokens to a transaction terminal (e.g., at a transit station) to allow the user to enter (e.g., tag on) or exit (e.g., tag off) a transit area (or station). In some examples, the first account is a stored-value transit account that, for example, stores transit passes that are transferred to the transaction terminal. Thus, in some examples, the electronic device is enabled to provide the user with access to a transit (e.g., bus, train, rail, ferry) network.

In accordance with some embodiments, the first account (e.g., 1572A) is a stored-value account and the information corresponding to the first account includes an account number (e.g., a unique account number) of the first account (e.g., a transit account, a stored-value transit account), and the electronic device detects (e.g., subsequent to detecting the wireless signal), by the one or more short-range communication radios, a second wireless signal that includes a request for an amount of funds. In some embodiments, the detected second wireless signal is from a second transaction terminal (e.g., a second contactless transaction terminal that is separate from the electronic device). In accordance with some embodiments, in accordance with (or in response to) a determination (e.g., the determination based on the content of the second wireless signal) that the second wireless signal corresponds to the first type of request (e.g., a request from a transaction terminal, a request for funds from a transit account), the electronic device transmits (e.g., to the second transaction terminal) funds (based on the amount of funds) from the first account without checking for authentication (e.g., without receiving fingerprint authentication and without receiving passcode authentication). For example, the electronic device transmits the funds from the first account to the second transaction terminal without receiving authentication information subsequent to detecting the second wireless signal. In some examples, this allows the transmission of the funds to occur more quickly. Thus, the electronic device provides information to the transaction terminal and subsequently provides funds to the second transaction terminal (e.g., at the second transit station) to allow the user to exit the transit arrival area. In some examples, in accordance with (or in response to) a determination (e.g., the determination based on the content of the second wireless signal) that the second wireless signal corresponds to a third type of request (different from the first type of request), the electronic device checks for authentication before proceeding with a transaction corresponding to the second wireless signal.

In accordance with some embodiments, the information corresponding to the first account includes an account number (e.g., a unique account number) of the first account (e.g., a transit account, a stored-value transit account), and the electronic device detects (e.g., subsequent to detecting the wireless signal), by the one or more short-range communication radios, a second wireless signal that includes a request for an amount of funds. In some embodiments, the detected second wireless signal is from a second transaction terminal. In some embodiments, subsequent to detecting the second wireless signal that includes the request for an amount of funds, the electronic device determines an expected cost (e.g., based on a transit entry location detected in response to detecting the wireless signal and a transit exit location detected in response to detecting the second wireless signal). In some examples, the electronic device determines the expected cost of the transit trip based on the starting location and ending location of the trip.

In accordance with some embodiments, in accordance with (or in response to) a determination (e.g., the determination based on the content of the second wireless signal) that the second wireless signal corresponds to the first type of request (e.g., a request from a transaction terminal, a request for funds from a transit account), and in accordance with a determination that the requested amount of funds does not exceed a pre-authorized transaction amount (e.g., the requested amount of funds corresponds to an expected cost (e.g., the requested amount of funds is equal to or less than an expected cost)), the electronic device transmits (e.g., to the transaction terminal) funds (based on the amount of funds) from the first account (e.g., to the second transaction terminal) without checking for authentication (e.g., without receiving fingerprint authentication and without receiving passcode authentication). In accordance with some embodiments, in accordance with a determination that the requested amount of funds exceeds the pre-authorized transaction amount (e.g., the requested amount of funds does not correspond to an expected cost (e.g., the requested amount of funds is more than an expected cost)), the electronic device displays and/or generates feedback (e.g., visual, audio, and/or haptic output generated by the device) indicating that the requested amount of funds does not correspond to an expected cost (e.g., by displaying a notification on a display of the electronic device, by performing a haptic alert at the electronic device, by playing audio at the electronic device). In some examples, the electronic device requests second authentication information from the user.

In accordance with some embodiments, in accordance with a determination that the requested amount of funds exceeds the pre-authorized transaction amount, the electronic device also checks (e.g., subsequent to providing the indication that the requested amount of funds does not correspond to an expected cost, subsequent to detecting the second wireless signal, in response to the determination that the request amount of funds exceeds the pre-authorized transaction amount) for authentication (e.g., receiving fingerprint authentication or passcode authentication) to proceed with the transaction (e.g., transmitting (e.g., to the second transaction terminal) funds (based on the requested amount of funds) from the first account). Thus, when the requested amount of funds does not correspond to an expected cost, the electronic device forgoes transmitting (e.g., to the second transaction terminal) funds unless the user provides authentication. In some examples, checking for authentication includes an audio, visual, or haptic prompt to the user requesting authentication. In some examples, checking for authentication includes receiving user input from the user, such as a fingerprint or a password. This allows, for example, the electronic device to avoid transmitting an unexpected amount of funds without first receiving user approval.

In accordance with some embodiments, in accordance with (or in response to) the determination (e.g., the determination based on the content of the second wireless signal) that the second wireless signal corresponds to the first type of request (e.g., a request from a transaction terminal, a request for funds from a transit account), and in accordance with the determination that the requested amount of funds exceeds the pre-authorized transaction amount (e.g., the requested amount of funds does not correspond to an expected cost (e.g., the requested amount of funds is more than an expected cost)), the electronic device receives (e.g., responsive to the request for authentication) second authentication information (e.g., detecting a fingerprint, detecting input of a passcode). Further, in accordance with some embodiments, in accordance with a determination that the second authentication information is consistent with enrolled authentication information (e.g., an enrolled fingerprint, an enrolled passcode) that is enabled to authorize transactions, the electronic device proceeds with the transaction. Further, in accordance with some embodiments, in accordance with a determination that the second authentication information is not consistent with enrolled authentication information that is enabled to authorize transactions, the electronic device forgoes proceeding with the transaction.

In accordance with some embodiments, the determination that the wireless signal corresponds to the first type of request is based on contextual information of the electronic device that corresponds to the time when the wireless signal was detected by the electronic device (e.g., location, detection of other wireless signals, time of time, direction of travel). For example, the determination that the signal corresponds to the first type of request is based on one or more of: the content of the wireless signal received from a terminal (e.g., separate from the electronic device), detection of one or more wireless signals different from the wireless signal (e.g., one or more beacons placed near the terminal, such as one or more iBeacons™ or short-range communication location/proximity beacons), location information (e.g., GPS or other location information that corresponds to the electronic device being at a location, such as a transit location (for example, a London Underground station, a subway station) and is, for example, headed toward a the trains). For example, the electronic device uses heuristics to determine that the user signal corresponds to the first type of request. In some examples, the determination includes determining that the electronic device is at a physical location associated with public transportation, such as a transit station, a train station, and the like. In some examples, the determination includes determining that the electronic device is heading toward a physical location, such as heading towards a train station platform. Thus, the electronic device can use various techniques (either alone or in combination) to determine that the request is of the first type. This provides, for example, added assurance that the request is of the first type.

In accordance with some embodiments, the determination (e.g., the determination based on the content of the wireless signal) that the wireless signal corresponds to the first type of request (e.g., a request from a transaction terminal 1590, a request for funds from a transit account) includes a determination that a set of one or more contextual conditions has been met, wherein a first contextual condition of the one or more contextual conditions is met when content of the wireless signal (e.g., from the transaction terminal 1590) includes a predetermined value (e.g., a "003" code). Thus, the electronic device can use this technique (either alone or in combination other techniques) to determine that the request is of the first type. This provides, for example, added assurance that the request is of the first type.

In accordance with some embodiments, the determination (e.g., the determination based on the content of the wireless signal) that the wireless signal corresponds to the first type of request (e.g., a request from a transaction terminal, a request for funds from a transit account) includes a determination that a set of one or more contextual conditions has been met, wherein a second contextual condition of the one or more contextual conditions is met when a physical location of the electronic device (e.g., determined using GPS and/or one or more iBeacons™) that corresponds to the time when the wireless signal was detected by the electronic device corresponds to a predetermined location (e.g., such as a transit station). Thus, the electronic device can use the current location (either alone or in combination other techniques) to determine that the request is of the first type. This provides, for example, added assurance that the request is of the first type.

In accordance with some embodiments, the determination (e.g., the determination based on the content of the wireless signal) that the wireless signal corresponds to the first type of request (e.g., a request from a transaction terminal, a request for funds from a transit account) includes a determination that a set of one or more contextual conditions has been met, wherein a third contextual condition of the one or more contextual conditions is met when the electronic device is within range (and/or proximity) of one or more wireless signals different from the wireless signal (e.g., one or more beacons placed near the terminal, such as one or more iBeacons™ or short-range communication location/proximity beacons). Thus, in some examples, the electronic device uses this technique (either alone or in combination other techniques) to determine that the request is of the first type. This provides, for example, added assurance that the request is of the first type.

In accordance with some embodiments, the determination (e.g., the determination based on the content of the wireless signal) that the wireless signal corresponds to the first type of request (e.g., a request from a transaction terminal, a request for funds from a transit account) includes a determination that a set of one or more contextual conditions has been met, wherein a fourth contextual condition of the one or more contextual conditions is met when the wireless signal includes a request for an amount of funds that does not exceed a fund threshold (e.g., the requested amount of funds does not exceed a maximum per-transaction amount, transmitting the requested amount of funds would not cause the total transmission of funds, such as from the first account or from one or more accounts, to exceed a maximum per-day amount). In some examples, the fund threshold is a user-selected amount. For example, if the request for the amount of funds exceeds the fund threshold, the electronic device checks for authentication before proceeding. Thus, the electronic device can avoid making payments that exceed an amount specified by the user without receiving authorization from the user.

In accordance with some embodiments, the determination that the wireless signal corresponds to the first type of request includes a determination that a set of one or more unlock conditions has been met, wherein a first unlock condition of the set of one or more unlock conditions is met when the electronic device has been (e.g., at least once) unlocked (e.g., receiving fingerprint authentication to unlock the electronic device or receiving passcode authentication to unlock the device based on user input with an input device of the electronic device such as touch inputs on a touchscreen to enter a passcode, or a touch on a fingerprint sensor of the electronic device to provide a fingerprint) within a previous amount of time (e.g., at least once in the last 24 hours, at least once in the last 4 hours). Thus, the electronic device has added assurance that an authorized user is in possession of the electronic device and the electronic device does not need to check for authentication, thereby reducing the number of required user inputs and conserving battery power.

In accordance with some embodiments, the determination that the wireless signal corresponds to the first type of request includes a determination that a set of one or more unlock conditions has been met, wherein a second unlock condition of the set of one or more unlock conditions is met when the electronic device has been (e.g., at least once, in the current day) unlocked (e.g., receiving fingerprint authentication to unlock the electronic device or receiving passcode authentication to unlock the device based on user input with an input device of the electronic device such as touch inputs on a touch-screen to enter a passcode, or a touch on a fingerprint sensor of the electronic device to provide a fingerprint) after a predetermined time of day on the day that the wireless signal is detected (e.g., time of day in the current day, at least once each day after midnight). In some examples, the second unlock condition is met for the current day when the electronic device has been unlocked at any time during the current day (and before the determination that the wireless signal corresponds to the first type of request). Thus, the second unlock condition is met throughout the day after the first time a user unlocks the device in the morning of that day. However, in this example, the second unlock condition is no longer met after midnight, and thus the user must again unlock the device. Thus, the electronic device has added assurance that an authorized user is in possession of the electronic device and the electronic device does not need to check for authentication, thereby reducing the number of required user inputs and conserving battery power.

In accordance with some embodiments, the determination that the wireless signal corresponds to the first type of request includes a determination that a set of one or more unlock conditions has been met, wherein a third unlock condition of the set of one or more unlock conditions is met when the electronic device has been (e.g., at least once, in the current day) unlocked (e.g., receiving fingerprint authentication to unlock the electronic device or receiving passcode authentication to unlock the device based on user input with an input device of the electronic device such as touch inputs on a touch-screen to enter a passcode, or a touch on a fingerprint sensor of the electronic device to provide a fingerprint) after a restart. As a result, the third unlock condition is met when the device has been unlocked subsequent to the immediately preceding restart of the device. However, the third unlock condition is no longer met after the device restarts, until the user unlocks the device again. Thus, the electronic device has added assurance that an authorized user is in possession of the electronic device and the electronic device does not need to check for authentication, thereby reducing the number of required user inputs and conserving battery power.

At block 1618, in accordance with (or in response to) a determination (e.g., the determination based on the content of the wireless signal) that the wireless signal corresponds to a second type of request (different from the first type of request), at block 1622, the electronic device checks for authentication (e.g., 1574C) before proceeding with a transaction corresponding to the wireless signal. Thus, by checking for authentication, the electronic device provides added security for transactions corresponding to the second type of request, thereby helping to avoid fraudulent transactions. This second type of request may be referenced as a non-Express Transit request.

In accordance with some embodiments, at block 1612, the first type of request is a type of request for which transmission of account information has been pre-authorized (e.g., before detecting the wireless signal) to be made automatically available without authentication (e.g., without biometric or passcode authentication by the user), and, at block 1620, the second type of request is a type of request for which transmission of account information has not been pre-authorized to be made automatically available without authentication. In some examples, the electronic device differentiates between different signal types and, when appropriate, automatically transmits (e.g., to a transaction terminal) information (e.g., account number, funds) corresponding to the first account without checking for authentication. This enables the technique to require fewer inputs from the user and results in the technique being faster and more efficient so that users do not experience delays when moving through high-speed payment transaction scenarios, such as moving through a heavily-used public transit terminal.

In accordance with some embodiments, checking for authentication includes presenting an indication (e.g., 1574C) (e.g., display a notification on a display of the electronic device, playing audio at a speaker of the electronic device, causing a haptic vibration at the electronic device) requesting authentication (e.g., fingerprint authentication or passcode authentication), receiving (e.g., responsive to the request for authentication) authentication information (e.g., detecting a fingerprint, detecting input of a passcode), and, in accordance with a determination that the authentication information is consistent with enrolled authentication information (e.g., an enrolled fingerprint, an enrolled passcode) that is enabled to authorize transactions, proceeding with the transaction. In some embodiments, the technique proceeds with the transaction using the first account (e.g., transmitting information, such as account number or funds, corresponding to the first account to the transaction terminal). In some embodiments, the technique proceeds with the transaction using information, such as account number or funds, corresponding to a second account (e.g., transmitting information, such as account number or funds, corresponding to the second account to the transaction terminal). In some embodiments, in accordance with a determination that the authentication information is not consistent with enrolled authentication information that is enabled to authorize transactions, the electronic device forgoes proceeding with the transaction (e.g., forgo transmitting information, such as account number or funds, corresponding to the first account, second account, or any account to the transaction terminal). Thus, under certain circumstances, the user-provided information is verified against enrolled information to provide an additional level of security (e.g., such as to confirm that an authorized user is performing the operation).

In accordance with some embodiments, proceeding with the transaction includes transmitting (e.g., to a transaction terminal) information (e.g., an account number or funds) corresponding to the first account (e.g., 1572A). Accordingly, the same account can be used for both express transit transactions (without authentication) and regular payment transactions (with authentication, such as fingerprint authentication or passcode authentication), depending on context (e.g., based on the signal corresponding to the first type of request or to a second type of request). Therefore, the electronic device provides, for the same account, quicker transmission of information when the signal corresponds to the first type of request, and further provides added security when the request corresponds to the second type of request.

In accordance with some embodiments, proceeding with the transaction includes transmitting (e.g., to a transaction terminal) information (e.g., an account number or funds) corresponding to a second account different from the first account. Accordingly, different accounts can be used for an express transit transaction (without authentication) and a regular payment transaction (with authentication, such as fingerprint authentication or passcode authentication), depending on context (e.g., based on the signal corresponding to the first type of request or to a second type of request). Therefore, the electronic device provides quicker transmission of information corresponding to the first account when the signal corresponds to the first type of request, and further provides a security when the request corresponds to the second type of request.

Note that details of the processes described above with respect to method 1600 (e.g., FIGS. 16A-16B) are also applicable in an analogous manner to the methods described above and below. For example, methods 800, 1000, 1200, 1400, 1800, and 2000 optionally include one or more of the characteristics of the various methods described above with reference to method 1600. For example, the user interface of FIG. 7A may correspond to the user interfaces of FIGS. 9A and 15B. For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

FIGS. 17A-17H illustrate exemplary user interfaces for moving a transaction account from one device to another device using an electronic device (e.g., 100) with a display and one or more input devices, in accordance with some embodiments. The user interfaces in these figures are used to illustrate the processes described below, including the processes in FIG. 18.

In accordance with some embodiments, a transaction account (such as a stored-value account) can only be stored on a single electronic device at any time. The description corresponding to FIGS. 17A-17H provide techniques for a user to initiate a process to cause a transaction account to be moved between various devices. This is helpful, for example, when a user has a stored-value account on a device (such as a smartphone) but the user wants to participate in a transaction using the stored-value account using a different device (such as a smartwatch). By moving the stored-value account to the respective device, the user can participate in the transaction using the preferred device. This allows, for examples, a user that will be going for a run with their smartwatch to transfer a stored-value account from their smartphone to their smartwatch, and to leave their smartphone at home when going for the run.

Figure 17A:
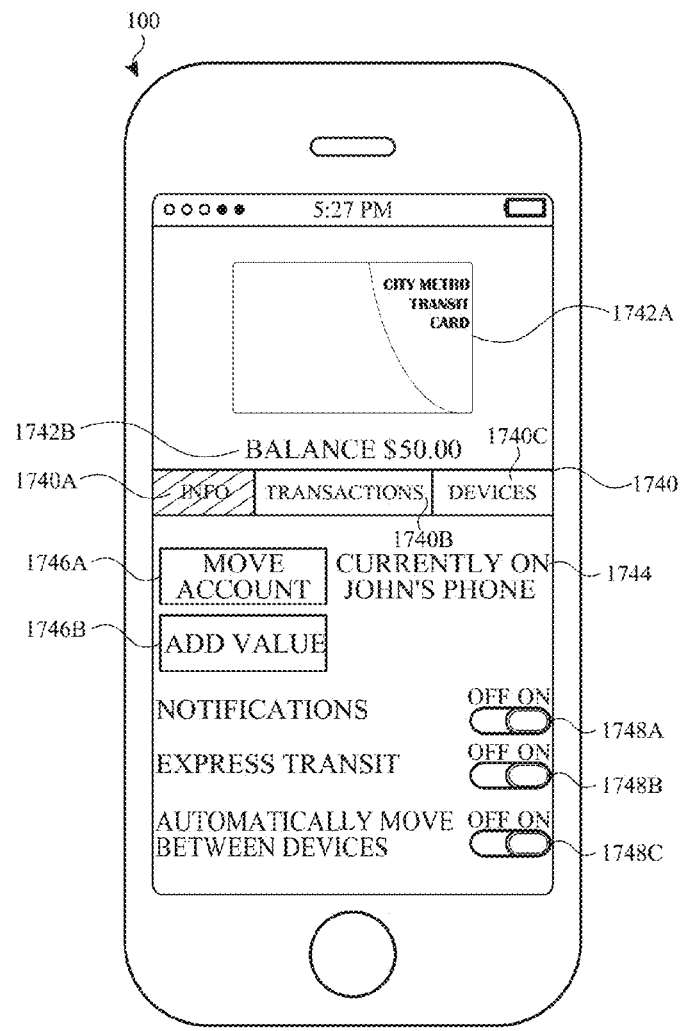
FIGS. 17A-17H illustrate exemplary user interfaces for moving a transaction account from one device to another device, in accordance with some embodiments.
Figure 17B:
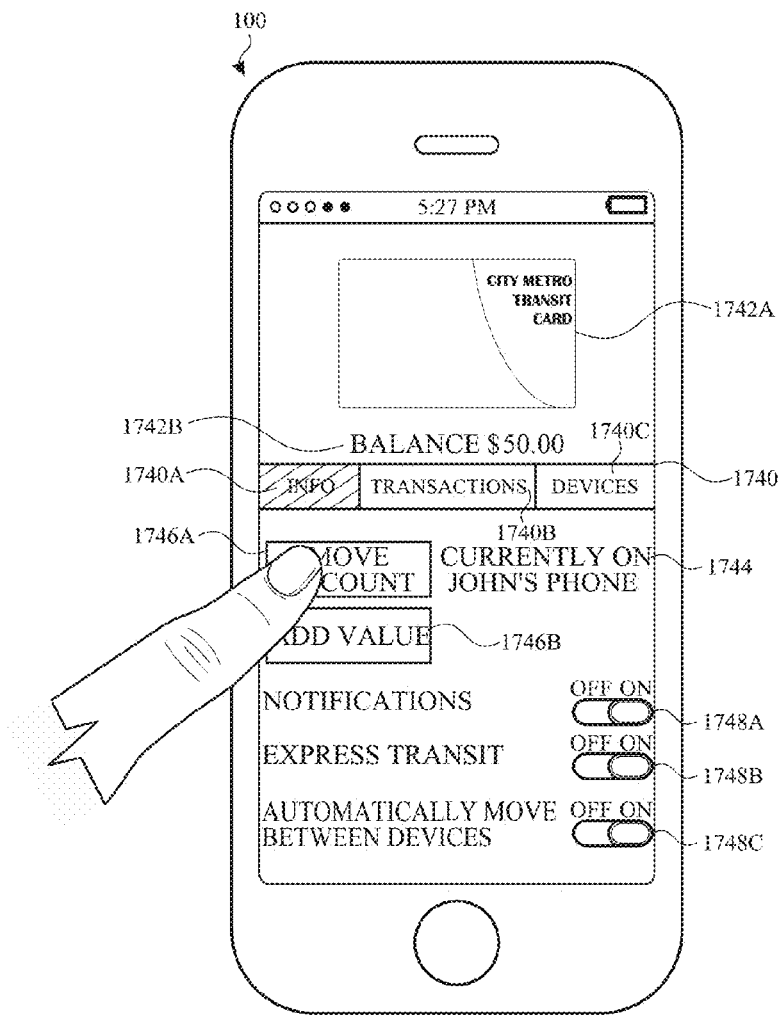
Figure 18:
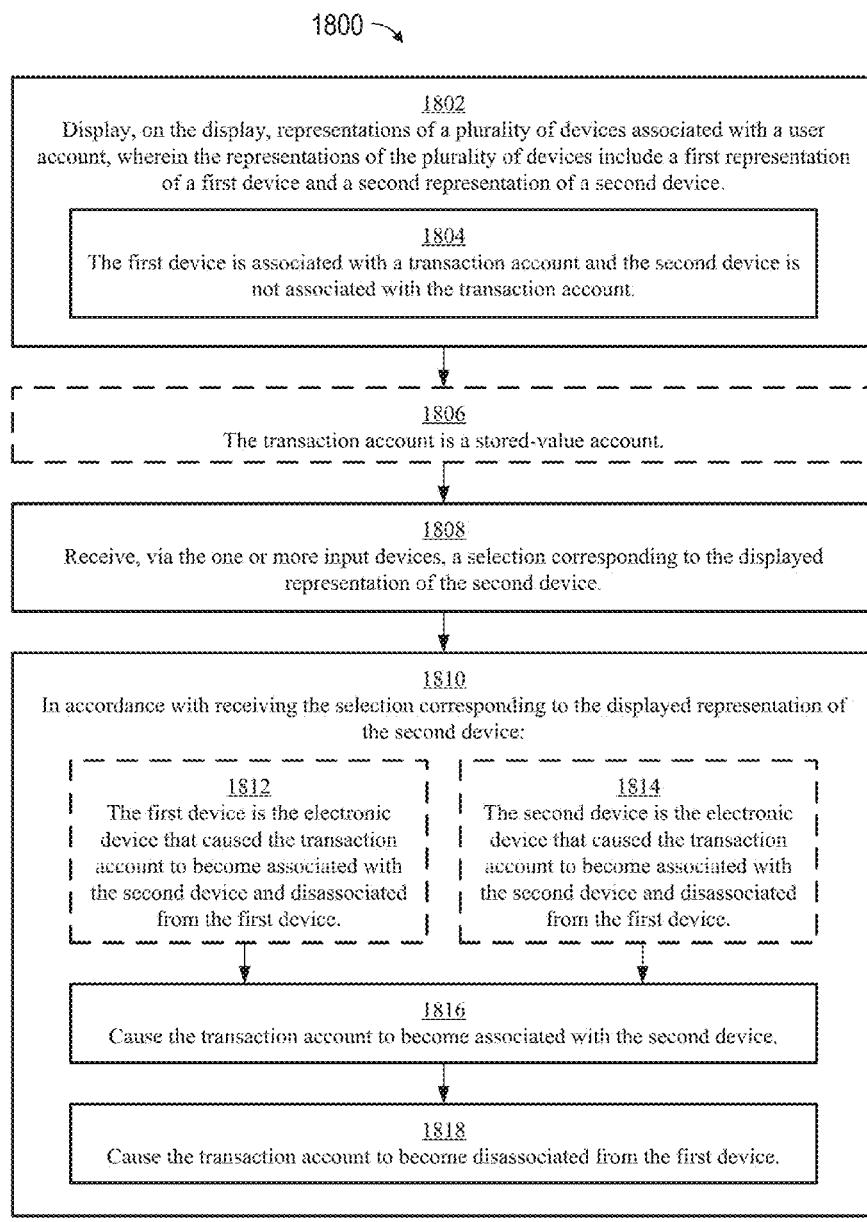
FIG. 18 is a flow diagram illustrating methods of moving a transaction account from one device to another device, in accordance with some embodiments.

FIGS. 17A-17B illustrate a representation of a transaction account displayed on the display of the electronic device 100, in accordance with some embodiments. In some embodiments, the transaction account is a stored-value account. In some embodiments, as illustrated in FIG. 17A, the representation of the transaction account includes a graphical depiction (e.g., 1742A) of the transaction account. The graphical depiction (e.g., 1742A) of the transaction account enables the user to differentiate the transaction account from a different account provisioned on the electronic device 100. In some embodiments, the representation of the transaction account includes an indication (e.g., 1742B) of the available credit (e.g., available funds, commuter plan) of the transaction account.

In some embodiments, the transaction account is a payment account. In some examples, the payment account corresponds to a revolving credit account or a debit account. In some embodiments, as illustrated in FIG. 17A, the transaction account is transit account. In some examples, the transit account stores a transit plan (or transit pass) information. In some examples, the transit plan is a monthly or weekly transit plan. In some embodiments, the transaction account is a stored-value account. For example, the funds are physically stored on the electronic device 100 in the form of binary-coded data. In some examples, the transaction account is a closed-loop stored-value payment account. In some examples, the stored-value account stores electronic cash.

In some embodiments, the representation of the transaction account includes a menu (e.g., 1740) that includes a plurality of selectable affordances (e.g., 1740A, 1740B, 1740C). In some examples, the menu (e.g., 1740) includes an information affordance (e.g., 1740A). In some examples, the menu (e.g., 1740) includes a transactions affordance (e.g., 1740B). In some examples, the menu (e.g., 1740) includes a devices affordance (e.g., 1740C). In some embodiments, the representation of the transaction account includes an activatable transfer-account option (e.g., 1746A). In some embodiments (e.g., in response to user-selection of the information affordance (e.g., 1740A), as illustrated in FIG. 17A), the representation of the transaction account displays an activatable add-value option (e.g., 1746B) which, when activated, causes display of the user interface described with reference to FIGS. 11C-11G. Thus, in some examples, the electronic device 100 presents a user interface that provides the user with options to add value to the transaction account or to move the transaction account to/from another device. In some embodiments (e.g., in response to user-selection of the information affordance (e.g., 1740A), as illustrated in FIG. 17A), the representation of the transaction account displays a transfer-account option (e.g., 1746B). Thus, in some examples, the electronic device 100 provides the user with the option to move accounts from one device to another device.

In some embodiments (e.g., in response to user-selection of the information affordance (e.g., 1740A), as illustrated in FIG. 17A), the representation of the transaction account includes display of: an indication (e.g., 1744) of which device the stored-value account currently resides, features and/or data (e.g., current balance, transit pass information) of the transaction account, a selection affordance (e.g., 1748A) for enabling or disabling notification, a selection affordance (e.g., 1748B) for enabling or disabling having the transaction account be made available for use without checking authentication, such as described with reference to FIGS. 15A-15M, and a selection affordance (e.g., 1748C) for designating or not designating the transaction account to be available for use for transactions made at two or more devices (e.g., associated with the user account), although payment credentials of the transaction account are stored at only one of the two or more devices at a time (e.g., a restriction of the transaction account being a stored-value account), such as described with reference to FIGS. 19A-19H.

In some embodiments, the electronic device 100 receives user input indicating a desire to receive or not to receive notifications about transactions associated with the transaction account (e.g., by moving a selection affordance to the "ON" or "OFF" position, as illustrated with respect to selection affordance 1748A). In some embodiments, the electronic device 100 receives user input indicating a desire to have the transaction account be made available for use without checking authentication (e.g., by moving a selection affordance to the "OFF" position, as illustrated with respect to selection affordance 1748B), such as described with reference to FIGS. 15A-15M. Thus, the electronic device 100 provides the user with the option to designate or not designate the transaction account as an express transit account (e.g., using the selection affordance 1748B), by which funds are transmitted in particular transactions without requiring authentication. In some embodiments, when the transaction account is designated as an express transit account (e.g., by moving the selection affordance 1748B to the "ON" position), the electronic device 100 provides faster access to the stored-value account. In some embodiments, when the stored-value account is not designated as an express transit account (e.g., by moving the selection affordance 1748B to the "OFF" position), the electronic device 100 provides added security for accounts provisioned on the electronic device. In some embodiments, the electronic device 100 receives user input designating the transaction account as an account to be available for use (e.g., by moving a selection affordance to the "ON" or "OFF" position, as illustrated with respect to selection affordance 1748C) at two or more devices of the plurality of devices (e.g., associated with the user account). In some examples, the transaction account is designated to be available for use for transactions made at two or more devices (e.g., associated with the user account), although credentials of the transaction account are stored at only one of the two or more devices at a time (e.g., a restriction of the transaction account being a stored-value account), such as described with reference to FIGS. 19A-19H. Thus, in some examples, the electronic device 100 requests credentials of the transaction account when the user has specified that the transaction account be made available at the electronic device.

In some embodiments, as illustrated in FIG. 17B, the electronic device 100 receives (e.g., from the user) activation of the transfer-account option (e.g., 1746A). In some embodiments, representations of the plurality of devices are displayed in response to receiving activation of the transfer-account option (e.g., 1746A), as illustrated in FIG. 17C.

Figure 17C:
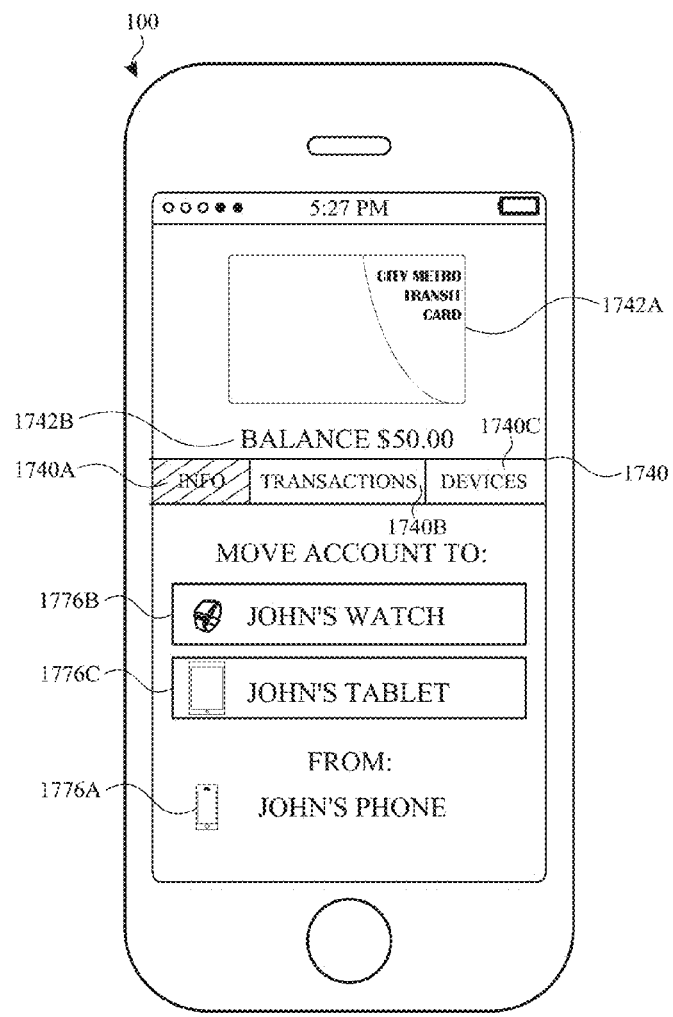

As illustrated in FIG. 17C, the electronic device 100 displays, on the display of the electronic device, representations of the plurality of devices (e.g., phone 1776A, smartwatch 1776B, tablet 1776C) associated with a user account. For example, the plurality of devices associated with the user account includes devices that are logged into a service under the same user account as the electronic device and, optionally, devices that are associated with accounts that are linked to the user account, such as accounts that are part of a family sharing plan. For another example, the plurality of devices associated with the user account includes devices amongst which payment accounts can be moved. The representations of the plurality of devices include a first representation (e.g., 1776A) of a first device (e.g., the electronic device 100, the phone) and a second representation (e.g., 1776B, 1776C) of a second device, wherein the first device is associated with the transaction account and the second device is not associated with the transaction account. In the exemplary embodiment illustrated in FIG. 17C, the phone (e.g., represented by 1776A) is associated with the transaction account (as illustrated in FIGS. 17A-17B by indication 1744) and the smartwatch (e.g., represented by 1776B) and the tablet (e.g., represented by 1776C) are not associated with the transaction account. Thus, in this embodiment, the phone is the first device, and the smartwatch or the tablet is the second device. In some examples, a respective transaction account is provisioned on the first device. In some examples, the respective transaction account is not provisioned on the second device. In some examples, the first device is also associated with a second transaction account that is not a stored-value account, such as a revolving credit transaction account. In some embodiments, a representation of a device that is not associated with the transaction account is selectable by the user, such as 1776B and 1776C. In some embodiments, a representation of a device that is associated with the transaction account is not selectable by the user, such as 1776A. Thus, in the exemplary embodiment illustrated in FIG. 17C, the representation (e.g., 1776A) of the phone is not selectable by the user and the representation (e.g., 1776B) of the smartwatch and the representation (e.g., 1776C) of the tablet are selectable by the user.

In some embodiments, the representations (e.g., 1776A, 1776B, 1776C) of the plurality of devices (e.g., computers, phones, and smartwatches) associated with the user account includes representations of devices that are logged into a service under the same user account as the electronic device 100. For example, the service that the plurality of devices are logged into include a data synchronization service that synchronizes data between devices, a content authorization service that authorizes the devices to access purchased content, or a subscription service such as a purchased applications and music subscription service. In some examples, the representations of the plurality of devices associated with the user account do not include representations of devices that are not logged into the service under the same user account as the electronic device 100. Thus, in some examples, the electronic device 100 displays representations of the devices that are configured for use with the user account, rather than, for example, the user's family member's account.

In some embodiments, the representations (e.g., 1776A, 1776B, 1776C) of the plurality of devices (e.g., computers, phones, and smart watches) associated with the user account includes representations of devices logged into a service using respective user accounts that are associated with the user account with which the electronic device 100 is logged into the service. In some examples, the representations of the plurality of devices associated with the user account do not include representations of devices that are not logged into the service using respective user accounts that are associated with the user account with which the electronic device 100 is logged into the service. Thus, in some examples, the electronic device 100 displays representations of the devices that are configured for use with the accounts associated with the user account, for example the user's family members' accounts.

Figure 17D:
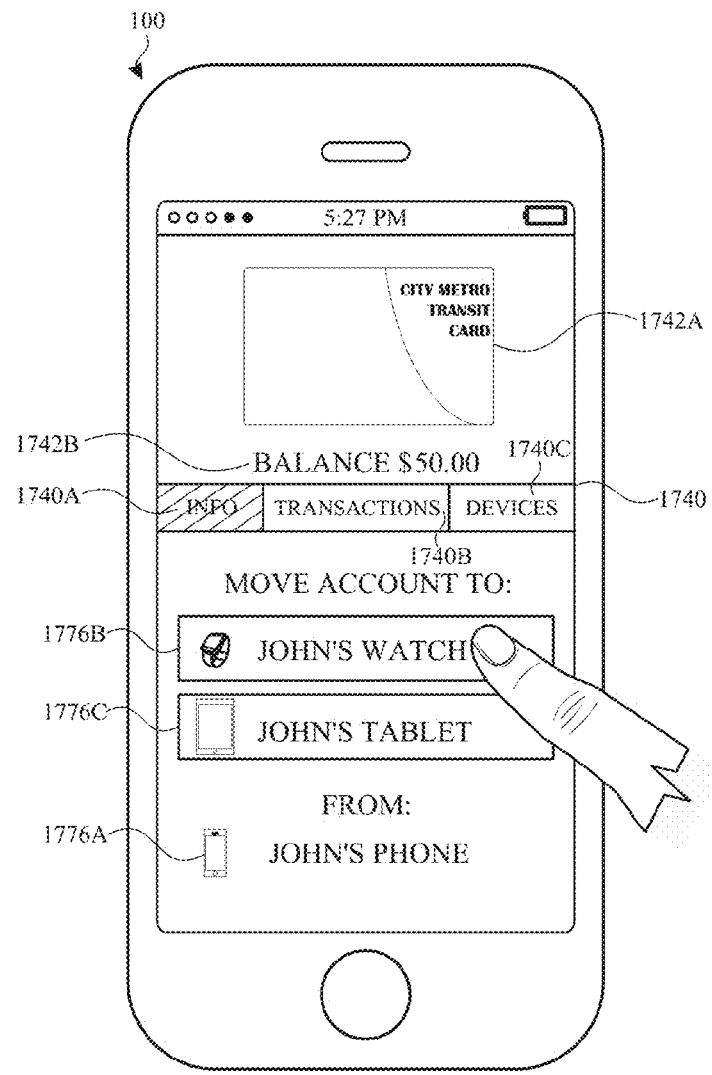

As illustrated in FIG. 17D, the electronic device 100 receives, via the one or more input devices (e.g., a touch-sensitive surface), a selection corresponding to the displayed representation of the second device (e.g., selection of the representation 1776B of the smartwatch). In some embodiments, the second device is not associated with the transaction account.

Figure 17E:
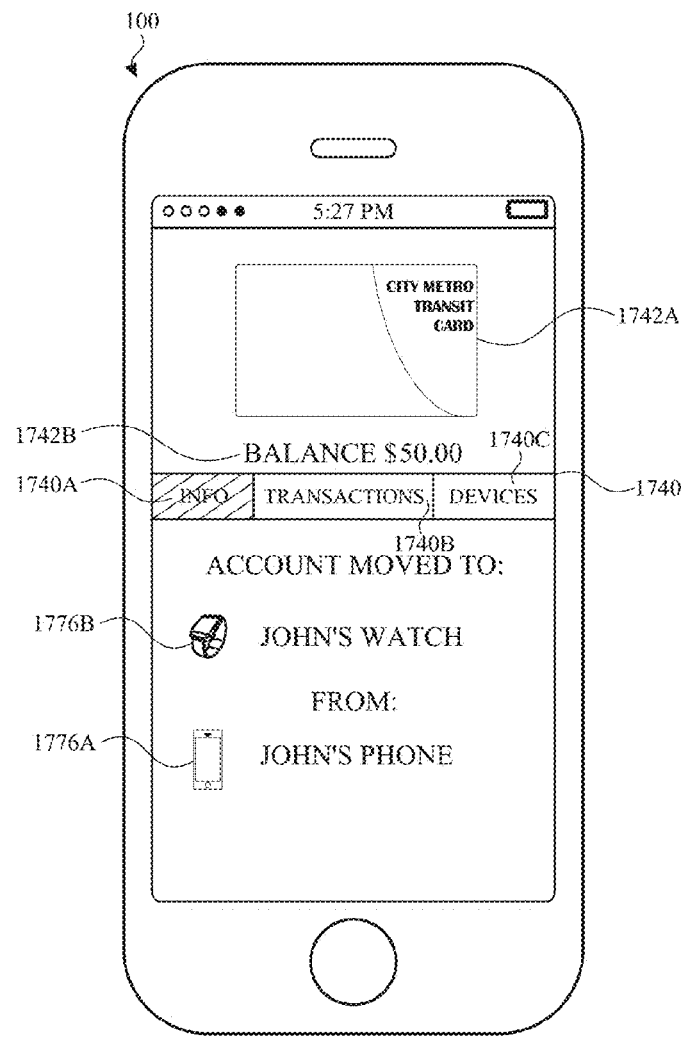

As illustrated in FIG. 17E, in accordance with (or in response to) receiving the selection corresponding to the displayed representation of the second device (e.g., of the representation 1776B of the smartwatch), the electronic device 100 causes (e.g., by transmitting information of the transaction account to the second device) the transaction account to become associated with the second device. For example, the electronic device 100 associates the second device (e.g., represented by 1776B) with the respective transaction account in response to or in accordance with receiving the selection corresponding to the displayed representation of the second device. In some examples, the electronic device 100 causes the transaction account to be provisioned on the second device (e.g., represented by 1776B). In some examples, the electronic device 100 enables the second device (e.g., represented by 1776B) to provision the transaction account on the second device.

In some embodiments, causing the transaction account to become associated with (e.g., provision, enable provisioning) the second device (e.g., represented by 1776B) includes restricting the transaction account to a maximum payment amount at the second device. In some examples, causing the transaction account to become associated with the second device (e.g., represented by 1776B) includes restricting the second device to a maximum payment amount using the transaction account. In some embodiments, causing the transaction account to become associated with (e.g., provision, enable provisioning) the second device (e.g., represented by 1776B) includes restricting the transaction account at the second device to require, from the first device (e.g., a phone represented by 1776A, the electronic device 100), respective pre-approvals for proposed payments to be made at the second device. In some examples, the electronic device 100 is the first device (e.g., represented by 1776B). In some examples, a representation of the transaction account is available at the second device (e.g., represented by 1776B) and a user can request to make a payment using the transaction account (e.g., by selecting the representation of the transaction account for the payment) at the second device. In some examples, in response the request to make the payment using the transaction account at the second device (e.g., represented by 1776B), the second device transmits (e.g., to the electronic device 100, or to the first device (e.g., represented by 1776A)) a request for pre-approval for making the payment using the transaction account. For example, the request includes an amount for pre-approval.

In some embodiments, a user interface is presented to the user at the electronic device 100 (or at the first device (e.g., represented by 1776A)) to approve or disapprove the request for pre-approval. In some embodiments, the electronic device 100 (or the first device (e.g., represented by 1776A)) transmits a response based on user input approving or disapproving the pre-approval. In some embodiments, at the second device (e.g., represented by 1776B), in accordance with receiving a response indicating approval, the second device transmits (e.g., to a contactless payment terminal) payment information corresponding to the transaction account, and in accordance with receiving a response indicating disapproval, the second device forgoes transmitting (e.g., to a contactless payment terminal) payment information corresponding to the transaction account. Thus, the electronic device 100 enables the user to make the transaction account available with pre-approval conditions. This is particularly helpful, for example, if the user wants a family member of the user to have access to the transaction account while maintaining the ability to approve individual transactions.

As also illustrated in FIG. 17E, in accordance with (or in response to) receiving the selection corresponding to the displayed representation of the second device (e.g., represented by 1776B), the electronic device 100 also causes (e.g., by transmitting information of the transaction account to the first device) the transaction account to become disassociated (e.g., de-provisioned, removed) from the first device (e.g., represented by 1776A). In some examples, the first device is the electronic device 100. In some examples, the second device is the electronic device. In some examples, the electronic device is a third device that is different from the first device and the second device.

In some embodiments, the first device is the electronic device 100 that causes the transaction account to become associated with the second device and disassociated with the first device. Thus, in some examples, the electronic device 100 enables the user to move the transaction account from the electronic device to a different device (e.g., push the transaction account from the electronic device to the second device). In some embodiments, the second device is the electronic device that causes the transaction account to become associated with the second device and disassociated with the first device. Thus, in some examples, the electronic device 100 enables the user to move the transaction account from a different device to the electronic device (e.g., pull the transaction account from the first device to the electronic device). In some examples, the electronic device 100 is a third device that causes the transaction account to become associated with the second device and disassociated with the first device.

In some embodiments, in accordance with a determination that a time condition has been met, the electronic device 100 causes (e.g., by transmitting information of the transaction account to the second device) the transaction account to become disassociated from the second device. For example, the time condition is a user-specified time period for which the transaction account remains on the second device until the user-specified time period expires, at which point the transaction account is returned to the first device. In some embodiments, the electronic device 100 causes (e.g., by transmitting information of the transaction account to the first device) the transaction account to become associated with the first device. In some examples, the first device is the electronic device. In some examples, the second device is the electronic device 100. Thus, in some examples, the electronic device 100 can transfer the transaction account back to the first device from the second device. Thus, the electronic device 100 enables the transaction account to be made available for use for a particular time period. This is particularly helpful, for example, if the user wishes to have a family member have access to the transaction account for a certain amount of time, such as a day, week, or month, but not longer. In some examples, causing (e.g., by transmitting information of the transaction account to the second device) the transaction account to become associated with the second device includes restricting the transaction account to be associated with the second device for a maximum time period.

Figure 17F:
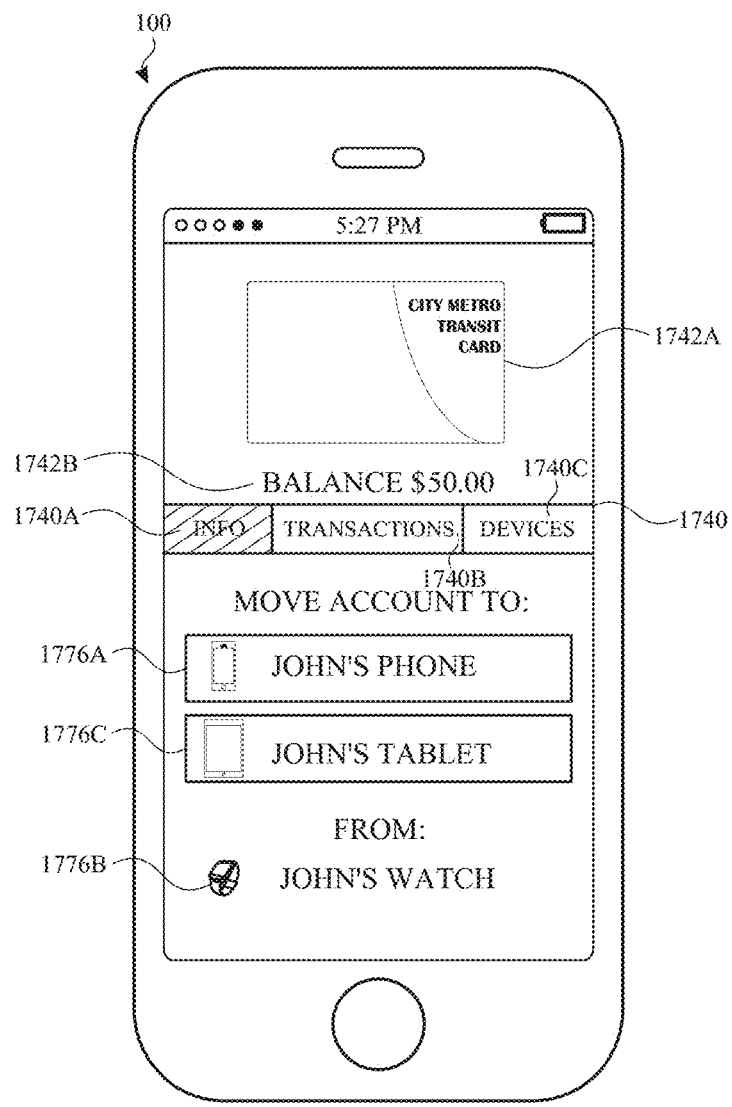
Figure 17G:
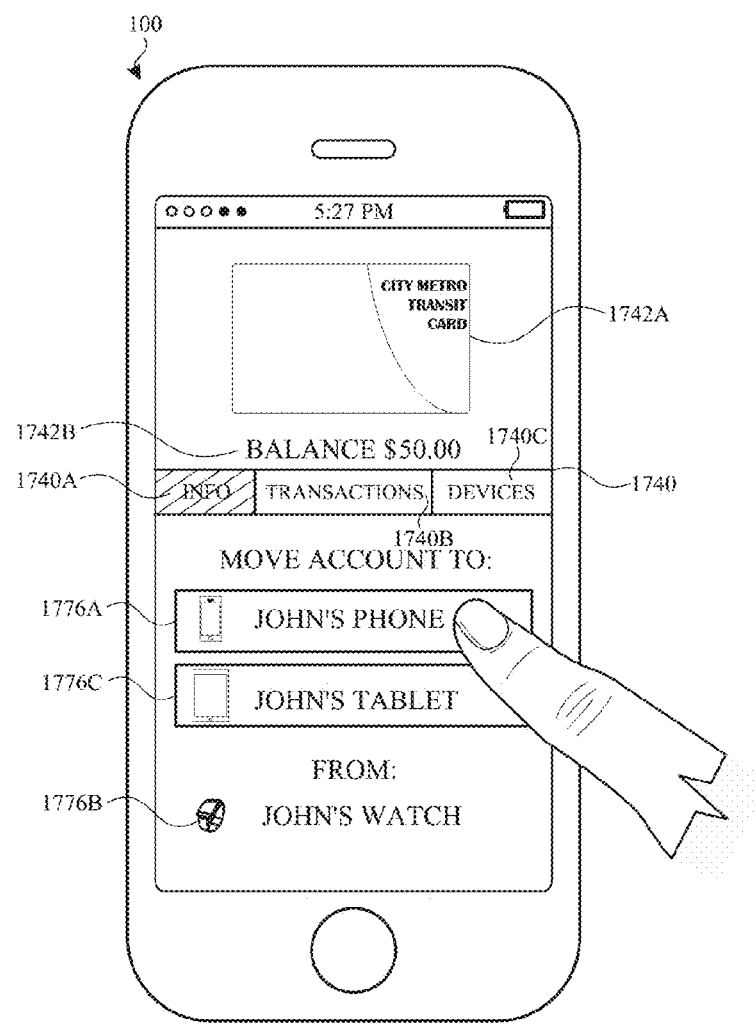
Figure 17H:
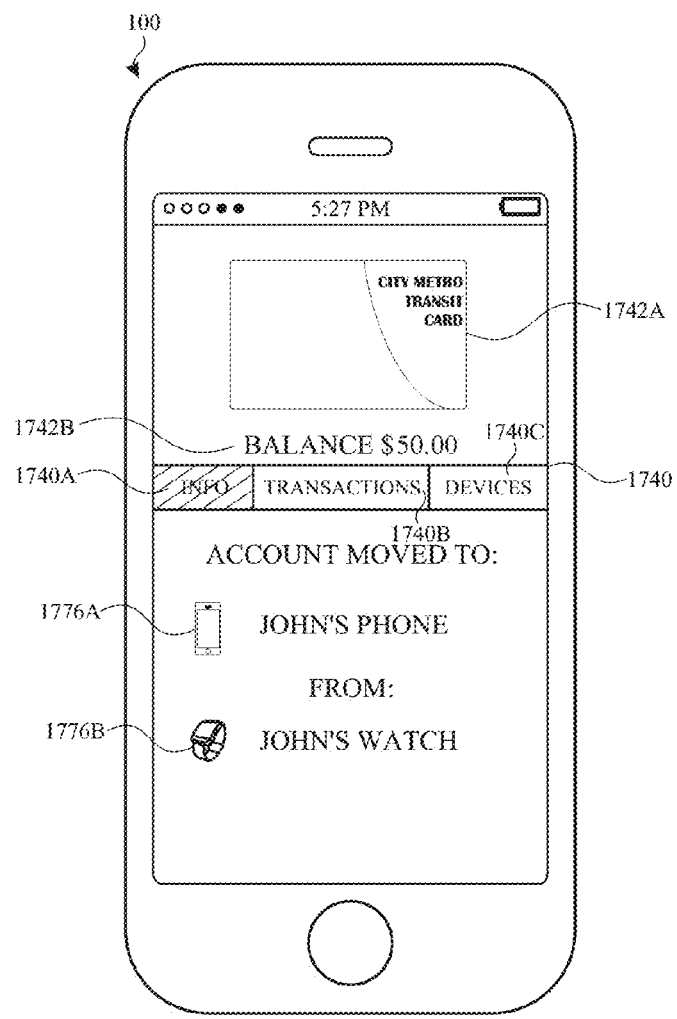

FIGS. 17F-17H illustrate exemplary user interfaces for transferring the transaction account back from the second device (e.g., represented by 1776B) to the first device (e.g., represented by 1776A) in accordance with some embodiments. In some embodiments, as illustrated in FIG. 17F, subsequent to causing (e.g., by transmitting information of the transaction account to the second device) the transaction account to become associated with the second device (e.g., represented by 1776B) and subsequent to causing (e.g., by transmitting information of the transaction account to the first device) the transaction account to become disassociated from the first device (e.g., represented by 1776A), the electronic device 100 displays, on the display of the electronic device, representations of the plurality of devices (e.g., computers, phones, and smart watches). In some embodiments, as illustrated FIG. 17F, the representation (e.g., 1776A) of the first device is selectable, indicating that the first device is not associated with the transaction account (e.g., the respective transaction account is not provisioned onto the first device), and the representation (e.g., 1776B) of the second device is not selectable, and indicating that the second device is associated with the transaction account (e.g., the respective transaction account is provisioned onto the second device).

In some embodiments, as illustrated in FIG. 17G, the electronic device 100 receives, via the one or more input devices, a respective selection corresponding to the first device (e.g., represented by 1776A).

As illustrated in FIG. 17H, in some embodiments, in accordance with (and/or in response to) receiving the respective selection corresponding to the first device (e.g., represented by 1776A), the electronic device 100 causes (e.g., by transmitting information of the transaction account to the second device) the transaction account to become disassociated from the second device (e.g., represented by 1776B). As illustrated in FIG. 17H, in some embodiments, in accordance with (and/or in response to) receiving the respective selection corresponding to the first device (e.g., represented by 1776A), the electronic device 100 causes (e.g., by transmitting information of the transaction account to the first device) the transaction account to become associated with the first device (e.g., represented by 1776A) with the respective transaction account in response to or in accordance with receiving the selection corresponding to the first device. In some examples, the first device is the electronic device 100. In some examples, the second device is the electronic device 100. Thus, in some examples, the electronic device 100 can cause the account to be moved back to the first device from the second device.

In some embodiments, the electronic device 100 is the second device, and the electronic device, as the second device, receives user input designating a third device (and/or first device, and/or second device, and/or a fourth device, etc.) of the plurality of devices associated with the user account as a device for which the transaction account is to be made available for use. In some embodiments, subsequent to causing (e.g., by transmitting information of the transaction account to the second device) the transaction account to become associated with the second device and subsequent to causing (e.g., by transmitting information of the transaction account to the first device) the transaction account to become disassociated from the first device, the electronic device 100 receives a request for payment credentials of the transaction account from the third device (e.g., a tablet) that is different from the electronic device 100. In some embodiments, in accordance with a determination that the third device is designated as a device for which the transaction account is to be made available for use, the electronic device transmits payment credentials of the transaction account to the third device from the second device. Thus, in some examples, the electronic device 100 enables the user to select one or more devices for which the transaction account should be made available for use, thereby reducing the need for the user to manually request that a transaction account be moved from one device to another device of the plurality of devices associated with the user account.

In some examples, causing the transaction account to become associated with the second device includes transmitting information, such as payment credentials, to the second device that is used by the second device to participate in transactions using the transaction account. In some examples, this includes sending payment account information, such as a PAN, account number, or account expiration date, to the second device. In some examples, causing the transaction account to become associated with the second device includes instructing the first device to transmit information, such as payment credentials, to the second device that is to be stored by (e.g., in a secure element of the second device) and used by the second device to participate in transactions using the transaction account.

In some examples, causing the transaction account to become disassociated from the first device includes causing the first device to remove or delete information, such as payment credentials, that would be used to participate in transactions using the transaction account. In some examples, this includes removing payment information, such as a PAN, account number, or account expiration date, from the first device. In some examples, causing the transaction account to become disassociated with the first device includes instructing the first device to remove or delete the information, such as payment credentials, that would be used to participate in transactions using the transaction account.

FIG. 18 is a flow diagram illustrating a method of moving a transaction account from one device to another device, in accordance with some embodiments. Method 1800 is performed at a device (e.g., 100, 300, 500) with a display and one or more input devices. Some operations in method 1800 are, optionally, combined, the order of some operations is, optionally, changed, and some operations are, optionally, omitted.

As described below, method 1800 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

At block 1802, the electronic device displays, on the display, representations (e.g., 1776A, 1776B, 1776C) of a plurality of devices (e.g., computers, phones, and smart watches) associated with a user account (e.g., the plurality of devices are logged into a service under the same user account and, optionally, devices associated with accounts that are linked to the user account such as accounts that are part of a family sharing plan; the devices among which payment accounts can be moved), and, wherein the representations of the plurality of devices include a first representation (e.g., 1776A) of a first device and a second representation (e.g., 1776b) of a second device, and, at block 1804, the first device is associated with a transaction account (e.g., a payment transaction account or a transit transaction account). In some examples, a respective transaction account is provisioned on the first device and the second device is not associated with the transaction account (e.g., the respective transaction account is not provisioned on the second device).

In accordance with some embodiments, at block 1806, the transaction account is a stored-value account (e.g., the funds are physically stored on the electronic device, in the form of binary-coded data). For example, the transaction account is a closed-loop stored-value payment account. In some examples, the stored-value account stores electronic cash. In some examples, the first device is also associated with a second transaction account that is not a stored-value account, such as a revolving credit transaction account. In some examples, information for retrieving the value/data from the transaction account is stored in the secure element of the electronic device to ensure that the value is not accessible in the absence of a properly processed transaction that retrieves the information from the secure element.

In accordance with some embodiments, the transaction account is a payment account. In some examples, the transaction account is a stored-value account that stores electronic cash. In some examples, the payment account corresponds to a revolving credit account or a debit account. In accordance with some embodiments, the transaction account is transit account. In some examples, the transaction account is a stored-value transit account. In some examples, the transit account stores a transit plan (or transit pass) information. In some examples, the transit plan is a monthly or weekly transit plan. Thus, in some examples, the electronic device provides the user with the option to move accounts that can be used to provide the user with access to the transit system.

In accordance with some embodiments, the transaction account is a stored-value account, and, prior to displaying the representations of the plurality of devices, the electronic device displays a representation of the account (e.g., the stored-value account) concurrently with (e.g., adjacent to or otherwise visually linked with the representation of the account) an activatable add-value option (e.g., 1746B) and an activatable transfer-account option (e.g., 1746A). In accordance with some embodiments, the electronic device receives activation of the transfer-account option (e.g., 1746A), wherein displaying the representations (e.g., 1776A, 1776B, 1776C) of the plurality of devices (e.g., computers, phones, and smart watches) associated with the user account is in response to receiving activation of the transfer-account option (e.g., 1746A). Thus, in some examples, the electronic device provides a user interface that allows the user options to add value to the transaction account or to move the transaction account to or from another device.

In accordance with some embodiments, the representations (e.g., 1776A, 1776B, 1776C) of the plurality of devices (e.g., computers, phones, and smart watches) associated with the user account includes representations of devices that are logged into a service (e.g., a data synchronization service that synchronizes data between devices and/or a content authorization service that authorizes the devices to access purchased content or subscription services such as purchased applications and music subscriptions) under the same user account as the user account associated with the electronic device. In some examples, the representations of the plurality of devices associated with the user account do not include representations of devices that are not logged into the service under the same user account as the electronic device. Thus, in some examples, the electronic device displays representations of devices that are configured for use with the user's account (e.g., rather than a family member's account).

In accordance with some embodiments, the representations (e.g., 1776A, 1776B, 1776C) of the plurality of devices (e.g., computers, phones, and smart watches) associated with the user account includes representations of devices logged into a service using respective user accounts that are associated with the user account with which the electronic device is logged into the service. In some examples, the representations of the plurality of devices associated with the user account do not include representations of devices not logged into the service using respective user accounts that are associated with the user account with which the electronic device is logged into the service. Thus, in some examples, the electronic device displays representations of devices that are configured for use with other accounts that are associated with the user's account (e.g., a family members' account).

At block 1808, the electronic device receives, via the one or more input devices, a selection corresponding to the displayed representation of the second device.

At block 1810, in accordance with (and/or in response to) receiving the selection corresponding to the displayed representation of the second device, the electronic device, at block 1816, causes (e.g., by transmitting information to the second device) the transaction account to become associated with the second device (e.g., provision, enable provisioning on the second device), and, at block 1818, causes (e.g., by transmitting information to the first device) the transaction account to become disassociated (e.g., de-provisioned, removed) from the first device. In some examples, causing the transaction account to become associated with the second device includes causing the second device to store, in a secure element of the second device, information for retrieving value of the transaction account, and wherein causing the transaction account to become disassociated from the first device includes causing the first device to no longer store, in a secure element of the first device, information for retrieving value of the transaction account. For example, the electronic device associates the second device with the respective payment account in response to or in accordance with receiving the selection corresponding to the displayed representation of the second device. In some examples, the first device is the electronic device. In some examples, the second device is the electronic device. In some examples, the electronic device is a third device that is different from the first device and the second device. Thus, by moving the transaction account between the two devices, the electronic device enables the user to control which device stores the credentials of the transaction account. As a result, a single stored-value transaction account can be used at various devices.

In accordance with some embodiments, at block 1812, the first device is the electronic device that caused the transaction account to become associated with the second device and disassociated with the first device. Thus, in some examples, the electronic device enables the user to move the transaction account from the electronic device to a different device (e.g., push the transaction account from the electronic device to the second device).

In accordance with some embodiments, at block 1814, the second device is the electronic device that caused the transaction account to become associated with the second device and disassociated with the first device. Thus, in some examples, the electronic device enables the user to move the transaction account from a different device to the electronic device (e.g., pull the transaction account from the first device to the electronic device). In some examples, the electronic device is a third device that causes the transaction account to become associated with the second device and disassociated with the first device. In some examples, moving the transaction account includes releasing (or deleting) information (e.g., transaction information, payment information) from a secure element of the electronic device.

In accordance with some embodiments, the electronic device is the second device, and the electronic device receives user input designating a third device (and/or first device and/or second device) of the plurality of devices as a device for which the transaction account is to be made available for use. In accordance with some embodiments, subsequent to causing (e.g., by transmitting information to the second device) the transaction account to become associated (e.g., provision, enable provisioning) with the second device and subsequent to causing (e.g., by transmitting information to the first device) the transaction account to become disassociated (e.g., de-provisioned, removed) from the first device, the electronic device receives a request for payment credentials of the transaction account from the third device (e.g., an electronic device, such as a phone) that is different from the electronic device, and, in accordance with a determination that the third device is designated as a device for which the transaction account is to be made available for use, transmits payment credentials of the transaction account to the third device from the second device. Thus, in some examples, the electronic device enables the user to select one or more devices for which the transaction account should be made available for use. In some examples, this reduces the need for the user to manually request that a transaction account be moved from one device to another device.

In accordance with some embodiments, causing (e.g., by transmitting information to the second device) the transaction account to become associated with the second device (e.g., provision, enable provisioning) includes restricting the transaction account to a maximum payment amount at the second device. In some examples, causing the transaction account to become associated with the second device includes restricting the second device to a maximum payment amount using the transaction account. Thus, by restricting the second device to a maximum payment amount, the electronic device provides additional security against costly transactions and provides the user with additional control over the use of the transaction account.

In accordance with some embodiments, causing (e.g., by transmitting information to the second device) the transaction account to become associated with the second device (e.g., provision, enable provisioning) includes restricting the transaction account at the second device to require, from the first device (or the electronic device), respective pre-approvals for proposed payments to be made at the second device. In some examples, the electronic device is the first device. In some examples, a representation of the transaction account is available at the second device and a user can request to make a payment using the transaction account (e.g., by selecting the representation of the transaction account for the payment) at the second device. In some examples, in response to the request to make the payment using the transaction account at the second device, the second device transmits (e.g., to the electronic device, to the first device) a request for pre-approval for making the payment using the transaction account. For example, the request includes an amount for pre-approval. A user interface is presented to a user at the electronic device (or at the first device) to approve or disapprove the request for pre-approval. The electronic device (or the first device) transmits a response based on user input approving or disapproving the pre-approval. At the second device, in accordance with receiving a response indicating approval, the second device transmits (e.g., to a contactless payment terminal) payment information corresponding to the transaction account, and in accordance with receiving a response indicating disapproval, the second device forgoes transmitting (e.g., to a contactless payment terminal) payment information corresponding to the transaction account. Thus, the electronic device enables the user to make the transaction account available with pre-approval conditions. This is particularly helpful, for example, if the user wants a family member to have access to the transaction account, but the user would like to approve individual transactions.

In accordance with some embodiments, subsequent to causing (e.g., by transmitting information to the second device) the transaction account to become associated with the second device (e.g., provision, enable provisioning) and subsequent to causing (e.g., by transmitting information to the first device) the transaction account to become disassociated (e.g., de-provisioned, removed) from the first device, the electronic device displays, on the display, representations (e.g., 1776A, 1776B, 1776C) of the plurality of devices (e.g., computers, phones, and smart watches), wherein the first device is not associated with the transaction account (e.g., the respective payment account is provisioned onto the first device) and the second device is associated with the transaction account (e.g., the respective payment account is not provisioned on the second device) and receives, via the one or more input devices, a respective selection corresponding to the first device. In accordance with some embodiments, in accordance with (or in response to) receiving the respective selection corresponding to the first device, the electronic device causes (e.g., by transmitting information to the second device) the transaction account to become disassociated (e.g., de-provisioned, removed) from the second device. For example, associating the second device with the respective payment account in response to or in accordance with receiving the selection corresponding to the displayed representation of the second device. In accordance with some embodiments, in accordance with (or in response to) receiving the respective selection corresponding to the first device, the electronic device also causes (e.g., by transmitting information to the first device) the transaction account to become associated (e.g., provisioned, enable provisioning) with the first device. In some examples, the first device is the electronic device. In some examples, the second device is the electronic device. Thus, in some examples, the electronic device can move the account back to the first device from the second device.

In accordance with some embodiments, in accordance with a determination that a time condition has been met (e.g., that a time period (such as a user-specified time period for which the transaction account should remain on the second device before being returned to the first device) has expired; that a time has been reached), the electronic device causes (e.g., by transmitting information to the second device) the transaction account to become disassociated (e.g., de-provisioned, removed) from the second device. For example, the second device is associated with the respective payment account in response to or in accordance with receiving the selection corresponding to the displayed representation of the second device. In accordance with some embodiments, in accordance with a determination that a time condition has been met, the electronic device also causes (e.g., by transmitting information to the first device) the transaction account to become associated (e.g., provisioned, enable provisioning) with the first device. In some examples, the first device is the electronic device. In some examples, the second device is the electronic device. Thus, in some examples, the electronic device automatically moves the account back to the first device from the second device. Thus, the electronic device enables the user to make the transaction account available for use for a particular time period. This is particularly helpful, for example, if the user wants a family member to have access to the transaction account for the day, week, month, or other determined period of time, but not for a longer period. In some examples, causing (e.g., by transmitting information to the second device) the transaction account to become associated with the second device (e.g., provision, enable provisioning) includes restricting the transaction account to be associated with the second device for a maximum time period.

In some examples, transmitting information to a device to cause the transaction account to become associated with the device includes transmitting account information (such as a PAN, an account number) to the device (e.g., for storage in a secure element of the device). In some examples, transmitting information to a device to cause the transaction account to become disassociated from the device includes transmitting an instruction that identifies the transaction account for disassociation to the device (e.g., instruction to remove account information, such as a PAN, an account number from a secure element of the device).

In accordance with some embodiments, the electronic device receives user input designating the transaction account as an account to be available for use at two or more devices of the plurality of devices. In some examples, the transaction account is designated to be available for use in transactions at two or more devices, although the credentials of the transaction account are stored at only one of the two or more devices at a time (e.g., as a restriction of the transaction account being a stored-value account), as described with reference to FIGS. 19A-19H. Thus, in some examples, the electronic device requests credentials of the transaction account when the user has specified that the transaction account be made available for use at the electronic device.

Note that details of the processes described above with respect to method 1800 (e.g., FIG. 18) are also applicable in an analogous manner to the methods described above and below. For example, methods 800, 1000, 1200, 1400, 1600, and 2000 optionally include one or more of the characteristics of the various methods described above with reference to method 1800. For example, the user interface of FIG. 7A may correspond to the user interfaces of FIGS. 9A and 15B. For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

FIGS. 19A-19H illustrate exemplary user interfaces for accounts that are available for use at one or more devices of a plurality of devices using an electronic device (e.g., 100), in accordance with some embodiments. The user interfaces in these figures are used to illustrate the processes described below, including the processes in FIGS. 20A-20B.

In accordance with some embodiments, a stored-value account can only be physically stored (e.g., in a secure element) at one electronic device at a time. In some examples, a user specifies which electronic devices should have access to the stored-value account. The electronic devices then coordinate to move the stored-value account between the various devices specified by the user when the need arises. For example, when a stored-value account is stored on the user's smartwatch and the user attempts to use a smartphone to participate in a transaction (e.g., such as an NFC transaction) using the stored-value account, the smartphone and smartwatch communication (e.g., via Bluetooth, via NFC) to transfer the stored-value account from the smartwatch to the smartphone. As a result, the user is able to use the stored-value account using various devices without requiring the user to manually request that the stored-value account be moved to a particular device when the user wants to use that device to participate in a transaction using the stored-value account.

Figure 19A:
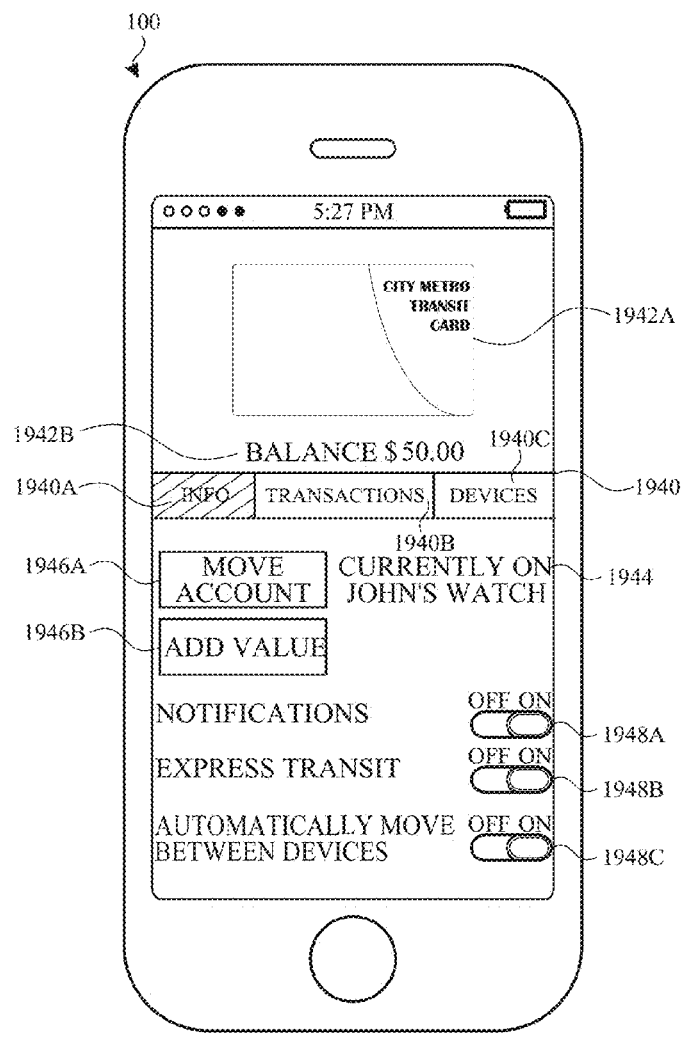
FIGS. 19A-19H illustrate exemplary user interfaces for accounts that are available for use at one or more devices of a plurality of devices, in accordance with some embodiments.
Figure 19B:
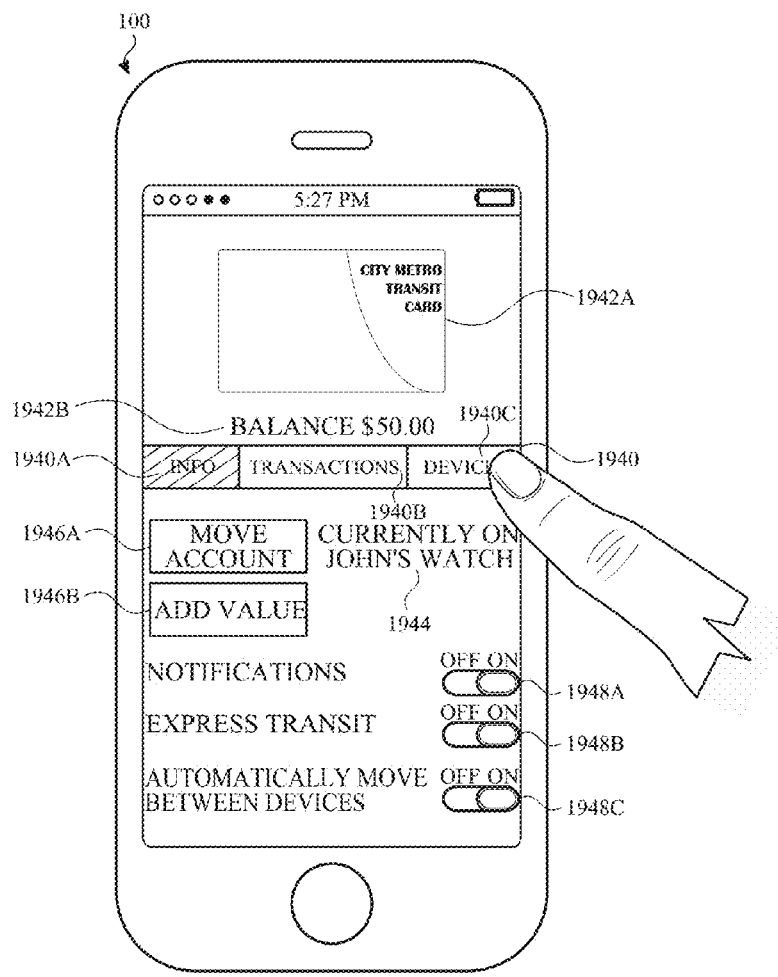
Figure 20A:
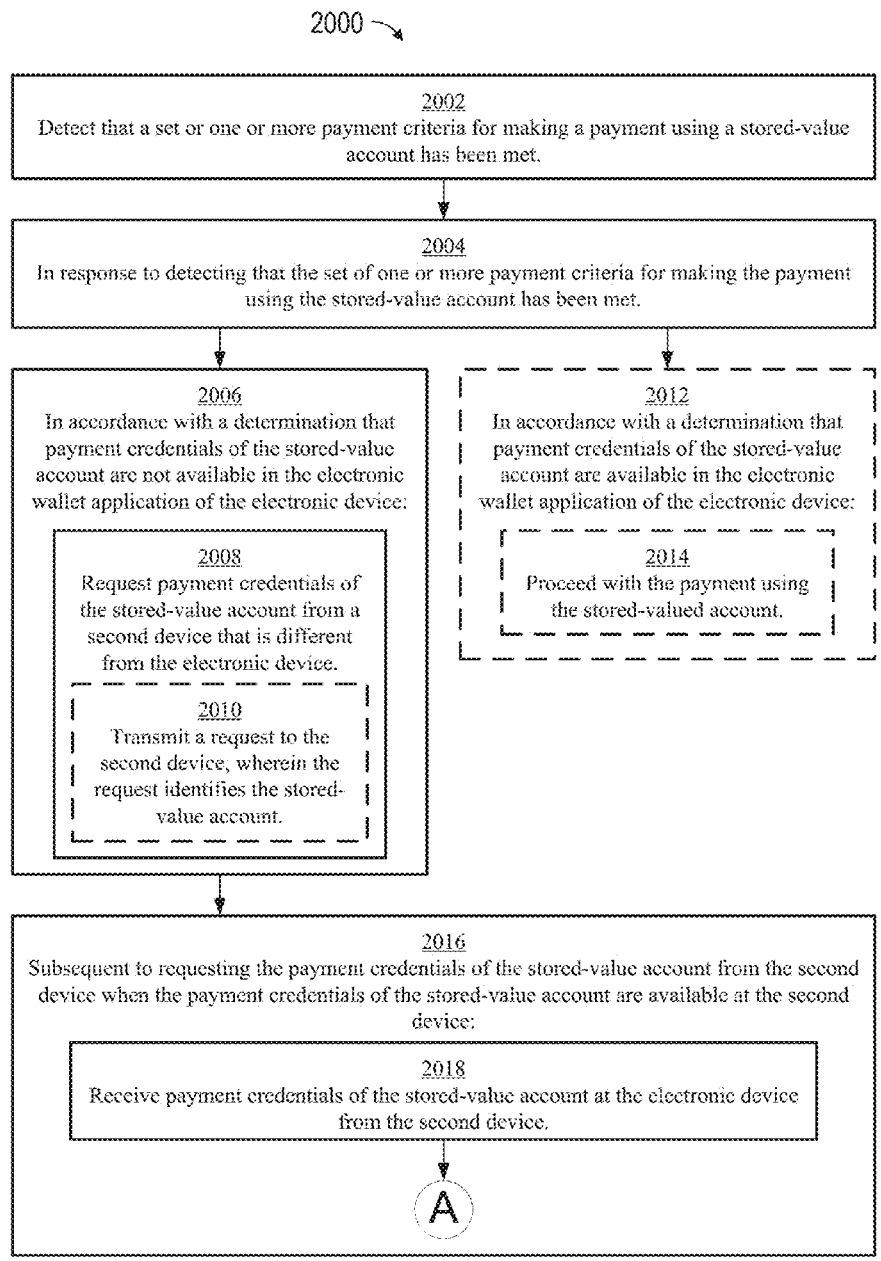
FIGS. 20A-20B is a flow diagram illustrating methods of managing accounts that are available for use at one or more devices of a plurality of devices, in accordance with some embodiments.
Figure 20B:
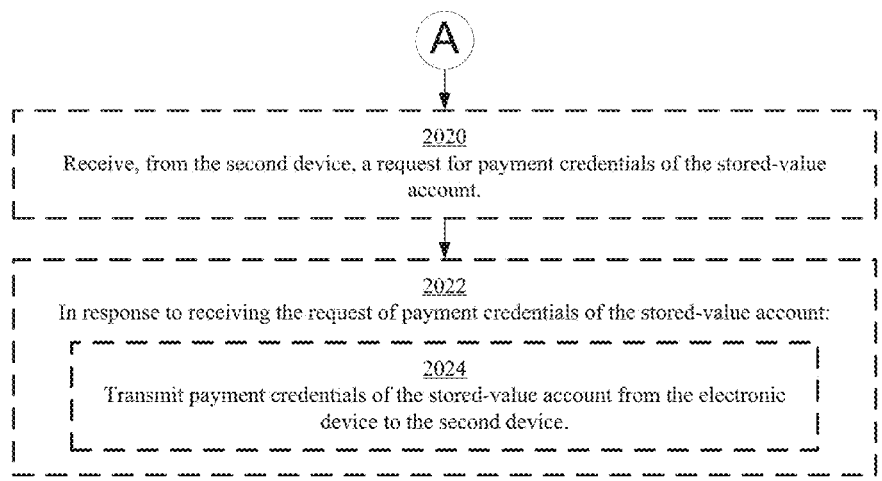

FIGS. 19A-19B illustrate a representation of a stored-value account (or, more generally, an account) displayed, on the display of the electronic device 100, in accordance with some embodiments. In some embodiments, the stored-value account is a payment account. In some examples, the payment account corresponds to a revolving credit account or a debit account. In some embodiments, the stored-value account is transit account. In some examples, the transit account stores a transit plan (or transit pass) information. In some examples, the transit plan is a monthly or weekly transit plan. In some examples, the funds of the stored-value account are physically stored on the electronic device 100, in the form of binary-coded data. In some examples, the stored-value account is a closed-loop stored-value account. In some examples, the stored-value account stores electronic cash. In some embodiments, as illustrated in FIG. 19A, the representation of the stored-value account includes a graphical depiction (e.g., 1942A) of the stored-value account. The graphical depiction (e.g., 1942A) of the stored-value account enables the user to differentiate the stored-value account from a different account provisioned on the electronic device 100. In some embodiments, the representation of the stored-value account includes an indication (e.g., 1942B) of the available credit (e.g., available funds) of the stored-value account.

In some embodiments, the representation of the stored-value account includes a menu (e.g., 1940) that includes a plurality of selectable affordances (e.g., 1940A, 1940B, 1940C). In some examples, the menu (e.g., 1940) includes an information affordance (e.g., 1940A). In some examples, the menu (e.g., 1940) includes a transactions affordance (e.g., 1940B). In some examples, the menu (e.g., 1940) includes a devices affordance (e.g., 1940C). In some embodiments (e.g., in response to user-selection of the information affordance (e.g., 1940A), as illustrated in FIG. 19A), the representation of the stored-value account displays an activatable add-value option (e.g., 1946B) which, when activated, causes display of the user interface described with reference to FIGS. 11C-11G. Thus, in some examples, the electronic device 100 presents a user interface that provides the user with options to add value to the stored-value account or to move the stored-value account to/from another device. In some embodiments (e.g., in response to user-selection of the information affordance (e.g., 1940A), as illustrated in FIG. 19A), the representation of the stored-value account displays a transfer-account option (e.g., 1946B). Thus, in some examples, the electronic device 100 provides the user with the option to move accounts from one device to another device, such as described with reference to FIGS. 17C-17H.

In some embodiments (e.g., in response user-selection of the information affordance (e.g., 1940A), as illustrated in FIG. 19A), the representation of the stored-value account displays: an indication (e.g., 1944) of on which device the stored-value account currently resides, of one or more devices of the plurality of devices (e.g., associated with the user account), features and/or data (e.g., current balance, transit pass information) of the stored-value account, a selection affordance (e.g., 1948A) for enabling or disabling notification, a selection affordance (e.g., 1948B) for enabling or disabling having the stored-value account be made available for use without checking authentication, such as described with reference to FIGS. 15A-15M, and a selection affordance (e.g., 1948C) for designating or not designating the stored-value account to be available for use for transactions made at two or more devices (e.g., associated with the user account), although payment credentials of the stored-value account are stored at only one of the two or more devices at a time (e.g., a restriction of the stored-value account being a stored-value account).

In some embodiments, the electronic device 100 receives user input indicating a desire to receive or not to receive notifications about transactions associated with the stored-value account (e.g., by moving a selection affordance to the "ON" or "OFF" position, as illustrated with respect to selection affordance 1948A). In some embodiments, the electronic device 100 receives user input indicating a desire to have the stored-value account be made available for use without checking authentication (e.g., by moving a selection affordance to the "OFF" position, as illustrated with respect to selection affordance 1948B), such as described with reference to FIGS. 15A-15M. Thus, the electronic device 100 provides the user with the option to designate or not designate the stored-value account as an express transit account (e.g., using the selection affordance 1948B), by which funds are transmitted in particular transactions without requiring authentication. In some embodiments, when the stored-value account is designated as an express transit account (e.g., by moving the selection affordance 1948B to the "ON" position), the electronic device 100 provides faster access to the stored-value account. In some embodiments, when the stored-value account is not designated as an express transit account (e.g., by moving the selection affordance 1948B to the "OFF" position), the electronic device 100 provides added security for accounts provisioned on the electronic device. In some embodiments, the electronic device 100 receives user input designating the stored-value account as an account to be available for use (e.g., by moving a selection affordance to the "ON" or "OFF" position, as illustrated with respect to selection affordance 1948C) at two or more devices of the plurality of devices (e.g., associated with the user account). In some examples, the stored-value account is designated to be available for use for transactions made at two or more devices (e.g., associated with the user account), although credentials of the stored-value account are stored at only one of the two or more devices at a time (e.g., a restriction of the stored-value account being a stored-value account), such as described with reference to FIGS. 19A-19H. Thus, in some examples, the electronic device 100 requests credentials of the stored-value account when the user has specified that the stored-value account be made available at the electronic device.

In some embodiments, as illustrated in FIG. 19B, the electronic device 100 receives (e.g., from the user) selection of the devices affordance (e.g., 1940C) from the menu (1940). In response to detecting the selection of the devices affordance (e.g., 1940C), the electronic device 100 presents a user interface for designating one or more available devices as being available for payment as illustrated in FIGS. 19C-19E, in accordance with some embodiments.

Figure 19C:
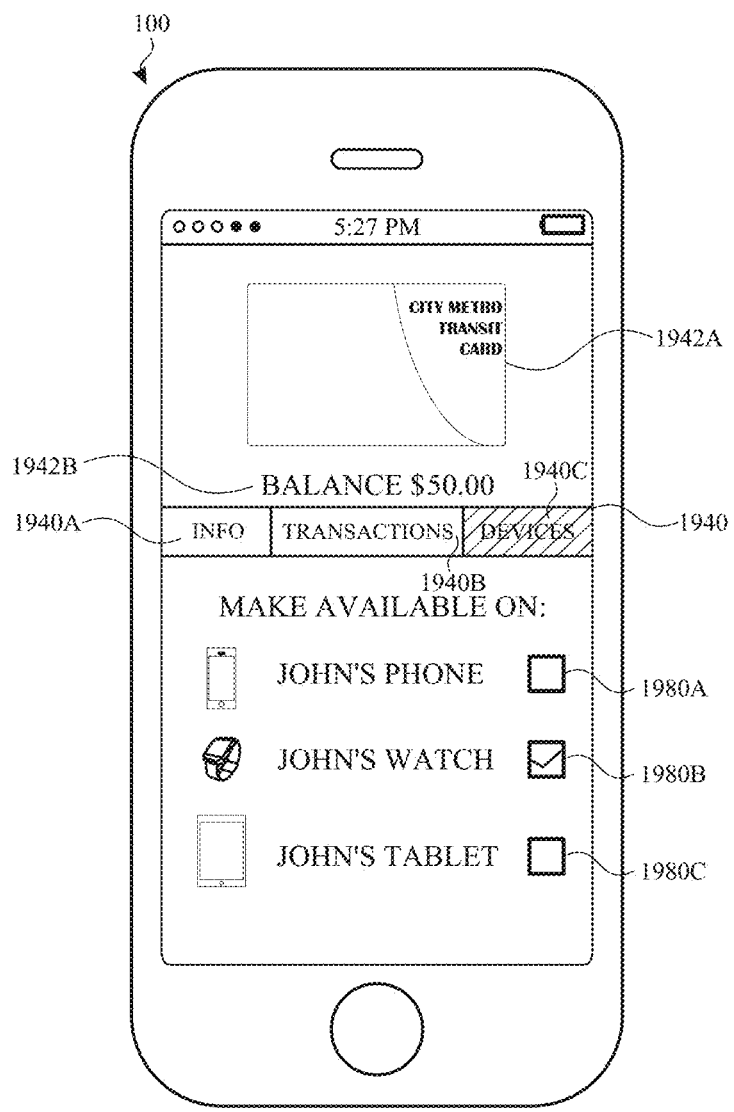
Figure 19D:
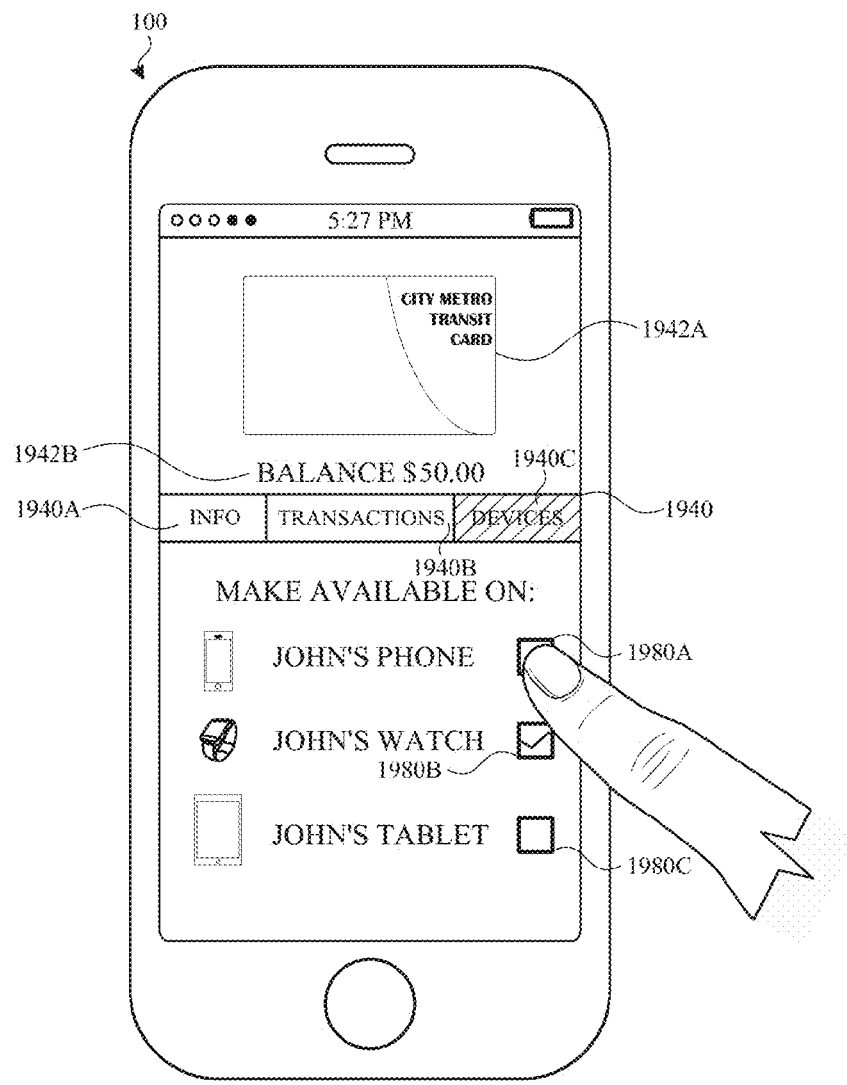
Figure 19E:
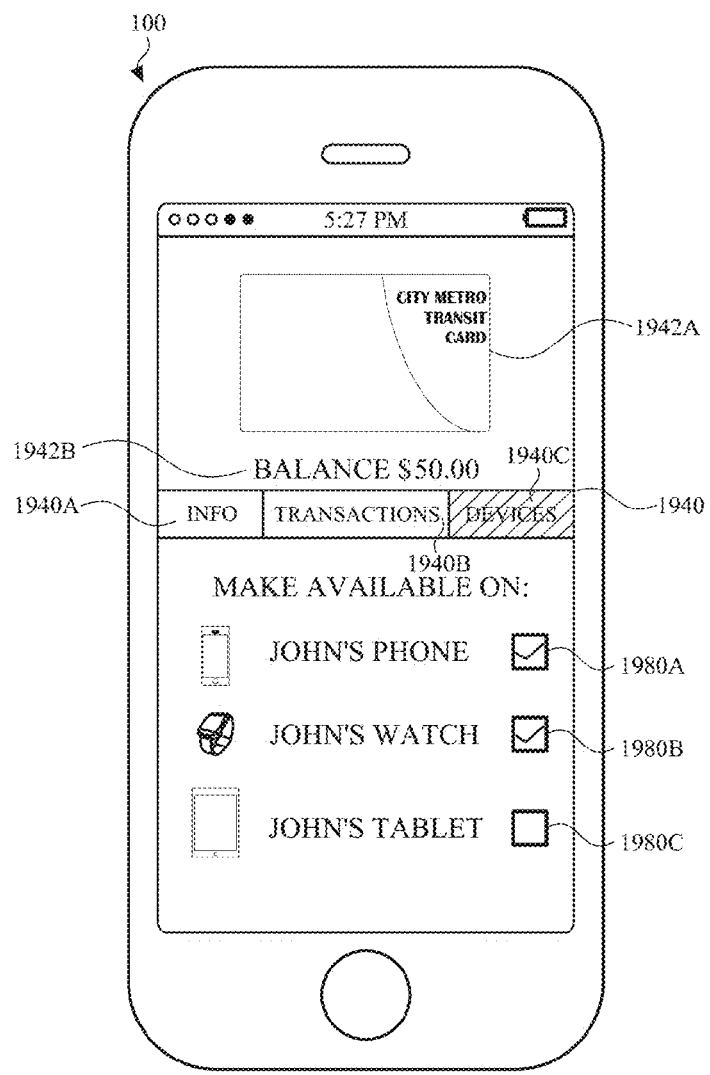

As illustrated in FIG. 19C, in some embodiments, in response to receiving selection of the devices affordance (e.g., 1940C) from the menu (e.g., 1940), the electronic device 100 displays, on the display of the electronic device, a list of selectable representations (e.g., 1980A, 1980B, 1980C) of one or more available devices. In the exemplary embodiment of FIG. 19C, the electronic device displays a list of selectable representations (e.g., 1980A, 1980B, 1980C) of three available devices. The first representation (e.g., 1980A) is of the user's phone, the second representation is of the user's watch (e.g., 1980B), and the third representation is of the user's tablet (e.g., 1980C). In some embodiments, the one or more available devices are devices that are associated with the user account (e.g., configured for use with the user account). In some embodiments, the one or more available devices include devices of other accounts that are associated with the user account, such as the user's family member's account. In some embodiments, in response to the user selecting the devices affordance (e.g., 1940C) from the menu (e.g., 1940) (as illustrated in FIG. 19B), the electronic device 100 displays (or continues to display) a graphical depiction (e.g., 1942A) of the stored-value account and an indication (e.g., 1942B) of the available credit of the stored-value account.

In some embodiments, as illustrated in FIG. 19C, the electronic device 100 presents that one or more available devices are already designated as being available for payment. In this embodiment, the electronic device 100 presents (e.g., displays, on the display) that the representation (e.g., 1980B) of the watch is selected and the representation (e.g., 1980A) of the phone and the representation (e.g., 1980C) of the tablet are not selected. Thus, in this embodiment, of the three available devices (the phone, the watch, and the tablet), only the watch is currently available for payment using the stored-value account represented by 1942A. In some examples, no device is made available for payment using the stored-value account represented by 1942A. For example, the user can un-select the representations of all available devices. In some examples, one device is made available for payment (as illustrated in FIG. 19C). In some examples, more than one device is be made available for payment using the stored-value account represented by 1942A. For example, in the embodiment illustrated in FIG. 19D, the user selects the representation (e.g., 1980A) of the phone. Thus, two devices of the three available devices, the phone and the watch, are now available for payment using the stored-value account represented by 1942A. As illustrated in FIG. 19E, the electronic device 100 presents to the user that the representation (e.g., 1980A) of the phone and the representation (e.g., 1980B) of the watch are now selected, and are available for payment using the stored-value account represented by 1942A.

As described with reference to FIGS. 19C-19E, in some embodiments, two devices of the user's available devices can be made available for payment (e.g., the user's phone and watch). In some embodiments, the available devices include the electronic device 100. In this exemplary embodiment, the electronic device 100 is the phone and a second device is the smartwatch. In other exemplary embodiments, the electronic device 100 may be the smartwatch and the second device may be the phone. In other exemplary embodiments, the electronic device 100 may be a phone and the second device may be a different phone. In other exemplary embodiments, the combination of devices can include any available devices that are made available for payment by the user, such as described with reference to FIGS. 19C-19E.

Figure 19F:
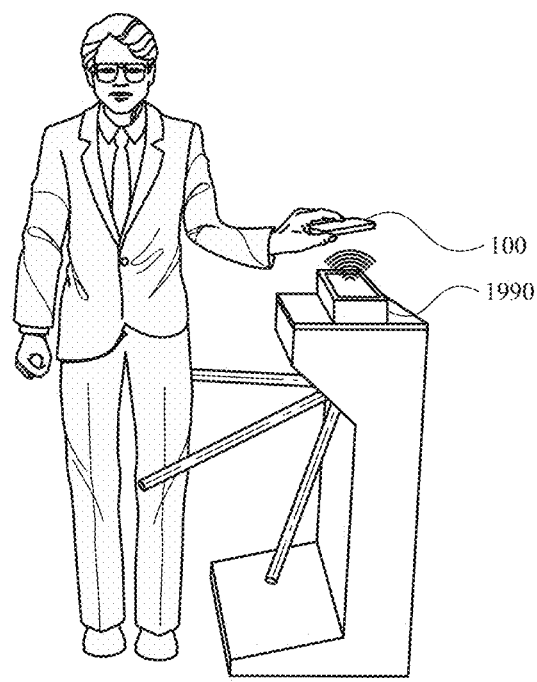

The electronic device 100 (e.g., a phone) detects that a set of one or more payment criteria for making a payment using a stored-value account has been met. In some embodiments, a first payment criterion of the set of one or more payment criteria is met when the electronic device receives (e.g., via one or more short-range communication radios, such as NFC radios) a request for payment, as illustrated in FIG. 19F. In some examples, the payment request includes a request for payment using the stored-value account. In some examples, the payment request is received when there are no payment credentials available at the electronic device. In some examples, the payment request is received from a contactless transaction terminal, for example from a contactless transaction terminal of an entry (or exit) point (e.g., turnstile) of a transit system, as illustrated in FIG. 19F.

In some embodiments, a second payment criterion of the set of one or more payment criteria is met when the electronic device 100 detects, using the one or more short-range communication radios (e.g., NFC radios), a field (e.g., such as an NFC field of the contactless transaction terminal). In some examples, the field indicates that payment will be requested. In some examples, the field indicates that payment is requested. In some examples, the field indicates that payment is requested with a particular type of account (e.g., the same type as the type of the stored-value account). In some examples, the field is generated by a contactless transaction terminal (e.g., an NFC-enabled contactless transaction terminal). Thus, in some examples, the electronic device 100 requests payment credentials when the electronic device expects that a payment will be requested.

In some embodiments, a third payment criterion of the set of one or more payment criteria is met when the electronic device 100 detects a context indicating that a payment will be requested. In some examples, detecting the context includes detecting, using a location sensor (e.g., GPS sensor), that the electronic device 100 is at a predetermined location (e.g., at a transit station). In some examples, detecting the context includes detecting that the electronic device 100 was previously used for payment at the current location (e.g., using the stored-value account). Thus, in some examples, the electronic device 100 requests payment credentials when the electronic device expects that a payment will be requested.

In some embodiments, a fourth payment criterion of the set of one or more payment criteria is met when the electronic device 100 detects activation of an option (e.g., an affordance) corresponding to the stored-value account. For example, the electronic device 100 detects activation of an affordance corresponding to the stored-value account on a lock screen of the electronic device while the electronic device is in a locked state. Thus, in some examples, the electronic device requests payment credentials based on the user request.

In some embodiments, a fifth payment criterion of the set of one or more payment criteria is met when the electronic device 100 determines that the stored-value account has been designated to be made available at the electronic device (and, optionally, the second device), as illustrated in FIG. 19E. In some examples, the stored-value account is designated to be available for use in transactions at both the electronic device 100 and the second device, although the payment credentials of the stored-value account are stored at only one device at a time (e.g., as a restriction of the stored-value account).

In some embodiments, the stored-value account is a first type of account, and a sixth payment criterion of the set of one or more payment criteria is met when the electronic device 100 receives (e.g., from a contactless transaction terminal) a request for payment using the first type of account. In some examples, the sixth criterion is met when the request includes a request for payment using a type of account, wherein the stored-value account is of the requested type of account. For example, the electronic device 100 receives a request for payment with a particular private label payment account, and the stored-value account is a payment account of that particular private label.

In response to detecting that the set of one or more payment criteria for making the payment using the stored-value account has been met (e.g., the electronic device 100 receives, via the one or more short-range communication radios, a request for payment from a contactless transaction terminal as illustrated in FIG. 19F), and in accordance with a determination that payment credentials of the stored-value account are not available in the electronic wallet application of the electronic device 100 (e.g., a phone) and, optionally, in accordance with a determination that payment credentials of the stored-value account are available at a second device (e.g., a smartwatch), the electronic device (e.g., a phone) requests payment credentials of the stored-value account from the second device (e.g., the smartwatch) that is different from the electronic device. In some embodiments, requesting the payment credentials of the stored-value account from the second device (e.g., a smartwatch) includes transmitting a request to the second device, where the request identifies the stored-value account that is being requested for the transfer of credentials to the electronic device.

Subsequent to (and/or, in response to) requesting the payment credentials of the stored-value account from the second device (e.g., a smartwatch), when (e.g., in accordance with the determination that) the payment credentials of the stored-value account are available at the second device, the electronic device 100 receives payment credentials of the stored-value account at the electronic device from the second device. In some embodiments, the payment credentials of the stored-value account are received at the electronic device from the second device (e.g., an electronic device, such as a watch corresponding to 1980B) using a device-to-device (such as electronic device-to-second device) communication over a short-range wireless network. In some examples, the payment credentials are received via a local WiFi network, a peer-to-peer WiFi network, a Bluetooth connection, an NFC connection, or a short-range wireless network. Thus, in some examples, the electronic device 100 and second device do not need to rely on a separate server for communications.

In some embodiments, the electronic device 100 uses a first communication protocol (e.g., a Bluetooth protocol) to receive payment credentials of the stored-value account from the second device and uses a second communication protocol (e.g., an NFC protocol) different from the first communication protocol to make the payment (e.g., transfer funds out of the stored-value account, transmit funds) to a transaction terminal (e.g., a contactless payment terminal, contactless transaction terminal). Thus, in some examples, the electronic device 100 and the second device use protocols that are particular to (or beneficial or optimized) performing respective actions.

In some embodiments, the electronic device 100 uses a first set of one or more radios of the electronic device (e.g., a Bluetooth radios) to receive payment credentials of the stored-value account from the second device and uses a second set of one or more radios (e.g., NFC radios, one or more short-range communication radios) different from the first set of one or more radios to make the payment (e.g., transfer funds) to a transaction terminal (e.g., a contactless payment terminal, a contactless transaction terminal). Thus, in some examples, the electronic device 100 and the second device use various hardware particular to (or beneficial or optimized) performing respective actions.

In some embodiments, subsequent to receiving payment credentials of the stored-value account at the electronic device 100 (e.g., a phone) from the second device (e.g., a smartwatch), the electronic device 100 stores the payment credentials in a secure element of the electronic device 100.

In some embodiments, subsequent to receiving payment credentials of the stored-value account at the electronic device 100 (e.g., a phone) from the second device (e.g., a smartwatch), the electronic device 100 presents an indication (e.g., display a notification on a display of the electronic device, playing audio at a speaker of the electronic device, causing a haptic vibration at the electronic device) requesting authentication (e.g., biometric authentication, fingerprint authentication, passcode authentication) for making payment using payment credentials of the stored-value account. In some embodiments, the electronic device 100 (e.g., a phone) receives (e.g., responsive to the request for authentication) authentication information (e.g., detecting a fingerprint, detecting input of a passcode). In some embodiments, in accordance with a determination that the authentication information is consistent with enrolled authentication information that is enabled to authorize transactions, the electronic device 100 (e.g., a phone) transfers (e.g., using the one or more short-range communication radios, such as NFC radios) funds (e.g., a portion of the funds stored in the stored-value account) from the stored-value account to a transaction terminal (e.g., a contactless payment terminal, a contactless transaction terminal) to make the payment. For example, the electronic device 100 transfers (or transmitting) funds to the transaction terminal using the payment credentials of the stored-value account. In some examples, the electronic device 100 (e.g., a phone) makes a payment by transferring funds to the transaction terminal. In some examples, in accordance with a determination that the authentication information is not consistent with enrolled authentication information that is enabled to authorize transactions, the electronic device 100 (e.g., a phone) forgoes transferring funds of the stored-value account to the transaction terminal (e.g., a payment terminal, a contactless payment terminal). Thus, the electronic device 100 provides additional security through authentication.

In some embodiments, such as subsequent to the electronic device 100 receiving the payment credentials of the stored-value account from the second device, the payment credentials of the stored-value account are already available on the electronic device 100 (e.g., a phone). Thus, in some embodiments, the electronic device 100 does not need to request the payment credentials of the stored-value account from the second device (e.g., a smartwatch) to make a payment, as the payment credentials of the stored-value account are already on the electronic device. For example, in some embodiments, as illustrated in FIG. 19H, the electronic device 100 presents an indication (e.g., 1944) that the payment credentials of the stored-value account (represented by the graphical depiction 1942A) is on (e.g., on the electronic wallet application of) the electronic device (e.g., the phone). In some embodiments, in response to detecting that the set of one or more payment criteria for making the payment using the stored-value account have been met and in accordance with a determination that payment credentials of the stored-value account are available in the electronic wallet application of the electronic device (e.g., as is the case in the embodiment described with reference to FIG. 19H), the electronic device 100 proceeds, or prepares to proceed, with the payment using the payment credentials of the stored-value account that is on the electronic wallet application of the electronic device. In some examples, proceeding with the payment using the stored-value account includes transferring funds from the stored-value account to a transaction terminal (e.g., a contactless payment terminal) (e.g., using payment credentials of the stored value account stored in a secure element of the electronic device). In some examples, because the payment credentials of the stored-value account are available as part of the electronic wallet application of the electronic device 100, the electronic device foregoes requesting payment credentials of the stored-value account from the second device (e.g., a smartwatch), as is the case in the exemplary embodiment illustrated in FIG. 19H.

Figure 19G:
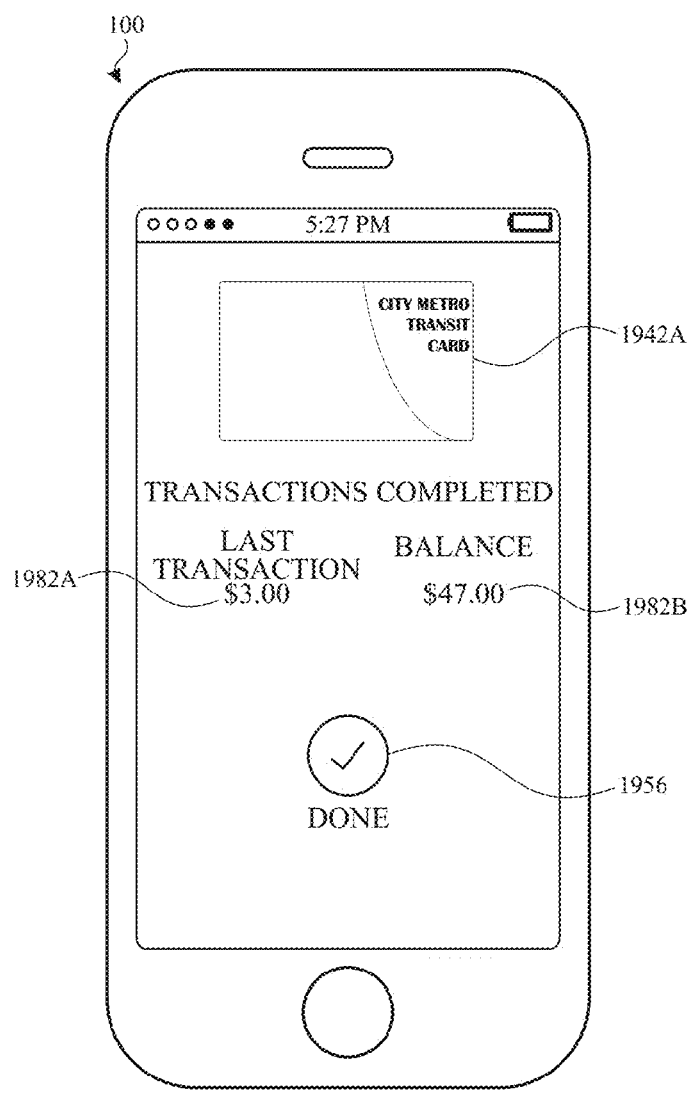
Figure 19H:
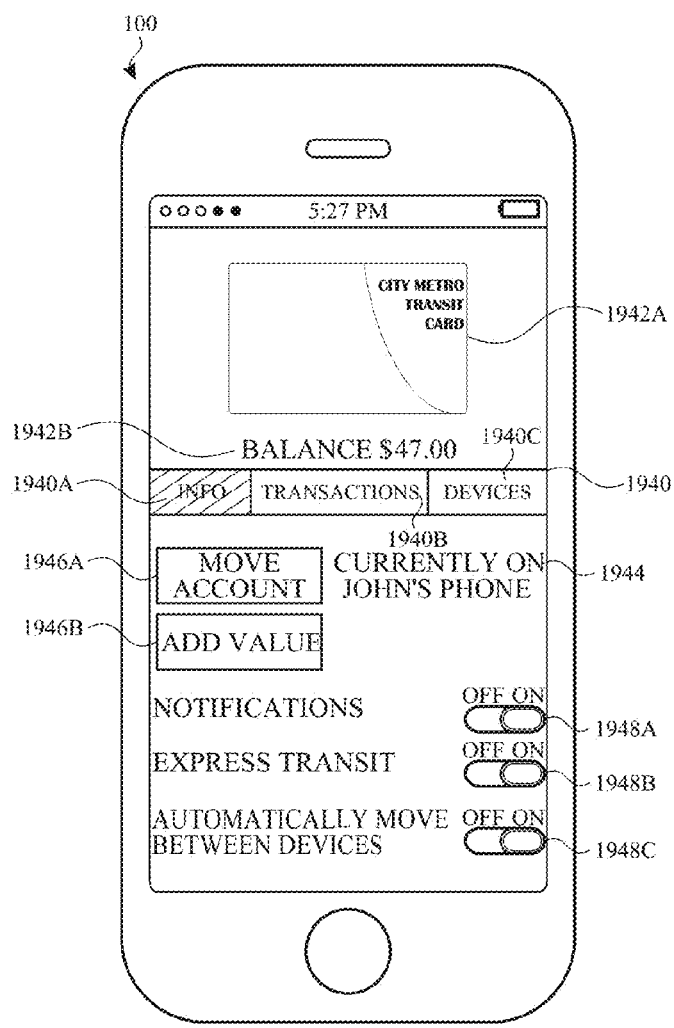

In some embodiments, subsequent to receiving the payment credentials of the stored-value account at the electronic device 100 (e.g., a phone) from the second device (e.g., a smartwatch), the electronic device 100 transfers (e.g., using the one or more short-range communication radios, such as NFC radios) funds (e.g., a portion of the funds stored in the stored-value account) from the stored-value account to a transaction terminal (e.g., a contactless transaction terminal, contactless payment terminal) to make the payment, as indicated by FIG. 19G. For example, transferring (or transmitting) funds to the transaction terminal uses the payment credentials of the stored-value account, which in some examples are stored in a secure element of the electronic device. In some embodiments, in response to transferring funds from the stored-value account to the transaction terminal, the electronic device 100 transmits (or transfers) the payment credentials of the stored-value account from the electronic device 100 (e.g., a phone) back to the second device (e.g., a smartwatch). In some examples, transmitting (or transferring) the payment credentials of the stored-value account from the electronic device 100 (e.g., a phone) to the second device (e.g., a smartwatch) causes the payment credentials to no longer be available at the electronic device (e.g., removed or deactivated), such as no longer be stored in the secure element of the electronic device. Thus, in some examples, the electronic device 100 (e.g., a phone) moves the payment credentials of the stored-value account back to the second device (e.g., a smartwatch) after the electronic device uses the stored-value account for a payment, enabling the second device to use the payment credentials of a subsequent payment transaction.

In some embodiments, subsequent to receiving the payment credentials of the stored-value account at the electronic device 100 (e.g., a phone) from the second device (e.g., a smartwatch), the electronic device 100 transfers (e.g., using the one or more short-range communication radios, such as NFC radios) funds (e.g., a portion of the funds stored in the stored-value account) from the stored-value account to a transaction terminal (e.g., a contactless payment terminal, contactless transaction terminal) to make the payment. For example, transferring (or transmitting) funds to the transaction terminal uses the payment credentials of the stored-value account. Thus, for example, the electronic device makes the payment by transferring funds to the transaction terminal. In some embodiments, in response to transferring funds from the stored-value account to the transaction terminal, the electronic device 100 forgoes transmitting (or forgoes transferring) the payment credentials of the stored-value account from the electronic device (e.g., a phone) to the second device (e.g., a smartwatch). Thus, in some examples, the electronic device 100 retains the payment credentials of the stored-value account so that a future payment can be made using the payment credentials of the stored-value account without the need to request or receive the payment credentials.

In some embodiments, subsequent to receiving the payment credentials of the stored-value account at the electronic device 100 (e.g., a phone) from the second device (e.g., a smartwatch), the electronic device 100 receives, from the second device, a request for payment credentials of the stored-value account. In some embodiments, in response to receiving the request of payment credentials of the stored-value account, the electronic device 100 transmits (or transfers) the payment credentials of the stored-value account from the electronic device (e.g., a phone) to the second device (e.g., a smartwatch), such that the second device stores the payment credentials in a secure element of the second device. In some examples, transmitting (or transferring) the payment credentials of the stored-value account from the electronic device 100 (e.g., a phone) to the second device (e.g., a smartwatch) causes the payment credentials of the stored-value account to no longer be available at the electronic device (e.g., removed or deactivated), for example by causing the stored-value account to become disassociated with the electronic device.

In some embodiments, subsequent to receiving the payment credentials of the stored-value account at the electronic device 100 (e.g., a phone) from the second device (e.g., a smartwatch), the electronic device 100 determines whether a predetermined schedule event condition (e.g., a day of the week, a day of the month, an hour of the day, a date, a time of the day, an interval) is met. In some embodiments, in accordance with a determination that the predetermined schedule event condition is met, the electronic device 100 transmits (or transfers) the payment credentials of the stored-value account from the electronic device (e.g., a phone) to the second device (e.g., a smartwatch). In some examples, transmitting (or transferring) the payment credentials of the stored-value account from the electronic device 100 (e.g., a phone) to the second device (e.g., a smartwatch) causes the payment credentials to no longer be available at the electronic device (e.g., removed or deactivated), such as no longer being stored in a secure element of the electronic device. Thus, the electronic device 100 transmits the payment credentials back to the second device, for example on a scheduled basis. In some examples, in accordance with a determination that the predetermined schedule event condition is not met, the payment credentials for the stored-value account are not transmitted (or transferred) from the electronic device to the second device.

In some embodiments, payment credentials of the stored-value account are not available in the electronic device 100 and are not (or cannot be) received from a device different from the electronic device. For example, the payment credentials of the stored-value account are not available at the second device (e.g., a smartwatch). For another example, the payment credentials of the stored-value account are received from the second device only after a time-out condition has been met (e.g., after a predetermined amount of time has expired). Thus, in some embodiments, in response to detecting that the set of one or more payment criteria for making the payment using the stored-value account have been met, and in accordance with the determination that payment credentials of the stored-value account are not available in the electronic wallet application of the electronic device 100, and further in accordance with not receiving (e.g., within a predetermined amount of time) payment credentials of the stored-value account, the electronic device 100 forgoes proceeding (or forgoes preparing to proceed) with the payment using the stored-value account (e.g., using the payment credentials of the stored-value account). Further, in some embodiments, the electronic device 100 presents (e.g., displays on the display of the electronic device, plays audio via a speaker of the electronic device, cause a haptic vibration at the electronic device) a notification to the user indicating that the stored-value account is not available for use to make the payment. Thus, in some examples, the electronic device 100 notifies the user if the stored-value account is either not available at both the electronic device and the second device or if the payment credentials of the stored-value account are not received in a timely fashion.

FIGS. 20A-20B are a flow diagram illustrating methods for managing accounts that are available for use at one or more devices of a plurality of devices, in accordance with some embodiments. Method 2000 is performed at a device (e.g., 100, 300, 500) with an electronic wallet application and, optionally, one or more radios (e.g., short range radios and not short range radios). Some operations in method 2000 are, optionally, combined, the order of some operations is, optionally, changed, and some operations are, optionally, omitted.

As described below, method 2000 provides an intuitive way for managing transactions. The method reduces the cognitive burden on a user for managing transactions, thereby creating a more efficient human-machine interface. For battery-operated computing devices, enabling a user to manage transactions faster and more efficiently conserves power and increases the time between battery charges.

At block 2002, the electronic device (e.g., 100) detects that a set of one or more payment criteria for making a payment using a stored-value account (or, more generally, an account) has been met. In some examples, the funds for the stored-value account are physically stored on the electronic device (e.g., 100), in the form of binary-coded data. In some examples, the stored-value account is a closed-loop stored-value account.

In accordance with some embodiments, a first payment criterion of the set of one or more payment criteria is met when the electronic device (e.g., 100) receives (e.g., via one or more short-range communication radios, such as NFC radios) a request for payment (e.g., from payment terminal 1990). In some examples, the payment request includes a request for payment using the stored-value account. In some examples, the payment request is received when there are no payment credentials available at the electronic device (e.g., 100). In some examples, the payment request is received from a contactless transaction terminal (e.g., 1990).

In accordance with some embodiments, the electronic device (e.g., 100) includes one or more short-ranged communication radios, and a second payment criterion of the set of one or more payment criteria is met when the electronic device detects, using the one or more short-range communication radios (e.g., NFC radios), a field (e.g., such as an NFC field of the contactless transaction terminal 1990). In some examples, the field indicates that payment will be requested. In some examples, the field indicates that payment is requested. In some examples, the field indicates that payment is requested with a particular type of account (e.g., the same type as a type of the stored-value account). In some examples, the field is generated by a contactless transaction terminal (e.g., an NFC-enabled contactless transaction terminal 1990). Thus, in some examples, the electronic device (e.g., 100) requests payment credentials when the electronic device (e.g., 100) expects that a payment will be requested.

In accordance with some embodiments, a third payment criterion of the set of one or more payment criteria is met when the electronic device detects a context indicating that a payment will be requested. In some examples, detecting the context includes detecting, using a location sensor (e.g., GPS sensor), that the device is at a predetermined location (e.g., at a transit station). In some examples, detecting the context includes detection of one or more wireless signals (e.g., one or more beacons placed near the terminal, such as one or more iBeacons™ or short-range communication location/proximity beacons). In some examples, detecting the context includes detecting that the electronic device was previously used for payment at the current location (e.g., using the stored-value account). Thus, in some examples, the electronic device requests payment credentials when the electronic device expects that a payment will be requested.

In accordance with some embodiments, a fourth payment criterion of the set of one or more payment criteria is met when the electronic device detects activation of an option (e.g., an affordance) corresponding to the stored-value account. For example, the electronic device detects activation of an affordance corresponding to the stored-value account on a lock screen of the electronic device while the electronic device is in a locked state. Thus, in some examples, the electronic device requests payment credentials based on a user request.

In accordance with some embodiments, a fifth payment criterion of the set of one or more payment criteria is met when the electronic device determines that the stored-value account has been designated (e.g., via affordance 1980A) to be available at the electronic device (and, optionally, the second device). In some examples, the stored-value account is designated to be available for use in transactions at both the electronic device (e.g., 100) and the second device (e.g., watch, corresponding to affordance 1980B), although the credentials of the stored-value account are stored at only one device at a time (e.g., as a restriction of the stored-value account). Thus, in some examples, the electronic device requests credentials of the account when the user has specified that the account be made available at the electronic device.

In accordance with some embodiments, the stored-value account is a first type of account, and a sixth payment criterion of the set of one or more payment criteria is met when the electronic device receives (e.g., from a contactless payment terminal 1990) a request for payment using the first type of account. In some examples, the sixth criterion is met when the request includes a request for payment using a type of account, wherein the stored-value account is of the requested type of account. For example, the electronic device (e.g., 100) receives a request for payment with a particular private label payment account, and the stored-value account is a payment account of that particular private label.

At block 2004, in response to detecting that the set of one or more payment criteria for making the payment using the stored-value account has been met and, at block 2006, in accordance with a determination that payment credentials of the stored-value account are not available in the electronic wallet application of the electronic device (and, optionally, a determination that payment credentials of the stored-value account are available at a second device), at block 2008, the electronic device (e.g., 100) requests payment credentials of the stored-value account from a second device (e.g., a second electronic device, such as a smartwatch corresponding to affordance 1980B) that is different from the electronic device (e.g., 100, corresponding to affordance 1980A). Thus, by requesting payment credentials when the set of one or more payment criteria are met, the electronic device (e.g., 100) prepares the electronic device to participate in a transaction, thereby reducing the number of user inputs required (e.g., as compared to the user manually requesting the payment credentials to be moved among devices) enhances the operability of the device by providing the device with the ability to participate in transactions using the payment credentials.

In accordance with some embodiments, at block 2010, requesting payment credentials of the stored-value account from the second device (e.g., a second electronic device, such as a smartwatch) includes transmitting a request to the second device, wherein the request identifies the stored-value account (e.g., for transfer of credentials of the stored-value account to the electronic device).

In accordance with some embodiments, at block 2012, in response to detecting that the set of one or more payment criteria for making the payment using the stored-value account have been met and in accordance with a determination that payment credentials of the stored-value account are available in the electronic wallet application of the electronic device (e.g., 100), the electronic device proceeds (or prepares to proceed) with the payment using the stored-value account (e.g., using credentials of the stored-value account). In some examples, proceeding with the payment using the stored-value account includes transferring funds (e.g., a portion of the funds stored in the stored-value account) from the stored-value account to a payment terminal (e.g., a contactless payment terminal 1990). In some examples, because the payment credentials of the stored-value account are available in the electronic wallet application of the electronic device (e.g., 100), the electronic device (e.g., 100) foregoes requesting payment credentials of the stored-value account from the second device (e.g., a second electronic device, such as a smartwatch corresponding to affordance 1980B).

In accordance with some embodiments, in response to detecting that the set of one or more payment criteria for making the payment using the stored-value account have been met and in accordance with the determination that payment credentials of the stored-value account are not available in the electronic wallet application of the electronic device (e.g., 100), and further in accordance with not receiving (e.g., within a determined time) payment credentials of the stored-value account (e.g., when the payment credentials of the stored-value account are not available at the second device; when the payment credentials of the stored-value account are received from at the second device only after a time-out condition has been met), the electronic device (e.g., 100) forgoes proceeding (or forgoes preparing to proceed) with the payment using the stored-value account (e.g., using credentials of the stored-value account) and presents (e.g., displaying on the display, playing audio via a speakers, causing a haptic vibration at the electronic device) a notification to the user indicating that the stored-value account is not available for use with the payment (e.g., in the payment transaction). Thus, in some examples, the electronic device (e.g., 100) detects and notifies the user if the stored-value account is either (1) not available at the electronic device and at the second device or (2) if the credentials of the stored-value account are not received in a timely fashion, thereby prompting the user to take action with respect to the transaction.

At block 2016, subsequent to (or in response to) requesting the payment credentials of the stored-value account from the second device when (e.g., in accordance with) the payment credentials of the stored-value account are available at the second device, at block 2018, the electronic device (e.g., 100) receives payment credentials of the stored-value account at the electronic device (e.g., a phone) from the second device (e.g., a second electronic device, such as a smartwatch). In some examples, the electronic device includes a secure element, and subsequent to receiving the payment credentials of the stored-value account at the electronic device, the electronic device stores, in the secure element of the electronic device, information for accessing a value of the stored-value account. In some examples, when receiving the payment credentials, information for retrieving the value/funds/data from the stored-value account is stored in the secure element of the electronic device to ensure that the value/funds/data is not accessible in the absence of a properly processed transaction that retrieves the information from the secure element.

In accordance with some embodiments, the payment credentials of the stored-value account are received at the electronic device (e.g., 100, a smartphone) from the second device (e.g., a second electronic device, such as a smartwatch) using a device-to-device (such as electronic device-to-second device) communication over a short-range wireless network. In accordance with some embodiments, the payment credentials of the stored-value account are received at the electronic device using a local WiFi network, a peer-to-peer WiFi network a Bluetooth connection, an NFC connection, or a short-range wireless network. Thus, in some examples, the electronic device and the second device do not rely on a separate server for communications.

In accordance with some embodiments, subsequent to receiving payment credentials of the stored-value account at the electronic device (e.g., a phone) from the second device (e.g., a second electronic device, such as a smartwatch), the electronic device (e.g., 100) transfers (e.g., using the one or more short-range communication radios, such as NFC radios) funds (e.g., a portion of the funds stored in the stored-value account) from the stored-value account to a transaction terminal (e.g., a contactless transaction terminal, contactless payment terminal 1990) to make the payment. For example, transferring (or transmitting) funds to the transaction terminal (e.g., 1990) uses the payment credentials of the stored-value account. For example, the electronic device (e.g., 100) makes payment by transferring funds to the transaction terminal (e.g., 1990). In accordance with some embodiments, in response to transferring funds from the stored-value account to the transaction terminal, the electronic device (e.g., 100) transmits (or transfers) payment credentials of the stored-value account from the electronic device back to the second device. In some examples, transmitting (or transferring) the payment credentials of the stored-value account from the electronic device (e.g., 100) to the second device causes the payment credentials to no longer be available at the electronic device (e.g., removed or deactivated). Thus, in some examples, the electronic device (e.g., 100) moves the payment credentials of the stored-value account back to the second device after the electronic device uses the stored-value account for a payment, enabling the second device to use the payment credentials, if desired. In some examples, transferring funds from the stored-value account includes releasing information (e.g., transaction information, payment information) from a secure element of the electronic device.

In accordance with some embodiments, subsequent to receiving payment credentials of the stored-value account at the electronic device (e.g., 100, a smartphone) from the second device (e.g., a second electronic device, such as a smartwatch), the electronic device (e.g., 100) transfers (e.g., using the one or more short-range communication radios, such as NFC radios) funds (e.g., a portion of the funds stored in the stored-value account) from the stored-value account to a transaction terminal (e.g., 1990, a contactless payment terminal, contactless transaction terminal) to make the payment. For example, transferring (or transmitting) funds to the transaction terminal (e.g., 1990) uses the payment credentials of the stored-value account. For another example, the electronic device (e.g., 100) makes payment by transferring funds to the transaction terminal (e.g., 1990). In accordance with some embodiments, in response to transferring funds from the stored-value account to the transaction terminal, the electronic device forgoes transmitting (or forgoes transferring) payment credentials of the stored-value account from the electronic device to the second device. Thus, in some examples, the electronic device (e.g., 100) retains the payment credentials of the stored-value account so that a future payment can be made using the payment credentials of the stored-value account without the need to request/receive the credentials.

In accordance with some embodiments, subsequent to receiving payment credentials of the stored-value account at the electronic device (e.g., 100, a phone) from the second device (e.g., a second electronic device, such as a smartwatch), at block 2020, the electronic device (e.g., 100) receives, from the second device, a request for payment credentials of the stored-value account, and, at block 2022, in response to receiving the request of payment credentials of the stored-value account, at block 2024, transmits (or transfers) payment credentials of the stored-value account from the electronic device (e.g., 100) to the second device. In some examples, transmitting (or transferring) the payment credentials of the stored-value account from the electronic device (e.g., a smart watch) to the second device causes the payment credentials to no longer be available at the electronic device (e.g., removed or deactivated).

In accordance with some embodiments, subsequent to receiving payment credentials of the stored-value account at the electronic device (e.g., 100, a phone) from the second device (e.g., a second electronic device, such as a smartwatch), the electronic device (e.g., 100) determines whether a predetermined schedule event condition (e.g., a day of the week, a day of the month, an hour of the day, a date, a time of the day, an interval) is met, and, in accordance with a determination that the predetermined schedule event condition is met, transmits (or transfers) payment credentials of the stored-value account from the electronic device to the second device. In some examples, transmitting (or transferring) the payment credentials of the stored-value account from the electronic device (e.g., 100) to the second device causes the payment credentials to no longer be available at the electronic device (e.g., removed or deactivated). Thus, the electronic device (e.g., 100) transmits the payment credentials back to the second device, such as on a scheduled basis, thereby enabling the second device to participate in transactions using the payment credentials without the second device requesting the payment credentials. In some examples, in accordance with a determination that the predetermined schedule event condition is not met, the payment credentials for the stored-value account are not transmitted (or transferred) from the electronic device to the second device.

In accordance with some embodiments, subsequent to receiving payment credentials of the stored-value account at the electronic device (e.g., 100, a phone) from the second device (e.g., a second electronic device, such as a smartwatch), the electronic device (e.g., 100) presents an indication (e.g., display a notification on a display of the electronic device, playing audio at a speaker of the electronic device, causing a haptic vibration at the electronic device) requesting authentication (e.g., biometric authentication, fingerprint authentication, passcode authentication) for making payment using payment credentials of the stored-value account, receives (e.g., responsive to the request for authentication) authentication information (e.g., detecting a fingerprint, detecting input of a passcode), and, in accordance with a determination that the authentication information is consistent with enrolled authentication information (e.g., enrolled biometric information, an enrolled fingerprint, an enrolled passcode) that is enabled to authorize transactions, transfers (e.g., using the one or more short-range communication radios, such as NFC radios) funds (e.g., a portion of the funds stored in the stored-value account) from the stored-value account to a transaction terminal (e.g., 1990, a contactless payment terminal, a contactless transaction terminal) to make the payment. For example, transferring (or transmitting) funds to the transaction terminal (e.g., 1990) uses the payment credentials of the stored-value account. In some examples, the electronic device (e.g., 100) makes a payment by transferring funds to the transaction terminal (e.g., 1990). In some examples, in accordance with a determination that the authentication information is not consistent with enrolled authentication information that is enabled to authorize transactions, the electronic device (e.g., 100) forgoes transferring funds of the stored-value account to the transaction terminal (e.g., 1990, a payment terminal, a contactless payment terminal). Thus, by checking for valid authentication, the electronic device provides added security and helps deter unauthorized transactions.

In accordance with some embodiments, the electronic device (e.g., 100) uses a first communication protocol (e.g., a Bluetooth protocol) to receive payment credentials of the stored-value account from the second device and the electronic device (e.g., 100) uses a second communication protocol (e.g., an NFC protocol) different from the first communication protocol to make the payment (e.g., transfer funds out of the stored-value account) to a transaction terminal (e.g., a contactless payment terminal, contactless transaction terminal). Thus, in some examples, the electronic device (e.g., 100) and the second device use protocols that are particular to (or beneficial; or optimized) performing respective actions, thereby enhancing the efficiency and operability of the device.

In accordance with some embodiments, the electronic device (e.g., 100) includes one or more radio units, and wherein the electronic device (e.g., 100) uses a first set of one or more radios of the electronic device (e.g., a Bluetooth radios) to receive payment credentials of the stored-value account from the second device and the electronic device (e.g., 100) uses a second set of one or more radios (e.g., NFC radios, one or more short-range communication radios) different from the first set of one or more radios to make the payment (e.g., transfer funds out of the stored-value account) to a transaction terminal (e.g., a contactless payment terminal, a contactless transaction terminal). Thus, in some examples, the electronic device (e.g., 100) and the second device use various types of hardware particular to (or beneficial; or optimized) performing respective actions, thereby enhancing the efficiency and operability of the device.

Note that details of the processes described above with respect to method 2000 (e.g., FIGS. 20A-20B) are also applicable in an analogous manner to the methods described above. For example, methods 800, 1000, 1200, 1400, 1600, and 1800 optionally include one or more of the characteristics of the various methods described above with reference to method 2000. For example, the user interface of FIG. 7A may correspond to the user interfaces of FIGS. 9A and 15B.

For another example, accounts provisioned using the techniques of method 800 and 1000 can be used to perform the techniques described with reference to methods 1200, 1400, 1600, 1800, and 2000. For another example, the technique of method 1200 can be used to add funds to the stored-value accounts described with respect to methods 800, 1000, 1400, 1600, 1800, and 2000. For another example, a funded account can be moved to or from different devices, as discussed with respect to methods 1800 and 2000. For brevity, these details are not repeated below.

Figure 21:
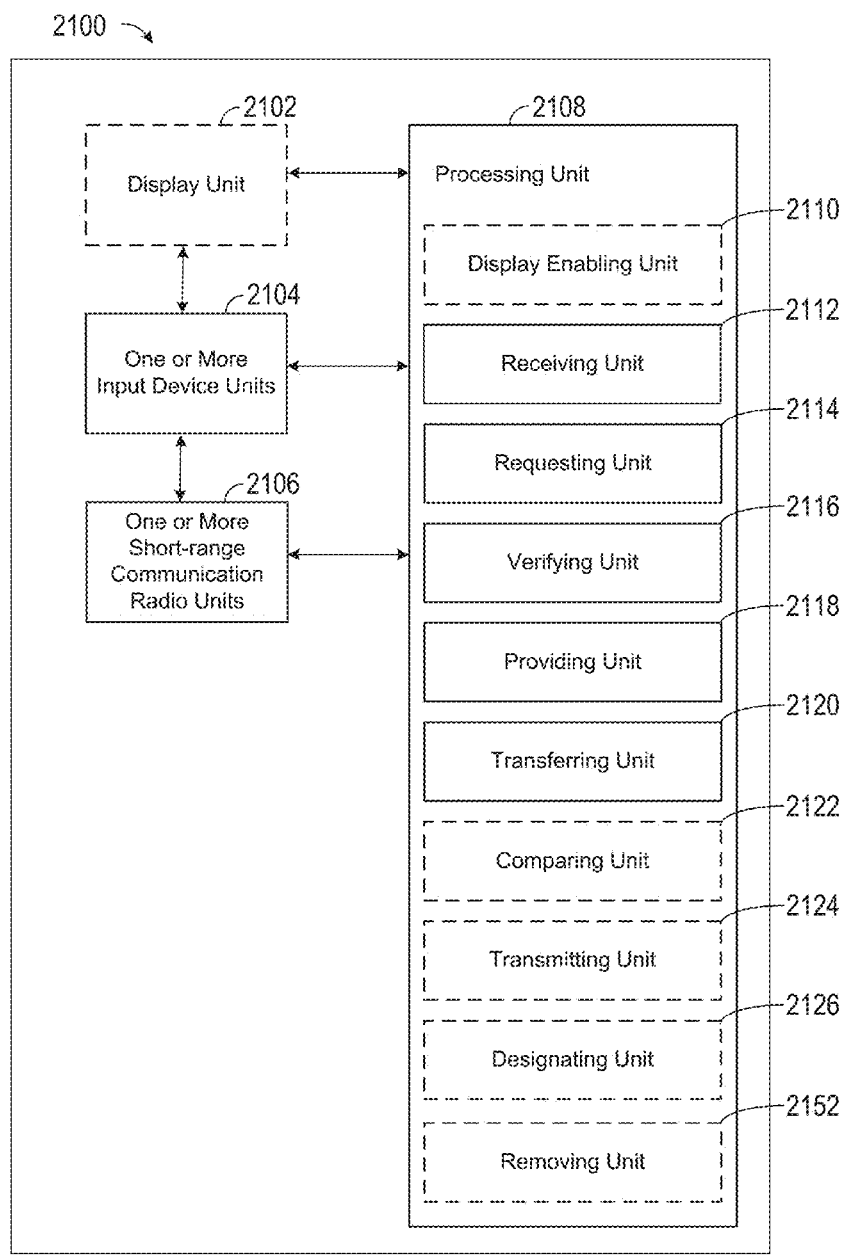
FIGS. 21-27 illustrate functional block diagrams in accordance with some embodiments.

In accordance with some embodiments, FIG. 21 shows an exemplary functional block diagram of an electronic device 2100 configured in accordance with the principles of the various described embodiments. In accordance with some embodiments, the functional blocks of electronic device 2100 are configured to perform the techniques described above. The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

As shown in FIG. 21, an electronic device 2100 includes one or more input device units 2104 configured to receive input, one or more short-range communication radio units 2106 configured to receive and transmit short-range communication, and, optionally, a display unit 2102 configured to display a graphic user interface, and a processing unit 2108 coupled to the one or more input device units 2104, one or more short-range communication radio units 2106, and, optionally, the display unit 2102. In some embodiments, the processing unit 2108 includes a receiving unit 2112, a requesting unit 2114, a verifying unit 2116, a providing unit 2118, a transferring unit 2120, optionally, a display enabling unit 2110, a comparing unit 2122, a transmitting unit 2124, a designating unit 2126, and a removing unit 2152.

The processing unit 2108 is configured to: receive (e.g., using the receiving unit 2112), by the one or more short-range communication radio units 2106, a card account number of a card, wherein the card has a stored value; request (e.g., using the requesting unit 2114) verification information to verify ownership of the card; receive (e.g., using the receiving unit 2112), via the one or more input device units 2104, input from a user of the electronic device 2100 that includes verification information for verifying ownership of the card; verify (e.g., using the verifying unit 2116) ownership of the card by comparing the verification information with separate information about the card that is received separately from the verification information; and in accordance with a determination that verification of ownership is successful: generating (e.g., using the providing unit 2118) a prompt to perform a value transfer operation for a value transfer; and in conjunction with the value transfer operation, transfer (e.g., using the transferring unit 2120) at least some of the stored value from the card to a virtual card stored on the electronic device 2100.

In accordance with some embodiments, the verification information is information that is not shown on the card.

In accordance with some embodiments, the card is a stored-value card.

In accordance with some embodiments, the processing unit 2108 is further configured to: in accordance with a determination that the value transfer is not successful:

generating (e.g., using the providing unit 2118) a second prompt to perform the value transfer operation for the value transfer.

In accordance with some embodiments, the processing unit 2108 is further configured to: in accordance with a determination that verification of ownership is not successful: generating (e.g., using the providing unit 2118) feedback indicating that verification of ownership was not successful.

In accordance with some embodiments, in accordance with a determination that the card is registered: requesting (e.g., using the requesting unit 2114) verification information to verify ownership of the card includes requesting information that is not shown on the card; and in accordance with a determination that the card is not registered: requesting (e.g., using the requesting unit 2114) verification information to verify ownership of the card includes requesting information that is shown on the card.

In accordance with some embodiments, the processing unit 2108 is further configured to: in accordance with a determination that the card is not registered and prior to verifying ownership of the card: request (e.g., using the requesting unit 2114) a user-provided account number of the card as part of requesting verification information to verify ownership of the card; receive (e.g., using the receiving unit 2112) the user-provided account number of the card as part of receiving input from the user of the electronic device 2100 that includes verification information for verifying ownership of the card; and compare (e.g., using the comparing unit 2122) the user-provided account number to the card account number as part of verifying ownership of the card by comparing the verification information with separate information, wherein the separate information includes the received card account number of the card.

In accordance with some embodiments, the electronic device 2100 does not present the card account number of the card prior to receiving, via the one or more input device units 2104, input from the user of the electronic device 2100 that includes verification information for verifying ownership of the card.

In accordance with some embodiments, the processing unit 2108 is further configured to: in accordance with a determination that the card is registered: transmit (e.g., using the transmitting unit 2124) the card account number of the card; and receive (e.g., using the receiving unit 2112) the separate information.

In accordance with some embodiments, the processing unit 2108 is further configured to: forgo receiving (e.g., using the receiving unit 2112) a user-provided account number of the card.

In accordance with some embodiments, the electronic device 2100 includes a display unit 2102, and the processing unit 2108 is further configured to: subsequent to transferring at least some of the stored value from the card to the virtual card stored on the electronic device 2100: enable display (e.g., using the display enabling unit 2110), on the display unit 2102, of transit plan information of the virtual card, the transit plan information based on the transferred at least some of the stored value.

In accordance with some embodiments, the electronic device 2100 includes a display unit 2102, and the processing unit 2108 is further configured to: subsequent to transferring at least some of the stored value from the card to the virtual card stored on the electronic device: enable display (e.g., using the display enabling unit 2110), on the display unit 2102, of one or more of: a balance of the virtual card, a username of an account registered to the virtual card, and transit plan information of the virtual card.

In accordance with some embodiments, transferring (e.g., using the transferring unit 2120) at least some of the stored value from the card to the virtual card stored on the electronic device 2100 includes: removing (e.g., using the removing unit 2152) the stored value from the card; and transmitting (e.g., using the transmitting unit 2124) a request to a server to deactivate the card.

In accordance with some embodiments, the processing unit 2108 is further configured to: in accordance with a determination that the electronic device 2100 does not have another linked transit account, designate (e.g., using the designating unit 2126) an account of the virtual card to be made available for use without checking authentication; and in accordance with a determination that the electronic device 2100 has one or more other linked transit accounts, forgo designating (e.g., using the designating unit 2126) the account of the virtual card to be made available for use without checking authentication.

In accordance with some embodiments, the processing unit 2108 is further configured to: in accordance with a determination that the electronic device 2100 does not have another linked transit account: in accordance with receiving user input indicating a desire not to have accounts be made available for use without checking authentication, forgo designating (e.g., using the designating unit 2126) the account of the virtual card to be made available for use without checking authentication.

In accordance with some embodiments, the processing unit 2108 is further configured to: receive (e.g., using the receiving unit 2112) user input indicating a desire not to have accounts be made available for use without checking authentication; and in response to receiving the user input indicating the desire not to have accounts be made available for use without checking authentication, designate (e.g., using the designating unit 2126) an account of the virtual card to not be made available for use without checking authentication.

In accordance with some embodiments, the processing unit 2108 is further configured to: receive (e.g., using the receiving unit 2112) user input selecting an account to be made available for use without checking authentication; and in response to receiving the user input selecting the account to be made available for use without checking authentication, designate (e.g., using the designating unit 2126) the selected account to be made available for use without checking authentication.

In accordance with some embodiments, prior to receiving the card account number of the card and prior to verifying ownership of the card, the virtual card is stored on the electronic device 2100.

In accordance with some embodiments, the processing unit 2108 is further configured to: subsequent to transferring at least some of the stored value from the card to the virtual card stored on the electronic device 2100: enable display (e.g., using the display enabling unit 2110), on the display unit 2102, of a stored value of the virtual card.

The operations described above with reference to FIGS. 8A-8B are, optionally, implemented by components depicted in FIGS. 1A-1B or FIG. 21. For example, receiving operation 802, requesting operation 806, receiving operation 816, verifying operation 818, determining operation 820, providing operation 822, and transferring operation 824 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 22:
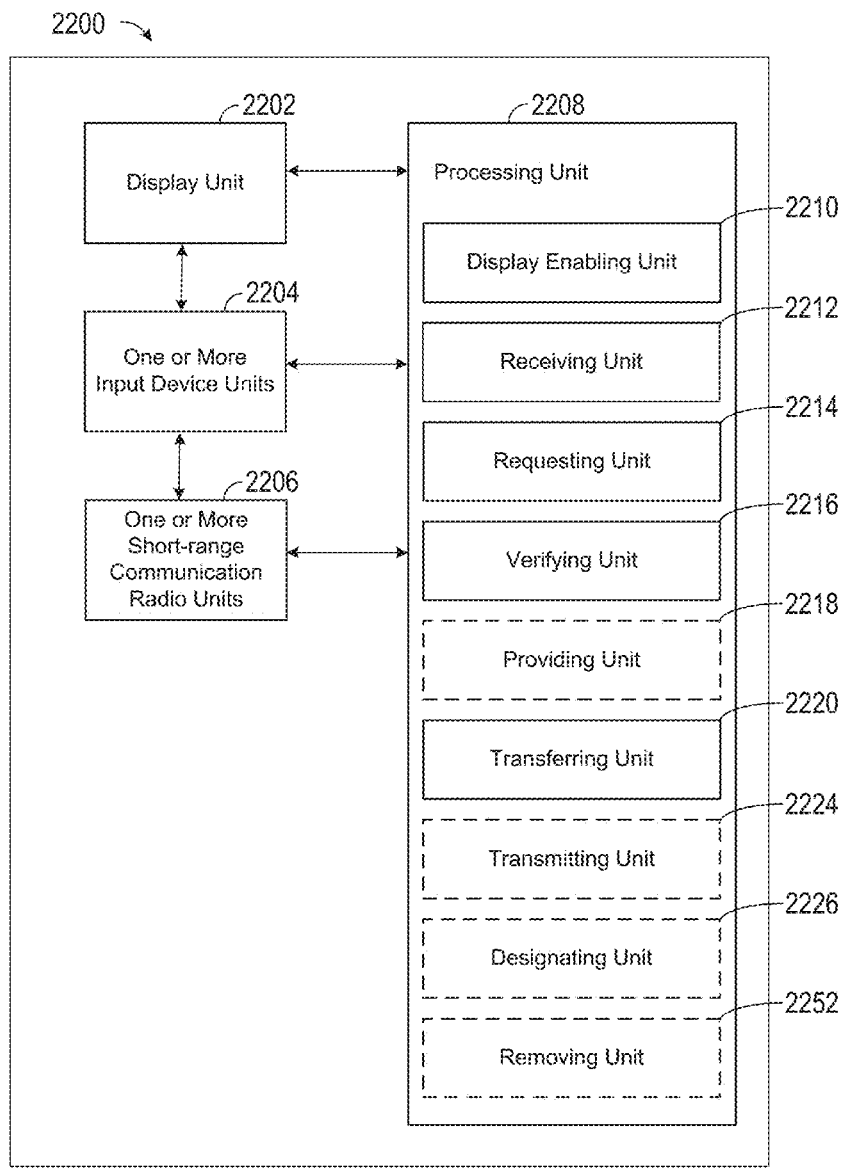

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes a display unit 2202 configured to display a graphic user interface, one or more input device units 2204 configured to receive input, one or more short-range communication radio units 2206 configured to receive and transmit short-range communication, and a processing unit 2208 coupled to the display unit 2202, the one or more input device units 2204, and the one or more short-range communication radio units 2206. In some embodiments, the processing unit 2208 includes a display enabling unit 2210, a receiving unit 2212, a requesting unit 2214, a verifying unit 2216, a transferring unit 2220, and, optionally, a providing unit 2218, a transmitting unit 2224, a designating unit 2226, and a removing unit 2252.

The processing unit 2208 is configured to: request (e.g., using the requesting unit 2214) verification information to verify ownership of a stored-value card, wherein the stored-value card has a stored value; receive (e.g., using the receiving unit 2212), via the one or more input device units 2204, input from a user of the electronic device that includes verification information for verifying ownership of the card, wherein the verification information includes information that is not shown on the card; enable display (e.g., using the display enabling unit 2210), on the display unit 2202 of the electronic device 2200, of a prompt to place the electronic device 2200 within communication range of the stored-value card; receive (e.g., using the receiving unit 2212), by the one or more short-range communication radio units 2206, identifying information from the stored-value card; verify (e.g., using the verifying unit 2216) ownership of the stored-value card by comparing the verification information with the identifying information; and in accordance with a determination that verification of ownership is successful: transfer (e.g., using the transferring unit 2220) at least some of the stored value from the stored-value card to a virtual card stored on the electronic device 2200.

In accordance with some embodiments, the processing unit 2208 is further configured to: in accordance with a determination that verification of ownership is not successful: generating (e.g., using the providing unit 2218) feedback indicating that verification of ownership was not successful; and request (e.g., using the requesting unit 2214) verification information to verify ownership of the stored-value card.

In accordance with some embodiments, the processing unit 2208 is further configured to: in accordance with the determination that verification of ownership is successful: transfer (e.g., using the transferring unit 2220) at least some of the stored value from the stored-value card to a virtual card stored on the electronic device 2200.

In accordance with some embodiments, transferring (e.g., using the transferring unit 2220) at least some of the stored value from the stored-value card to the virtual card stored on the electronic device 2200 includes: removing (e.g., using the removing unit 2252) the stored value from the stored-value card; and transmitting (e.g., using the transmitting unit 2224) a request to a server to deactivate the stored-value card.

In accordance with some embodiments, the stored-value card is a stored-value transit card.

In accordance with some embodiments, the virtual card is a transit virtual card.

In accordance with some embodiments, the virtual card is a stored-value virtual card.

In accordance with some embodiments, the verification information is a card account number of the stored-value card.

In accordance with some embodiments, the electronic device 2200 does not present the card account number of the stored-value card prior to receiving (e.g., using the receiving unit 2212), via the one or more input device units 2204, input from the user of the electronic device 2200 that includes verification information for verifying ownership of the card.

In accordance with some embodiments, the processing unit 2208 is further configured to: subsequent to transferring at least some of the stored value from the stored-value card to the virtual card stored on the electronic device 2200: enable display (e.g., using the display enabling unit 2210), on the display unit 2202, of a stored value of the virtual card.

In accordance with some embodiments, the processing unit 2208 is further configured to: subsequent to transferring at least some of the stored value from the stored-value card to a virtual card stored on the electronic device 2200: enable display (e.g., using the display enabling unit 2210), on the display unit 2202, of transit plan information of the virtual card, the transit plan information based on the transferred at least some of the stored value.

In accordance with some embodiments, the processing unit 2208 is further configured to: subsequent to transferring at least some of the stored value from the stored-value card to a virtual card stored on the electronic device 2200: enable display (e.g., using the display enabling unit 2210), on the display unit 2202, of one or more of: a balance of the virtual card, a username of an account registered to the virtual card, and transit plan information of the virtual card.

In accordance with some embodiments, the verification information is information that is personal to a registered user of the stored-value card.

In accordance with some embodiments, the processing unit 2208 is further configured to: in accordance with a determination that the electronic device 2200 does not have another linked transit account, designate (e.g., using the designating unit 2226) an account of the virtual card to be made available for use without checking authentication; and in accordance with a determination that the electronic device 2200 has one or more other linked transit accounts, forgo designating (e.g., using the designating unit 2226) the account of the virtual card to be made available for use without checking authentication.

In accordance with some embodiments, the processing unit 2208 is further configured to: in accordance with a determination that the electronic device 2200 does not have another linked transit account: in accordance with receiving user input indicating a desire not to have accounts be made available for use without checking authentication, forgo designating (e.g., using the designating unit 2226) the account of the virtual card to be made available for use without checking authentication.

In accordance with some embodiments, the processing unit 2208 is further configured to: receive (e.g., using the receiving unit 2212) user input indicating a desire not to have accounts be made available for use without checking authentication; and in response to receiving the user input indicating the desire not to have accounts be made available for use without checking authentication, designate (e.g., using the designating unit 2226) an account of the virtual card to not be made available for use without checking authentication.

In accordance with some embodiments, the processing unit 2208 is further configured to: receive (e.g., using the receiving unit 2212) user input selecting an account to be made available for use without checking authentication; and in response to receiving the user input selecting the account to be made available for use without checking authentication, designate (e.g., using the designating unit 2226) the selected account to be made available for use without checking authentication.

In accordance with some embodiments, prior to receiving the card account number of the card and prior to verifying ownership of the card, the virtual card is stored on the electronic device 2200.

The operations described above with reference to FIG. 10 are, optionally, implemented by components depicted in FIGS. 1A-1B or FIG. 22. For example, requesting operation 1002, receiving operation 1004, displaying operation 1006, receiving operation 1008, verifying operation 1010, determining operation 1012, and transferring operation 1014 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
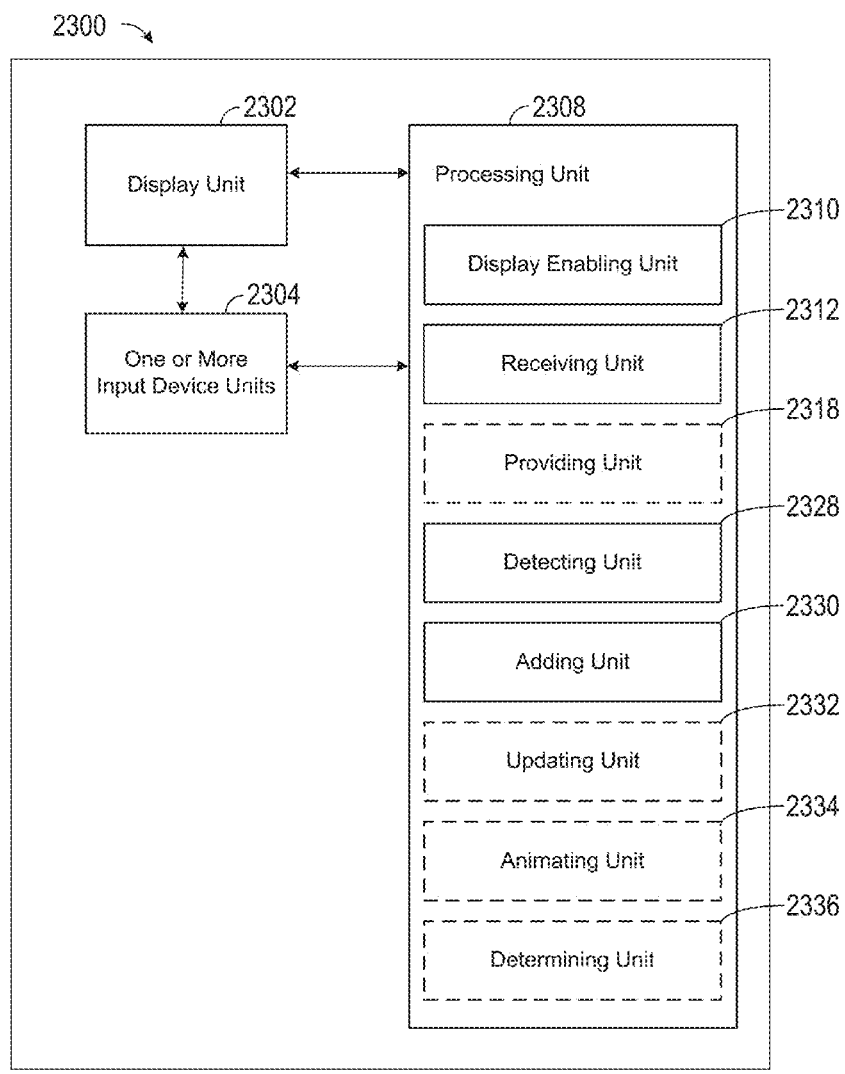

In accordance with some embodiments, FIG. 23 shows an exemplary functional block diagram of an electronic device 2300 configured in accordance with the principles of the various described embodiments. In accordance with some embodiments, the functional blocks of the device 2300 are configured to perform the techniques described above. The functional blocks of the electronic device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes a display unit 2302 configured to display a graphic user interface, one or more input device units 2304 configured to receive input, and a processing unit 2308 coupled to the display unit 2302 and the one or more input device units 2304. In some embodiments, the processing unit 2308 includes a display enabling unit 2310, a receiving unit 2312, a detecting unit 2328, an adding unit 2330, and, optionally, a providing unit 2318, an updating unit 2332, an animating unit 2334, and a determining unit 2336.

The processing unit 2308 is configured to: enable display (e.g., on the display enabling unit 2310), on the display unit 2302, of a representation of a stored-value account that includes an activatable add-value option, wherein the electronic device 2300 has an electronic wallet application that includes the stored-value account and a payment account; while displaying the representation of the stored-value account, detect (e.g., using the detecting unit 2328), via the one or more input device units 2304, activation of the add-value option; detect (e.g., using the detecting unit 2328), via the one or more input device units 2304, activation of a fund-account option to add value to the stored-value account using the payment account of the electronic wallet application; while enabling display (e.g., using the display enabling unit 2310) of a proposed transaction to add funds to the stored-value account from the payment account, receive (e.g., using the receiving unit 2312) authentication information at the electronic device 2300; and in response to receiving (e.g., using the receiving unit 2312) the authentication information and in accordance with a determination that the authentication information is consistent with enrolled authentication information for performing payment transactions using the payment account, add (e.g., using the adding unit 2330) value to the stored-value account using the payment account.

In accordance with some embodiments, the processing unit 2308 is further configured to: in response to receiving (e.g., using the receiving unit 2312) the authentication information and in accordance with a determination that the authentication information is not consistent with enrolled authentication information for performing payment transactions using the payment account, forgo adding (e.g., using the adding unit 2330) value to the stored-value account using the payment account.

In accordance with some embodiments, the processing unit 2308 is further configured to: prior to receiving the authentication information, generating (e.g., using the providing unit 2318) a prompt to provide authorization to add value to the stored-value account from the payment account.

In accordance with some embodiments, the representation of a stored-value account includes a current balance of the stored-value account.

In accordance with some embodiments, the processing unit 2308 is further configured to: subsequent to adding value to the stored-value account using the payment account, update (e.g., using the updating unit 2332) display of the current balance of the stored-value account to reflect the value added to the stored-value account.

In accordance with some embodiments, the processing unit 2308 is further configured to: enable display (e.g., using the display enabling unit 2310), on the display unit 2302, of a representation of a second payment account that does not include an activatable add-value option.

In accordance with some embodiments, the processing unit 2308 is further configured to: enable display (e.g., using the display enabling unit 2310), on the display unit 2302, of a user interface for user entry of value to add to the stored-value account using the payment account, wherein the user interface for user entry of value to add concurrently includes: a virtual numeric keypad, one or more suggested amounts, and the current balance of the stored-value account; receive (e.g., using the receiving unit 2312) input at the virtual numeric keypad of an amount for adding value to the stored-value account using the payment account; in response to receiving the input at the virtual numeric keypad, update (e.g., using the updating unit 2332) display of the one or more suggested amounts based on the input received at the virtual numeric keypad.

In accordance with some embodiments, the received input at the virtual numeric keypad corresponds to an amount exceeding a maximum permissible amount for adding value to the stored-value account using the payment account; and updating (e.g., using the updating unit 2332) display of the one or more suggested amounts based on the input received at the virtual numeric keypad includes updating (e.g., using the updating unit 2332) display of one of the one or more suggested amounts to reflect the maximum permissible amount.

In accordance with some embodiments, at least one of the one or more suggested amounts is based on a previous amount used for adding value to the stored-value account using the payment account.

In accordance with some embodiments, at least one of the one or more suggested amounts is based on a current day of the current month.

In accordance with some embodiments, the user interface for user entry of value to add to the stored-value account using the payment account further concurrently includes a graphical depiction of a card corresponding to the stored-value account; the received input at the virtual numeric keypad corresponds to an amount exceeding a maximum permissible amount for adding value to the stored-value account using the payment account; and the processing unit 2308 is further configured to: in response to receiving the input at the virtual numeric keypad, animate (e.g., using the animating unit 2334) the graphical depiction of the card corresponding to the stored-value account to shake for a period of time.

In accordance with some embodiments, the processing unit 2308 is further configured to: receive (e.g., using the receiving unit 2312) user input of a selected amount to add value to the stored-value account; in response to receiving user input of the selected amount, enable display (e.g., using the display enabling unit 2310), on the display unit 2302, of a user interface requesting authentication.

In accordance with some embodiments, the stored-value account is a transit account.

In accordance with some embodiments, the stored-value account is a gift card account.

In accordance with some embodiments, adding value to the stored-value account using the payment account is part of recurring transactions to add value to the stored-value account using the payment account.

In accordance with some embodiments, the processing unit 2308 is further configured to: detect (e.g., using the detecting unit 2328) that a current balance of the stored-value account is below a minimum balance notification level; and in response to detecting (e.g., using the detecting unit 2328) that the current balance of the stored-value account is below the minimum balance notification level, generating (e.g., using the providing unit 2318) a notification that the current balance of the stored-value account is below the minimum balance notification level.

In accordance with some embodiments, the processing unit 2308 is further configured to: receive (e.g., using the receiving unit 2312) user input activating the notification; and in response to receiving (e.g., using the receiving unit 2312) the user input activating the notification, enable display (e.g., using the display enabling unit 2310), on the display unit 2302, of a user interface for user entry of value to add to the stored-value account using the payment account.

In accordance with some embodiments, the stored-value account is a transit account; and the representation of the stored-value account includes: an indication of a transit plan associated with the transit account, and an indication of an expiration date of the transit plan.

In accordance with some embodiments, the stored-value account is a transit account, and the processing unit 2308 is further configured to: display (e.g., using the display enabling unit 2310), on the display unit 2302, a user interface for funding the transit account using the payment account, wherein the user interface for funding the transit account concurrently includes: one or more suggested amounts, and a start date and an end date of a recommended transit plan.

In accordance with some embodiments, the stored-value account is a transit account, and the processing unit 2308 is further configured to: in accordance with a determination that a transit plan of the stored-value account is due for renewal, generating (e.g., using a providing unit 2318) a notification indicating that the transit plan of the stored-value account is due for renewal.

In accordance with some embodiments, the stored-value account is a transit account, and the processing unit 2308 is further configured to: detect (e.g., using the detecting unit 2328) proximity to a transit station; determine (e.g., using the determining unit 2336) an expected destination based on one or more context factors; in accordance with a determination that the stored-value account does not have sufficient funds for travel from the transit station to the expected destination, generating (e.g., using the providing unit 2318) a notification that the stored-value account does not have sufficient funds for travel from the transit station to the expected destination; and enabling display (e.g., using the display enabling unit 2310) of the representation of the stored-value account that includes the activatable add-value option is in response to detecting (e.g., using the detecting unit 2328) activation of the notification that the stored-value account does not have sufficient funds.

The operations described above with reference to FIGS. 12A-12B are, optionally, implemented by components depicted in FIGS. 1A-1B or FIG. 23. For example, displaying operation 1202, detecting operation 1204, receiving operation 1206, receiving operation 1212, determining operation 1216, and adding operation 1218 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
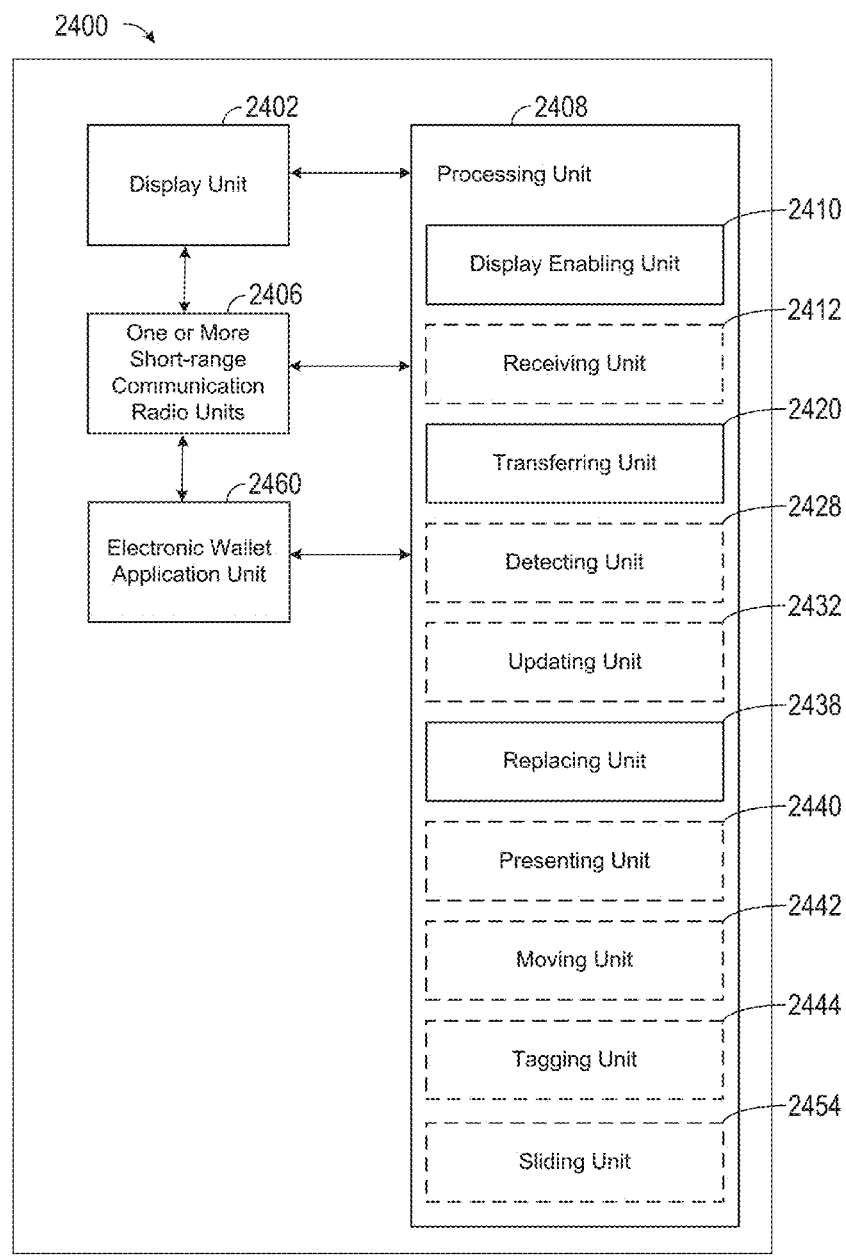

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a display unit 2402 configured to display a graphic user interface, one or more short-range communication radio units 2406 configured to receive and transmit short-range communication, an electronic wallet application unit 2460 configured to store one or more accounts, and a processing unit 2408 coupled to the display unit 2402, the one or more short-ranged communication radio units 2406, and the electronic wallet application unit 2460. In some embodiments, the processing unit 2408 includes a display enabling unit 2410, transferring unit 2420, a replacing unit 2438, and, optionally, a receiving unit 2412, a detecting unit 2328, an updating unit 2432, a presenting unit 2440, a moving unit 2442, a tagging unit 2444, and a sliding unit 2454.

The processing unit 2408 is configured to: enable display (e.g., using the display enabling unit 2410), on the display unit 2402, of an indication of an available credit of the stored-value account; transfer (e.g., using the transferring unit 2420), using the one or more short-range communication radio units 2406, credentials of the stored-value account to a contactless transaction terminal that is separate from the electronic device 2400; and replace (e.g., using the replacing unit 2438), based on a transaction performed with the contactless transaction terminal using the credentials of the stored-value account that were transferred to the contactless transaction terminal using the one or more short-range communication radio units 2406, display of the indication of the available credit with display of an indication of the transaction corresponding to the transfer of credentials to the contactless transaction terminal In accordance with some embodiments, the stored-value account is a stored-value transit account.

In accordance with some embodiments, enabling display (e.g., using the display enabling unit 2410), on the display unit 2402, of the indication of the available credit of the stored-value account includes: enabling display (e.g., using the display enabling unit 2410), at a first location on the display unit 2402, of the indication of the available credit of the stored-value account; and replacing (e.g., using the replacing unit 2438) display of the indication of the available credit with display of the indication of the transaction corresponding to the transfer of credentials to the contactless transaction terminal includes: enabling display (e.g., using the display enabling unit 2410), at a second location on the display unit 2402, of the indication of the available credit, wherein the second location is different from the first location, and enabling display (e.g., using the display enabling unit 2410), at the first location on the display unit 2402, of the indication of the transaction corresponding to the transfer of credentials to the contactless transaction terminal.

In accordance with some embodiments, replacing (e.g., using the replacing unit 2438) display of the indication of the available credit with display of the indication of the transaction corresponding to the transfer of credentials to the contactless transaction terminal includes, concurrently: sliding (e.g., using the sliding unit 2454) in a first direction, on the display unit 2402, the indication of the available credit from a first location to a second location that is different from the first location, and sliding (e.g., using the sliding unit 2454) in the first direction, onto the display unit 2402, the indication of the transaction corresponding to the transfer of credentials to the contactless transaction terminal.

In accordance with some embodiments, the processing unit 2408 is further configured to: in response to transferring the credentials of the stored-value account to the contactless transaction terminal, concurrently enable display (e.g., using the display enabling unit 2410), on the display unit 2402, of: the indication of the available credit, the indication of the transaction corresponding to the transfer of credentials to the contactless transaction terminal, and an indication that the transfer of credentials of the stored-value account to the contactless transaction terminal is complete.

In accordance with some embodiments, a determination that the transaction was performed using the credentials of the stored-value account includes detecting (e.g., using the detecting unit 2428) that the available credit of the stored-value account has changed.

In accordance with some embodiments, replacing (e.g., using the replacing unit 2438) display of the indication of the available credit with display of the indication of the transaction corresponding to the transfer of credentials to the contactless transaction terminal is in response to detecting (e.g., using the detecting unit 2428) that the available credit of the stored-value account has changed.

In accordance with some embodiments, the processing unit 2408 is further configured to: update (e.g., using the updating unit 2432) the indication of the available credit to reflect the transfer of credentials.

In accordance with some embodiments, the processing unit 2408 is further configured to: concurrently enable display (e.g., using the display enabling unit 2410), on the display unit 2402, of a graphical depiction of the stored-value account with the indication of the available credit and the indication of the transaction corresponding to the transfer of credentials.

In accordance with some embodiments, the processing unit 2408 is further configured to: prior to transferring (e.g., using the transferring unit 2420), using the one or more short-range communication radio units 2406, credentials of the stored-value account to the contactless transaction terminal and prior to replacing (e.g., using the replacing unit 2438) display of the indication of the available credit with display of the indication of the transaction corresponding to the transfer of credentials: present (e.g., using the presenting unit 2440) an indication requesting authentication to transfer credentials of the stored-value account to the contactless transaction terminal; receive (e.g., using the receiving unit 2412) authentication information; and transferring (e.g., using the transferring unit 2420) credentials of the stored-value account to the contactless transaction terminal is in accordance with a determination that the authentication information is consistent with enrolled authentication information that is enabled to authorize transactions.

In accordance with some embodiments, the processing unit 2408 is further configured to: subsequent to transferring (e.g., using the transferring unit 2420), using the one or more short-range communication radio units 2406, credentials of the stored-value account to the contactless transaction terminal, enable display (e.g., using the display enabling unit 2410), on the display unit 2402, of a history of transactions, the history of transactions including one or more representations of transit trips.

In accordance with some embodiments, the displayed history of transactions includes one or more representations of transit trips indicated as being covered by a transit plan.

In accordance with some embodiments, the displayed history of transactions includes one or more representations of transit trips that are in progress and the one or more representations of transit trips that are in progress include a displayed status indication that indicates that the one or more transit trips are in progress.

In accordance with some embodiments, an indication of a transit trip that is in progress is at the top of a list of the history of transactions, and the processing unit 2408 is further configured to: subsequent to enabling display (e.g., using the display enabling unit 2410) of the history of transactions including the indication of transit trip that is in progress at the top of the list of the history of transactions, transfer (e.g., using the transferring unit 2420), using the one or more short-range communication radio units 2406, credentials of the stored-value account to a second contactless transaction terminal for a non-transit transaction; move (e.g., using the moving unit 2442) the display of the indication of transit trip that is in progress in the list of the history of transactions and enable display (e.g., using the display enabling unit 2410) of an indication of the non-transit transaction at a location previously occupied by the indication of the transit trip that is in progress; and transfer (e.g., using the transferring unit 2420), using the one or more short-range communication radio units 2406, credentials of the stored-value account to a third contactless transaction terminal for the transit trip that is in progress to end the trip; and in response to transferring credentials of the stored-value account to the third contactless transaction terminal for the transit trip that is in progress: move (e.g., using the moving unit 2442) the display of the indication of the non-transit transaction to accommodate moving the display of the indication of the transit trip that was in progress to the top of the list of the history of transactions.

In accordance with some embodiments, the processing unit 2408 is further configured to: receive (e.g., using receiving unit 2412) a request to display a device-status user interface; in response to receiving the request to display the device-status user interface, enable display (e.g., using display enabling unit 2410) of the device-status user interface, including: in accordance with a determination that the device is using the stored-value account for an in-progress transit trip, enable display (e.g., using display enabling unit 2410) of information about the use of the transit account for the in-progress transit trip in the device-status user interface; and in accordance with a determination that the device is not using the stored value account for an in-progress transit trip, enable display (e.g., using display enabling unit 2410) of the device-status user interface without displaying information about the transit account for a transit trip.

In accordance with some embodiments, the processing unit 2408 is further configured to: while using (e.g., using the tagging unit 2444) the stored-value account for an in progress transit trip in accordance with transferring the credentials of the stored-value account to the contactless transaction terminal, and in accordance with the stored-value account being in use in a transit system and in accordance with the electronic device 2400 being in a locked state: enable display (e.g., using the display enabling unit 2410), on a lock screen of the display unit 2402, of an indication of the stored-value account.

In accordance with some embodiments, the processing unit 2408 is further configured to: detect (e.g., using the detecting unit 2428) activation of the indication of the stored-value account; and in response to detecting activation of the indication of the stored-value account, enable display (e.g., using the display enabling unit 2410) of a card detail view for the stored-value account that includes information about recent transactions for which the stored-value account was used.

In accordance with some embodiments, the processing unit 2408 is further configured to: detect (e.g., using the detecting unit 2428) activation of the indication of the stored-value account; and in response to detecting activation of the indication of the stored-value account, enable display (e.g., using the display enabling unit 2410) of a virtual boarding pass, the virtual boarding pass including one or more details about the in progress transit trip associated with the stored-value account.

The operations described above with reference to FIGS. 14A-14B are, optionally, implemented by components depicted in FIGS. 1A-1B or FIG. 24. For example, displaying operation 1402, transferring operation 1412, and replacing operation 1414 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
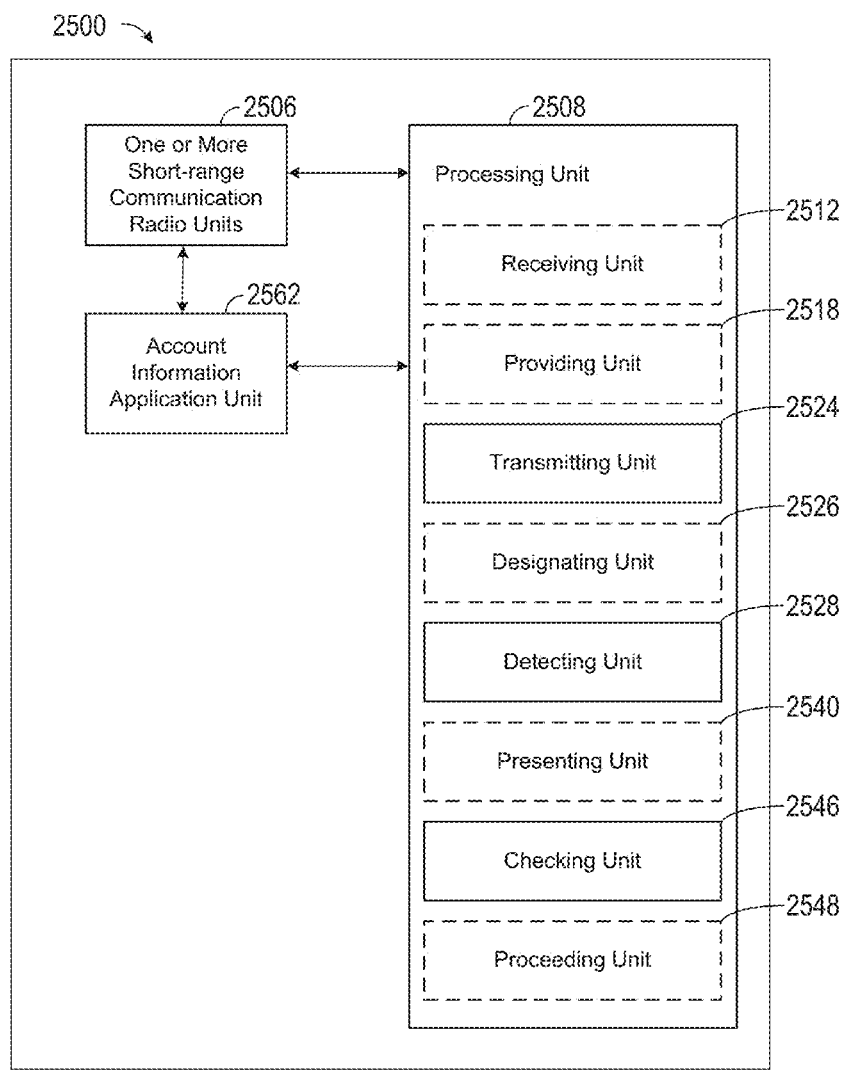

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes one or more short-range communication radio units 2506 configured to receive and transmit short-range communication, an account information application unit 2562 configured to store one or more accounts, and a processing unit 2508 coupled to the one or more short-range communication radio units 2506 and the account information application unit 2562. In some embodiments, the processing unit 2508 includes a transmitting unit 2524, a detecting unit 2528, a checking unit 2546, and, optionally, a receiving unit 2512, a providing unit 2518, a designating unit 2526, a presenting unit 2540, and a proceeding unit 2548.

The processing unit 2508 is configured to: detect (e.g., using the detecting unit 2528), by the one or more short-range communication radio units 2506, a wireless signal; in accordance with a determination that the wireless signal corresponds to a first type of request, transmit (e.g., using the transmitting unit 2524) information corresponding to the first account without checking for authentication; and in accordance with a determination that the wireless signal corresponds to a second type of request, check (e.g., using the checking unit 2546) for authentication before proceeding with a transaction corresponding to the wireless signal.

In accordance with some embodiments, the first type of request is a type of request for which transmission of account information has been pre-authorized to be made automatically available without authentication; and the second type of request is a type of request for which transmission of account information has not been pre-authorized to be made automatically available without authentication.

In accordance with some embodiments, the first account is a stored-value account.

In accordance with some embodiments, transmitting (e.g., using the transmitting unit 2524) information corresponding to the first account without checking for authentication includes transmitting (e.g., using the transmitting unit 2524) the information corresponding to the first account without requiring user input subsequent to detecting (e.g., using the detecting unit 2528), by the one or more short-range communication radio units 2506, the wireless signal.

In accordance with some embodiments, the account information application unit 2562 includes a second account that is different from the first account.

In accordance with some embodiments, checking (e.g., using the checking unit 2546) for authentication includes: presenting (e.g., using the presenting unit 2540) an indication requesting authentication; receiving (e.g., using the receiving unit 2512) authentication information; and in accordance with a determination that the authentication information is consistent with enrolled authentication information that is enabled to authorize transactions, proceeding (e.g., using the proceeding unit 2548) with the transaction.

In accordance with some embodiments, proceeding (e.g., using the proceeding unit 2548) with the transaction includes: transmitting (e.g., using the transmitting unit 2524) information corresponding to the first account.

In accordance with some embodiments, proceeding (e.g., using the proceeding unit 2548) with the transaction includes: transmitting (e.g., using the transmitting unit 2524) information corresponding to a second account different from the first account.

In accordance with some embodiments, the processing unit 2508 is further configured to: in accordance with the determination that the wireless signal corresponds to the first type of request: forgo presenting (e.g., using the presenting unit 2540) any indication requesting authentication.

In accordance with some embodiments, the first account is one of a plurality of transit accounts stored by the account information application unit 2562 and the account information application unit 2562 stores one or more additional accounts that are not transit accounts, and the processing unit 2508 is further configured to: prior to detecting (e.g., using the detecting unit 2528), by the one or more short-range communication radio units 2506, the wireless signal: receive (e.g., using the receiving unit 2512) user input selecting the first account as an account to be made available for use without checking authentication; and in response to receiving (e.g., using the receiving unit 2512) user input selecting the first account as an account to be made available for use without checking authentication, designate (e.g., using the designating unit 2526) the first account to be made available for use without checking authentication.

In accordance with some embodiments, the first account is an identification account.

In accordance with some embodiments, the electronic device 2500 is in a locked state prior to detecting the wireless signal and continues to remain in the locked state while transmitting (e.g., using the transmitting unit 2524) information corresponding to the first account without checking for authentication.

In accordance with some embodiments, the information corresponding to the first account includes an account number of the first account.

In accordance with some embodiments, the first account is a stored-value account and the information corresponding to the first account includes funds from the first account.

In accordance with some embodiments, the first account is a payment account and the information corresponding to the first account includes payment account information of the first account.

In accordance with some embodiments, the first account is a transit commuter account and the information corresponding to the first account includes transit pass information of the first account.

In accordance with some embodiments, the first account is a stored-value account and the information corresponding to the first account includes an account number of the first account, and the processing unit 2508 is further configured to: detect (e.g., using the detecting unit 2528), by the one or more short-range communication radio units 2506, a second wireless signal that includes a request for an amount of funds; and in accordance with a determination that the second wireless signal corresponds to the first type of request, transmit (e.g., using the transmitting unit 2524) funds from the first account without checking for authentication.

In accordance with some embodiments, the information corresponding to the first account includes an account number of the first account, and the processing unit 2508 is further configured to: detect (e.g., using the detecting unit 2528), by the one or more short-range communication radio units 2506, a second wireless signal that includes a request for an amount of funds; subsequent to detecting (e.g., using the detecting unit 2528) the second wireless signal that includes the request for an amount of funds, the electronic device 2500 determines an expected cost in accordance with a determination that the second wireless signal corresponds to the first type of request, and: in accordance with a determination that the requested amount of funds does not exceed a pre-authorized transaction amount transmitting funds from the first account without checking for authentication; and in accordance with a determination that the requested amount of funds exceeds the pre-authorized transaction amount: generating feedback (e.g., using the providing unit 2518) indicating that the requested amount of funds does not correspond to an expected cost; and check (e.g., using the checking unit 2546) for authentication to proceed with the transaction.

In accordance with some embodiments, the processing unit 2508 is further configured to: in accordance with the determination that the second wireless signal corresponds to the first type of request, and: in accordance with the determination that the requested amount of funds exceeds the pre-authorized transaction amount: receive (e.g., using the receiving unit 2512) second authentication information; and in accordance with a determination that the second authentication information is consistent with enrolled authentication information that is enabled to authorize transactions, proceed (e.g., using the proceeding unit 2548) with the transaction; and in accordance with a determination that the second authentication information is not consistent with enrolled authentication information that is enabled to authorize transactions, forgo proceeding (e.g., using the proceeding unit 2548) with the transaction.

In accordance with some embodiments, the determination that the wireless signal corresponds to the first type of request is based on contextual information of the electronic device that corresponds to the time when the wireless signal was detected by the electronic device.

In accordance with some embodiments, the determination that the wireless signal corresponds to the first type of request includes a determination that a set of one or more contextual conditions has been met, wherein a first contextual condition of the one or more contextual conditions is met when content of the wireless signal includes a predetermined value.

In accordance with some embodiments, the determination that the wireless signal corresponds to the first type of request includes a determination that a set of one or more contextual conditions has been met, wherein a second contextual condition of the one or more contextual conditions is met when a physical location of the electronic device 2500 that corresponds to the time when the wireless signal was detected by the electronic device corresponds to a predetermined location.

In accordance with some embodiments, the determination that the wireless signal corresponds to the first type of request includes a determination that a set of one or more contextual conditions has been met, wherein a third contextual condition of the one or more contextual conditions is met when the electronic device 2500 is within range of one or more wireless signals different from the wireless signal.

In accordance with some embodiments, the determination that the wireless signal corresponds to the first type of request includes a determination that a set of one or more contextual conditions has been met, wherein a fourth contextual condition of the one or more contextual conditions is met when the wireless signal includes a request for an amount of funds that does not exceed a fund threshold.

In accordance with some embodiments, the determination that the wireless signal corresponds to the first type of request includes a determination that a set of one or more unlock conditions has been met, wherein a first unlock condition of the set of one or more unlock conditions is met when the electronic device 2500 has been unlocked within a previous amount of time.

In accordance with some embodiments, the determination that the wireless signal corresponds to the first type of request includes a determination that a set of one or more unlock conditions has been met, wherein a second unlock condition of the set of one or more unlock conditions is met when the electronic device 2500 has been unlocked after a predetermined time of day on the day that the wireless signal is detected.

In accordance with some embodiments, the determination that the wireless signal corresponds to the first type of request includes a determination that a set of one or more unlock conditions has been met, wherein a third unlock condition of the set of one or more unlock conditions is met when the electronic device 2500 has been unlocked after a restart.

The operations described above with reference to FIGS. 16A-16B are, optionally, implemented by components depicted in FIGS. 1A-1B or FIG. 25. For example, detecting operation 1608, determining operation 1610, transmitting operation 1616, determining operation 1618, checking operation 1622 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
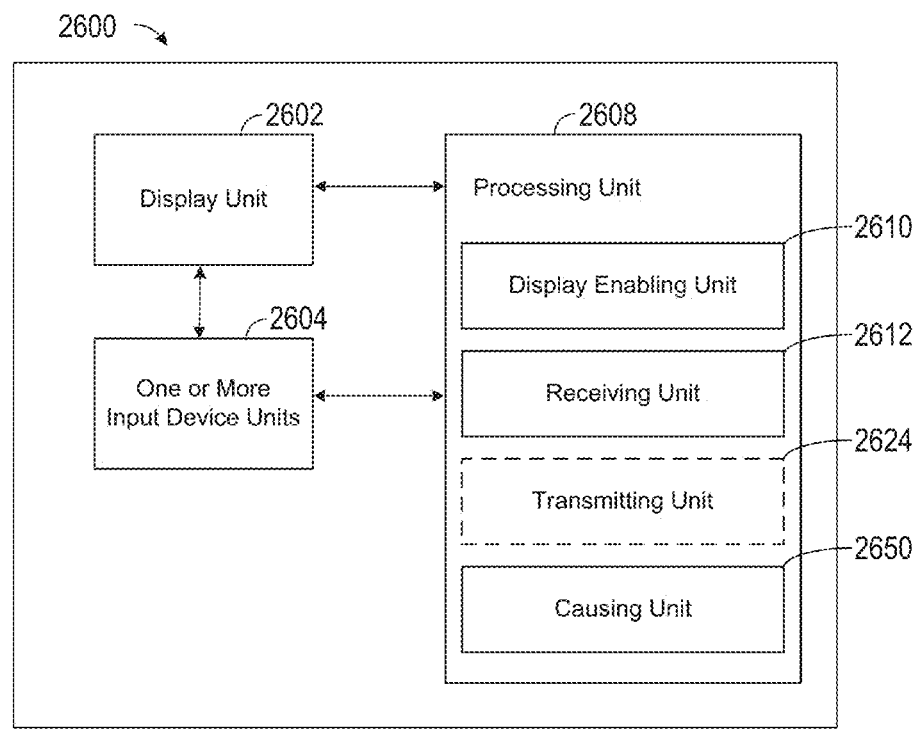

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a display unit 2602 configured to display a graphic user interface, one or more input device units 2604 configured to receive input, and a processing unit 2608 coupled to the display unit 2602 and the one or more input device units 2604. In some embodiments, the processing unit 2608 includes a display enabling unit 2610, a receiving unit 2612, a causing unit 2650, and, optionally, a transmitting unit 2624.

The processing unit 2608 is configured to: enable display (e.g., using the display enabling unit 2610), on the display unit 2602, of representations of a plurality of devices associated with a user account, wherein the representations of the plurality of devices include a first representation of a first device and a second representation of a second device, wherein the first device is associated with a transaction account and the second device is not associated with the transaction account; receive (e.g., using the receiving unit 2612), via the one or more input device units 2604, a selection corresponding to the displayed representation of the second device; and in accordance with receiving the selection corresponding to the displayed representation of the second device: cause (e.g., using the causing unit 2650) the transaction account to become associated with the second device; and cause (e.g., using the causing unit 2650) the transaction account to become disassociated from the first device.

In accordance with some embodiments, the first device is the electronic device 2600 that caused the transaction account to become associated with the second device and disassociated with the first device.

In accordance with some embodiments, the second device is the electronic device 2600 that caused the transaction account to become associated with the second device and disassociated with the first device.

In accordance with some embodiments, the transaction account is a payment account.

In accordance with some embodiments, the transaction account is transit account.

In accordance with some embodiments, the transaction account is a stored-value account.

In accordance with some embodiments, the transaction account is a stored-value account, and the processing unit 2608 is further configured to: prior to enabling display of the representations of the plurality of devices, enable display (e.g., using the display enabling unit 2610) of a representation of the account concurrently with (e.g., adjacent to or otherwise visually linked with the representation of the account) an activatable add-value option and an activatable transfer-account option; receive (e.g., using the receiving unit 2612) activation of the transfer-account option; and wherein enabling display (e.g., using the display enabling unit 2610) of the representations of the plurality of devices associated with the user account is in response to receiving (e.g., using the receiving unit 2612) activation of the transfer-account option.

In accordance with some embodiments, the processing unit 2608 is further configured to: receive (e.g., using the receiving unit 2612) user input designating the transaction account as an account to be available for use at two or more devices of the plurality of devices.

In accordance with some embodiments, the electronic device 2600 is the second device, and the processing unit 2608 is further configured to: receive (e.g., using the receiving unit 2612) user input designating a third device of the plurality of devices as a device for which the transaction account is to be made available for use; subsequent to causing the transaction account to become associated with the second device and subsequent to causing the transaction account to become disassociated from the first device: receive (e.g., using the receiving unit 2612) a request for payment credentials of the transaction account from the third device that is different from the electronic device; and in accordance with a determination that the third device is designated as a device for which the transaction account is to be made available for use, transmit (e.g., using the transmitting unit 2624) payment credentials of the transaction account to the third device from the second device.

In accordance with some embodiments, in accordance with a determination that a time condition has been met: cause (e.g., using the causing unit 2650) the transaction account to become disassociated from the second device; and cause (e.g., using the causing unit 2650) the transaction account to become associated with the first device.

In accordance with some embodiments, causing the transaction account to become associated with the second device includes restricting the transaction account at the second device to require, from the first device, respective pre-approvals for proposed payments to be made at the second device.

In accordance with some embodiments, the representations of the plurality of devices associated with the user account include representations of devices that are logged into a service under the same user account as the electronic device 2600.

In accordance with some embodiments, the representations of the plurality of devices associated with the user account include representations of devices logged into a service using respective user accounts that are associated with the user account with which the electronic device 2600 is logged into the service.

In accordance with some embodiments, the processing unit 2608 is further configured to: subsequent to causing the transaction account to become associated with the second device and subsequent to causing the transaction account to become disassociated from the first device: enable display (e.g., using the display enabling unit 2610), on the display unit 2602, of representations of the plurality of devices, wherein the first device is not associated with the transaction account and the second device is associated with the transaction account; receive (e.g., using the receiving unit 2612), via the one or more input device units 2604, a respective selection corresponding to the first device; and in accordance with receiving the respective selection corresponding to the first device: cause (e.g., using the causing unit 2650) the transaction account to become disassociated from the second device; and cause (e.g., using the causing unit 2650) the transaction account to become associated with the first device.

The operations described above with reference to FIG. 18 are, optionally, implemented by components depicted in FIGS. 1A-1B or FIG. 26. For example, displaying operation 1802, receiving operation 1808, causing operation 1816, and causing operation 1818 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
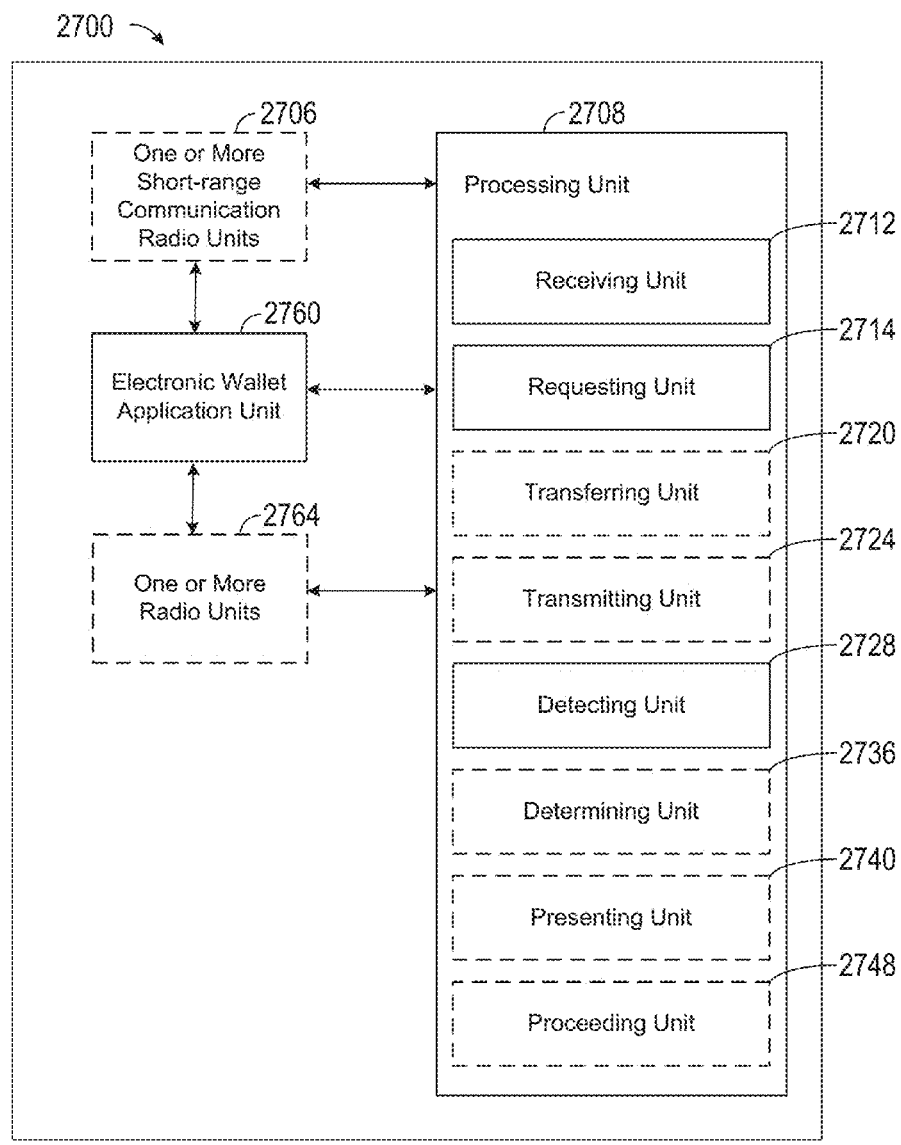

In accordance with some embodiments, FIG. 27 shows an exemplary functional block diagram of an electronic device 2700 configured in accordance with the principles of the various described embodiments. In accordance with some embodiments, the functional blocks of electronic device 2700 are configured to perform the techniques described above. The functional blocks of the device 2700 are, optionally, implemented by hardware, software, or a combination of hardware and software to carry out the principles of the various described examples. It is understood by persons of skill in the art that the functional blocks described in FIG. 27 are, optionally, combined or separated into sub-blocks to implement the principles of the various described examples. Therefore, the description herein optionally supports any possible combination or separation or further definition of the functional blocks described herein.

As shown in FIG. 27, an electronic device 2700 includes an electronic wallet application unit 2760 configured to store one or more accounts, and, optionally, one or more short-range communication radio units 2706 configured to receive and transmits short-range communication, and, optionally, one or more radio units 2764 configured to receive and transmit signals, and a processing unit 2708 coupled to the electronic wallet application unit 2760, optionally, the one or more short-range communication radio units 2706 and, optionally, the one or more radio units 2764. In some embodiments, the processing unit 2708 includes a receiving unit 2712, a requesting unit 2714, a detecting unit 2728, and, optionally, a transferring unit 2720, a transmitting unit 2724, a determining unit 2736, a presenting unit 2740, and a proceeding unit 2748.

The processing unit 2708 is configured to: detect (e.g., using the detecting unit 2728) that a set of one or more payment criteria for making a payment using a stored-value account has been met; in response to detecting (e.g., using the detecting unit 2728) that the set of one or more payment criteria for making the payment using the stored-value account has been met and in accordance with a determination that payment credentials of the stored-value account are not available in the electronic wallet application of the electronic device 2700, request (e.g., using the requesting unit 2714) payment credentials of the stored-value account from a second device that is different from the electronic device 2700; and subsequent to requesting (e.g., using the requesting unit 2714) the payment credentials of the stored-value account from the second device when the payment credentials of the stored-value account are available at the second device, receive (e.g., using the receiving unit 2712) payment credentials of the stored-value account at the electronic device 2700 from the second device.

In accordance with some embodiments, the payment credentials of the stored-value account are received at the electronic device 2700 from the second device using a device-to-device communication over a short-range wireless network.

In accordance with some embodiments, a first payment criterion of the set of one or more payment criteria is met when the electronic device 2700 receives a request for payment.

In accordance with some embodiments, the electronic device 2700 includes one or more short-range communication radio units 2706, a second payment criterion of the set of one or more payment criteria is met when the electronic device 2700 detects, using the one or more short-range communication radio units 2706, a field.

In accordance with some embodiments, a third payment criterion of the set of one or more payment criteria is met when the electronic device 2700 detects a context indicating that a payment will be requested.

In accordance with some embodiments, a fourth payment criterion of the set of one or more payment criteria is met when the electronic device 2700 detects activation of an option corresponding to the stored-value account.

In accordance with some embodiments, a fifth payment criterion of the set of one or more payment criteria is met when the electronic device 2700 determines that the stored-value account has been designated to be available at the electronic device 2700.

In accordance with some embodiments, the stored-value account is a first type of account, and wherein a sixth payment criterion of the set of one or more payment criteria is met when the electronic device 2700 receives a request for payment using the first type of account.

In accordance with some embodiments, requesting payment credentials of the stored-value account from the second device includes transmitting (e.g., using the transmitting unit 2724) a request to the second device, wherein the request identifies the stored-value account.

In accordance with some embodiments, the processing unit 2708 is further configured to: in response to detecting (e.g., using the detecting unit 2728) that the set of one or more payment criteria for making the payment using the stored-value account have been met and in accordance with a determination that payment credentials of the stored-value account are available in the electronic wallet application unit 2760 of the electronic device 2700, proceed (e.g., using the proceeding unit 2748) with the payment using the stored-value account.

In accordance with some embodiments, the processing unit 2708 is further configured to: in response to detecting that the set of one or more payment criteria for making the payment using the stored-value account have been met and in accordance with the determination that payment credentials of the stored-value account are not available in the electronic wallet application unit 2760 of the electronic device 2700 and in accordance with not receiving payment credentials of the stored-value account: forgo proceeding (e.g., using the proceeding unit 2748) with the payment using the stored-value account; and present (e.g., using the presenting unit 2740) a notification to the user indicating that the stored-value account is not available for use with the payment.

In accordance with some embodiments, the processing unit 2708 is further configured to: subsequent to receiving payment credentials of the stored-value account at the electronic device 2700 from the second device: transfer (e.g., using the transferring unit 2720) funds from the stored-value account to a transaction terminal to make the payment; and in response to transferring funds from the stored-value account to the transaction terminal, transmit (e.g., using the transmitting unit 2724) payment credentials of the stored-value account from the electronic device 2700 to the second device.

In accordance with some embodiments, the processing unit 2708 is further configured to: subsequent to receiving payment credentials of the stored-value account at the electronic device 2700 from the second device: transfer (e.g., using the transferring unit 2720) funds from the stored-value account to a transaction terminal to make the payment; and in response to transferring funds from the stored-value account to the transaction terminal, forgo transmitting (e.g., using the transmitting unit 2724) payment credentials of the stored-value account from the electronic device 2700 to the second device.

In accordance with some embodiments, the processing unit 2708 is further configured to: subsequent to receiving payment credentials of the stored-value account at the electronic device 2700 from the second device: receive (e.g., using the receiving unit 2712), from the second device, a request for payment credentials of the stored-value account; and in response to receiving the request of payment credentials of the stored-value account, transmit (e.g., using the transmitting unit 2724) payment credentials of the stored-value account from the electronic device 2700 to the second device.

In accordance with some embodiments, the processing unit 2708 is further configured to: subsequent to receiving payment credentials of the stored-value account at the electronic device 2700 from the second device: determine (e.g., using the determining unit 2736) whether a predetermined schedule event condition is met; in accordance with a determination that the predetermined schedule event condition is met, transmit (e.g., using the transmitting unit 2724) payment credentials of the stored-value account from the electronic device 2700 to the second device.

In accordance with some embodiments, the electronic device 2700 uses a first communication protocol to receive payment credentials of the stored-value account from the second device and the electronic device 2700 uses a second communication protocol different from the first communication protocol to make the payment to a transaction terminal.

In accordance with some embodiments, the electronic device 2700 includes one or more radio units 2764, and the electronic device 2700 uses a first set of the one or more radio units 2764 of the electronic device 2700 to receive payment credentials of the stored-value account from the second device and the electronic device 2700 uses a second set of the one or more radio units 2764 different from the first set of the one or more radio units 2764 to make the payment to a transaction terminal.

In accordance with some embodiments, the processing unit 2708 is further configured to: subsequent to receiving payment credentials of the stored-value account at the electronic device 2700 from the second device: present (e.g., using the presenting unit 2740) an indication requesting authentication for making payment using payment credentials of the stored-value account; receive (e.g., using the receiving unit 2712) authentication information; and in accordance with a determination that the authentication information is consistent with enrolled authentication information that is enabled to authorize transactions, transfer (e.g., using the transferring unit 2720) funds from the stored-value account to a transaction terminal to make the payment.

The operations described above with reference to FIGS. 20A-20B are, optionally, implemented by components depicted in FIGS. 1A-1B or FIG. 27. For example, detecting operation 2002, determining operation 2006, requesting operation 2008, and receiving operation 2018 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium storing one or more programs configured to be executed by one or more processors of an electronic device with one or more short-range communication radios and an account information application that includes a first account, the one or more programs including instructions for:
   detecting, by the one or more short-range communication radios, a wireless signal from a transaction terminal;
   in accordance with a determination, based on contents of the wireless signal from the transaction terminal, that the wireless signal corresponds to a first type of request, wherein the determination that the wireless signal corresponds to the first type of request includes a determination that a set of one or more contextual conditions has been met, wherein a first contextual condition of the one or more contextual conditions is met when content of the wireless signal includes a predetermined value:
   transmitting, to the transaction terminal, information corresponding to the first account without checking for authentication; and
   in accordance with a determination, based on contents of the wireless signal from the transaction terminal, that the wireless signal corresponds to a second type of request, checking for authentication before proceeding with a transaction corresponding to the wireless signal, wherein checking for authentication includes:
   presenting an indication requesting authentication;
   receiving authentication information; and
   in accordance with a determination that the authentication information is consistent with enrolled authentication information that is enabled to authorize transactions, proceeding with the transaction.

2. The non-transitory computer-readable storage medium of claim 1, wherein:
   the first type of request is a type of request for which transmission of account information has been pre-authorized to be made automatically available without authentication; and
   the second type of request is a type of request for which transmission of account information has not been pre-authorized to be made automatically available without authentication.

3. The non-transitory computer-readable storage medium of claim 1, wherein the first account is a stored-value account.

4. The non-transitory computer-readable storage medium of claim 1, wherein transmitting information corresponding to the first account without checking for authentication includes transmitting the information corresponding to the first account without requiring user input subsequent to detecting, by the one or more short-range communication radios, the wireless signal.

5. The non-transitory computer-readable storage medium of claim 1, wherein the account information application includes a second account that is different from the first account.

6. The non-transitory computer-readable storage medium of claim 1, wherein proceeding with the transaction includes:
   transmitting information corresponding to the first account.

7. The non-transitory computer-readable storage medium of claim 1, wherein proceeding with the transaction includes:
   transmitting information corresponding to a second account different from the first account.

8. The non-transitory computer-readable storage medium of claim 1, the one or more programs further including instructions for:
   in accordance with the determination that the wireless signal corresponds to the first type of request:
   forgoing presenting any indication requesting authentication.

9. The non-transitory computer-readable storage medium of claim 1, wherein the first account is one of a plurality of transit accounts stored by the account information application and the account information application stores one or more additional accounts that are not transit accounts, the one or more programs further including instructions for:
   prior to detecting, by the one or more short-range communication radios, the wireless signal:
   receiving user input selecting the first account as an account to be made available for use without checking authentication; and in response to receiving user input selecting the first account as an account to be made available for use without checking authentication, designating the first account to be made available for use without checking authentication.

10. The non-transitory computer-readable storage medium of claim 1, wherein the first account is an identification account.

11. The non-transitory computer-readable storage medium of claim 1, wherein the electronic device is in a locked state prior to detecting the wireless signal and continues to remain in the locked state while transmitting information corresponding to the first account without checking for authentication.

12. The non-transitory computer-readable storage medium of claim 1, wherein the information corresponding to the first account includes an account number of the first account.

13. The non-transitory computer-readable storage medium of claim 1, wherein the first account is a stored-value account and the information corresponding to the first account includes funds from the first account.

14. The non-transitory computer-readable storage medium of claim 1, wherein the first account is a payment account and the information corresponding to the first account includes payment account information of the first account.

15. The non-transitory computer-readable storage medium of claim 1, wherein the first account is a transit commuter account and the information corresponding to the first account includes transit pass information of the first account.

16. The non-transitory computer-readable storage medium of claim 1, wherein the first account is a stored-value account and the information corresponding to the first account includes an account number of the first account, the one or more programs further including instructions for:
  detecting, by the one or more short-range communication radios, a second wireless signal that includes a request for an amount of funds; and
  in accordance with a determination that the second wireless signal corresponds to the first type of request, transmitting funds from the first account without checking for authentication.

17. The non-transitory computer-readable storage medium of claim 1, wherein the information corresponding to the first account includes an account number of the first account, the one or more programs further including instructions for:
  detecting, by the one or more short-range communication radios, a second wireless signal that includes a request for an amount of funds;
  in accordance with a determination that the second wireless signal corresponds to the first type of request, and:
    in accordance with a determination that the requested amount of funds does not exceed a pre-authorized transaction amount, transmitting funds from the first account without checking for authentication; and
    in accordance with a determination that the requested amount of funds exceeds the pre-authorized transaction amount:
      generating feedback indicating that the requested amount of funds does not correspond to an expected cost; and
      checking for authentication to proceed with the transaction.

18. The non-transitory computer-readable storage medium of claim 17, the one or more programs further including instructions for:
  in accordance with the determination that the second wireless signal corresponds to the first type of request, and:
    in accordance with the determination that the requested amount of funds exceeds the pre-authorized transaction amount:
      receiving second authentication information; and
      in accordance with a determination that the second authentication information is consistent with enrolled authentication information that is enabled to authorize transactions, proceeding with the transaction; and
      in accordance with a determination that the second authentication information is not consistent with enrolled authentication information that is enabled to authorize transactions, forgoing proceeding with the transaction.

19. The non-transitory computer-readable storage medium of claim 1, wherein the determination that the wireless signal corresponds to the first type of request is based on contextual information of the electronic device that corresponds to the time when the wireless signal was detected by the electronic device.

20. The non-transitory computer-readable storage medium of claim 1, wherein the determination that the wireless signal corresponds to the first type of request includes a determination that a set of one or more contextual conditions has been met, wherein a second contextual condition of the one or more contextual conditions is met when a physical location of the electronic device that corresponds to the time when the wireless signal was detected by the electronic device corresponds to a predetermined location.

21. The non-transitory computer-readable storage medium of claim 1, wherein the determination that the wireless signal corresponds to the first type of request includes a determination that a set of one or more contextual conditions has been met, wherein a third contextual condition of the one or more contextual conditions is met when the electronic device is within range of one or more wireless signals different from the wireless signal.

22. The non-transitory computer-readable storage medium of claim 1, wherein the determination that the wireless signal corresponds to the first type of request includes a determination that a set of one or more contextual conditions has been met, wherein a fourth contextual condition of the one or more contextual conditions is met when the wireless signal includes a request for an amount of funds that does not exceed a fund threshold.

23. The non-transitory computer-readable storage medium of claim 1, wherein the determination that the wireless signal corresponds to the first type of request includes a determination that a set of one or more unlock conditions has been met, wherein a first unlock condition of the set of one or more unlock conditions is met when the electronic device has been unlocked within a previous amount of time.

24. The non-transitory computer-readable storage medium of claim 1, wherein the determination that the wireless signal corresponds to the first type of request includes a determination that a set of one or more unlock conditions has been met, wherein a second unlock condition of the set of one or more unlock conditions is met when the electronic device has been unlocked after a predetermined time of day on the day that the wireless signal is detected.

25. The non-transitory computer-readable storage medium of claim 1, wherein the determination that the wireless signal corresponds to the first type of request includes a determination that a set of one or more unlock conditions has been met, wherein a third unlock condition of the set of one or more unlock conditions is met when the electronic device has been unlocked after a restart.

26. A method, comprising:
at an electronic device with one or more short-range communication radios and an account information application that includes a first account:
detecting, by the one or more short-range communication radios, a wireless signal from a transaction terminal;
in accordance with a determination, based on contents of the wireless signal from the transaction terminal, that the wireless signal corresponds to a first type of request, wherein the determination that the wireless signal corresponds to the first type of request includes a determination that a set of one or more contextual conditions has been met, wherein a first contextual condition of the one or more contextual conditions is met when content of the wireless signal includes a predetermined value:
transmitting, to the transaction terminal, information corresponding to the first account without checking for authentication; and
in accordance with a determination, based on contents of the wireless signal from the transaction terminal, that the wireless signal corresponds to a second type of request, checking for authentication before proceeding with a transaction corresponding to the wireless signal, wherein checking for authentication includes:
presenting an indication requesting authentication;
receiving authentication information; and
in accordance with a determination that the authentication information is consistent with enrolled authentication information that is enabled to authorize transactions, proceeding with the transaction.

27. An electronic device, comprising:
one or more short-range communication radios;
an account information application that includes a first account;
one or more processors; and
a memory storing one or more programs configured to be executed by the one or more processors, the one or more programs including instructions for:
detecting, by the one or more short-range communication radios, a wireless signal from a transaction terminal;
in accordance with a determination, based on contents of the wireless signal from the transaction terminal, that the wireless signal corresponds to a first type of request, wherein the determination that the wireless signal corresponds to the first type of request includes a determination that a set of one or more contextual conditions has been met, wherein a first contextual condition of the one or more contextual conditions is met when content of the wireless signal includes a predetermined value:
transmitting, to the transaction terminal, information corresponding to the first account without checking for authentication; and
in accordance with a determination, based on contents of the wireless signal from the transaction terminal, that the wireless signal corresponds to a second type of request, checking for authentication before proceeding with a transaction corresponding to the wireless signal, wherein checking for authentication includes:
presenting an indication requesting authentication;
receiving authentication information; and
in accordance with a determination that the authentication information is consistent with enrolled authentication information that is enabled to authorize transactions, proceeding with the transaction.

28. The method of claim 26, wherein:
the first type of request is a type of request for which transmission of account information has been pre-authorized to be made automatically available without authentication; and
the second type of request is a type of request for which transmission of account information has not been pre-authorized to be made automatically available without authentication.

29. The method of claim 2, wherein the first account is a stored-value account.

30. The method of claim 26, wherein transmitting information corresponding to the first account without checking for authentication includes transmitting the information corresponding to the first account without requiring user input subsequent to detecting, by the one or more short-range communication radios, the wireless signal.

31. The method of claim 26, wherein the account information application includes a second account that is different from the first account.

32. The method of claim 26, wherein proceeding with the transaction includes:
transmitting information corresponding to the first account.

33. The method of claim 26, wherein proceeding with the transaction includes:
transmitting information corresponding to a second account different from the first account.

34. The method of claim 26, further comprising:
in accordance with the determination that the wireless signal corresponds to the first type of request:
forgoing presenting any indication requesting authentication.

35. The method of claim 26, wherein the first account is one of a plurality of transit accounts stored by the account information application and the account information application stores one or more additional accounts that are not transit accounts, the method further comprising:
prior to detecting, by the one or more short-range communication radios, the wireless signal:
receiving user input selecting the first account as an account to be made available for use without checking authentication; and
in response to receiving user input selecting the first account as an account to be made available for use without checking authentication, designating the first account to be made available for use without checking authentication.

36. The method of claim 26, wherein the first account is an identification account.

37. The method of claim 26, wherein the electronic device is in a locked state prior to detecting the wireless signal and continues to remain in the locked state while transmitting information corresponding to the first account without checking for authentication.

38. The method of claim 26, wherein the information corresponding to the first account includes an account number of the first account.

39. The method of claim 26, wherein the first account is a stored-value account and the information corresponding to the first account includes funds from the first account.

40. The method of claim 26, wherein the first account is a payment account and the information corresponding to the first account includes payment account information of the first account.

41. The method of claim 26, wherein the first account is a transit commuter account and the information corresponding to the first account includes transit pass information of the first account.

42. The method of claim 26, wherein the first account is a stored-value account and the information corresponding to the first account includes an account number of the first account, the method further comprising:
  detecting, by the one or more short-range communication radios, a second wireless signal that includes a request for an amount of funds; and
  in accordance with a determination that the second wireless signal corresponds to the first type of request, transmitting funds from the first account without checking for authentication.

43. The method of claim 26, wherein the information corresponding to the first account includes an account number of the first account, the method further comprising:
  detecting, by the one or more short-range communication radios, a second wireless signal that includes a request for an amount of funds;
  in accordance with a determination that the second wireless signal corresponds to the first type of request, and:
    in accordance with a determination that the requested amount of funds does not exceed a pre-authorized transaction amount, transmitting funds from the first account without checking for authentication; and
    in accordance with a determination that the requested amount of funds exceeds the pre-authorized transaction amount:
      generating feedback indicating that the requested amount of funds does not correspond to an expected cost; and
      checking for authentication to proceed with the transaction.

44. The method of claim 43, further comprising:
  in accordance with the determination that the second wireless signal corresponds to the first type of request, and:
    in accordance with the determination that the requested amount of funds exceeds the pre-authorized transaction amount:
      receiving second authentication information; and
      in accordance with a determination that the second authentication information is consistent with enrolled authentication information that is enabled to authorize transactions, proceeding with the transaction; and
      in accordance with a determination that the second authentication information is not consistent with enrolled authentication information that is enabled to authorize transactions, forgoing proceeding with the transaction.

45. The method of claim 26, wherein the determination that the wireless signal corresponds to the first type of request is based on contextual information of the electronic device that corresponds to the time when the wireless signal was detected by the electronic device.

46. The method of claim 26, wherein the determination that the wireless signal corresponds to the first type of request includes a determination that a set of one or more contextual conditions has been met, wherein a second contextual condition of the one or more contextual conditions is met when a physical location of the electronic device that corresponds to the time when the wireless signal was detected by the electronic device corresponds to a predetermined location.

47. The method of claim 26, wherein the determination that the wireless signal corresponds to the first type of request includes a determination that a set of one or more contextual conditions has been met, wherein a third contextual condition of the one or more contextual conditions is met when the electronic device is within range of one or more wireless signals different from the wireless signal.

48. The method of claim 26, wherein the determination that the wireless signal corresponds to the first type of request includes a determination that a set of one or more contextual conditions has been met, wherein a fourth contextual condition of the one or more contextual conditions is met when the wireless signal includes a request for an amount of funds that does not exceed a fund threshold.

49. The method of claim 26, wherein the determination that the wireless signal corresponds to the first type of request includes a determination that a set of one or more unlock conditions has been met, wherein a first unlock condition of the set of one or more unlock conditions is met when the electronic device has been unlocked within a previous amount of time.

50. The method of claim 26, wherein the determination that the wireless signal corresponds to the first type of request includes a determination that a set of one or more unlock conditions has been met, wherein a second unlock condition of the set of one or more unlock conditions is met when the electronic device has been unlocked after a predetermined time of day on the day that the wireless signal is detected.

51. The method of claim 26, wherein the determination that the wireless signal corresponds to the first type of request includes a determination that a set of one or more unlock conditions has been met, wherein a third unlock condition of the set of one or more unlock conditions is met when the electronic device has been unlocked after a restart.

52. The electronic device of claim 27, wherein:
  the first type of request is a type of request for which transmission of account information has been pre-authorized to be made automatically available without authentication; and
  the second type of request is a type of request for which transmission of account information has not been pre-authorized to be made automatically available without authentication.

53. The electronic device of claim 27, wherein the first account is a stored-value account.

54. The electronic device of claim 27, wherein transmitting information corresponding to the first account without checking for authentication includes transmitting the information corresponding to the first account without requiring user input subsequent to detecting, by the one or more short-range communication radios, the wireless signal.

55. The electronic device of claim 27, wherein the account information application includes a second account that is different from the first account.

56. The electronic device of claim 27, wherein proceeding with the transaction includes:
   transmitting information corresponding to the first account.

57. The electronic device of claim 27, wherein proceeding with the transaction includes:
   transmitting information corresponding to a second account different from the first account.

58. The electronic device of claim 27, the one or more programs further including instructions for:
   in accordance with the determination that the wireless signal corresponds to the first type of request:
      forgoing presenting any indication requesting authentication.

59. The electronic device of claim 27, wherein the first account is one of a plurality of transit accounts stored by the account information application and the account information application stores one or more additional accounts that are not transit accounts, the one or more programs further including instructions for:
   prior to detecting, by the one or more short-range communication radios, the wireless signal:
      receiving user input selecting the first account as an account to be made available for use without checking authentication; and
      in response to receiving user input selecting the first account as an account to be made available for use without checking authentication, designating the first account to be made available for use without checking authentication.

60. The electronic device of claim 27, wherein the first account is an identification account.

61. The electronic device of claim 27, wherein the electronic device is in a locked state prior to detecting the wireless signal and continues to remain in the locked state while transmitting information corresponding to the first account without checking for authentication.

62. The electronic device of claim 27, wherein the information corresponding to the first account includes an account number of the first account.

63. The electronic device of claim 27, wherein the first account is a stored-value account and the information corresponding to the first account includes funds from the first account.

64. The electronic device of claim 27, wherein the first account is a payment account and the information corresponding to the first account includes payment account information of the first account.

65. The electronic device of claim 27, wherein the first account is a transit commuter account and the information corresponding to the first account includes transit pass information of the first account.

66. The electronic device of claim 27, wherein the first account is a stored-value account and the information corresponding to the first account includes an account number of the first account, the one or more programs further including instructions for:
   detecting, by the one or more short-range communication radios, a second wireless signal that includes a request for an amount of funds; and
   in accordance with a determination that the second wireless signal corresponds to the first type of request, transmitting funds from the first account without checking for authentication.

67. The electronic device of claim 27, wherein the information corresponding to the first account includes an account number of the first account, the one or more programs further including instructions for:
   detecting, by the one or more short-range communication radios, a second wireless signal that includes a request for an amount of funds;
   in accordance with a determination that the second wireless signal corresponds to the first type of request, and:
      in accordance with a determination that the requested amount of funds does not exceed a pre-authorized transaction amount, transmitting funds from the first account without checking for authentication; and
      in accordance with a determination that the requested amount of funds exceeds the pre-authorized transaction amount:
         generating feedback indicating that the requested amount of funds does not correspond to an expected cost; and
         checking for authentication to proceed with the transaction.

68. The electronic device of claim 67, the one or more programs further including instructions for:
   in accordance with the determination that the second wireless signal corresponds to the first type of request, and:
      in accordance with the determination that the requested amount of funds exceeds the pre-authorized transaction amount:
         receiving second authentication information; and
         in accordance with a determination that the second authentication information is consistent with enrolled authentication information that is enabled to authorize transactions, proceeding with the transaction; and
         in accordance with a determination that the second authentication information is not consistent with enrolled authentication information that is enabled to authorize transactions, forgoing proceeding with the transaction.

69. The electronic device of claim 27, wherein the determination that the wireless signal corresponds to the first type of request is based on contextual information of the electronic device that corresponds to the time when the wireless signal was detected by the electronic device.

70. The electronic device of claim 27, wherein the determination that the wireless signal corresponds to the first type of request includes a determination that a set of one or more contextual conditions has been met, wherein a second contextual condition of the one or more contextual conditions is met when a physical location of the electronic device that corresponds to the time when the wireless signal was detected by the electronic device corresponds to a predetermined location.

71. The electronic device of claim 27, wherein the determination that the wireless signal corresponds to the first type of request includes a determination that a set of one or more contextual conditions has been met, wherein a third contextual condition of the one or more contextual conditions is met when the electronic device is within range of one or more wireless signals different from the wireless signal.

72. The electronic device of claim 27, wherein the determination that the wireless signal corresponds to the first type of request includes a determination that a set of one or more contextual conditions has been met, wherein a fourth contextual condition of the one or more contextual conditions is met when the wireless signal includes a request for an amount of funds that does not exceed a fund threshold.

73. The electronic device of claim 27, wherein the determination that the wireless signal corresponds to the first type of request includes a determination that a set of one or more unlock conditions has been met, wherein a first unlock condition of the set of one or more unlock conditions is met when the electronic device has been unlocked within a previous amount of time.

74. The electronic device of claim 27, wherein the determination that the wireless signal corresponds to the first type of request includes a determination that a set of one or more unlock conditions has been met, wherein a second unlock condition of the set of one or more unlock conditions is met when the electronic device has been unlocked after a predetermined time of day on the day that the wireless signal is detected.

75. The electronic device of claim 27, wherein the determination that the wireless signal corresponds to the first type of request includes a determination that a set of one or more unlock conditions has been met, wherein a third unlock condition of the set of one or more unlock conditions is met when the electronic device has been unlocked after a restart.

* * * * *

UNITED STATES PATENT AND TRADEMARK OFFICE
CERTIFICATE OF CORRECTION

PATENT NO.       : 9,842,330 B1
APPLICATION NO.  : 15/274086
DATED            : December 12, 2017
INVENTOR(S)      : Marcel Van Os et al.

It is certified that error appears in the above-identified patent and that said Letters Patent is hereby corrected as shown below:

In the Claims

Column 186, Line 22 in Claim 29, Line 1, "claim 2" should be replaced with --claim 26--.

Signed and Sealed this
Thirteenth Day of March, 2018

Andrei Iancu
*Director of the United States Patent and Trademark Office*